Feb. 2, 1971 M. D. BUSCH 3,560,936

MESSAGE BUFFERING COMMUNICATION SYSTEM

Filed Oct. 8, 1968 20 Sheets-Sheet 1

INVENTOR
MICHAEL D. BUSCH

BY
FOWLER, KNOBBE
& MARTENS
ATTORNEYS.

INVENTOR.
MICHAEL D. BUSCH

BY
FOWLER, KNOBBE & MARTENS
ATTORNEYS.

Feb. 2, 1971 M. D. BUSCH 3,560,936

MESSAGE BUFFERING COMMUNICATION SYSTEM

Filed Oct. 8, 1968 20 Sheets-Sheet 3

INVENTOR.
MICHAEL D. BUSCH

BY
FOWLER, KNOBBE
& MARTENS
ATTORNEYS.

INVENTOR
MICHAEL D. BUSCH
BY
FOWLER, KNOBBE & MARTENS
ATTORNEYS.

INVENTOR.
MICHAEL D. BUSCH
BY
FOWLER, KNOBBE & MARTENS
ATTORNEYS.

INVENTOR.
MICHAEL D. BUSCH
BY
FOWLER, KNOBBE & MARTENS
ATTORNEYS.

INVENTOR.
MICHAEL D. BUSCH
BY
FOWLER, KNOBBE
& MARTENS
ATTORNEYS.

INVENTOR.
MICHAEL D. BUSCH
BY
FOWLER, KNOBBE
& MARTENS
ATTORNEYS.

INVENTOR.
MICHAEL D. BUSCH
BY
FOWLER, KNOBBE & MARTENS
ATTORNEYS.

Feb. 2, 1971 M. D. BUSCH 3,560,936

MESSAGE BUFFERING COMMUNICATION SYSTEM

Filed Oct. 8, 1968 20 Sheets-Sheet 10

INVENTOR.
MICHAEL D. BUSCH

BY
FOWLER, KNOBBE
& MARTENS
ATTORNEYS.

INVENTOR.
MICHAEL D. BUSCH
BY
FOWLER, KNOBBE & MARTENS
ATTORNEYS.

INVENTOR.
MICHAEL D. BUSCH

BY
FOWLER, KNOBBE & MARTENS
ATTORNEYS.

INVENTOR
MICHAEL D. BUSCH
BY
FOWLER, KNOBBE & MARTENS
ATTORNEYS.

INVENTOR
MICHAEL D. BUSCH
BY
FOWLER, KNOBBE & MARTENS
ATTORNEYS.

INVENTOR.
MICHAEL D. BUSCH
BY
FOWLER, KNOBBE & MARTENS
ATTORNEYS.

MESSAGE BUFFERING COMMUNICATION SYSTEM

Filed Oct. 8, 1968 20 Sheets-Sheet 16

INVENTOR.
MICHAEL D. BUSCH
BY
FOWLER, KNOBBE & MARTENS
ATTORNEYS.

MESSAGE BUFFERING COMMUNICATION SYSTEM

Filed Oct. 8, 1968 20 Sheets-Sheet 17

INVENTOR
MICHAEL D. BUSCH
BY
FOWLER, KNOBBE & MARTENS
ATTORNEYS.

INVENTOR.
MICHAEL D. BUSCH
BY
FOWLER, KNOBBE & MARTENS
ATTORNEYS.

INVENTOR.
MICHAEL D. BUSCH
BY
FOWLER, KNOBBE & MARTENS
ATTORNEYS.

INVENTOR.
MICHAEL D. BUSCH
BY
FOWLER, KNOBBE & MARTENS
ATTORNEYS.

United States Patent Office 3,560,936

Patented Feb. 2, 1971

3,560,936

MESSAGE BUFFERING COMMUNICATION SYSTEM

Michael D. Busch, Corona del Mar, Calif., assignor to Pillsbury-Occidental Co., a corporation of Delaware Filed Oct. 8, 1968, Ser. No. 766,384
Int. Cl. G06f *3/00, 5/06, 16/11*
U.S. Cl. 340—172.5 9 Claims

(A) ABSTRACT OF THE DISCLOSURE

Apparatus and method for transmitting data on a time-shared basis between a plurality of low-speed sources and a high-speed source over a communication circuit. Byte-serial data is initially transmitted at a relatively low rate from a plurality of remote sources (terminals) to a nearby peripheral computer which temporarily stores the incoming data in a memory unit and arranges it into strings of data blocks. The stored data is later transmitted as messages of one or more data blocks at a much faster rate over a communication circuit to a central computer. These data blocks may be either text blocks containing the temporarily stored data or control blocks containing information regarding the status of remote terminals. In addition, each message contains an acknowledge block whose purpose is to facilitate the detection and correction of data transmission errors. The central computer checks all incoming blocks for errors and acknowledges only those that have been correctly received. Blocks received in error by the central computer are not acknowledged, and are retransmitted by the peripheral computer until they are correctly received. Conversely, messages consisting of acknowledge, text, and control blocks are transmitted from the central computer to the peripheral computer over the communication circuit at high speed, the data is temporarily stored in the peripheral computer's memory and is later transmitted to the correct remote destination (terminal) at low speed. Error detection and correction performed on these messages is similar to those performed on messages traveling in the opposite direction.

(B) BACKGROUND OF THE INVENTION

(1) Field of the invention

The present invention relates to a system and a method for transmitting data between several low-speed sources and a central high-speed source. The invention relates more particularly to digital data communication systems in which a plurality of sources such as Teletype terminals capable of receiving and transmitting byte-serial digital data (hereinafter referred to as "terminals") are connected by communication circuits to a central computer capable of receiving and transmitting byte-serial digital data from and to a plurality of terminals simultaneously.

(2) Description of the prior art

In one prior digital data communication system, each terminal is connected to a central data processing system, i.e., a computer, by means of a separate parallel communication circuit, i.e., a telephone line. However, in digital data communication systems in which the cost of communication circuits is high (i.e., a system in which the terminals are scattered throughout a large geographic area), it is often advantageous to interpose between the terminals and the central data processing system one or more devices capable of concentrating the input and output data streams of a plurality of terminals onto a single communication circuit in such a way that the identity of each data stream (i.e., the terminal of origin or destination) is preserved. Two types of such concentrators are well known.

A frequency-division concentrator preserves the identity of data streams coming from a plurality of terminals by providing a discrete and separable subcarrier for each terminal. Each subcarrier is usually of a different frequency and is modulated by the data stream from the associated terminal. A frequency-division concentrator preserves the identity of data streams going to a plurality of terminals by isolating each discrete and separable subcarrier signal (e.g., with a band-pass filter) demodulating it and directing the resultant data stream to the terminal associated with that subcarrier.

A time-division concentrator transmits and receives over its communication circuit a cyclic synchronous digital data stream, each cycle of which consists of a data byte associated with each attached terminal taken in turn together with synchronization information which defines the beginning of each cycle. Each terminal is assigned a discrete time interval within this cycle. A time-division concentrator preserves the identity of data streams coming from a plurality of terminals by temporarily storing (buffering) a data byte from each terminal and retransmitting that byte over the communication circuit during the next discrete time interval assigned to that terminal. A time-division concentrator preserves the identity of data streams going to a plurality of terminals by buffering a data byte for each terminal, that byte being obtained from the communication circuit during the discrete time interval assigned to that terminal, and retransmitting that data byte to the terminal.

Frequency-division concentrators and time-division concentrators share a number of fundamental deficiencies. The first of these is due to the fact that in most digital data communication systems each terminal is actually transmitting and receiving data during only a small portion of the time; it is idle during the rest of the time. Concentrators of the prior art cannot take advantage of the low duty cycle of terminals, i.e., the small amount of time during which the terminals are active, because such concentrators create a fixed partitioning of the communication circuit. That is, they necessarily assign a discrete interval of time (or bandwidth) to each terminal regardless of whether that terminal is active or idle, which is, of course, undesirable.

Secondly, concentrators generally prove most advantageous in digital data communication systems which involve long-distance and high-speed data transmission. But errors and loss of information are particularly likely to occur over long distances and at high transmission rates. Yet, existing concentrators are primarily directed toward detecting errors rather than correcting them.

Finally, it is frequently necessary for digital data communication systems to include several different types of terminals. The central data processing system may be complicated significantly by the requirement that it be able to communicate with terminals which are made by different manufacturers, and which have different character codes and data transmission rates. Existing concentrators are incapable of performing sufficient speed conversion, character translation, etc. to render the differences between terminal types "invisible" to the central data processing system.

(C) SUMMARY OF THE INVENTION

An exemplary data communication system constructed in accordance with the invention and disclosed in detail herein includes a plurality of data terminals, a peripheral computer which is usually located relatively near the terminals and a central computer which is usually considerably farther from them. Each of the terminals produces an intermittent stream of digital data which are transmitted to the peripheral computer asynchronously and concurrently over a plurality of low speed communication channels which extend between the respective ones of the terminals and the peripheral computer. In accordance with a principal feature of the invention, means are provided within the peripheral computer for assembling all of the data streams into a continuous data string while preserving the identity of each of them. This data string is then synchronously transmitted to the central computer over a single high speed communication channel extending between the two computers.

An important advantage of the system incorporating the above feature of the invention is that the high speed communication channel is utilized much more effectively and efficiently than in the prior art because only so much time is devoted to the transmission of data from a given terminal as that data actually requires. Thus, the system is able to take advantage of the low duty cycle characteristic of most terminals.

In carrying out this feature of the invention, a novel and highly effective means is provided in the peripheral computer for assembling all of the data streams into a continuous data string. Its principal component is a memory, typically of the magnetic core type, having a plurality of individually addressable memory segments. All of the data streams are concurrently stored in the memory, with each data stream being stored in a different group of memory segments with each group including at least one memory segment. As each group of memory segments receives a data string comprising one complete message from a given terminal, that group of memory segments is effectively interlinked with other groups of memory segments which have been similarly filled. In this way, a continuous string of data held in a series of interlinked memory segments is built up.

A particularly effective means of transmitting the data string assembled in the memory of the peripheral computer in such a way as to correct any errors that might occur during transmission is also disclosed. However, it is not claimed herein, but is claimed instead in a copending divisional application filed on or about July 10, 1970 and entitled Data Communication System With Error Correction.

(D) BRIEF DESCRIPTION OF THE DRAWINGS

Figure 1:
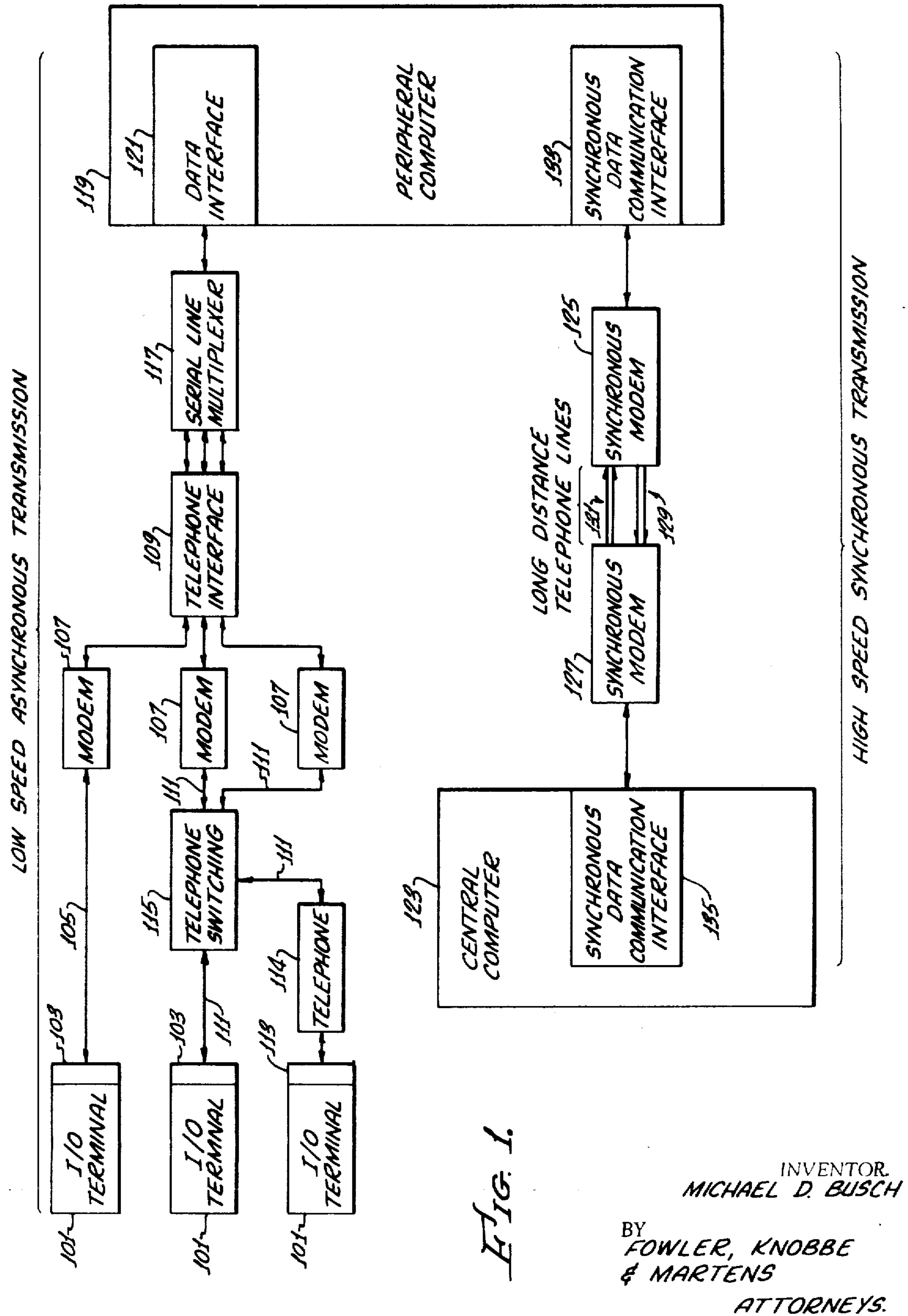
FIG. 1 is a general block diagram of a data communication time sharing system suitable for practicing the present invention.
Figure 7:
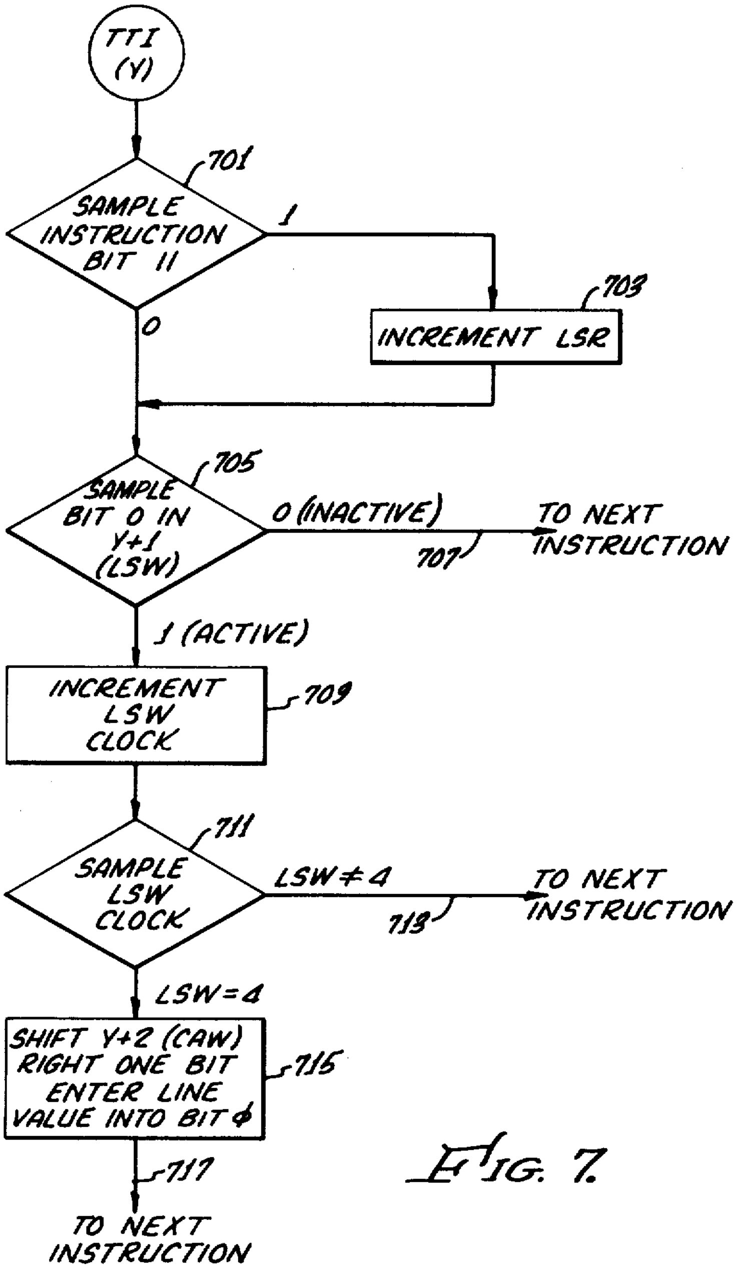
Figure 8A:
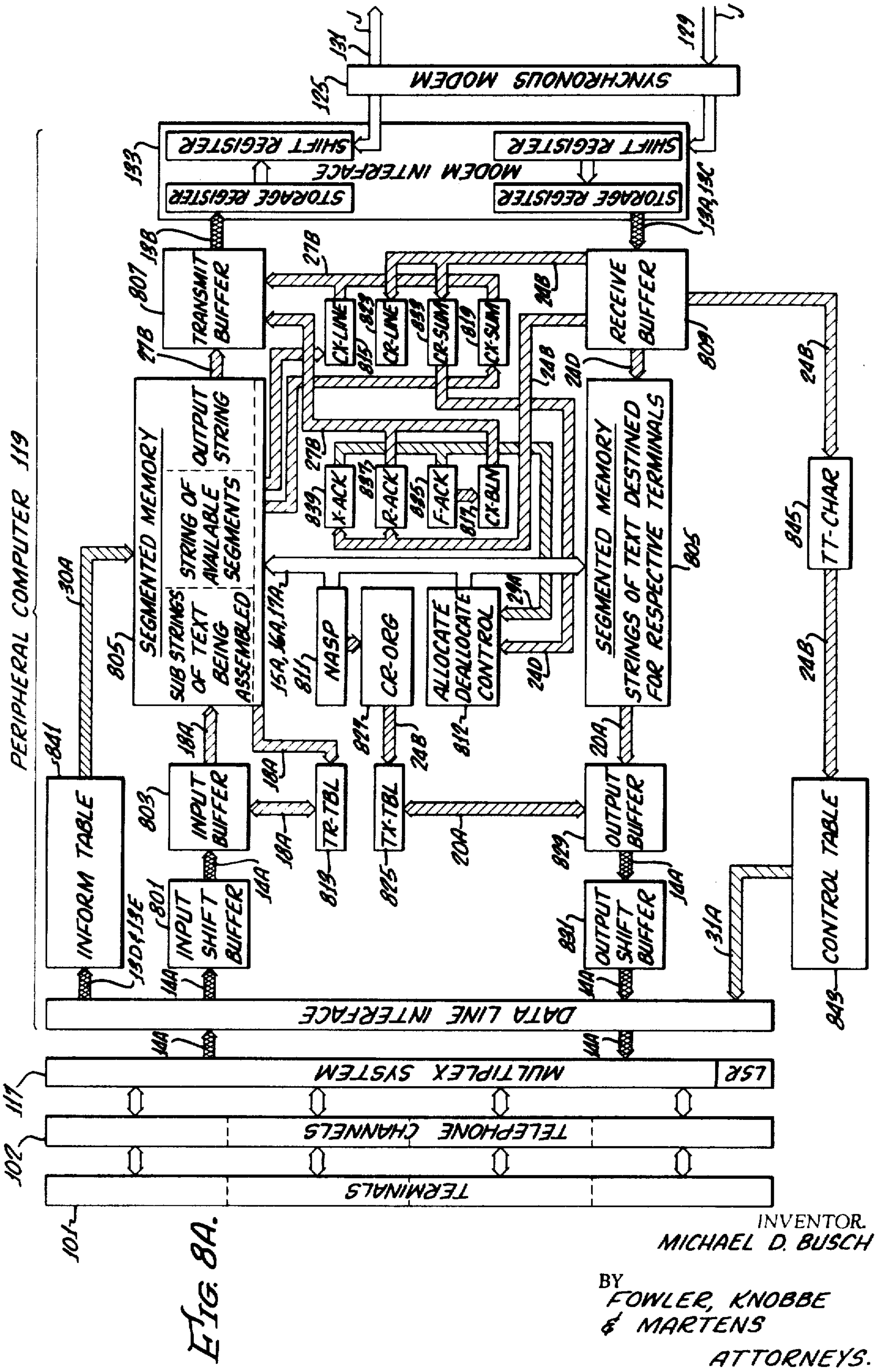
Figure 8B:
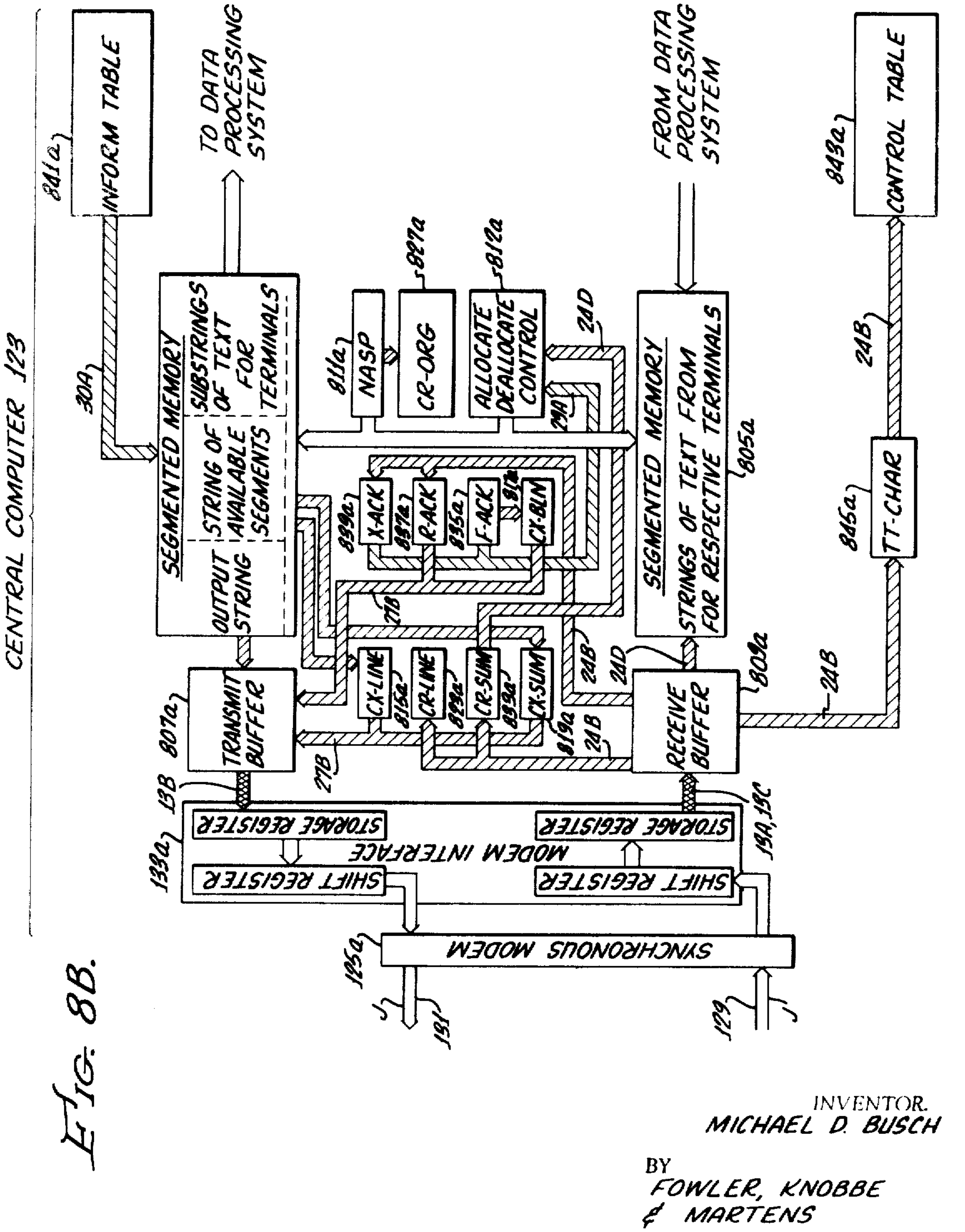
Figure 9:
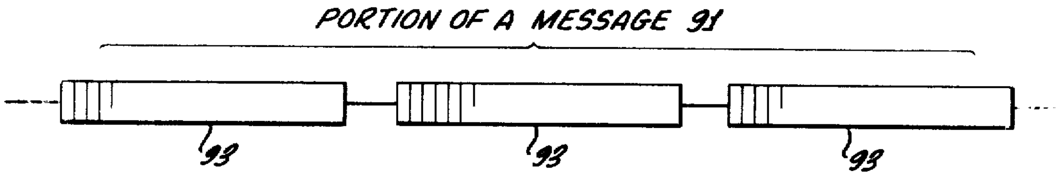
Figure 10:
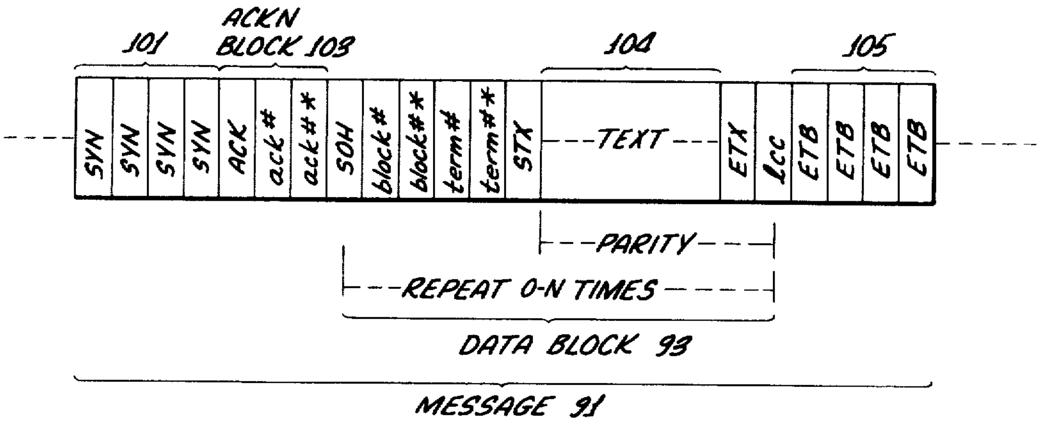
Figure 11A:
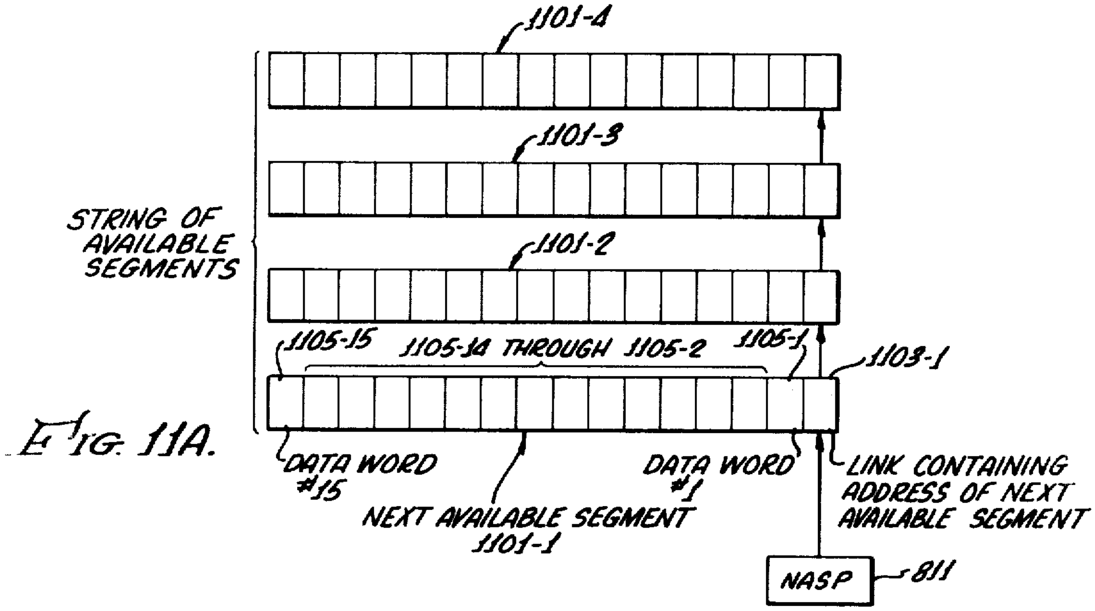
Figure 11B:
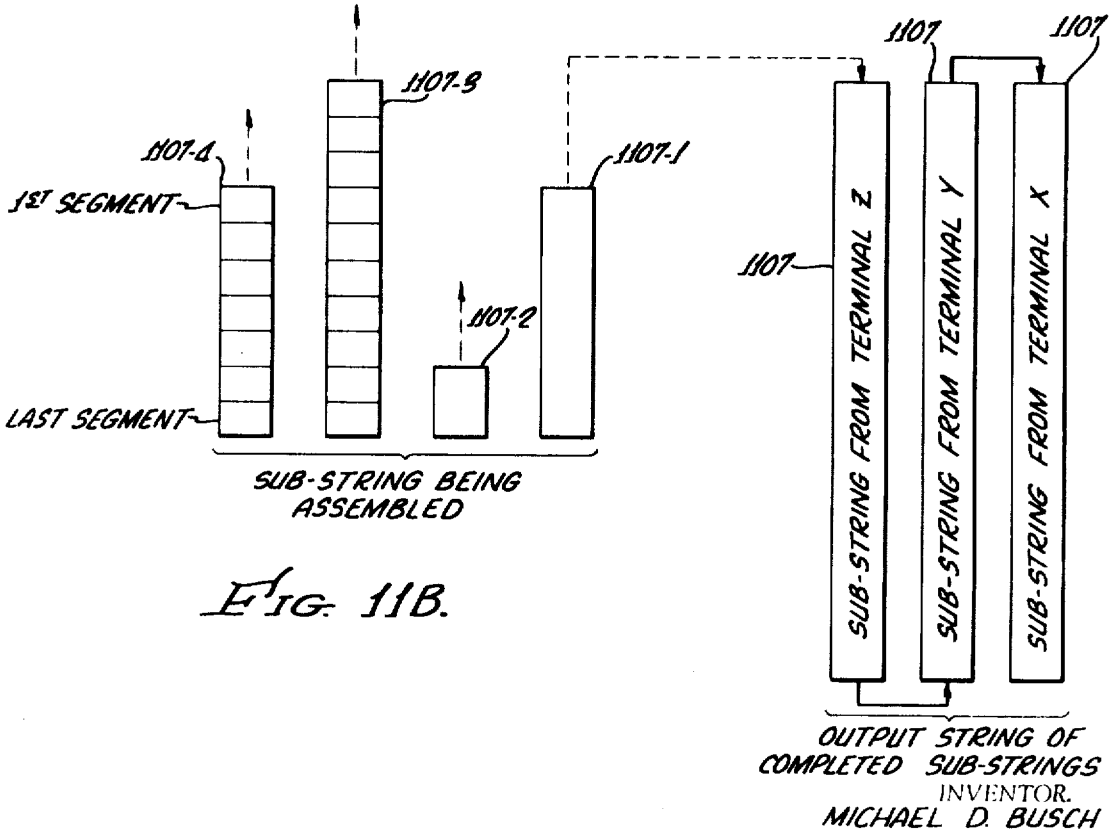
Figure 12:
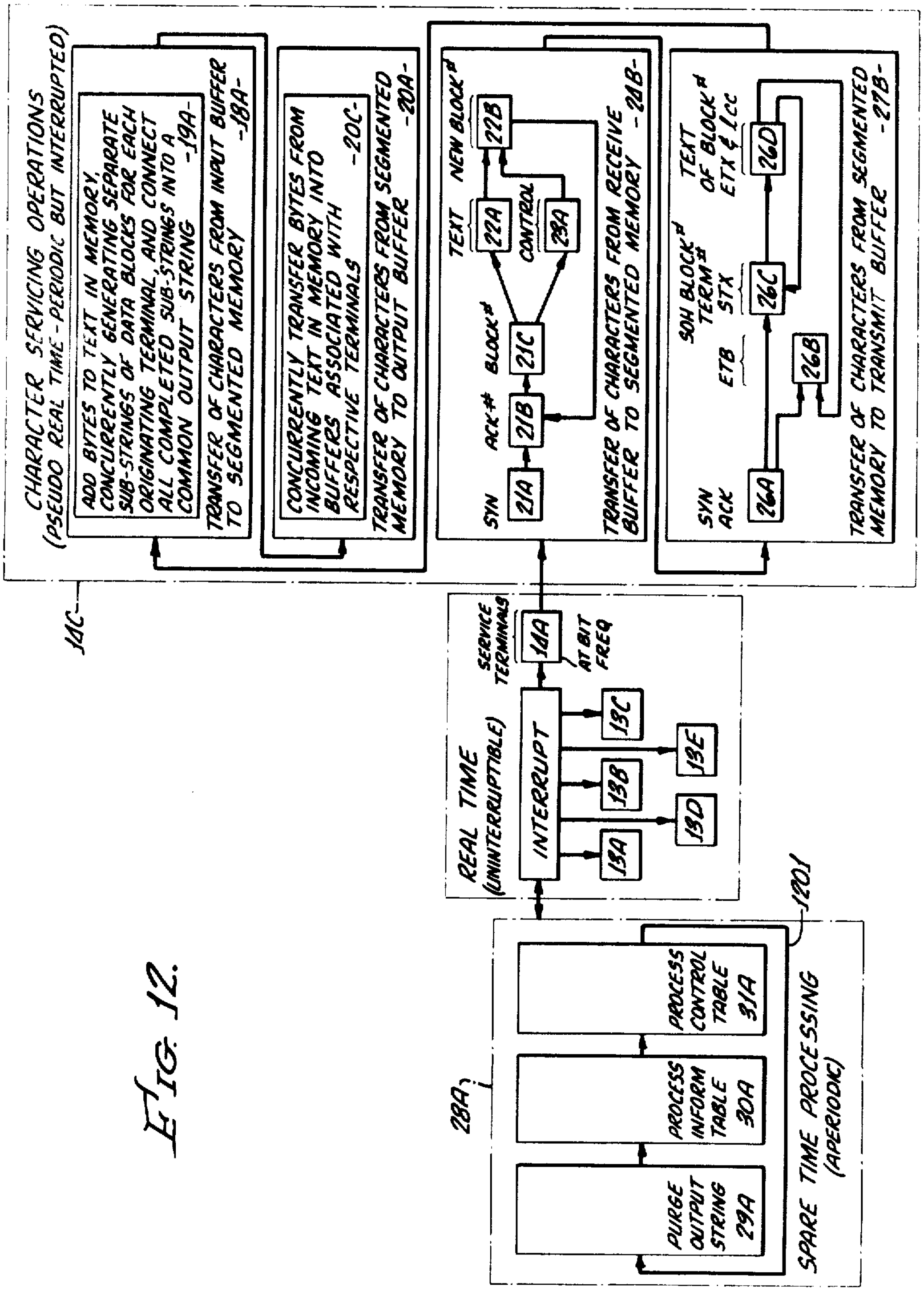

FIGS. 6*a*, 6*b*, 6*c*, and 6*d* show the four different instruction formats used by the peripheral computer of FIG. 1;

FIG. 7 is a flow chart for a Teletype In instruction;

FIG. 8, formed of FIGS. 8*a*–8*b* when joined together as indicated thereon, is a schematic block diagram of a message buffering communication system incorporating features of the present invention;

FIG. 9 illustrates three data blocks forming a portion of a message which is transmitted between the computers comprising part of the system of FIG. 8;

FIG. 10 shows the sequence of bytes at the beginning and end of the message a portion of which is shown in FIG. 9;

FIG. 11*a* illustrates the manner in which available memory segments are organized into a continuous string, in which each suitable memory segment contains the address in memory of the following available memory segment;

FIG. 11*b* illustrates the manner in which several substrings of memory segments are concurrently assembled in the segmented memory of the data concentrator portion of the system in FIG. 8*a* and are linked into a continuous output string;

FIG. 12 is a simplified flow chart of the operations carried out by the system of FIG. 8; and FIGS. 13–30 are more detailed flow charts of the operations indicated generally in FIG. 12.

(E) REFERENCES

The following documents should be consulted for additional information concerning currently known and commercially available elements of the disclosed embodiment of the invention:

(1) Small Computer Handbook (1967–1968), published by Digital Equipment Corporation, Maynard, Mass.
(2) The PDP–8 Users Handbook, published by Digital Equipment Corporation, Maynard, Mass.
(3) PDP–8 Maintenance Manual, published by Digital Equipment Corporation, Maynard, Mass.
(4) Datasets 201A and 201B Interface Specifications Bulletin, published by American Telephone and Telegraph Company, New York, N.Y.
(5) DEC Communications Equipment, published by Digital Equipment Corporation, Maynard, Mass.
(6) Data Communication System 680 Instruction Manual (DEC–08–17CA–D), published by Digital Equipment Corporation, Maynard, Mass.
(7) The 689/ADF Bulletin, published by Digital Equipment Corporation, Maynard, Mass.
(8) Data Communication Channel DP01A Instruction Manual for Use With PDP–8, published by Digital Equipment Corporation, Maynard, Mass.
(9) PAL III Symbolic Assembler Programming Manual, (8–3–S), published by Digital Equipment Corporation, Maynard, Mass.
(10) Digital 8–3–S Assembly Program, available from Digital Equipment Corporation, Maynard, Mass.

(F) DEFINITION OF TERMS bit—A quantity of data, consisting of one binary digit (0 or 1).

Byte—A quantity of data, consisting of a predetermined number of bits (e.g., in the present invention, 8-bits); usually the quantity of data needed to encode a single character.

byte serial—A method of data transmission, one byte at a time.

byte parity—The number of one-bits in a byte modulo two (i.e., the oddness or eveness). For the purposes of error detection, an additional "parity bit" is frequently included in each byte and is set to 0 or 1 in order to maintain a predetermined byte parity (e.g., in the present invention, even byte-parity).

microencoded—A method of transmitting byte-serial data, in which each bit position of a byte has a different assigned meaning.

block—A quantity of data, consisting of a plurality of bytes.

character—A letter, number, or mark in binary code.

longitudinal checksum—The sum of the bytes in a block, where each byte is taken as a binary number, and overflows are ignored in summing. For the purposes of error detection, an additional "longitudinal checksum character" (lcc) is frequently included in each block and is given a value which maintains a predetermined longitudinal checksum (e.g., in the present invention, zero modulo 128).

baud—A measure of data transmission speed, consisting of one bit per second.

mark—A signal on a communications circuit corresponding to a 0-bit.

full-duplex—A method of data transmission, in which independent streams of data are transmitted in both directions simultaneously.

synchronous—A method of transmitting byte-serial data, in which the time interval between successive bytes is fixed.

asynchronous—A method of transmitting byte-serial data, in which the time interval between successive bytes is random.

modem—A bidirectional transducer between D.C. digital signals and a signal capable of transmission over a voice-grade telephone circuit (e.g., frequency-modulated or phase modulated audio tones).

segment—A quantity of memory space, consisting of a predetermined number of memory words (e.g., in the present invention, sixteen), one of which is a link (which see).

link—In a segment, a word (e.g., in the present invention, the first word of the segment) which contains the memory address of another memory segment.

linking word—The address in a link.

SYN—An ASCII character used for establishing synchronism in synchronous data transmission.

SOH—An ASCII character which denotes start of header.

STX—An ASCII character which denotes start of text.

ETX—An ASCII character which denotes end of text.

ACK—An ASCII character which denotes an acknowledgment.

ETB—An ASCII character which denotes an end of message.

message—A unit of data transmission, consisting of one or a plurality of blocks.

output string—The blocks which are temporarily stored in the memory of one computer pending their successful transmission to another computer.

one's complement—The one's complement of a binary number is obtained by subtracting that number from a binary number consisting entirely of "1" bits.

two's complement—The two's complement of a binary number is obtained by subtracting that number from a binary number consisting entirely of "0" bits. The sum of a number and its two's complement is 0.

End of Text Sentinel—A byte having a simple configuration, such as all zeroes, denoting the end of a message.

(G) DESCRIPTION OF THE PREFERRED EMBODIMENT

(1) Description of a suitable data transmission system (a) General description of the system: Referring now to FIG. 1 there is shown a time sharing computer system suitable for practicing the present invention. Data originates at a plurality of remote teleprinter terminals 101, only three of which are shown. Typically the terminals comprise a keyboard unit and a display or printing unit. The first terminal 101 is connected to a conventional modem 103 which converts the digital signals from the terminal 101 to frequency-shift-keyed audio tones which can be transmitted over a dedicated voice-grade telephone line 105 and converted by another modem 107 to digital signals and coupled as input to a telephone interface 109. The telephone interface 109 will transmit data serially to the first terminal 101 through modem 107, telephone line 105 and modem 103. A suitable modem 103 for use in conjunction with the terminal 101 is the A.T.&T. 101C Dataset. A suitable modem 107 is the A.T.&T. 103A Dataset.

The second terminal 101 is also connected to a modem 103. The audio tones generated by the modem 103 are transmitted over a dial-up telephone circuit including telephone lines 111 and telephone switching equipment 115 before passing through a modem 107 to the telephone interface 109.

The third terminal 101 is connected to the telephone interface 109 in a fashion similar to the coupling used for the second terminal 101 except that a telephone acoustical coupler 113 and a conventional telephone instrument 114 are used in the place of a modem 103. A suitable acoustical coupler 113 is the Anderson-Jacobson Modem 260 originating acoustical coupler.

Digital data is transmitted between the terminals 101 and the telephone interface 109 asynchronously, typically at a rate of 60 to 150 baud. The telephone interface 109 includes means for detecting a change in the carrier signal between the modems 103 and 107 and means for connecting and disconnecting the remote terminal 101 (i.e., "pick up the phone" and "hang up the phone"). One suitable telephone interface 109 is the Digital Equipment Corporation Model 689 additional dataphone features unit.

A serial line multiplexer 117 is coupled to the telephone interface 109 and provides a means for coupling any one of the dataline inputs from the telephone interface 109 to a peripheral computer 119 through a data interface 121. A suitable data interface 121 is the Digital Equipment Corporation Data Line Interface Type 681. A suitable serial line multiplexer 117 is the Digital Equipment Corporation Model 685. The multiplexer 117 includes a line selection register (LSR) which specifies the particular input circuit from the telephone interface 109 to be connected to the data interface 121. The LSR is a 7 bit register whose 6 low order bits select one of 64 input circuits and whose 7th high order bit may be used to select one of an additional 64 input circuits of a second multiplexer 117 is provided in the system. The peripheral computer 119 includes instructions and logic for loading a number into the LSR so that random access to any input circuit from the telephone interface 109 is possible. The peripheral computer 119 also includes means for clearing and incrementing the LSR providing the capability for high speed sequential scanning of the input lines from the telephone interface 109.

The serial line multiplexer 117 includes one or more clocks which interrupt the computer 119 periodically to permit the computer 119 to sample incoming data from the telephone interface 109 and to transmit outgoing data to the telephone interface 109 at the proper bit rate.

The computer 119 will sample each input line at the proper time under the control of the clocks in the multiplexer 117 and assemble these sampled data bits into bytes. These data bytes are then assembled into data blocks within the computer 119 for later transmission to a central computer 123.

Advantageously, the peripheral computer 119 and the central computer 123 may be small scale general purpose digital computers such as the Digital Equipment Corporation PDP–8 which is a one-address, fixed word length, parallel computer using 12 bit, two's complement arithmetic and having a random-address magnetic core memory providing storage for 4,096 words. The memory cycle time for this computer is 1.5 microseconds. This computer also features indirect addressing and means for instruction skipping and program interruption as a function of the condition of the input/output devices associated with the computer.

The computer 119 transmits and receives data bytes from the central computer 123 over a communications circuit which includes a pair of high speed synchronous modems 125 and 127 and a dedicated bidirectional communications circuit 129 and 131. The modems 125 and 127 may be any of the commercially available units of which the American Telephone and Telegraph Company 201B Dataset is an example. The communications circuit must be capable of continuous full-duplex transmission and may be a so-called 4-wire telephone circuit consisting of two independent unidirectional pairs 129 and 131 faced in opposite directions. Advantageously, the synchronous modems 125 and 127 have a transmission rate in the order of 2400 baud.

The peripheral computer 119 includes a synchronous data communications interface 133 which provides a means for synchronizing data communication with the modem 125. The synchronous interface 133 includes a first transmit register which receives a data byte or character in parallel from the computer 119 when a transmit instruction is performed. The data byte is then shifted in parallel into a second transmit register. The second transmit register is then shifted so that the bits in the byte are transmitted serially to the modem 125. The synchronous interface 133 however will not begin transmission until the computer 119 inserts a particular character, a synchronization character, into the first transmit register.

The computer 119 receives data bits serially from the modem 125. These bits are shifted into a first receive register in the synchronous interface 133. Once a complete data byte or character has been assembled in the first receive register the byte is shifted in parallel into a second receive register releasing the first receive register to receive a subsequent byte from the modem 125.

The synchronous interface 133 continuously decodes the bytes appearing in the first register and will prevent the parallel shift of characters from the first receive register to the second receive register until a particular character, a synchronization character, is decoded in the first receive register. All subsequent characters from the modem 125 received in the first receive register will be shifted to the second receive register. Each time the synchronous interface 133 shifts a byte into the second receive register it will send an indication to the computer 119 that a data byte is available for it to process.

The central computer 123 receives and transmits data to the synchronous modem 127 through a synchronous data communication interface 135 in the same manner as that described above.

A suitable device for use as the synchronous data communication interface 133 and 135 is the Digital Equipment Corporation Data Communication Channel DP01A.

Figure 2:
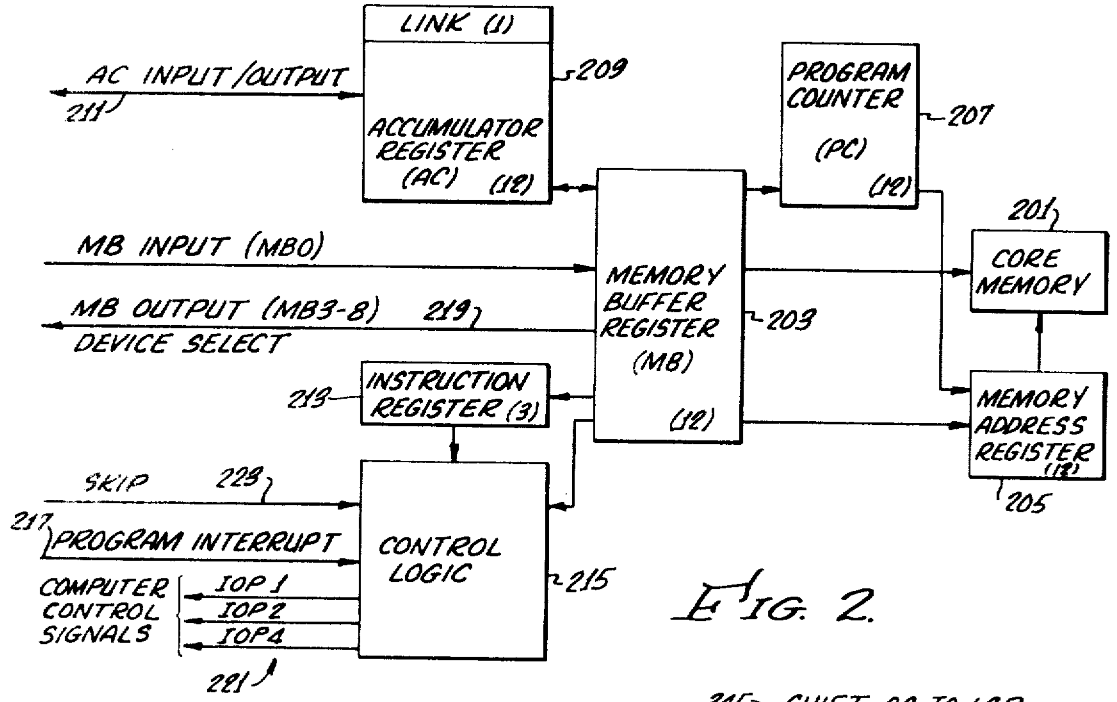
FIG. 2 is a block diagram of the peripheral computer seen in FIG. 1.

(b) Detailed description of the system (1) The peripheral computer: In FIG. 2 there is shown a simplified block diagram of the peripheral computer 119. A core memory 201 provides program and data storage and has a capacity to store 4,096, 12 bit words. All words to be entered into or read from the memory 201 must pass through a 12 bit memory buffer register 203 (MB). A 12 bit memory address register 205 selects the particular word location or address in the memory 201 which is to be written into or read from by the memory buffer register 203. The memory address register 205 allows random access to any particular location in the core memory 201. The word location which is to be accessed in the memory 201 may be set into the memory address register 205 from a 12 bit program counter 207 (PC) or the memory buffer register 203.

The arithmetic and logical operations of the computer 119 are performed in a 12 bit accumulator register 209 (AC). A 13th bit or a link bit is provided in the accumulator register 209 for overflow indications during arithmetic computation. The contents of the accumulator register 209 may be rotated with the link bit right or left, under the control of the program in the memory 201. The contents of the accumulator register 209 may be added to the contents of the memory buffer register 203 with the sum being placed in accumulator register 209. Similarly the contents of the accumulator register 209 and the memory buffer register 203 may be logically ANDed under program control with the result being placed in accumulator register 209. Data bits may be entered into or read from the accumulator register 209 in parallel on a line 211 which represents a plurality of input/output lines, one corresponding to each stage in the accumulator register 209.

To execute an instruction in the program the location of that instruction is set into the memory address register 205 from the program counter 207. The contents of the memory location defined by the memory address register 205 is read into the memory buffer register 203. A portion of the word (i.e., the instruction) in the memory buffer register 203 corresponding to the operation code of the instruction (MB0–2) is then shifted into a 3 bit instruction register 213. The operation code contained in the instruction register 213 is decoded by logic in a control logic means 215.

The control logic means 215 controls the logical operation of the computer 119 by generating control signals to the logical elements in the computer 119 to control the sequencing of a particular logical function. The interconnections between the control logic 215 and the other elements of the computer 119 are not shown for the sake of simplicity. When an instruction has been completely performed the control logic 215 will increment the program counter 207 and will cause that new instruction address to be shifted into the memory address register 205. The process is then repeated again.

Particular instructions which may be performed by the computer 119 require that the control logic 215 make a decision dependent upon certain conditions present in the computer 119. If the particular condition in the computer 119, such as a negative number in the accumulator register 209, is detected, the control logic 215 will cause the program counter 207 to be incremented to skip the next sequential instruction. The computer 119 may also execute an instruction which will cause a parallel transfer of bits from the memory buffer register into the program counter 207 to cause the computer 119 to jump to a new section of the program to continue computation.

All data transfers between the core memory 201 and the various registers in the computer 119 pass through the memory buffer register 203. Data may be transferred into the memory buffer register 203 from the memory address register 205 or the accumulator register 209.

During the execution of certain instructions the control logic 215 will cause particular bits in the memory buffer register 203 (MB3–8) to be read out in parallel on a plurality of lines represented by line 219. These lines may be connected to a plurality of input/output devices and used as a code for selecting a particular device to interact with the computer 119.

The control logic 215 includes enable interrupt logic which may be enabled or disabled by the execution of particular instructions by the computer 119. When the interrupt logic is enabled, the normal operation of the computer 119 may be interrupted by a program interrupt signal on line 217 to the control logic 215. A program interrupt signal may be generated by any one of the input/output devices associated with the computer 119. All the input/output devices have their program interrupt signals bussed together and connected to line 217. When a program interrupt signal occurs on line 217 the control logic 215 will allow the computer 119 to complete the particular instruction that it is executing and will then cause the location of the next instruction which was to be performed to be shifted from the program counter 207 into a particular memory location, location 0000 for example, in the core memory 201. The control logic 215 will then cause the computer 119 to execute the instruction found in a particular memory location, location 0001 for example. The instruction found in this latter location will usually be an instruction which will cause the computer 119 to jump to a routine that will cause the computer 119 to interrogate the status of the various input/output devices and to take whatever action is necessitated by the condition which caused the program interrupt signal to be generated.

To interrogate the status of various conditions in the input/output devices the computer 119 will perform certain instructions as determined by the program in the core memory 201. For example, to check the status of a particular condition in a particular input/output device, an instruction will be shifted from a core memory 201 into the memory buffer register 203. This instruction when decoded by control logic 215 will result in the device select bits (MB3–8) in the memory buffer register 203 being applied in parallel on the lines represented by line 219 to the input/output devices. Each input/output device has a device select decoder which generates an indication to the input/output device that it has been selected to be interrogated. At the same time that the device select code is being read out from the memory buffer register 203, control signals (IOP1, IOP2, IOP4) will be generated by the control logic 215 on a plurality of lines 221. The signals on the lines 221 are connected to the input/output devices and when decoded in conjunction with the device select code on line 219 will cause a particular condition in that input/output device to be interrogated.

There are, in general, two types of conditions in the input/output devices which will cause program interrupts. If a particular condition of the first type in an input/output device is interrogated and it is found that it was not the condition which generated the program interrupt a skip signal will be returned to the control logic 215 on line 223. The control logic 215 detects the skip signal and will cause the program counter 207 to skip the next sequential instruction and perform the following one. If, however, the condition is interrogated and it is found that it was the condition that caused the program interrupt a skip signal will not appear on line 223 from that device. The control logic 215 will cause the program counter 207 to be incremented, as it normally would, resulting in the computer 119 performing the next sequential instruction. Typically that instruction will cause the computer 119 to jump to a routine which will take the appropriate action necessitated by the particular condition. When a condition of the second type is interrogated the opposite result occurs. That is, a skip signal will be generated if the interrogated condition did cause the program interrupt and will not be generated if it did not.

The signals on lines 221 (IOP1, IOP2, IOP4) are generated by the control logic 215 as a function of the state of particular bit positions (MB9–11) of certain types of instructions once the instruction has been read into the memory buffer register 203. These signals do not occur simultaneously but instead will be spaced apart by approximately 1 microsecond. The signals on lines 221 and the device select code on lines 219 may be gated together in the input/output device to generate control logic signals for elements within the device.

Figure 3:
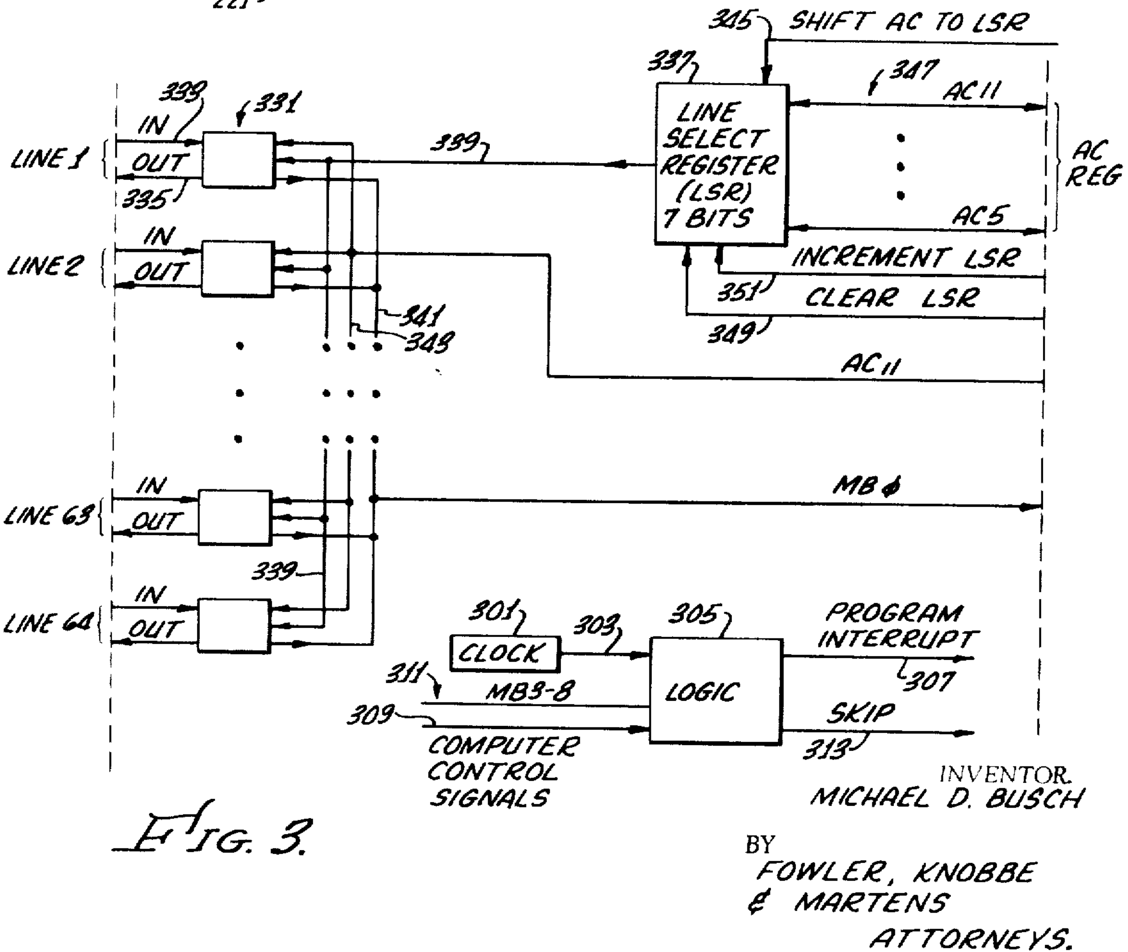
FIG. 3 is a block diagram of the serial line multiplexer seen in FIG. 1.

(2) The serial line multiplexer: In FIG. 3 there is shown a schematic block diagram of the serial line multiplexer 117 seen in FIG. 1. The multiplexer 117 includes one or more clocks only one of which, clock 301, is shown in the figure. The clock 301 has a periodic output on line 303 to a logic means 305. Each time a clock pulse appears on line 303 a clock flag flip flop (not shown) will be set which will cause a clock program interrupt pulse to appear on line 307 if the clock interrupt signal has been previously enabled. The clock program interrupt is enabled when a certain instruction is executed by the computer 119. When this instruction is executed a device select code will appear on line 311 and a signal will appear on line 309. The line 309 represents the IOP signals appearing on lines 221 in FIG. 2. These signals will set a clock enable flip flop (not shown). The clock enable flip flop when set enables logic which will cause the clock flag flip flop to set when a clock pulse occurs.

The program interrupt signal on line 307 is an input to the control logic 215 on the program interrupt line 217. The program interrupt signal will cause the computer 119 to initiate an interrupt routine to interrogate all the possible conditions which could generate a program interrupt signal. During the execution of this interrupt interrogation routine, a certain instruction will be executed which will interrogate the logic 305 to determine if the clock 301 was the device which had resulted in the program interrupt signal. To interrogate the clock 301 the computer 119 will execute a particular instruction which will select the logic 305 by an appropriate signal on line 311. At the same time a second signal will appear on line 309 to interrogate the status of the clock flag flip flop to determine whether or not the clock 301 had generated the program interrupt pulse. If the clock 301 was not the source of the interrupt signal a skip signal on line 31 from logic 305 will cause the computer 119 to skip the next instruction and execute the following one as previously described. If, however, the clock 301 was the source of the program interrupt the skip signal on line 31 will not occur and the computer 119 will sequence to the next instruction which will result in the computer jumping to a sub-routine to service the input and output lines to the terminals 101.

The multiplexer 117, shown in FIG. 3, provides a means for the computer 119 to communicate data bits to or from up to 64 data terminals 101. A date conversion module, such as module 331, is associated with each data terminal 101. Data bits generated by a data terminal 101 are connected to the conversion modules 331 on an input line such as line 333. Data bits being transmitted out to the data terminals 101 from the multiplexer 117 appear on an output line such as line 335.

A 7 bit line select register 337 (LSR) provides a means for the computer 119 to select a particular data conversion module 331. Once a data conversion module 331 has been selected, the computer 119 may receive/transmit data to its associated terminal 101. The bits in the LSR 337 are coupled in parallel to each of the data conversion modules 331 by lines represented by line 339. Each data conversion module 331 decodes the bits contained in the LSR 337. If the LSR 337 selects a particular data conversion module 331, data bits may be transferred either in or out through that module. A data bit input to a selected data conversion module 331 will be coupled to an input bus 341. The data bit appearing on the bus 341 is coupled as an input to the most significant bit (MB0) in the memory buffer register 203 in the computer 119. The memory buffer register 203 will accept this data bit input only when the computer 119 is executing a Teletype Input instruction.

A data bit to be transmitted to a terminal 101 is contained in the least significant bit position (AC11) of the accumulator register 209. When the computer 119 executes a Teletype Out instruction, the AC11 bit is coupled to a bus 343 which is connected to each of the data conversion modules 331. The bit on the bus 343 will be coupled to the appropriate output line 335 through the data conversion module 331 which has been selected by the LSR 337.

The computer 119 may randomly address a particular terminal 101 by executing a Load Line Select Register instruction. This instruction will cause the computer 119 to generate a signal on line 345 to the LSR 337. When the signal appears on line 345 the 7 bits from the accumulator register 209 appearing on lines 347 will be shifted into the LSR 337. The computer 119 may then execute a Teletype In or a Teletype Out instruction to communicate with the desired terminal 101.

The computer 119 may perform a high speed scan of the input lines to the multiplexer 117 by initially executing a Clear Line Select Register instruction and then performing a series of Teletype In (TTI) or Teletype Out (TTO) instructions for a number of times corresponding to the number of terminals 101 to be communicated with. When the Clear Line Select Register instruction is performed a signal will appear on line 349 to clear the LSR 337. The LSR 337 will be incremented by a signal on line 351 each time a Teletype In or Teletype Out instruction is executed. (Of course, between each TTI/TTO instruction the contents of the accumulator register 209/memory buffer register 203 should be changed to the character being communicated to/from the particular terminal 101.)

The contents of the LSR 337 may be shifted into the computer 119 by the execution of a Read Line Select Register instruction. When this instruction is executed the bits contained in the LSR 337 are read into the accumulator register 209 on lines 347. This feature allows the computer 119 to segment the high speed scan of the terminals 101 into groups. For example, the computer 119 could clear the LSR 337 and sequentially scan the first 8 terminals by incrementing the LSR 337 8 times and performing 8 TTI or TTO instructions. The computer 119 would then read the contents of the LSR 337 into the accumulator register 209 and subsequently store that value into a particular memory location. At a later time this value could be retrieved from that memory location and reinserted into the LSR 337 by the execution of a Load Line Select Register instruction. The computer 119 would thereafter increment the LSR 337 and execute TTI or TTO instructions for a second group of terminals 101.

A data word transmitted from a terminal 101 to the serial line multiplexer 117 typically includes an 11 bit unit code. The first bit is a start bit which is followed by eight character bits and two stop bits. The data word will have a duration of 100 milliseconds for a terminal 101 transmission rate of 110 baud.

To prevent any deterioration in the bit pulse shape, due for example to transmission line impedance, from causing a device receiving such a data word asynchronously to read a one bit as a zero, the receiving device must determine the bit sampling time accurately so that the bits in the data word are sampled approximately in the center.

The clock 301 in the multiplexer 117 provides the means for determining the correct bit sampling time. Advantageously, the clock 301 has a frequency eight times the bit transmission rate of the terminals 101. Accordingly, when the clock 301 causes the computer 119 to sample an input line the computer 119 will be able to determine within one-eight of a bit time when the start bit first appears as an input. Thereafter, the computer 119 can sample the approximate center of each character bit by sampling the input line every eight clock pulses.

If the baud rate of the terminals 101 were different, the output frequency of the clock 301 would be changed accordingly. If the terminals 101 had different baud rates, more clocks could be used, one corresponding to each different baud rate.

Figure 4:
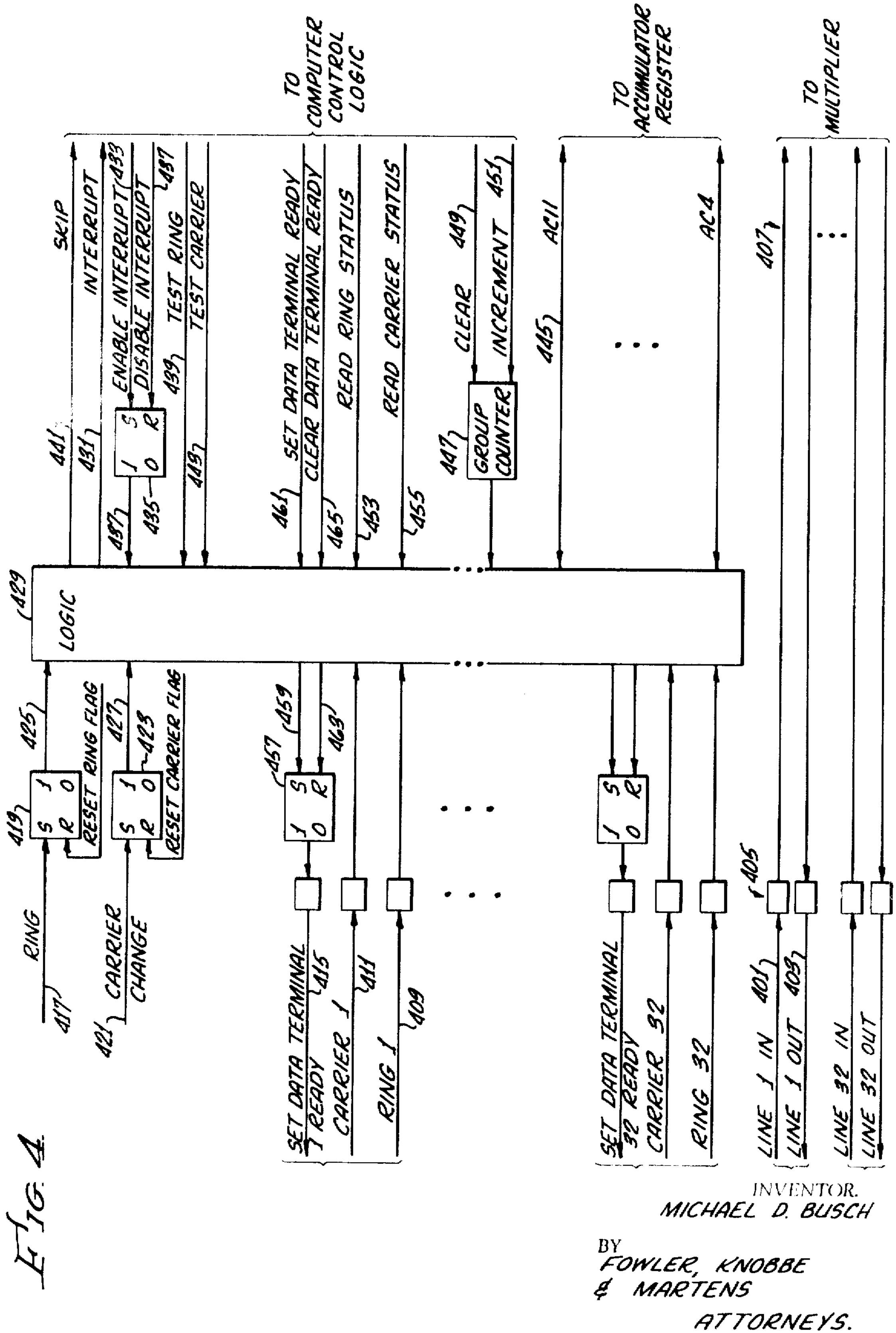
FIG. 4 is a schematic block diagram of the telephone interface seen in FIG. 1.

(3) The telephone interface: Referring now to FIG. 4, there is shown a schematic block diagram of the telephone interface 109 seen in FIG. 1.

The telephone interface 109 includes means for coupling the data bits to be communicated between the modems 107 and the serial line multiplexer 117. Each modem 107 has an input line and an output line such as lines 401 and 403 coupled to a signal conditioning means 405 in the telephone interface 109. The signal conditioning means 405 are connected to the data conversion modules 331, seen in FIG. 3, by lines 407.

Data communication between the terminals 101 and the computer 119 may be initiated by either device. For example, if the terminal 101 desires to transmit data to the computer 119 it will generate a ring signal. The ring signal is detected by the telephone interface 109 which informs the computer 119 by generating a program interrupt signal. The computer 119 detects that one of the terminals 101 has generated a ring signal and will cause the interface 109 to generate a set data terminal ready signal (i.e., pick up the phone) to the receiving modem 107 corresponding to the particular terminal 101. The set data terminal ready signal allows the receiving modem 107 to communicate with the transmitting modem 103. The telephone interface 109 will then receive a carrier signal which indicates that the modems 103 and 107 are connected.

Referring now to FIG. 4, in particular, it will be seen that each terminal 101 has a ring input such as the signal appearing on line 409 and a carrier input such as the signal appearing on line 411 to the telephone interface 109. The telephone interface 109 may generate a set data terminal ready signal such as the signal appearing on line 415 to each terminal 101.

All of the ring signal inputs to the telephone interface 409 are bussed together and connected as a one set input on line 417 to a ring flag flip flop 419. When any one of the terminals 101 generates a ring signal, the flip flop 419 will be set.

In a like manner, all of the carrier signal inputs from the terminals 101 are bussed together and connected by a line 421 as a one set input to a carrier flag flip flop 423. The flip flop 423 will be set when the status of any one of the carrier signal input changes.

The set output of the flip flops 419 and 423 are connected by lines 425 and 427, respectively, to a logic means 429. If the computer 119 has enabled the logic means 429, the logic means 429 will generate a program interrupt signal on line 431 when either of the flip flops 419 or 423 is set. The computer 119 will enable the logic means 429 by executing a particular instruction which will cause an enable interrupt signal to appear on line 433. The signal on line 433 will one set a flip flop 435. The set output of the flip flop 435 is connected to the logic means 429 by line 437. The computer 119 may disable the logic means 429 by executing a particular instruction which results in a signal appearing on line 437 to reset the flip flop 435.

If a program interrupt signal is generated on line 431 due to a ring signal or a change in a carrier signal, the computer 119 will interrogate the telephone interface 109 to determine the cause.

The computer 119 will interrogate the status of the ring flip flop 419 by executing a particular instruction which results in a signal being generated on line 439 as an input to the logic 429. If the ring flip flop 419 is one set, a skip signal on line 441 will be generated by the logic means 429 to the computer 119.

The computer 119 will test the status of the carrier flip flop 423 by executing an instruction which will result in a signal being generated as an input to logic 429 on line 443. If the flip flop 423 has been one set, a skip signal will be generated on line 441 as an indication to the computer 119.

When the computer has interrogated the telephone interface 109 and determined that either the ring flip flop 419 or the carrier flip flop 423 has become set, it will then interrogate all of the ring lines or all of the carrier lines, as the case may be, from the input terminals 101 to determine which particular terminal had generated the original signal which resulted in the program interrupt signal.

All of the ring signal inputs from the terminals 101 to the logic 429 are segmented into groups of eight within the logic 429. (With 32 terminals 101, for example, there would be four groups of eight.) The ring signals in each group of eight are coupled through group selection logic within the logic 429 to eight output lines 445. The lines 445 are connected to eight stages (AC4–11) in the accumulator register 209. A group counter 447 is decoded in the logic 429 to select a particular group of eight lines. The group counter 447 may be cleared to zero by a signal on line 449 and may be incremented by a signal on line 451. Accordingly, the computer 119 may check the status of all the ring signal inputs to the telephone interface 109 by executing a particular instruction which results in a signal on line 453 as an input to logic means 429. The signal on line 453 will enable the ring signals from a particular group selected by the group counter 447 to be coupled to the output lines 445. The computer 119 will initially clear the group counter 447 and read the status of the first group of eight ring signals into the accumulator register 209. It will then store the contents of the accumulator register 209 away in memory for later reference and then increment the counter 447 to select the second group of ring signals and so forth.

The status of the carrier line inputs to the telephone interface 109 may be determined in a similar manner. That is, the carrier line inputs are segmented into groups of eight and coupled to the output lines 445 through carrier group selection logic. The carrier group selection logic will be enabled when the computer executes an instruction which generates a signal as an input to logic 429 on line 455. The group counter 447 will be incremented by the computer 119 to sequentially select the groups to be coupled to the output lines 445.

A set data terminal ready signal may be sent to a particular terminal 101 by one setting a data terminal ready flip flop which is associated with that terminal, such as flip flop 457. The flip flop 457 will be one set by a signal on a line 459 from the logic means 429. All of the one set signal outputs to the data terminal ready flip flops 457 from the logic means 429 are segmented into groups of eight. The lines 445 from the accumulator register 209 are connected to each group of eight. The group counter 447 will enable the lines 445 to be coupled to a particular group of lines 459. Accordingly, when the computer 119 executes a particular instruction, a signal will appear on line 461 as an input to the logic means 429. This signal will enable the lines 445 to be coupled to a particular group of lines 459, as determined by the group counter 447. Accordingly, if the computer 119 desires to send a set data terminal ready signal to a particular data terminal 101, it will place a one bit in a particular bit position of the accumulator 209 and execute a sequence of instructions which will result in the group counter 447 selecting the appropriate group of lines 459 and causing the lines 455 to be coupled to that particular group.

The set data terminal ready signal will be terminated when the corresponding flip flop 457 is reset. A signal on line 463 from the logic means 429 will reset the flip flop 457. The computer 119 will reset the flip flops 457 in a manner similar to the one described to set the flip flops 457. That is, the computer 119 will execute an instruction which will result in a signal appearing on line 465 to enable the outputs from the logic means 429 on the lines 463. The signals on the lines 445 will be coupled sequentially to the groups of the lines 463 as the group counter 447 is incremented. As the group counter 447 is incremented, the contents of the accumulator register 209 is changed to correspond to that particular group of lines.

Figure 5:
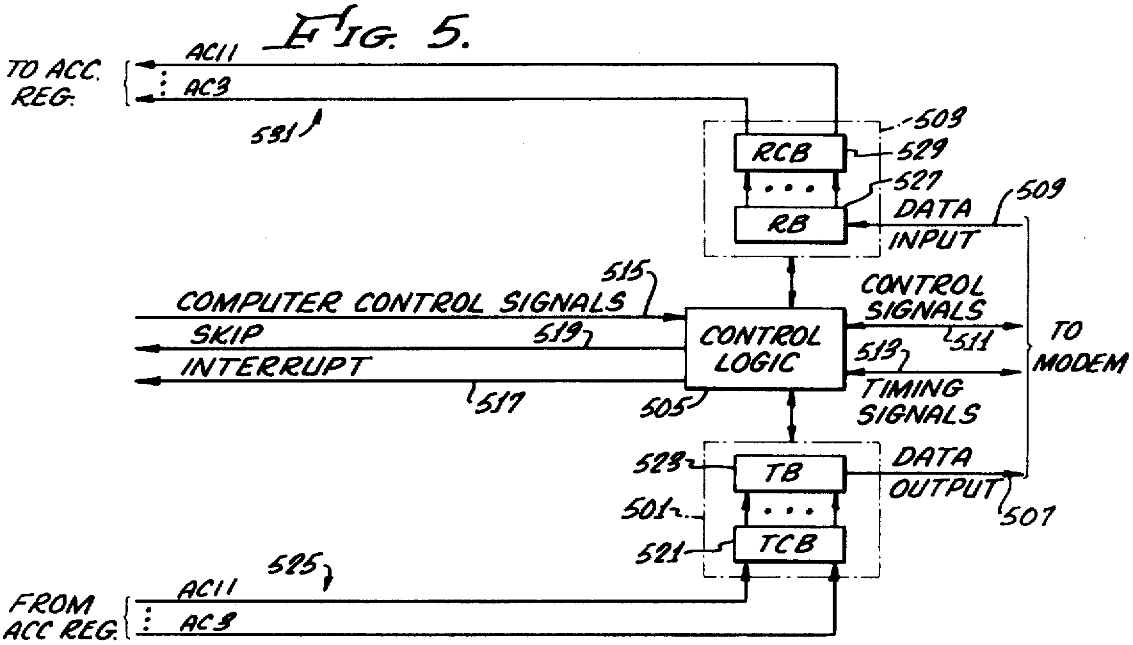
FIG. 5 is a block diagram of the synchronous data communication interface seen in FIG. 1.

(4) The synchronous data communications interface: Referring now to FIG. 5, there is shown a block diagram of the synchronous data communications interface 133 seen in FIG. 1.

The synchronous data communications interface 133 is functionally divided into a transmit character section 501 and a receive character section 503 with a common control logic means 505.

Data bits are transmitted from the transmit section 501 to the synchronous modem 125, seen in FIG. 1, on a line 507. Data bits received from the modem 125 appear as an input to the receive section 503 on a line 509. A line 511 represents a plurality of control signals which are communicated between the control logic means 505 and the modem 125 to indicate the status of both devices to each other. Timing signals which synchronize the transmission and the reception of data bits between the interface 133 and the modem 125 appear on line 513. The computer 119 controls the status of the synchronous data interface 133 with a plurality of control signals to the control logic 505 represented by the single line 515. These signals comprise various decoded combinations of the device select code signals (MB3–8) from the memory buffer register 203 and the IOP signals from the computer control logic 215.

The control logic 505 will generate a program interrupt signal on line 517 under certain conditions. When the computer 119 detects an interrupt signal on line 517, it will interrogate the possible causes of an interrupt with control signals on line 515. The control logic means 505 will respond to each interrogation by the computer 119 by generating a skip signal on line 519 depending upon the status of the condition interrogated.

The transmit character section 501 includes two 9 bit character registers, a transmit character buffer register 521 (TCB) and a transmit shift buffer register 523 (TB). The register 521 is connected to receive a data byte, in parallel, from the accumulator register 209 by lines 525.

The receive character section 503 also includes two 9 bit character registers, a receive shift buffer register 527 (RB) and a receive character buffer register 529 (RCB). The register 529 is coupled to shift a character in parallel to the accumulator register 209 on lines 531.

To transmit a character, the computer 119 will place the character in the accumulator register 209 and execute a transmit instruction. A control signal on line 515 from the computer 119 will cause the control logic 505 to enable the register 521 to read the contents of the accumulator 209. The control logic 505 will then shift the character into the register 523. The character is then shifted out one bit at a time on line 507 to the synchronous modem 125. The control logic 505 will also generate timing signals on line 513 to the modem 125 to synchronize the data transfer.

The first character in a transmit process must always be a synchronization (sync) character. A decoding means in the logic 505 continuously decodes the contents of the register 521. When a sync character is decoded in the register 521, the decoding means will cause the contents of register 521 to be shifted into the register 523 and a transmit active signal to be sent to the modem 125 on line 511. The transmit active signal will also enable the timing signals to be transmitted on line 513. When the character in register 521 is shifted into register 523, the logic 505 will set a transmit flag flip flop (not shown) which causes a program interrupt signal to be generated on line 517. The computer 119 will interrogate the control logic 505 with signals on line 515 and will determine that the transmit flag had been set. The computer 119 will then respond by clearing the transmit flag, inserting a new data character to be transmitted into the accumulator register 209, and executing a transmit instruction to shift that character into the register 521. During this time the character contained in the register 523 is being shifted out to the modem 125 on line 507. A decoding means associated with the register 523 is continuously decoding its contents. As soon as it senses that the register 523 is empty, it will cause the control logic 505 to shift the character in register 521 into the register 523 and also set the transmit flag again.

Since data transmission between the data interface 133 and the modem 125 is synchronous, the computer 119 must insert a new character into the register 521 before the contents of register 523 have been completely transmitted to the modem 125. Accordingly, for a data bit transmission rate of 2400 baud and a byte length of 8 bits, the computer 119 must provide 300 characters every second.

Data bits being received by the computer 119 from the modem 125 are shifted in series into the register 527. The modem 125 also provides timing signals on line 513 to synchronize the shifting of bits into the register 527. A decoding means in logic 505 continuously examines the contents of the register 527. When a sync character is sensed in the register 527 indicating that the modem 125 is initiating a data transfer into the computer 119, the logic means 505 will set a receive flag flip flop (not shown) which results in an interrupt signal on line 517. At the same time the control logic 505 will shift the character in register 527 into the register 529 and also set a receive active flip flop (not shown). The computer 119 will interrogate the control logic 505 in response to the program interrupt. When it determines that the receive flag was set, indicating that a character is available in register 529, it will execute a receive instruction to shift the character in register 529 into the accumulator 209 and reset the receive flag. After the first sync character has been detected in register 527, the control logic 505 will cause each eight bit group of data bits received on line 509 to be transferred into the register 529 and the receive flag to be set.

The control logic 505 also includes a timing means (not shown) which is responsive to the timing signals received on line 513 from the modem 125. When the modem 125 ends its transmission, the timing signals on line 513 will no longer be present. The timing means in the logic 505 will cause a receive end flag flip flop (not shown) to set if the timing signals on line 513 are missing for longer than approximately 1½ bit times. The receive end flag will cause a program interrupt on line 517 to the computer 119. The computer 119 will detect that the receive end flag had been set and will generate signals on line 515 to return the control logic 515 to an appropriate condition.

(5) Computer program instructions: The instructions which the computer 119 will execute may be divided into two main groups; a memory reference group, and an augmented group. The memory reference group of instructions will store or retrieve words from the core memory 201 while the augmented instructions do not.

The instructions in both groups utilize bit positions 0, 1 and 2 to specify the particular operation that the computer is to perform. The memory reference group of instructions employ the operation codes of 0 through 5 while the augmented instruction utilize the operation codes of 6 and 7.

Figure 6:
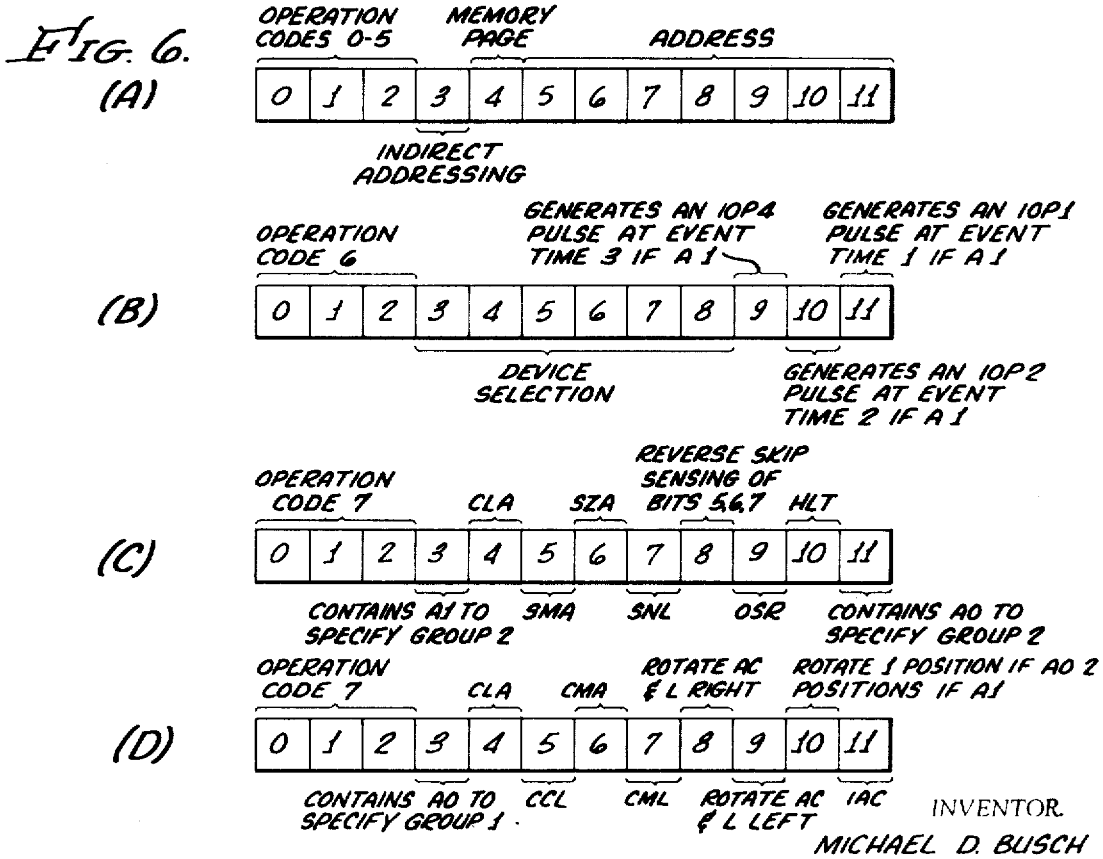

Referring to FIG. 6(*a*) there is shown the instruction format for a memory reference instruction. Note that the first three bit positions define the operation code and that the remaining nine bits contain the address of the location that the computer 119 must store a word in or retrieve a word from. The core memory 201 contains 4,096 words and has been divided into 32 blocks or pages each containing 128 words. Bit positions 5 through 11 in a memory reference instruction will define a particular address on a page. Bit position 4 will contain a one bit if the address in bits 5 through 11 indicate an address in the particular page on which the current instruction is located. A 0 in bit position 4 indicates that the address in bit positions 5 through 11 refers to that address on page 0 of the memory. The remaining pages of memory can be addressed by placing a 1 bit in the bit 3 position of the instruction and a 7 bit effective address in bits 5 through 11. A 1 in the bit 3 position of the current instruction will cause the computer 119 to retrieve the word in the address of the current page as defined by bit positions 5 through 11. The word retrieved from that address is a 12 bit absolute address of the operand. This is called "indirect addressing."

A list of the memory reference instructions which the computer 119 will perform is contained in Appendix I.

The augmented group of instructions may be further divided into an input-output transfer (IOT) group, which has an operation code of 6, and an operate group (OPR), which has an operation code of 7. Since these instructions do not require access to the memory 201 the bits 3 through 11 can be microencoded to define the particular operation to be performed by the computer 119 still further. The various operations which are performed as a function of the microencoding in bits 3 through 11 occur at a specified time with respect to the computer cycle time and are designated as event times 1, 2 and 3.

The instruction format for the IOT instructions is shown in FIG. 6(*b*). The instruction formats for the OPR instructions are shown in FIGS. 6(*c*) and 6(*d*).

During the execution of an IOT instruction, 3 event times separated by one microsecond will occur while only 2 event times will occur during the execution of an operate instruction.

The execution of an IOT instruction, op. Code 6, will cause the computer 119 to effect an information transfer between the computer 119 and an input/output device. Referring to FIG. 6(*b*), it will be seen that the operation code appears in bits 0, 1 and 2 while the bit positions 3 through 8 define a particular input/output device with which the computer 119 will communicate. The bit positions 9, 10 and 11 will cause the computer 119 to generate IOP4, 2 and 1 pulses at event times 3, 2 and 1, respectively, to the particular device selected by bits 3 through 8.

A list of IOT instructions which the computer 119 will perform is shown in Appendix II.

The operate group (OPR) of the augmented instructions may be still further divided into two groups of microinstructions. The first group, designated OPR1 and shown in FIG. 6(*d*), is distinguished from the second group, designated OPR2, and shown in FIG. 6(*c*), by the presence of a 1 in bit position 3 of the word.

The OPR1 group contains instructions which will clear, complement, rotate or increment the accumulator register 209. The OPR2 group includes instructions which will cause the computer 119 to continue to the next instruction or skip that instruction as a function of the contents of accumulator 209 and link bit.

The instructions in group OPR1 are listed in Appendix III. The instructions in group OPR2 are listed in Appendix IV.

(6) The Teletype in instruction: The Teletype In instruction (TTI), an IOT instruction seen in Appendix II, is a particularly complex instruction and can be better understood by referring to FIG. 7 where there is shown a flow chart of the logical sequence which the computer 119 performs when a TTI instruction is executed.

Recall that a unit of code from the terminals 101 into the serial line multiplexer 117 includes 11 bits having a first bit which indicates the start of the unit code followed by eight character bits and terminated with two stop bits. Also recall that the clock 301, FIG. 3, generates a pulse output to cause a program interrupt signal at a rate eight times the bit rate of the incoming bits from the terminal 101 and that the computer 119 will execute a TTI instruction to examine the incoming line each time a clock interrupt is detected. Therefore, during one bit time of the incoming unit code the computer 119 will examine the particular incoming line eight times.

Assume initially that the start bit of a unit code has just been applied to a previously inactive input line and that a clock interrupt occurs. The computer 119 will execute a TTI instruction and determine that that particular line was not receiving data at the time of the last clock interrupt. The computer 119 will then read and store the status of the line, which now is active, and proceed to the next instruction. At the time of the next clock interrupt, the computer 119 will determine that at the time of the last clock interrupt, a data bit was present on the line and will then examine a modulo 8 counter, which it increments each time it examines an active line. If the counter indicates that four clock interrupts have occurred since the line became active, it will sample the line and store the bit. The computer 119 will then sample the line every eight clock interrupts (i.e., every time the modulo 8 counter assumes a four count configuration). This ensures that the computer 119 will sample the line with 12.5% of the center of the incoming bit. After the computer 119 has sampled the line eight times following the start bit it will have assembled a complete input character.

More specifically, when the clock 301 produces a pulse causing a program interrupt to the computer 119 and the computer 119 determines that it was the clock 301 which generated the interrupt, the computer 119 will execute a TTI instruction. The TTI instruction requires 3 successive locations in memory. The first location, Y, contains the TTI instruction. The next successive location, $Y+1$, contains a line status word (LSW) and the third location, $Y+2$, contains a character assembly word (CAW). When the computer 119 executes a TTI instruction it will perform the logical sequence shown in FIG. 7.

In step 701 the first action taken by the computer 119 is to examine bit 11 in the TTI instruction. If bit 11 is a one the computer will increment the line select register 337 in step 703 and then proceed to step 705. If bit 11 of the TTI instruction is a zero, the computer 119 will proceed directly to step 705 and will not increment the LSR 337.

In step 705 the computer 119 will read the word contained in location $Y+1$, the line status word, into the memory buffer register 203 and examine bit zero to determine whether the terminal being tested was previously determined to be active or inactive at the time of the last clock interrupt. If bit 0 of the LSW is zero, indicating that the input line was inactive when last tested, the computer 119 will sample the present state of the input line and set that value into bit 0 and exit the TTI sequence on line 707. If bit 0 is a one indicating that the input line is receiving data from a terminal 101, the computer 119 will proceed to step 709 where the LSW bits 9, 10, and 11 (LSW clock), which maintain a running count of the number of times that the computer 119 examines the input line, are incremented. After the LSW clock has been incremented, the computer 119 will proceed to step 711 where it will examine the LSW clock to determine whether or not the clock is equal to four. If the LSW clock is not equal to four the computer 119 will exit the TTI instruction on line 713 and perform the next instruction. If the LSW clock is equal to four, however, indicating that either (1) that four clock interrupts have occurred since the start bit first appeared and that the center of the bit has been reached and should be sampled, or, (2) that eight clock pulses, or a multiple thereof, have occurred since the center of the start bit was reached and the line should again be sampled, the computer 119 proceeds to step 713. In step 713 the word contained in location $Y+2$, CAW, is read from memory 201 into the memory buffer register 203 and shifted right one bit. The computer 119 then reads the information on the incoming line and enters that value into bit 0 of the memory buffer register 203. The TTI sequence is then terminated when the computer 119 proceeds on line 717 to the next instruction contained in $Y+3$.

CAW is preset so that a 1 appears in bit position 11 when the entire character including one stop bit has been shifted in. The computer 119, under program control, may subsequently determine whether or not an entire character has been read into CAW by examining bit 11. If the bit 11 is a one, the computer 119 will place the word from CAW into a separate memory location for storage together with the number of the line that the word came from. The computer 119 will then reinitialize the TTI command by resetting the line status word to zero and the character assembly word to the appropriate number.

(2) Data format

From the previous description of the data transmission system with reference to FIG. 1, it will be recalled that the overall system includes a plurality of terminals 101 connected through a corresponding plurality of telephone channels 102 to a multiplex system 117 associated with a peripheral computer 119. Located at a distance from the peripheral computer 119 and communicating therewith over a pair of high speed long distance lines 129 and 131 is a central computer 123 which, for sake of simplicity, is shown as being of the same type as the peripheral computer 119. Interposed between respective ones of the computers 119 and 123 and their ends of the long distance lines 129 and 131 are a pair of synchronous modulator-demodulators (MODEMS) 125 and 127.

The format in which data is transmitted in accordance with the invention in both directions over the high speed communication lines 129 and 131 is shown in FIGS. 9 and 10. As seen in FIG. 3 data is sent in the form of a message 91, each message comprising one or more data blocks 93.

Referring to FIG. 10 the composition of a message will now be described in greater detail. A message 91 consists of four SYN characters 101, an acknowledge block 103, any number (including zero) of data blocks 93, which may be either control blocks **93*b* or text blocks 93*a* intermixed, and four ETB characters 105**.

The function of the SYN characters 101 is to synchronize the equipment which receives the bytes which follow them. Their number is not critical and may be either more or less than four.

The acknowledge block serves to notify the transmitting computer that the particular data block 93 sent by it was correctly received. It consists of three bytes: ACK/ack#/ack#* in which:

ACK=ASCII ACK character.
ack#=the block number (i.e., the serial number) of the last text block or control block correctly received.
ack#*=the 7-bit ones-complement (see definitions) of ack#.

A test block data block **93*a*** consists of:

SOH/block#/block#*/term#/term#*/ STX . . . text . . . /ETX/lcc in which:

SOH=ASCII SOH (Start of Heading) character.
block#=serial number of the block, modulo 128 (see definitions).
block#*=7-bit ones-complement of block#.
term#=terminal address associated with the block.
term#*=7-bit ones-complement of term#.
STX=ASCII STX (Start of Text) character.
text=any length string of ASCII characters *not* including ACK, SOH, STX, ETX or ETB.
ETX=ASCII ETX (End of Text) character.
lcc=longitudinal checksum character, whose value is chosen so that all the bytes in the text together with the ETX and lcc bytes (but excluding the STX) add to zero modulo 128.

A control data block **93*b* is identical in format to a text data block 93*a*** except that the seventh bit of the term# byte is set to "one" to mark it as a control block.

The text of a control block **93*b*** consists of just two bytes: a control byte and an ASCII DEL character. The control character is microencoded (see definitions) as follows:

In a message from the central computer 123 to the peripheral computer 119:

000 001 pick up the phone
000 010 hang up the phone
000 100 delete output
001 000 delete input
100 000 reload concentrator (emergency)

In a message from the peripheral computer 113 to the central computer 123:

000 001 output is exhausted
000 010 ringing
000 100 connect
001 000 disconnect (3) The message buffering communication system—The system in general A Communication System incorporating features of the invention is shown in FIG. 8. It comprises the peripheral computer 119 which receives streams of data from the terminals 101 and the central computer 123 to which data is transmitted at high speed from the peripheral computer 119 over the high speed communication lines 129 and 131. Although the computers 119 and 123 may be of different types, for sake of simplicity they are shown to be almost identical. Thus, many of the functional components of the peripheral computer 119 have identical counterparts in the central computer 123. Corresponding parts in the two computers 119 and 123 are identically numbered, but with the components in the central computer 123 having the suffix "*a*" added.

Considering the general organization of the peripheral computer 119 first, data streams from the terminals 101 are successively sampled under the control of the multiplex system 117 and are fed through the data line interface 121 of the peripheral computer 119 and through a pair of buffers 801 and 803 to a segmented memory 805 within the computer 119. The function and nature of the segmented memory 805 forms an important part of the invention and will be explained in considerable detail hereinafter. In the segmented memory the data streams from the several terminals 101 are assembled into separate sub-strings of data, each sub-string representing one or more data blocks from a single terminal. As each substring is completed so that it holds a complete message from its associated terminal, it is attached to an output data string formed of previously completed substrings. Bytes of data are successively shifted out of the output data string into a transmit buffer 807 and are synchronously transmitted therefrom through the MODEM interface 133 of the computer and through the high speed communication circuits 125, 131 and 127 to the central computer 123.

Information originating from the central computer 123 and intended for the various terminals 101 is first transmitted over the high speed communication circuits 127, 129 and 125 and is shifted into a receive buffer 809 within the peripheral computer by means of its MODEM interface 133. From the receive buffer 809 the data from the central computer 123 is transferred into another section of the segmented memory 805 in which strings of text intended for the various terminals 101 are separately assembled. Bytes from these strings of text are concurrently fed serially through a pair of output buffers 811 and 813 and through the data line interface 121 to the multiplex system 117 which distributes them for transmission to the proper terminals 111.

(4) The message buffering communication system—The system in detail (a) The input buffers: The input buffers include an input shift buffer 801 and an input buffer 803 which operate to assemble data bits coming in from the various terminals into bytes for subsequent transfer to the segmented memory 805. Both of the buffers 801 and 803 are parts of the main magnetic core memory 201 of the peripheral computer 119 (see G.1.b.1.). Thus the input shift buffer 801 is made up of a plurality of "words" in the memory 201, where each word is comprised of a set of magnetic cores capable of storing 12 bits of data. In each of the "words" of the input shift buffer 801 data bits are entered in the first core of the "word" and are successively shifted by control means of the peripheral computer 119 until a complete byte has been shifted into the word of the memory 201. In operation, bytes from the different terminals are sequentially stepped bit by bit into different word locations in the portion of the memory 201 comprising the input shift buffer 801 and periodically, in sequence for successive ones of the terminals 101, the word locations of the input shift buffer 801 are interrogated to ascertain whether a complete byte from the terminals has been assembled in them. Each time that a complete byte is found to have been assembled in the input shift buffer 801, it is transferred together with the address of the terminal from which the byte originated into one of a plurality of word locations of the memory 201 comprising the input buffer 803. The input buffer 803 is also comprised of a plurality of "words" in the main memory 201, each word having a capacity to store 12 bits. In a particular form of the system actually built, the input buffer was made up of 48 word locations in the memory, thereby being able to store at any one time 24 bytes and their terminal addresses. The input buffer 803 is organized into a configuration also known as a "circular buffer" and at any given time it contains input bytes and their terminal addresses from many different terminals. The manner and mode of assembling incoming bits into bytes in the input shift buffer 801 is not per se a feature of the present invention. Indeed it may be found described as a TTI instruction in the PDP-8 Users Handbook referred to in E.1. herein, in which each input shift buffer is referred to as a CAW (Character Assembly Word).

(b) The segmented memory: In accordance with an important feature of the invention, successive bytes fed from the input buffer 803 to the segmented memory 805 are assembled in the memory into a plurality of substrings, each of which contains bytes from a different one of the terminals 101.

More specifically, the segmented memory 805 is functionally divided into a plurality of individually addressable memory segments, each of which has a storage capacity for a given plurality of bytes and a linking word representing the address of another one of the memory segments. In a working system incorporating features of the invention, the segmented memory included 96 memory segments, each segment having a capacity for a linking word and 15 data bytes. All memory segments which are available for storing information are functionally arranged in a group designated as "available segments." This is achieved by means within the computer for initially storing in each except the last of the available memory segments a linking word representing the address of the next one of the available memory segments. Four available memory segments 1101–1, 1101–2, 1101–3, and 1101–4 are illustrated in FIG. 11*a*. Referring to the first memory segment 1101–1, it contains a first word position 1103–1 for storing a "linking word" which is the address of the next available memory segment 1101–2 and 15 additional word positions 1105–1 through 1105–15 for storing data bytes 1 through 15. By means of routines built into the computer and well known to those skilled in the art, data bytes are written into successive ones of the word positions 1 through 15 of the memory segment 1101–1. The linking word of each available memory segment 1101 represents or "points to" the address of the first word position, i.e. 1103–1, of the next available memory segment 1101 so that, given the address in memory of the first word position of a given memory segment 1101 in a series of available memory segments 1101 a large string of data bytes can be stored in successive ones of them in a continuous string. It will be understood that the linking word need not necessarily point to the linking word of the next data segment 1101. Therefore, in the description and claims that follow, a linking word will be referred to only as pointing to the next available memory segment. Where a more specific definition is intended, it will be given.

The address of the first available memory segment is held at all times in a one word memory location designated as the "Next Available Segment Pointer" 811 (see both FIGS. 8 and 11). Means are also provided for updating the next available segment pointer 811 each time that the memory segment whose address it contains has been allocated and is no longer available. At this time the address of the memory segment which has become unavailable is replaced in the next available segment pointer 811 with the address of the memory segment whose address was previously represented by the linking word of the memory segment which has just become unavailable, i.e. the address of the second available memory segment.

Each time that the initial byte of a message 91 from one of the terminals 101 is received and is ready to be stored from the input buffer 803 into the segmented memory 805, that byte is assigned the memory segment 1101–1 whose address is then in the next available segment pointer 811. Subsequent bytes from the same message 91 are stored in subsequent word locations in the same memory segment 1101–1 until it is filled. Thus, in the illustrated example a total of 15 bytes are stored in the memory segment 1101–1, with the first byte being the address of the terminal 101 from which the message originated. The 16th byte in the message 91 is directed to the second word position of the memory segment 1101–2 which is the next of those then available. This segment is linked to the first segment which has just been filled by setting into the first word of the first segment a linking word representing the address of the memory segment 1101–2 allocated to receive the 16th byte of the message 91.

The several operations involved in allocating and deallocating (to be explained subsequently) memory segments by adding or deleting linking words and by other means are performed by a set of instructions identified collectively in FIG. 8 as the "Allocate-Deallocate Control" block 812.

It should be noted that, if it were certain that the second available memory segment 1101–2 in the group of available memory segments 1101 will be allocated to receive bytes of the same message as the first, it would be unnecessary to set its address into the preceding (the first) memory segment 1101–1 because, as described previously, each available memory segment 1101 contains a linking byte representing the address of the following available memory segment 1101. However, as will become apparent, memory segments 1101 are allocated from the group of available memory segments 1101 to several streams of data arriving from the terminals 101 so that, if there are 96 available memory segments, Nos. 16, 54, and 72 might be linked together into one sub-string to hold a message from one data stream and a number of unrelated memory segments might be linked together to store a message from another data stream. Consequently, even though each memory segment 1101 in the group comprising the available memory segments holds the address of the following available memory segment 1101, its address must be changed when it becomes filled with data in order to correctly identify the memory segment 1101 holding the following data bytes in the message a part of which it contains.

In the manner just described, bytes originating as part of a data stream from a particular terminal 101 are successively stored in the segmented memory 805 with memory segments 1101 being continually furnished from the "reservoir" of available memory segments under the control of the next available segment pointer 811. This process is concurrently performed for data streams originating from several of the terminals 101. Thus, the first data byte of each message 93 from any terminal is assigned a new memory segment 1101 by the next available segment pointer 811, and as subsequent bytes from those messages fill those memory segments 1101, further memory segments 1101 are assigned to each of them by using the next available segment pointer (NASP). In this way several sub-strings of linked memory segments are concurrently formed in the segmented memory 805, each of them accumulating bytes from a different data stream. An example of this is illustrated in FIG. 11*b*, in which four substrings 1107–1, 1107–2, 1107–3, and 1107–4 in various stages of completion and containing bytes from data streams originating from different ones of the terminals 101 are shown.

(c) The terminal receive table (TR-TBL): In order to keep track of the several sub-strings 1107 which are being accumulated in the segmented memory 805, up to one sub-string for each terminal 101, a Terminal Receive Table (TR-TBL 813) is provided in the memory 201 of the computer 119. To save the locations of the beginning and end of each sub-string the TR-TBL 813 includes two words for each terminal 101. The first word "points" to the beginning in the segmented memory 805 of the data sub-string 1107 originating from a given terminal 101 and the second word "points" to the end of that substring. Each time a byte and its associated terminal address are read from the input buffer 803, reference is made to TR-TBL 813 to find where in the segmented memory 805 the sub-string 1107 being created for that terminal address is located. When the sub-string for that terminal is found, the byte just read from the input buffer 803 is appended to it by storing it in the next word location of the memory segment 1101 currently used for storing bytes from that terminal. In particular, this reference is made to the second word of the TR-TBL 813 associated with the particular terminal from which the data byte originates, this word pointing to the end of the sub-string 1107 being assembled for that terminal 101. If upon obtaining a byte from the input buffer 803 it is found that there is no entry in the second word provided in TR-TBL 813 for the terminal 101 from which the byte originated (meaning that there is no sub-string 1107 being assembled in the segmented memory 805 for that terminal) a new sub-string 1107 is started for it. This process is repeated each time another byte is read from the input buffer 803. It will be realized that, in all probability, each time a new byte is read from the input buffer 803 it will be from a different terminal 101. Consequently, the several substrings 1107 being assembled in the segmented memory 805 are built up in a completely random manner.

The accumulation of bytes in a given sub-string 1107 in the segmented memory 805 continues until the terminal 101 from which the data bytes of that sub-string originated generates a terminating character. In the case of a Teletype terminal this is always produced at the end of a typed line. When this occurs, the sub-string 1107 is terminated by removing the address of its last data byte from the second word provided in TR-TBL 813 for its associated terminal and by transferring the address from the first word provided for its associated terminal in TR-TBL 813 to the linking word of the last memory segment 1101 of the preceding sub-string 1107 which was terminated in a similar way previously and which is awaiting transmission as part of an output string 1109 in the segmented memory 805. Thereafter, both words in the TR-TBL 813 are zeroed out so as to indicate the next time a data byte originating from their associated terminal is read from the input buffer 803, representing the first byte of another message from that terminal, that subsequent data bytes will have to be assembled in another sub-string 1107 in segmented memory.

(d) The transmit buffer: Periodically bytes are read from the memory segments 1101 holding the output string of bytes 1109 in segmented memory 805. The transmit buffer 807 is comprised of 32 words in the memory 201 organized into a circular memory so that successive bytes read from the output string 1109 in the segmented memory 805 are transferred into successive word locations in the transmit buffer 807. Means are also provided for generating even byte parity for each byte transferred from the output string in the segmented memory 805 into the transmit buffer 807 so that each byte is entered into the transmit buffer 807 with correct parity.

(e) CX-LINE, CX-BLN, and CX-SUM: During the process in which a particular sub-string 1107 in the output string 1109 in the segmented memory 805 is transmitted through the transmit buffer 807, it becomes desirable temporarily to store the terminal address associated with the sub-string. This is always the first byte in the sub-string 1107 and is stored in a one word memory location shown in FIG. 8 as the block 815 labeled CX-LINE.

Reviewing briefly the data format found in the system of FIG. 8, and with the reference also to FIG. 10, each sub-string 1107 accumulated within the segmented memory 805 for a given terminal 101 represents a single message 91 of the type shown in FIG. 10. Such a message may include any number of text or control blocks 93. In accordance with the related invention claimed in the above-referenced divisional application, each text or control block, collectively referred to as a data block 93, is provided during transmission from the peripheral computer 119 to the central computer 123 with a unique block number. Toward this end a one word memory location 817, labeled in FIG. 8 as CX-BLN, is provided for storing the number of the last data block 93 to have been transmitted from the peripheral computer's segmented memory 805. Each time that a given data block 93 has been sent from the peripheral computer 119, CX-BLN 817 is stepped by one and the new number stored therein is transmitted as part of the next data block 93 sent from the peripheral computer. CX-BLN has a maximum count capacity of 127, after which it is stepped to zero. Therefore the numbers in it cycle through 0, 1, 2, . . . 127, 0 . . . etc.

Also part of the process for transmitting a data block 93 from the peripheral computer 119 is the provision of a longitudinal checksum character (lcc) which is incorporated in the data block as it is sent. This checksum character serves to enable the computer receiving a data block 93 to ascertain that all bytes in it have been received. The longitudinal checksum character lcc is produced in the system of FIG. 8 by keeping a running sum (modulo 128) of the bytes which have been entered into the transmit buffer 807 for a data block whose text was taken from the output string 1109 in the segmented memory 119 and by transmitting a longitudinal checksum character lcc which is the two's complement (see definitions) of the running sum (modulo 128) of other characters in the block that have been transmitted so that when those characters are counted at the receiving computer and their total is added to the longitudinal checksum character lcc which is received as part of that block, the sum equals zero. A running sum (modulo 128) of the bytes which have been transferred into the transmit buffer 801 and which are to be transmitted is kept in a one word memory location CX-SUM 819.

(f) TX-TBL, CR-LINE, CR-ORG: The segmented memory 805 also serves to sort in individual strings 821 text which has been transmitted from the central computer 123 over the high speed transmission circuits 127, 129 and 125 to the peripheral computer 119 for delivery to the various terminals 101. Thus, memory segments are made available by means of NASP 811 and the Allocate-deallocate control 812 from the same reservoir of available memory segments 1101 as those which serva data streams received from the terminals 101. In this way several strings of text 821 are built up concurrently in the segmented memory 805, each for delivery to a different one of the terminals 101. To keep track of the strings of text 821 being assembled in the segmented memory 805, a table 825 labeled TX-TBL is provided. It is similar to the TR-TBL table 813, but has only a single word for each terminal, this word always containing the address of the next byte to be transmitted from a string 821 in the segmented memory 805 to a terminal 101.

Let it be assumed, for example, that a data block 93 destined for delivery to a particular terminal 101 is sent to the peripheral computer 119 from the central computer 123.

Let it be assumed further, that at the time the data block 93 is being received in the peripheral computer 819 it is not the first but that there are other data blocks which have been assembled in the segmented memory 805 and are awaiting transmission to the same terminal. To take care of this possibility, means are provided for linking the memory segment 1101 holding the last received data block 93 to the preceding memory segments holding other data blocks assembled in a string 821 for delivery to the same terminal. This is done by setting the linking word 1103 of the last completed memory segment 1101 destined for a given terminal 101 to point to the last in the string of memory segments 821 already in the segmented memory and awaiting transmission to the same terminal 101. This is done by starting at the location in the segmented memory 805 whose address is the TX-TBL word location for the terminal in question and tracing through the successive memory segments 1101 in the segmented memory 805 until the last memory segment 1101 in this string is reached. The last memory segment in the string 821 is recognized by the fact that it has a link of zero. It is therefore this memory segment which is linked to the first segment of the new data block.

Whether or not an incoming data block is the first one destined for a particular terminal, the address of the particular terminal for which that data block is intended is stored in a one word memory location 823 labeled CR-LINE. The terminal address remains in CR-LINE 823 as byte after byte in the block 93 intended for the given terminal 101 is stored in the segmented memory 805. When the block 93 has been completely received, and it will be recalled that it may be stored in a string 821 of several linked memory segments 1101, the memory location in TX-TBL 825 corresponding to the terminal whose address is in CR-LINE 823 is interrogated to find out if it contains an address in the segmented memory 805 so as to ascertain whether or not there is already a string of text 821 in the segmented memory destined for the terminal 101 in question. If there is, the string 821 of memory segments containing the text just received is linked onto the preceding text by the process just outlined. That is, by tracing through the several memory segments 1101 containing the preceding next until the last one is reached.

If the word location of the terminal in the TX-TBL 825 contains no address, then the address of the first memory segment 1101 in the string of memory segments just assembled is stored therein so as to cause the word location in TX-TBL 825 for the terminal involved to "point" to the start of the just received text string 821. This information, namely the address of the first memory segment in the string of text just assembled is obtained from an additional one word memory location 827 labeled CR-ORG in which the address of the first segment assigned to the incoming string of text is transferred from NASP 811. Thus, for example, if the text just stored in the segmented memory 805 was intended for terminal #37 and was the only text in the segmented memory so intended, then CR-LINE 823 holds a word representing terminal #37. Furthermore, as successive bytes in this text are stored in successively allocated memory segments, the address of terminal #37 remains in CR-LINE 823. Similarly, the address of the first allocated memory segment 1101 remains in CR-ORG 827. If, at the termination of the text it is found that the word location in TX-TBL 825 corresponding to terminal #37 whose terminal address is in CR-LINE 823 contains no address, then the address of the first allocated memory segment 1101 is transferred from CR-ORG 827 to the word location in TX-TBL 825 corresponding to terminal #37, so that when TX-TBL 825 is subsequently interrogated with reference to terminal #37 it will correctly point to the initial memory segment holding the string of text intended for terminal #37.

(g) The output buffers: Two output buffers are provided for transferring bytes from the segmented memory 805 through the data line interface 121 to the multiplex system 117 of the peripheral computer 119. The first of these is an output buffer 829 having one word location in the memory 201 for each of the terminals 101. As will be explained in greater detail hereinafter, data is transferred from the segmented memory into the output buffer 829 by parallel transfer of entire bytes and similarly, entire bytes are transferred in parallel from the output buffer 829 into an output shift buffer 831 associated therewith. The respective word locations of the buffers 829 and 831 are permanently allocated to respective terminals 101 so that the second word location, for example, of the output buffer 829 and of the output shift buffer 831 will always hold data destined for the second one of the terminals 101.

Periodically, in response to a timing signal from the multiplex system 117, data is transferred bit by bit to successive ones of the terminals 101. This is done by successively interrogating for respective ones of the terminals 101 of their corresponding word locations in the output shift buffer 831 to see if there are one or more bits stored therein. If there are, they are shifted and the first bit in the word location interrogated is transmitted through the multiplex system 117 to the corresponding terminal 101. As part of the process of shifting bits out of the various word locations of the output shift buffer 831, each time it is noted that a particular word location in the output shift buffer 831 is empty, a new byte is transferred into it from the corresponding word location of the output buffer 829.

The parallel transfer of data from segmented memory 805 into the output buffer 829 is done at a different time and will also be explained in much greater detail subsequently. It will be sufficient to note at this point that this process too is done sequentially for the successive word locations of the output buffer 829 corresponding to the different ones of the terminals 101. Thus, one after the other of the word locations of the output buffer 829 is examined periodically and if it is found empty the next byte in the output string in the segmented memory destined to the terminal to which that word location corresponds is transferred into that word location. Thus, for each terminal, data is periodically transmitted from the string of text which is held therefor in segmented memory 805 by periodically transferring bytes in that text through the word locations allocated to that terminal in the output buffers 829 and 831.

(h) CR-SUM: It will be recalled from the brief discussion of the manner in which data is transmitted from the output string 1109 in the segmented memory 805 that, with each data block 93 transmitted there is sent a longitudinal checksum lcc which is equal to the two's complement of the sum (without carries) of the bytes in the block. It was explained that this is used by the receiving computer to verify the block by accumulating the sum (without carries) of the bytes received in the data block 93 and comparing the accumulated sum with the longitudinal checksum lcc transmitted with that data block. If the sum of these is zero, the data block 93 is stored. If not, it is purged. This technique is applied not only to data blocks 93 transmitted from the peripheral computer 119 to the central computer 123 but also to data blocks which are transmitted in the opposite direction and received at the peripheral computer. Therefore, every time a data block 93 is received in the peripheral computer 113, a running sum (modulo 128) is kept of the bytes therein as they are shifted into the receiver buffer 809. This sum is held in a one word memory location 833 labeled CR-SUM.

(i) R-ACK, F-ACK, X-ACK: Each of the computers 119 and 123 additionally includes four one-word memory locations which are involved in correcting errors in transmission between the computers. It will be recalled that each data block 93 transmitted from a given computer is given a unique serial number, that means are provided in each of the computers to accept only those data blocks whose block numbers are higher than those of data blocks received previously so as to prevent duplication of data blocks received, and that during the transmission process each computer continues to retransmit each data block until its correct receipt is positively acknowledged by the other computer.

Reference has already been made of CX-BLN 817 in which a running count of block numbers sent is kept. Each time that transmission of a data block 93 begins, CX-BLN 817 receives the block number of the last data block to have been purged from the output string 1109 in the segmented memory 805. It is then stepped by one and this new number, which is one higher than that of the last data block to have been purged, is assigned to the data block about to be transmitted.

The block number of the last block which was erased from the output string 1109 in memory is kept in the word location labeled in FIG. 9 as F-ACK 835.

In each computer one word location is devoted to storing the number of the last block that was correctly received at that computer. This word location is shown as R-ACK 837. The block number in this word location is used upon receiving each data block 93 to check whether that data block was previously received so that, if it was previously received it may now be rejected, thus preventing duplication of data blocks in the receiving computer.

As part of the transmission process between computers, each time a data block 93 is correctly received its block number is returned by the receiving computer to the transmitting computer as acknowledgment of the correct receipt of that block. When received, these acknowledgment numbers are stored in each of the computers 119 and 123 in a word location X-ACK 839 (or 839*a*).

(j) The inform table and control table: There are two tables in memory which are referred to in the flow charts and which are shown in FIG. 8 as the Inform Table 841 and the Control Table 843. They are used for temporarily storing and processing control messages which are exchanged between the computers 119 and 123. The Inform Table 841 is used to store micro-encoded bytes which should be sent to the central computer. An example of such a micro-encoded byte is that which is generated when one of the terminals 101 has dialed in and a ring indication is detected by the telephone channel corresponding to that terminal.

The Control Table 843, on the other hand, is used to store micro-encoded bytes which arrive from the central computer 123 in the form of Control blocks 93*b*, are temporarily stored in a one word memory location TT-CHAR 845 while their control block is verified, and are then stored in the proper word location in the Control Table 843. They remain there until the particular control function (such as picking up the telephone) which they represent is to be carried out, at which time they are removed from the control table and are transmitted to the proper telephone channel 102.

In order to understand the functions of the Inform and Control Tables 841 and 843, let it be assumed first that one of the terminals 101 has dialed in and that a ring indication is detected by the telephone channel 102 corresponding to that terminal. This causes a ring interrupt, as has been explained in Sec. G.1.b.3., and subsequently a control block containing the microencoded byte in the Inform Table 841 should be sent to the central computer 123 to let it know that the terminal 101 has dialed in. However, this is not the kind of information that needs to be transmitted to the central computer 123 immediately. Therefore, it is desirable to set up the control block without interrupting other operations which are being performed by the peripheral computer 119. Consequently, instead of immediately transmitting a control block in response to a "ring" interrupt, a micro-encoded bit representing a "ring" is stored in the inform table entry corresponding to the terminal while that terminal is ringing. Subsequently, in spare time, when other operations have been performed, the inform table 841 is scanned, the micro-encoded byte representing the ring from the terminal is picked up, and a control block including that byte is set up in the output string 1109 in the segmented memory 805, eventually to be sent to the central computer 123. By the same token, a control block received from the central computer 123 and intended for a particular terminal 101 is first stored in a location in the Control Table 843 allocated to that terminal. Subsequently, in spare time, the control bit is read from the Control Table 843 and the instruction which it represents is passed on to the appropriate component in the set of telephone channels 102.

In the foregoing description, attention has been concentrated on the components which are within the peripheral computer 119. The central computer 123 is shown in FIG. 8 as being substantially identical to the peripheral computer 119. Thus, the segmented memory 805, the transmit and receive buffers 807 and 809, and most of the one word memory locations in the peripheral computer 119 have counterparts in the central computer 123. The manner in which these elements of the central computer 123, which are labeled with a suffix "*a*," cooperate with the peripheral computer 119 will become apparent as this description proceeds.

It will suffice to note at this point, that the functions performed by the computers 119 and 121 as part of the system of FIG. 8 is that of data communication rather than that of data processing. This terminal-originated data received from the peripheral computer 119 by the central computer 123 and held in its segmented memory **805*a* is subsequently transferred to a data processing system which may be a part of the central computer 123, or may be another computer or data processing system. Similarly, terminal-destined data is put into the segmented memory 805*a* of the central computer 123 by such a data processing system for transmission to the peripheral computer 119. The manner of and means for transferring the data from the segmented memory 805*a* to the data processing system, processing it, and transferring the processed data back to the segmented memory 805*a* for transmission to the peripheral computer 119** does not form a part of the present invention and will not be described.

(5) Operations performed by the message buffering communication system—in general In each of the computers 119 and 123 of the system shown in FIG. 8 operations are grouped into three priorities. Those of the highest priority are performed in "real time." That is, they are performed without delay, by interrupting lower priority operations whenever an operation gouped in the highest priority is to be performed.

A second group of operations, comprising principally those required to transfer characters into and out of the segmented memory 805 is given a second level of priority. These operations are also performed by interrupting operations of lower priorities. However, the operations of the second level piority are themselves subject to interruption by operationsof the first priority. They will be referred to as being performed in "pseudo real time."

All remaining operations ae performed only when the computer can spare time from its higher order priority tasks and they are referred to herein as "spare time" processing operations. Spare time operations are subject to interruptions from both real time and pseudo-real time operations.

Figure 26:
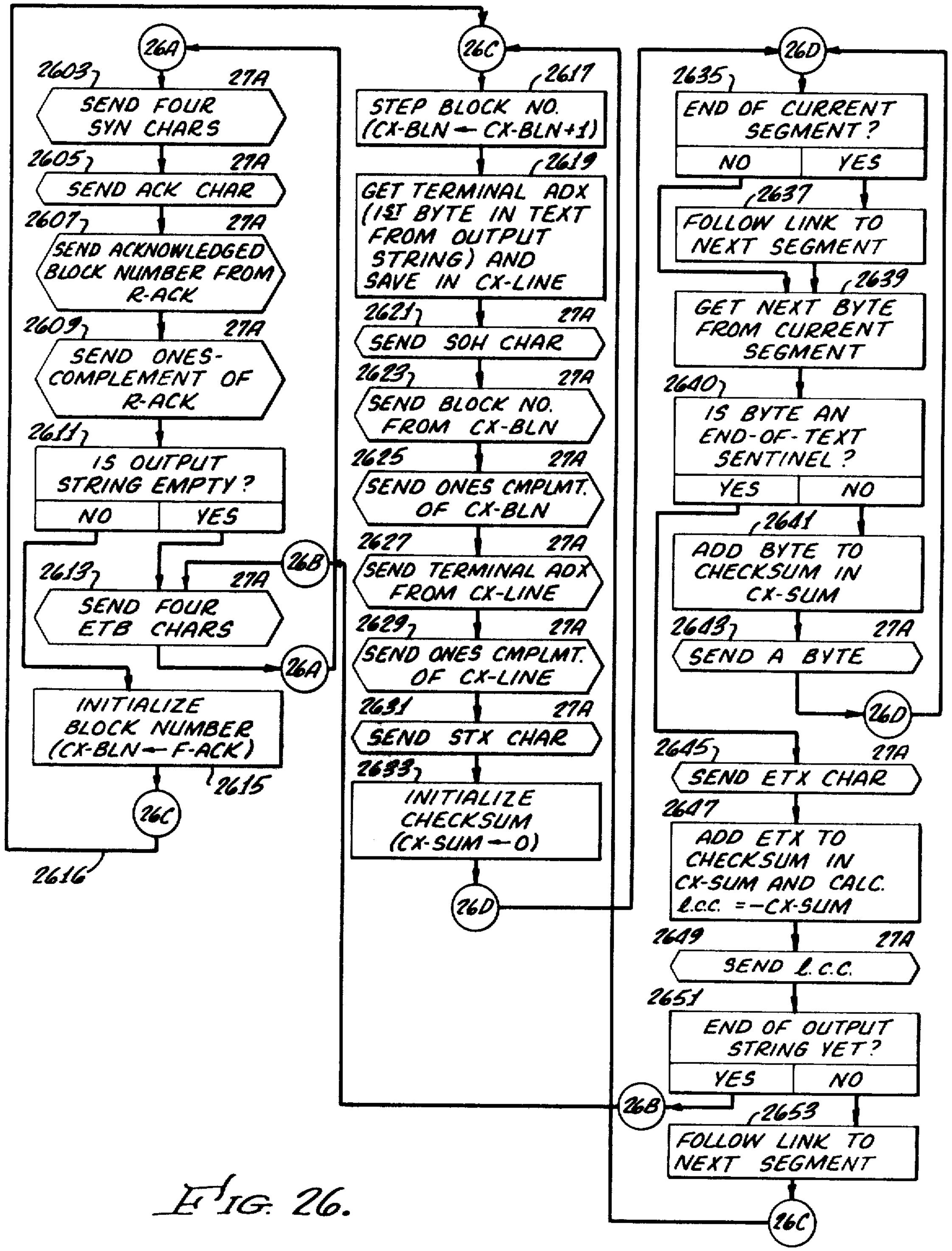

In the description which is to follow, a very detailed description will be given with reference to FIGS. 13 through 31 of the numerous operations which are carried out by the Message Buffering Data Concentrator. FIGS. 13 through 31 are flow charts showing each of the principal steps which are performed during these operations. In order to help the reader to follow the flow charts in FIGS. 13 through 31 and to understand their significant features in carrying out the invention, all of the flow charts are shown in simplified form, in FIG. 12. It enables ready identification of those operations of the system which are performed in real time, pseudo real time, and spare time. The numbers within the blocks in FIG. 12 refer to the various operations which are illustrated in FIGS. 13 through 31. The number of each routine is based on the figure number illustrating it. All operations, also referred to as routines, which appear alone in a figure are given their figure number with the suffix A. Thus, for example, the operation illustrated in FIG. 15 is designated as the operation 15A. Where several operations are illustrated in the same figure they are assigned the figure number and additional suffixes B, C, etc. Thus, for instance, four basic operations are shown in FIG. 26 and these are labeled 26A, 26B, 26C, and 26D.

Referring further to the detailed flow charts in FIGS. 14 through 31, a single step in an operation is shown in a rectangular block. Steps which depend on the outcome of a decision are shown in a rectangular block with the question to be decided indicated in the top portion of the block and with the possible outcomes (yes or no) being indicated on the bottom portion of the block.

Frequently repeated operations, known to those skilled in the art as subroutines, are shown in a hexagonal block, with the number of the operation being indicated above and toward the right of the hexagonal block.

The name or description of each operation appears in an oval block at the head of the blocks comprising the steps of the operation and the number of the operation appears in a small circle above the oval title block. For example, in FIG. 14 the first operation is called process clock interrupt, its number is 14A and is continued by another operation number 14B. That operation has four subroutines numbered 24B, 27B, 18A, and 20A. They may be found in FIGS. 24, 27, 18 and 20 respectively.

Returning to FIG. 12, spare time processing is performed by a set of routines collectively numbered 28A. Spare time processing is performed by the computer unless it is called upon to perform other operations. During spare time processing, the data output string 1109 in the segmented memory 805 is purged (29A), and the contents of the Inform Table 841 and of the Control Table 843 are processed (30A and 31A). As indicated by the loop 1201 in the block 28A, these operations are performed repeatedly in the order indicated.

As will be seen in the following discussion, it is very seldom that spare time processing will go on uninterrupted for any substantial length of time due to the frequency at which it is interrupted by real time operations. These are represented by the interrupt block 1301 and by the blocks 13A, 13B, 13C, 13D 13E and 14A to which it is connected. Principally, the operations represented by these blocks involve the transfer of data into the input buffers 801 and 803, the transfer of data out of the output buffers 829 and 831 and the transfer out of and into the transmit buffer 807 and the receive buffer 809 respectively. In this connection, it will be noted that system block diagram of the Data Concentrator in FIG. 8, the lines representing flow of data into the elements referred to have reference numerals corresponding to the routines to which reference has been made. This convention is followed throughout FIGS. 8 and 12 so as to make it relatively easy to find out from the two figures what type of operations is involved in the transfer of information into and out of each element of the system shown in FIG. 8.

Some of the real time operations which are performed as a result of an interrupt signal are done randomly whenever a particular element of the system calls for immediate service from the computer. These operations are represented by the blocks 13A through 13E. A very large number of the real time operations, however, are performed in response to periodic interrupt signals to handle information received from or dispatched to the various terminals 101. These operations are represented by the block 14A in FIG. 12. Briefly, the spare time data processing operations of the computer 119 are interrupted at a frequency which is 8 times as high as that at which data bits are transmitted over a given telephone line from the terminals 101 to the computer. Each time that the computer 119 is thus interrupted, it handles ⅛ the total number of terminals, so that, after each eight such interrupts it has handled all of them once. To each of those terminals which it handles, the computer 119 transmits one bit if there is a bit in the output buffer 831 awaiting transmission to the terminal. At the same time a bit is shifted into the input buffer 801 for any of the lines on which a bit is available.

Figure 21:
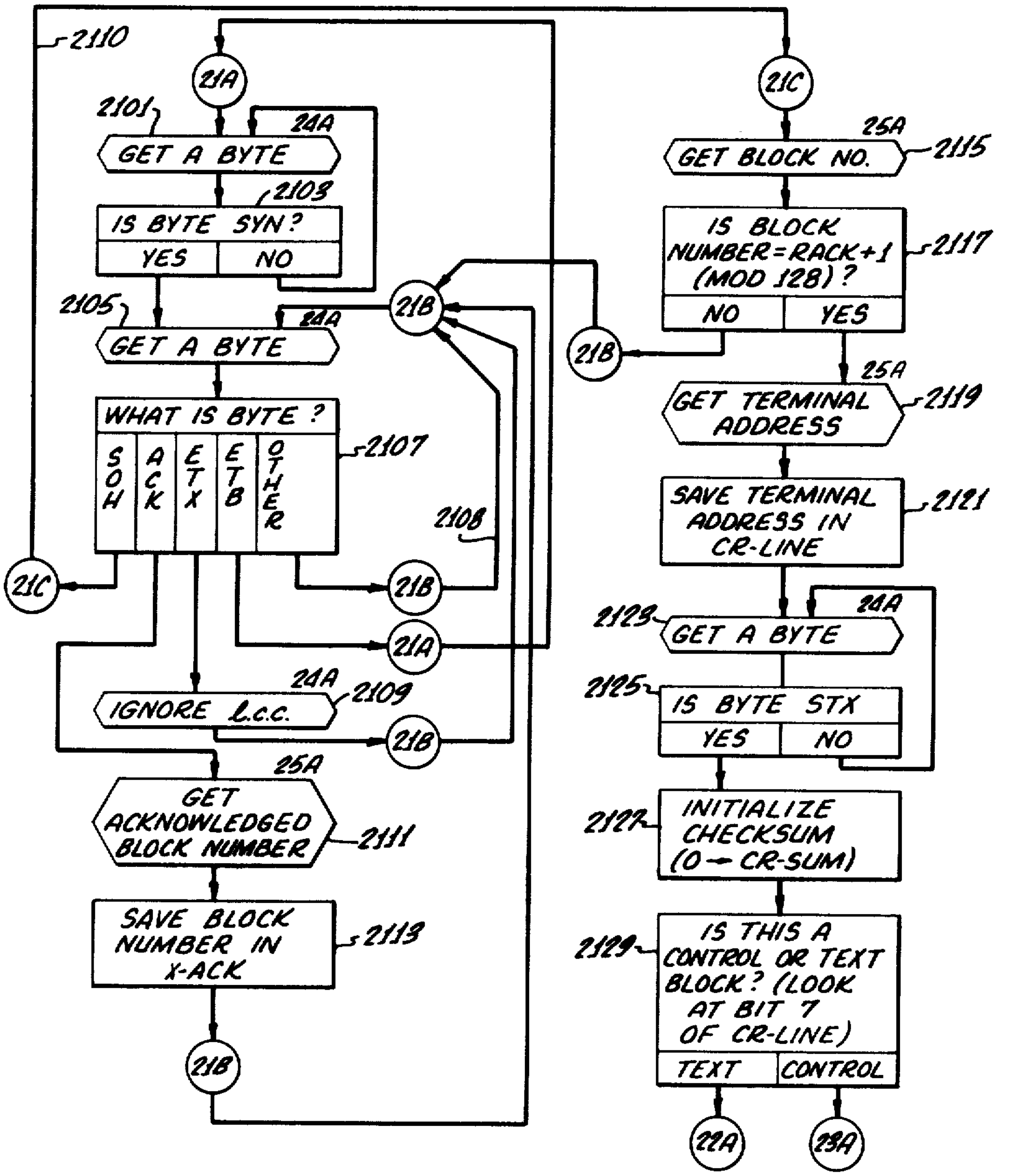
Figure 22:
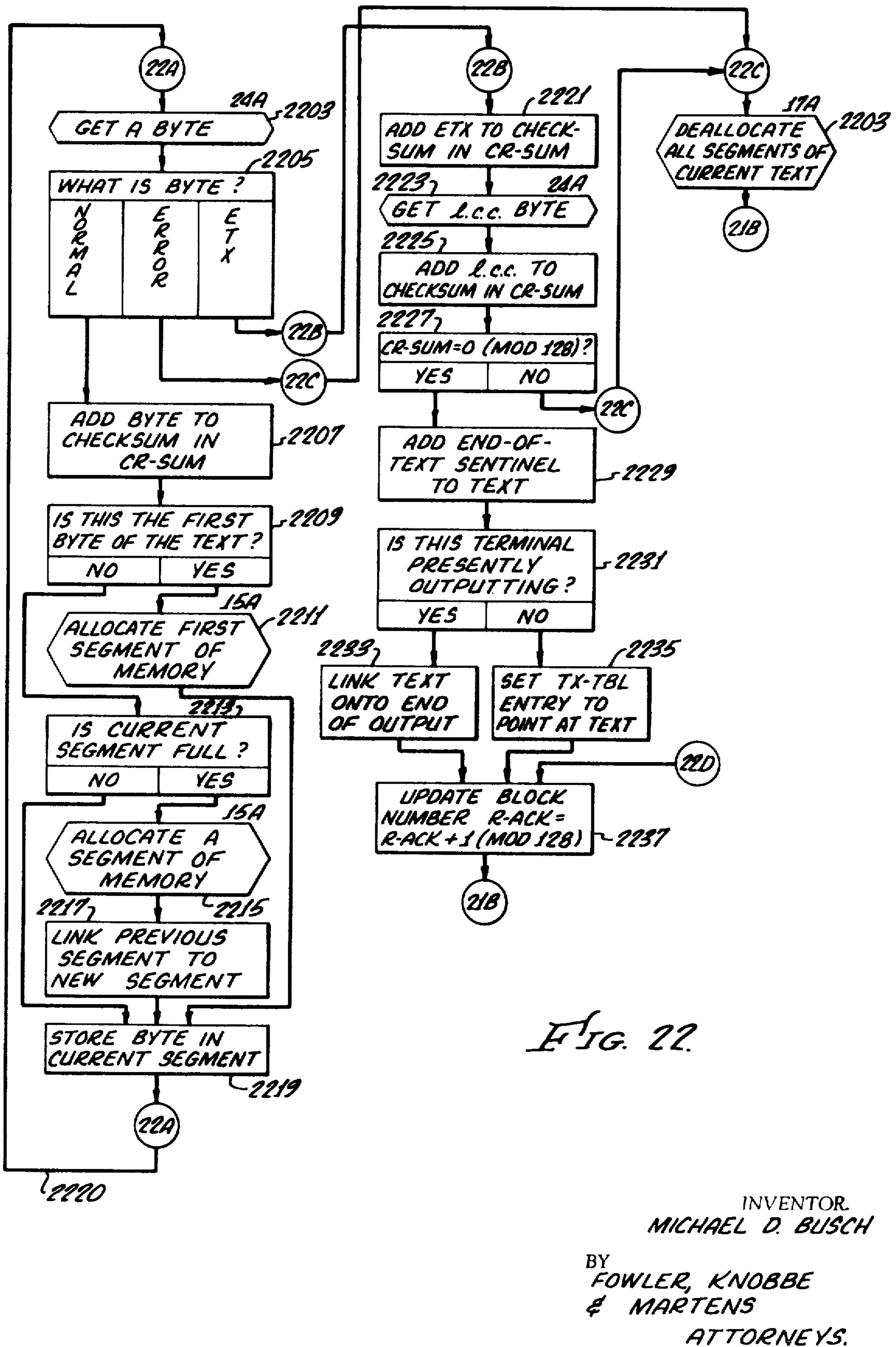
Figures 23, 24, 25:
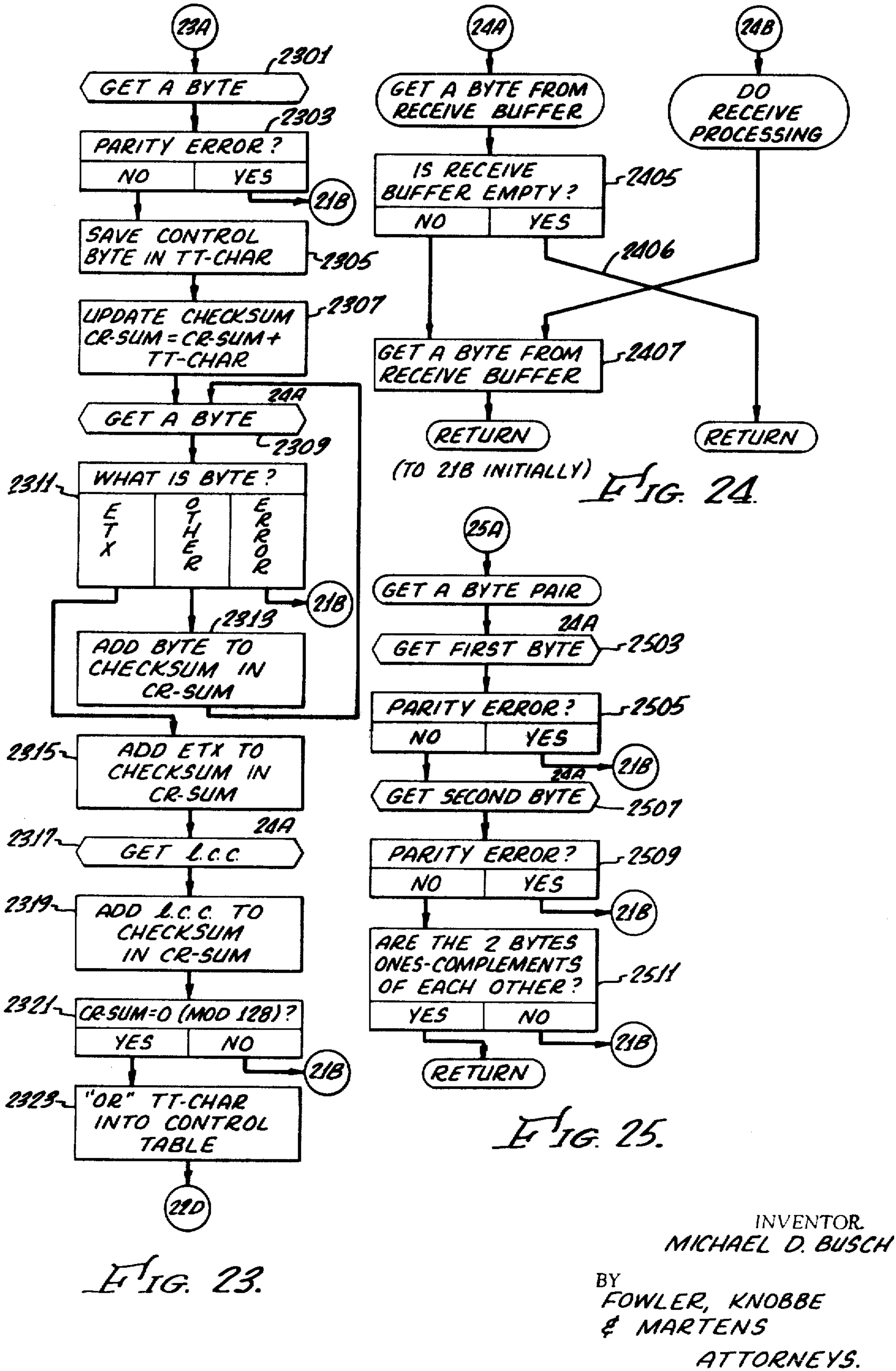

One out of a predetermined number of block 14A operations (every 88th one in the disclosed embodiment) is caused to initiate a series of four character service routines 14C which are referred to as being performed in pseudo-real time because, while they take precedence over spare time processing, they are interruptable by those operations which are performed in real time, such as those represented by the blocks 13A–13E and 14A. The first of these, represented by the block 24B involves a series of operations, parts of which are shown in FIGS. 21, 22 and 23. The function of all of the operations in block 24B is to transfer characters from the receive buffer 809 to the segmented memory 805. Briefly, the routine 24B looks for a SYN synchronizing character in the receive buffer 809 and when such a character is detected further tests are made on subsequent bytes to confirm whether the SYN character actually represents the beginning of a data message 91. If a message is indeed incoming from the central computer 123, the operations comprising the routines 24B will transfer the entire message into the segmented memory 805, performing all of the operations required to allocate the necessary memory segments and to assemble them into a string of text.

Following completion of the transfer of characters from the receive buffer 809 to the segmented memory 805 by means of 24B, the computer 119 performs its second Character Service routine, shown as the block 27B which serves principally to transfer characters from the segmented memory 805 to the transmit buffer 807. This routine continues until the 32-character transmit buffer 807 is full.

The third Character Service routine performed is that shown in block 18A for transferring characters from the input buffer 803 to the segmented memory 805. It is this routine through which several sub-strings 1107 are concurrently assembled in the segmented memory 805 for the respective terminals 101 and by which respective ones of the sub-strings once completed are connected into a single output string 1109.

The fourth and last of the Character Service routines is that represented by the block 20A and serves to transfer characters from the segmented memory 805 to the output buffer 829. As part of this routine bytes are concurrently transferred on a time-shared basis from the several strings of text 821 which have been assembled in the segmented memory 805 into the output buffer 821 for subsequent shifting through the output shift buffer 831 and transmission to the respective terminals 101 as part of the routine 14A.

(6) Operations performed by the message buffering communication system—in detail (a) Low speed asynchronous character communication: The highest priority routine performed by the data concentrator is the interrupt routine 1301 seen in FIG. 13. The interrupt routine 1301 processes both the low speed asynchronous transmission of characters between the peripheral computer 119 and the terminals 101 and the high speed synchronous transmission of characters between the peripheral computer 119 and the central computer 123. The high speed character communication will be discussed in the next section.

Recall that the clock in the serial line multiplexer 117 will generate program interrupts to the computer 119 at a rate eight times the bit rate of transmission from the terminals 101. For each clock interrupt the computer 119 will execute a TTI instruction, previously described, to examine each input line to the multiplexer 117. As each TTI instruction is performed, the computer 119 will examine the active or inactive status of the particular input line. If the input line for that instruction is determined to be inactive, the computer will proceed to the TTI instruction for the next input line. If the TTI instruction indicates that the input line is active, the computer 119 examines the count in the LSW to determine whether or not it should sample the input line. If the LSW count indicates that the input line should not be sampled, the computer 119 proceeds to the next TTI instruction for the next input line. If the LSW count indicates that eight clock interrupts to the computer 119 have occurred since that particular input line was sampled last, the computer 119 will sample that line and shift the appropriate bit into CAW and then proceed to the next TTI instruction.

Once all of the input lines to the multiplexer 117 have been examined, the computer 119 will then proceed to process the input shift buffer 801 and the output shift buffer 831, which have been previously described, for one-eighth of the terminals 101. In processing the input shift buffer 801 the computer 119 will examine the character assembly word, CAW, associated with each TTI instruction. If the CAW for a particular terminal 101 indicates that a complete character has been received from that terminal, the computer 119 will transfer the character from the CAW location into the input buffer 803 along with the address of the terminal from which the character was received.

The computer 119 will process the output shift buffer 831 by examining the characters which are being transmitted from the computer 119 to the terminals 101. If the computer 119 detects that a character has been completely transmitted from the output shift buffer 831 for a particular terminal 101 it will retrieve the next character for that terminal from the output buffer 829 and insert it into the output shift buffer 831.

Since the computer 119 will process the input shift buffer 801 and the output shift buffer 831 for one-eighth of the terminals 101 for each clock interrupt (where the clock interrupts at a rate eight times the bit transmission rate of the terminals 101), it is apparent then that each character being received from a terminal 101 will be examined once every bit time to determine whether or not the complete character has been assembled. If so, the computer 119 will remove that character from the input shift buffer 801 and place it in the input buffer 803. For the same reason, it is also apparent that the computer will examine each character being sent to the terminals 101 once every bit time to determine whether or not a complete character has been shifted out and if so the next character to be transmitted for that particular terminal will be retrieved from the output buffer 829 and inserted into the output shift buffer 831 for that terminal.

After the computer 119 has processed the input and output shift buffers 801 and 831 for each clock interrupt, it will proceed to determine whether or not it is time for character service. Recall that a character from or to a terminal 101 comprises 11 bit times. Accordingly, the computer 119 will have been interrupted by the clock in the multiplexer 117 88 times during one character time. The computer 119 keeps track of the number of clock interrupts and will proceed to the character service routine 14C after the clock has interrupted 88 times (i.e., one character time).

Figure 13:
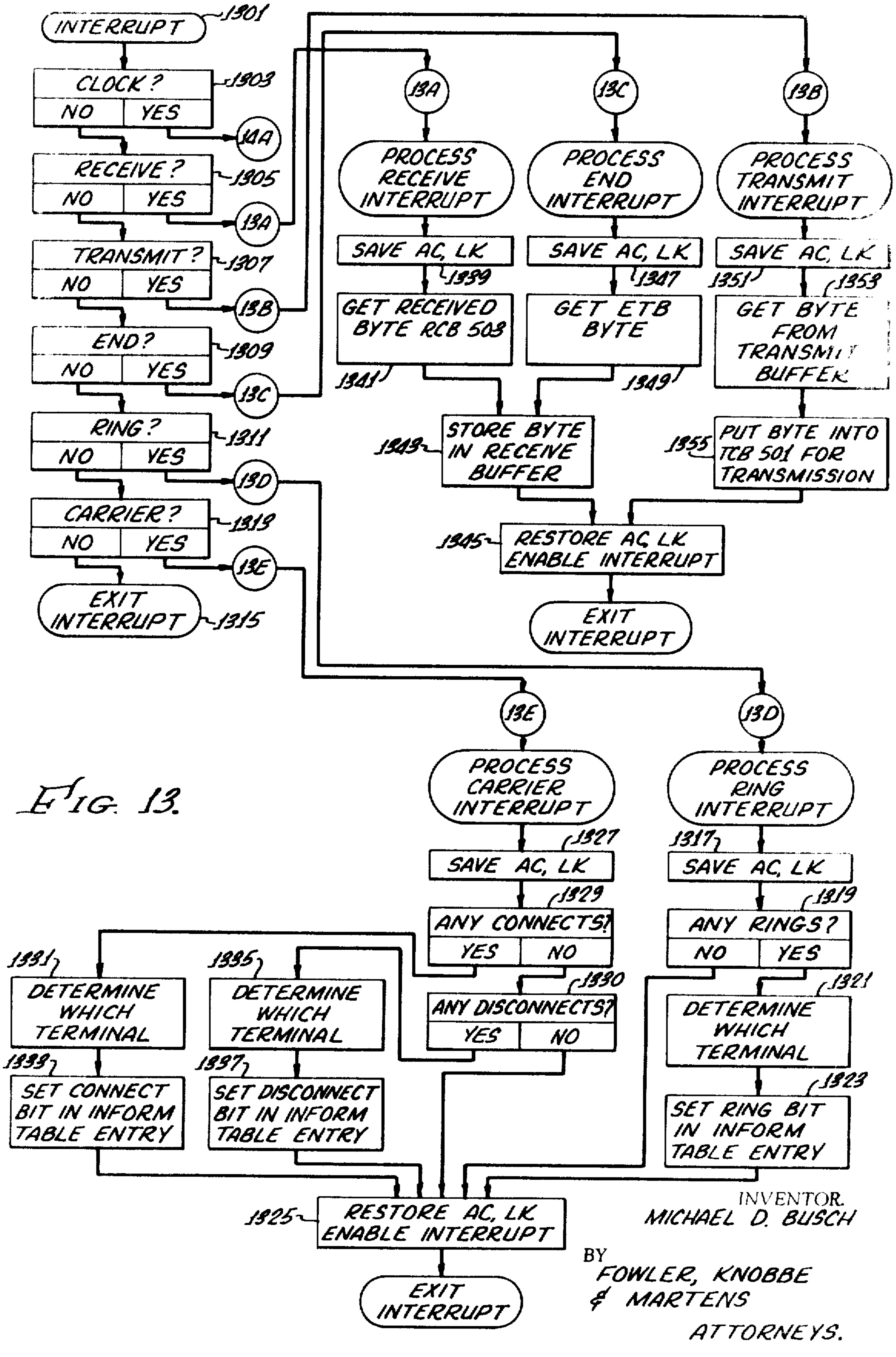
Figure 14:
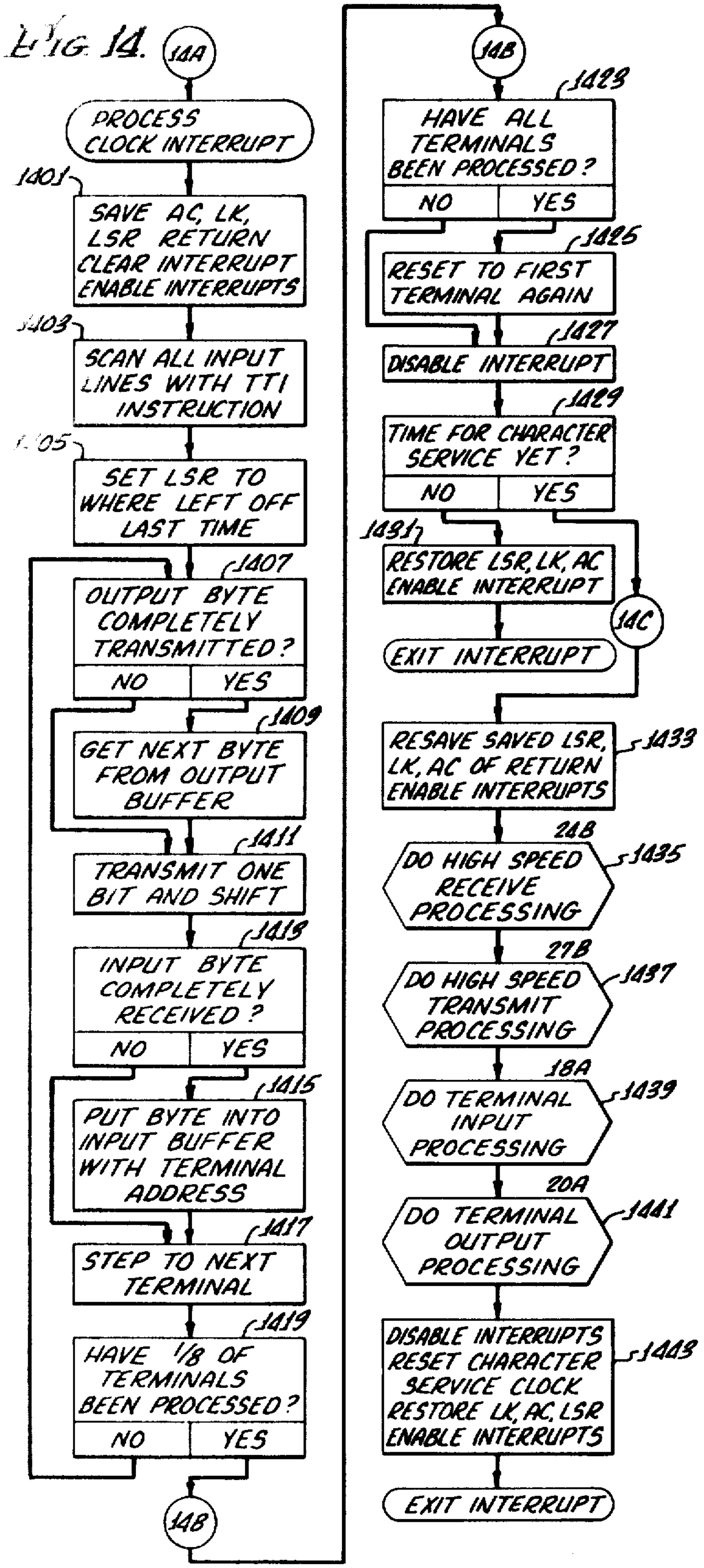
Figure 15:
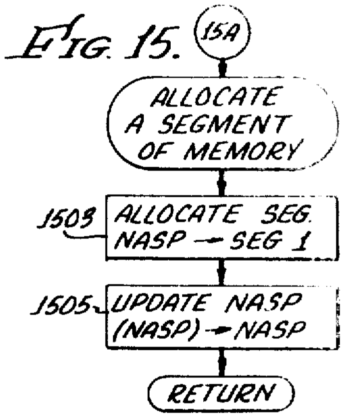

The above general description of the processing of a clock interrupt by the computer 119 is shown in detail in FIGS. 13 and 14.

In step 1303 the computer 119 interrogates the clock in the multiplexer 117 to determine whether or not it was the cause of the interrupt signal. When the computer 119 determines that the clock had interrupted, it proceeds to step 1401 in FIG. 14 where it stores the contents of the accumulator 209, the link bit, the contents of the LSR 337, and also the return address so that when the interrupt routine has been completed, the computer 119 can return to the routine which it was performing when the interrupt occurred. Also in step 1401 the computer 119 clears the clock interrupt in the multiplexer 117 and executes an interrupt enable instruction so that the computer 119 may respond to any subsequent interrupts. From this point on, the routine is "pseudo real time" and may be interrupted by a subsequent program interrupt.

The computer 119 then enters step 1403 where it scans all of the input lines to the multiplexer 117 with TTI instructions and then proceeds to step 1405.

Recall that during each clock interrupt the input shift buffer 801 and the output shift buffer 831 will be processed for one-eighth of the terminals 101. Accordingly, when the step 1405 is entered from step 1403 a number is set into the LSR 337 which corresponds to the particular terminal 101 which should be processed next, i.e., the first terminal 101 of the particular group, and continues to step 1407.

In step 1407 the computer 119 examines the character in the output shift buffer 831 which is being communicated to the terminal indicated in the LSR 337. If that character or byte has been completely transmitted, the computer 119 will retrieve the next byte to be transmitted to that terminal from the output buffer 829 by stepping to step 1409. The computer 119 then proceeds to step 1411 where it will transmit the first bit in the character just inserted into the output shift buffer 831 and shift that character one bit.

If in step 1407 the output character for the terminal 101 had not been completely transmitted, the computer 119 would have stepped immediately to step 1411 and transmitted one bit and shifted one bit.

In step 1413 the computer examines the input byte being shifted into the input shift buffer 801 from the terminal 101 indicated in the LSR 337 to determine whether or not a complete character has been received. If a character has been completely received, the computer 119 will put that character along with the address of the terminal from which that character originated into the input buffer 803 in step 1415 and then proceed to step 1417 where the LSR 337 is incremented so that the next terminal 101 may be processed. If the input byte in step 1413 had not been completely received, the computer 119 would have gone immediately to step 1417 to step the LSR 337 to the next terminal 101.

In step 1419 the computer determines whether or not one-eighth of the terminals 101 have been processed since the clock interrupt occurred. If they have not, the computer 119 will return to step 1407 to process the next terminal indicated in the LSR 337. If one-eighth of the terminals 101 have been processed since the clock pulse occurred, the computer will proceed to step 1423.

In step 1423 the computer 119 determines whether or not all of the terminals 101 have been processed. If they have, the LSR 337 is cleared and stored so that when the computer 119 processes the next clock interrupt and enters step 1405 to insert a terminal number into the LSR 337, the computer 119 at that time will begin processing one-eighth of the terminals beginning with the first terminal. The interrupts are then disabled in step 1427.

If in step 1423 all of the terminals 101 had not been processed, step 1427 would have been entered where the interrupts would have been disabled and the computer 119 would then have proceeded to step 1429 to determine whether it was time for character service (i.e., whether or not 88 clock interrupts had occurred since the last character service time).

If it is not time for character service, step 1431 is entered where the contents of the LSR 337, the link bit and the accumulator 209, which had been previously stored in step 1401 when the clock interrupt operation was initiated, are restored, the interrupts are enabled, and the interrupt routine is terminated. The computer 119 then returns to the particular routine that it was performing when the clock interrupt occurred.

If the computer 119 determines that it is time for character service in step 1429 it will proceed to step 1433 in routine 14C. In step 1433 the computer 119 will retrieve the contents of the accumulator 209, the link bit, the LSR 337 and the return address which it had stored in memory when it performed step 1401 and will store them in different locations. The interrupts are then enabled. This allows the computer 119 to process a clock interrupt, which might occur during the character service routine, without losing the information regarding the routine that it was processing when the current interrupt occurred.

The computer 119 will then execute the four character service sub-routines 24B, 27B, 18A, and 20A represented in FIG. 14 by the steps 1435, 1437, 1439, and 1441.

When sub-routine 20A has been completed the computer 119 proceeds to step 1443 where it first disables the interrupts and then resets the character service clock, examined in step 1429, by adding 88 to its current value. The contents of the accumulator 209, link bit, and the LSR 337 which were moved in step 1433 are then restored and the interrupts again enabled and the interrupt routine is terminated.

Any one of the terminals 101 may initiate a data communication to the peripheral computer 119 by generating a ring signal to the telephone interface 109. The ring signal generates a program interrupt to the computer 119 which responds to the interrupt by determining which terminal 101 has requested to send data. The computer 119 then informs the central computer 123 of this fact by an appropriate entry in the inform table 841. The computer 123 will return an instruction to the peripheral computer 119 by placing an entry into the control table 843 which causes an indication to be sent to the terminal 101 informing it that it may proceed with the communication. When the terminal 101 receives this response, it will generate a carrier signal to the telephone interface 109. The carrier signal causes a program interrupt to the computer 119 which responds by informing the central computer 123 through the inform table 843 that that particular terminal 101 is now active.

When a terminal 101 terminates communication with the computer 119, it will discontinue the carrier signal to the telephone interface 109. This will cause a program interrupt. The computer 119 will then inform the central computer 123 that that terminal 101 is now inactive by an entry into the inform table 841. The central computer 123 will send back an entry for the control table 843 which will cause the computer 119 to disconnect that particular terminal.

The above described processing of a ring or carrier interrupt by the computer 119 is shown in the flow charts in FIG. 13.

Assuming a ring interrupt has occurred, the computer 119 will proceed to the interrupt routine 1301 to determine the cause of the interrupt. It will sequentially interrogate the possible causes of the interrupt in steps 1303, 1305, 1307, 1309, and will ascertain that the cause was a ring interrupt after it enters step 1311.

The computer 119 will process the ring interrupt by proceeding to routine 13D. In step 1317, the contents of the accumulator 209 and the link bit are first stored and then the computer 119 scans all of the ring line inputs to the interface 109 in step 1319. Once it has received an indication of the status of all the ring lines, the computer 119 will examine this information in step 1321 to determine which terminal 101 had generated the ring signal. In step 1323 the computer 119 inserts a bit into the appropriate bit position corresponding to that particular terminal in the inform table 841 and proceeds to step 1325 where it restores the contents of accumulator 209 and link bit and will execute an instruction to enable the interrupts. The computer 119 will then exit the interrupt routine to return to the routine it was executing when the ring interrupt had occurred.

If the computer 119 in step 1319 had determined that none of the terminals 101 had generated a ring signal, it would have proceeded directly to step 1325 to exit the interrupt routine.

A change in any carrier signal from one of the terminals 101 to the telephone interface 109, i.e., a connect or a disconnect, will result in a program interrupt to the computer 119. The computer 119 will process this interrupt by executing routine 13E after it determines in step 1313 of the interrupt routine that a change in a carrier signal had caused the interrupt. In step 1327 of routine 13E the computer 119 will store the contents of accumulator 209 and the link bit. It will then examine the status of all the carrier signal inputs to the telephone interface 109. In steps 1329 and 1330 the computer 119 compares the status of all the carrier signal inputs with the previous status of these inputs to determine if (1) one of the terminals 101 which was previously inactive is now active or (2) one of the terminals 101 which was previously active is now inactive. In step 1329 the computer 119 tests for a recently connected terminal 101. If a terminal 101 has been recently connected, it proceeds to step 1331 where it determines which particular terminal 101 had been connected and then in step 1333 sets an appropriate bit in the inform table 841 corresponding to that terminal. The computer 119 then restores the accumulator 209 and link bit, enables the interrupt in step 1325, and exits the interrupt routine.

If in step 1329 it was determined that none of the terminals 101 had been recently connected, the computer 119 will proceed to step 1330 and examine the terminals 101 for a terminal which had recently been disconnected. If none of the terminals 101 had been disconnected, the accumulator 209 and link bit would be restored and the interrupt enabled in step 1325 and the interrupt routine would be terminated. If a terminal 101 has been disconnected, the computer 119 will go to step 1335 to determine which terminal it was. In step 1337, the computer 119 will set an appropriate bit into the inform table 841 for that terminal and exit the interrupt routine by proceeding to step 1325.

(b) High speed synchronous character communication: Data characters being received by the computer 119 from the synchronous modem 125 are serially shifted into the receive shift buffer register 527, FIG. 5, as previously described. Each time a complete character has been shifted into the register 527 it will be shifted in parallel into the receive character buffer register 529 and a receive flag will be set in the control logic 505 which causes a program interrupt to the computer 119. The computer 119 will process the receive interrupt by executing the interrupt routine 1301. In step 1305 of the interrupt routine the computer 119 will determine that it was the receive flag which had caused the program interrupt. In step 1339, the computer 119 will save the contents of the accumulator 209 and the link bit and advance to step 1341. In step 1341 the computer 119 will execute a certain instruction to cause the character contained in the register 529 to be shifted into the accumulator 209. In step 1343 the character in the accumulator 209 is inserted into the receive buffer 809 in the memory 201. The computer 119 will then restore the contents of accumulator 209 and link bit and will enable the interrupts in step 1345 and then exit the interrupt routine.

The control logic 505 will also generate a receiver end program interrupt when the modem 125 terminates its timing signal input on line 513 to the control logic 505. This indicates the end of a data communication. The computer 119 responds to the receive end program interrupt by processing the interrupt routine 1301. In step 1309 the computer 119 will determine that the receive end flag had caused the program interrupt and will process that interrupt by continuing to routine 13C. In step 1347 of that routine the contents of accumulator 209 and the link bit are stored. Next, the computer 119 will retrieve an ETB character from a particular location in memory and in step 1343 will store that character at the end of the data string in the receive buffer 809. The contents of the accumulator 209 and link bit are restored and the interrupts enabled in step 1345 before the computer 119 exits the interrupt routine.

Characters transmitted from the computer 119 to the synchronous modem 125 are initially shifted from the accumulator 209 into the transmit character buffer register 521. The control logic 505 will then shift this character in parallel into the transmit shift buffer register 523 and cause that character to be serially shifted to the modem 125 on line 507. Each time the control logic 505 transfers a character from the register 521 to the register 523, it will generate a transmit program interrupt to the computer 119 to indicate to the computer 119 that it must insert another character into the register 521 before the register 523 is emptied.

The computer 119 will process the transmit interrupt by executing routine 13B after it determines in step 1307 of the interrupt routine that it was the transmit flag which had caused the interrupt. In step 1351 the contents of the accumulator 209 and the link bit are stored. In step 1353 the computer 119 will retrieve the next character to be transmitted from the transmit buffer 807 in memory and in step 1355 will insert that character into register 521. The computer 119 will then restore the contents of the accumulator 209 and link bit and enable the interrupts before it exits the interrupt routine.

Figures 18, 19:
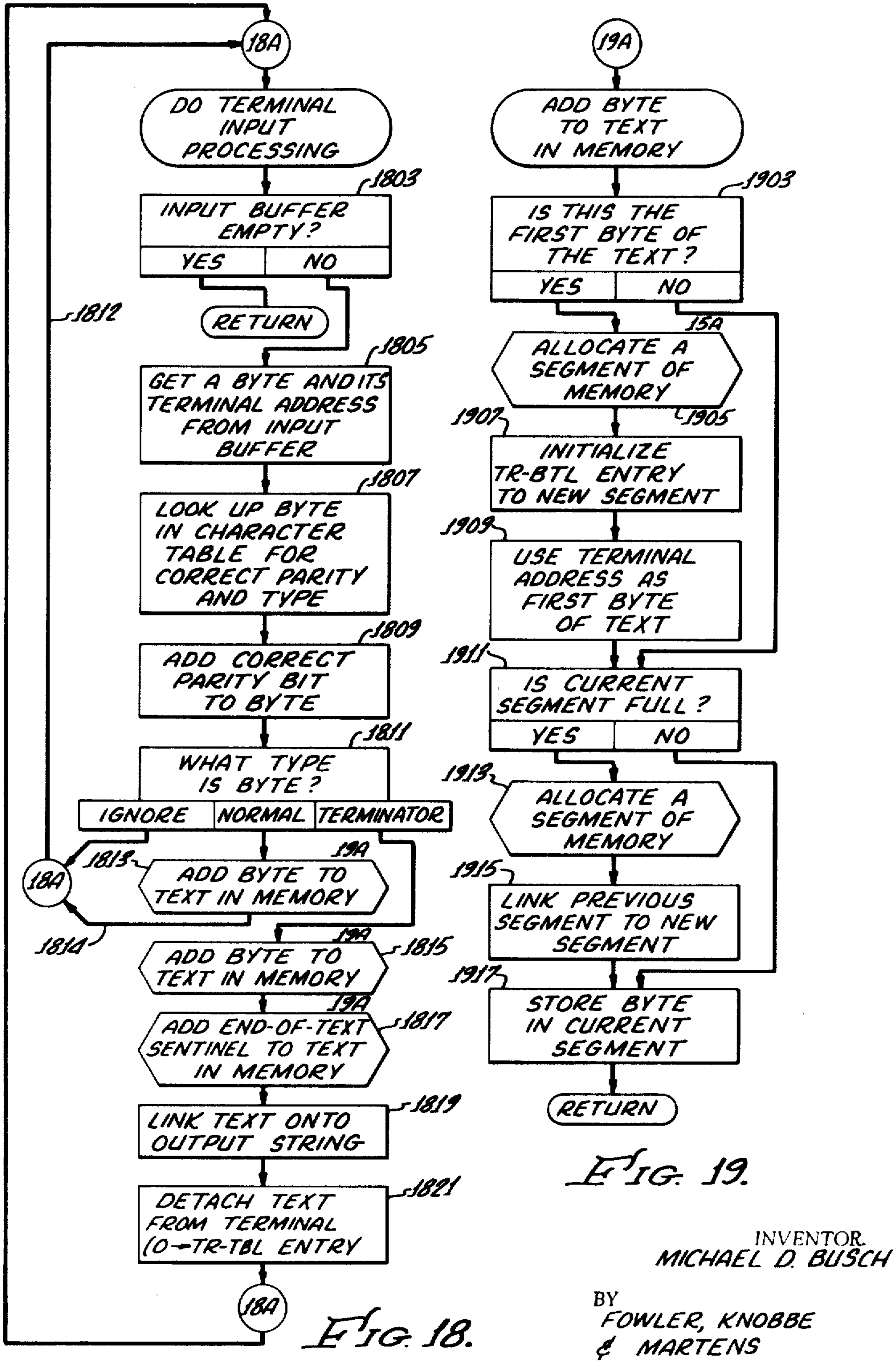
Figure 20:
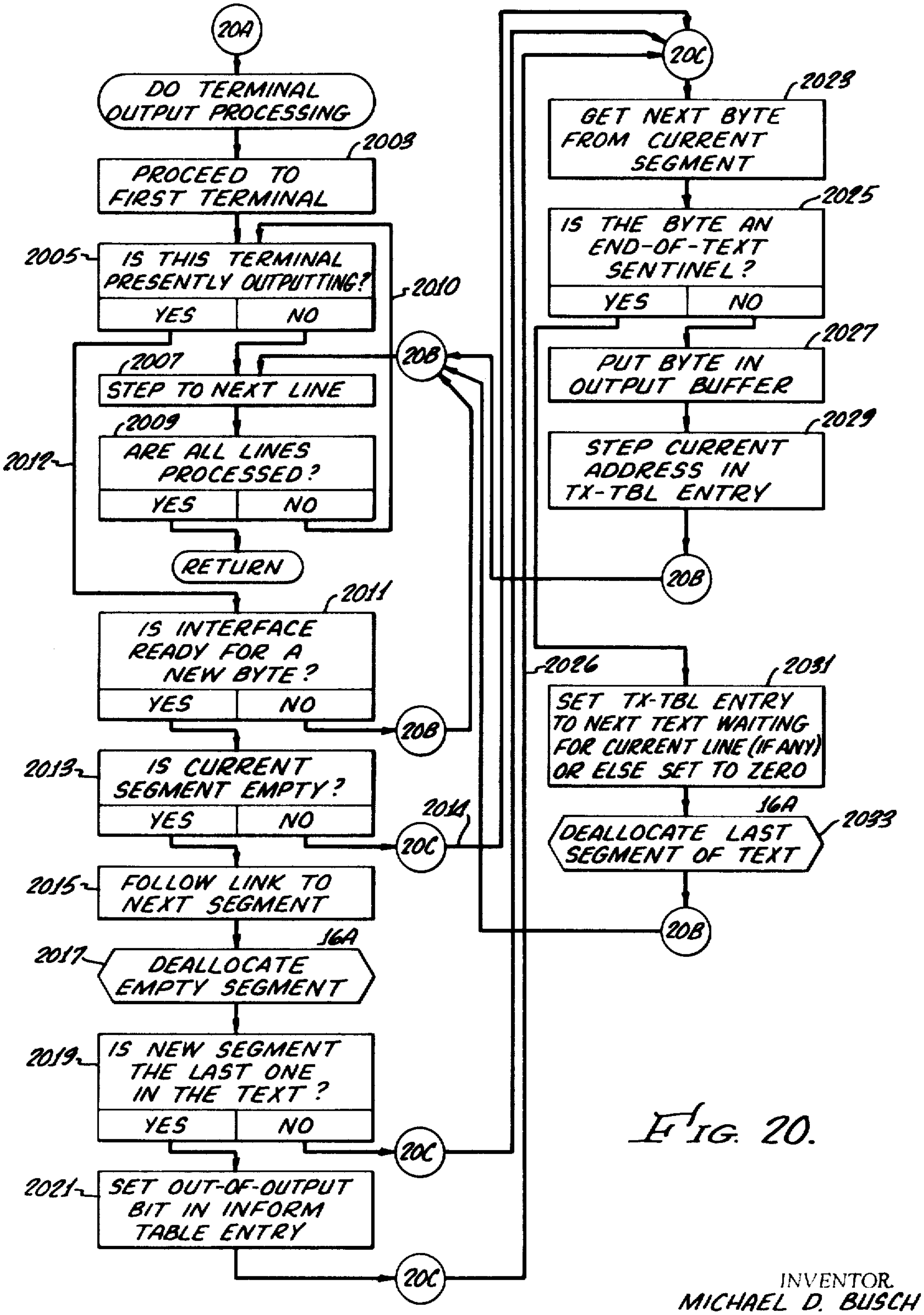

(c) Transfer of characters from the input buffer to the segmented memory: The sub-routine 18A for transferring the characters from the input buffer 803 to the segmented memory 805 is shown in FIG. 18. Its first step, shown in step 1803, is to query the input buffer 803 to discover whether or not it is empty. If it is, nothing further is done and the routine returns to the routine which initiated it, i.e., FIG. 14, routine 14B. If there is a byte in the input buffer 803, that byte and its terminal address are taken therefrom in step 1805 and in step 1807 the correct parity and type for the byte are looked up in a character table. There are three types of bytes in the input buffer 803. They are (1) terminating characters such as a carriage return; (2) characters which shoulld be ignored such as a delete character; and (3) all other characters which shall be called "normal." The character table (not shown in FIG. 8) comprises a block of memory locations in the memory 201. Each memory location in the block corresponds to a particular data byte so that the number of memory locations in the block is the same as the total number of different data bytes of characters which the computer 119 will process. To determine the address of the byte location in the character table which corresponds to a particular data byte, the computer 119 will add the character to the address of the beginning of the character table. This sum is the desired address. In this location, a word has been previously stored which provides the computer 119 with information regarding that particular character. For example, one particular bit position in the word informs the computer 119 whether or not the character should have a one or a zero in the parity bit position. It will also contain particular bit positions which the computer 119 can examine to determine whether the data byte is a normal byte, terminator byte, SYN byte, SOH byte, ACK byte, ETX byte or an ETB byte.

In step 1809, the parity bit supplied by the character table is added to the byte otbained from the input buffer 803. Next, in step 1811 the nature of the byte is determined. If it is of the type which is to be ignored, the routine returns through line 1812 to the beginning of the routine and its steps 1803 through 1811 are repeated to read and analyze another byte from the input buffer 803. If the character read is a normal one, step 1813 is performed, during which a sub-routine 19A is invoked to add that byte to the text in memory. This sub-routine is shown in detail in FIG. 19. The Add Byte To Text In Memory sub-routine 19A begins with the step 1903 in which a determination is made as to whether or not the byte just read from the input buffer 1803 is the first byte of a text. If it is not, the routine proceeds to step 1911 in which a determiation is made as to whether or not the memory segment 1101 in which preceding portions of the text (i.e., message) are stored is full. If it is not, the routine goes directly to step 1917 which stores the byte in the next word location in the current memory segment.

If as a result of the test made in step 1903, it is found that the byte read from the input buffer 803 is the first of a message, so that there is no sub-string 1107 of memory segments 1101 in the segmented memory 805 holding preceding portions of the message, a memory segment 1101 is allocated to that byte as part of the next step 1905. This step invokes sub-routine 15A shown in FIG. 15. The first step in the Allocate a Segment of Memory sub-routine 15A is the step 1503 in which the allocate-deallocate control 812 allocates that memory segment 1101 whose address is in NASP 811. The second and final step 1505 of the sub-routine is to update NASP 811 by storing it in the address in segmented memory of the next segment in the string of available segments. This terminates the sub-routine, and it returns control to step 1905 which now leads to the next step 1907 in which the word locations in TR-TBL 813 corresponding to the terminal from which the byte originated are set to point at the segment which was just allocated to receive that byte.

A determination is again made in step 1911 to find out whether or not the current segment is full. Since the segment was just assigned the answer will be NO and the byte in question, which is the first byte of the message, will be stored in the current memory segment in step 1917.

If the test in step 1911 reveals that the current memory segment 1101 is full, control passes to the block 1913 which invokes sub-routine 15A to allocate another segment of memory to receive the byte. In block 1915 the just filled memory segment 1101 is linked to the newly allocated memory segment 1101 by storing a linking byte in the just filled memory segment 1101 representing the address of the newly allocated memory segment 1101. Once the newly allocated memory segment 1101 has thus been linked to the previous memory segment 1101 the current byte is stored in the newly allocated memory segment (block 1917).

The process just described, by which successive bytes in a message 91 are added to the text in the memory 805 continues as the routine 18A loops repeatedly through its steps 1803–1813 until a byte is read from the input buffer 803 which is found during step 1811 to be a terminator character. When this occurs, the step 1815 in the routine 18A follows the step 1811 and as part of that step an End of Text sentinel is added to the text in the segmented memory 805 using the sub-routine 19A. When the end of text sentinel character has been made part of the sub-string 1107 which has been built up by the routine 18A, the sub-string is linked to the output string 1109 in the manner described in section G.4.b. Finally, in step 1821 the sub-string 1107 containing the text or message 91 just completed and which has just been attached to the output string 1109 is detached from the TR-TBL 813 by zeroing out both entries in TR-TBL 813 corresponding to the terminal for which the sub-string was assembled.

The terminal input processing routine 18A and its sub-routine 19A were described with reference to only one input terminal 101. That is, the routine was described only with reference to assembling a single sub-string 1107 in the segmented memory 805. It will be realized of course, that each time that a new byte and its terminal address are taken from the input buffer 803 by the step 1805 that byte may, and probably will, be a part of a different message 91 and will have come from a different one of the terminals 101. Thus, data bytes are presented by the input buffer 803 for transfer into the segmented memory 805 in a random manner and, as explained previously with reference to step 1905, each time the routine 18A finds that a given byte taken from the input buffer 803 is the first byte of a message 91, it allocates a new memory segment 1101 to that byte. Subsequent data bytes in the respective messages are stored in the respective allocated memory segments 1101 and in those which are subsequently linked to them so that several sub-strings 1107 are concurrently assembled in the segmented memory 805.

The routine 18A continues until the input buffer is found to be empty during the step 1803, at which time the routine returns to the point in the character service routine series 14C at which it was called up, so that the following sub-routine in the series may begin.

(d) Transfer of characters from the segmented memory to the output buffer: The function of the sub-routine which is to be discussed next is to transfer the strings of text 821, a byte at a time, from the segmented memory 805, where they were assembled by the routine 240, to the Output Buffer 829. The sub-routine 20A of FIG. 20 performs this function. As part of the process, all of the terminals 101 are scanned by the use of the multiplex unit 117 and those that require service, i.e., that have text stored in the segmented memory 805 for delivery to them, are serviced. The first part of the process is to proceed to scan the first of the terminals 101 (step 2003). Next, a determination is made as to whether there is any information or text in the segmented memory 805 destined for that terminal (step 2005). This is detected by interrogating the word location in TX-TBL 825 corresponding to the terminal. If there is an address in that word location, it means that there is text in the segmented memory 805 for the terminal. If it is found after step 2005 that there is no text for the terminal in question, the routine steps to the next line (step 2007) and determines whether or not all lines have been processed, that is, whether or not the routine 20A has been carried out for all of the terminals 101. If the answer is YES, it means that the routine for transferring data from the segmented memory 805 to the output buffer 825 has been completed and the sub-routine terminates by returning to the routine 14C so that the following step in that routine may be performed. If the answer is NO, meaning that one or more lines remain to be serviced, the routine loops back through the line to 2010 to the step 2005 and the process of interrogating the TX-TBL 825 is begun anew.

Assuming that this time the interrogating of TX-TBL 825 reveals that there is data in the segmented memory 805 destined for the terminal being serviced, the routine proceeds directly from the step 2005 to step 2011 as indicated by the connecting line 2012 between them and as part of the step 2011, the output buffer location corresponding to this terminal is interrogated to determine whether or not it is ready for a new byte. If it is not, i.e., if it contains a byte not yet moved to the output shift buffer 831, the routine for that terminal cannot continue. Therefore, if the answer is NO, the routine for that terminal ends and returns through line 2014 to step 2007 where the system is stepped to the next line and the following steps are repeated for that line.

If it is determined during step 2011 that the output buffer 829 is ready for a new byte for the terminal being serviced, another test is performed during step 2013 to find out if the memory segment 1101 whose address is in the word location of TX-TBL 825 corresponding to the terminal being serviced is empty. If it is, then, in step 2015, the link of that segment is followed to the next segment in the string 821 in the segmented memory 805 intended for the terminal being serviced, and the empty memory segment 1101 is deallocated during the next step 2017.

Figure 16:
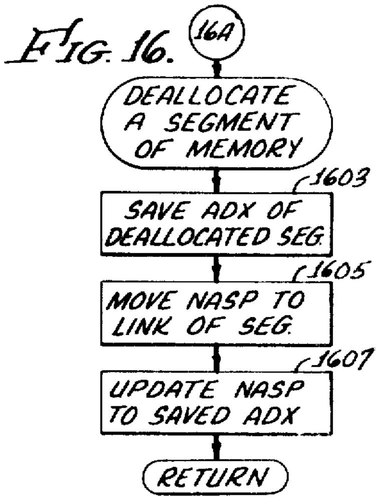

Deallocation of the empty segment called for during step 2017 is carried out by a separate sub-routine 16A. Referring to FIG. 16, the purpose of deallocating a memory segment which is found to be empty is to return it to the list of available memory segments. The first step in the process, step 1603, is to save the address of the memory segment 1101 which is to be deallocated. A one word location is provided in the memory 201 for this purpose but is not shown in FIG. 8. Next, in step 1605, the memory segment to be deallocated is linked to the first memory segment of the list of available memory segments, the address of which is in NASP 811. This linking is achieved by transferring the address of the first available memory segment 1101 from NASP 811 to the link of the memory segment 1101 which is to be deallocated. Finally, in step 1607 NASP 811 is updated by storing in it the address of the memory segment which was temporarily saved during step 1603. As a result, NASP 811 now points to the just deallocated memory segment 1101 making it the first in the list of available memory segments 1101.

Summarizing, as part of the routine 16A a memory segment 1101 which has been found to contain no data has been detached from the string of which it was a part and has been attached instead to the list of available memory segments 1101 and has indeed been made the first of them to be allocated on the basis of the address in NASP 811.

Once the sub-routine 16A has completed deallocation of the memory segment in question, it returns control to the routine which called upon it, i.e., the routine 20A. The next step to be performed is step 2019 during which a determination is made as to whether or not the new segment to which the routine proceeded during step 2015 is the last one in the text intended for the terminal being serviced. If it is, an "out of output" bit is set in the word location in the Inform Table 841 corresponding to the terminal 101 being serviced (step 2021). At a later time, during spare time processing, a control block will be sent to the central computer 123 to inform it of the fact that the terminal being serviced is about to run out of information.

After the "Out of Output" bit has been placed in the Inform Table 841 (step 2021), the routine 20C is begun. This routine is simply a continuation of the principal routine 20A for terminal output processing. It includes four steps whose purpose is to transfer a byte from the segmented memory 805 to the output buffer 829. It will be noted from FIG. 20 that the routine 20C for transferring a byte from the memory 805 to the output buffer 829 may be begun after any one of the steps 2013, 2019 and 2021. Thus, if during step 2013 it is found that the current memory segment is not empty, the subsequent steps 2015 through 2021, directed to proceeding to a following memory segment, are superfluous and the steps of the routine 20C for actually transferring a byte from the current memory segment may be carried out. Similarly, should it become necessary to proceed to the next memory segment and to carry out the steps 2015 and 2017, if during step 2019 it is found that the new memory segment is not the last one in the text intended for the terminal being serviced, then the step 2021 for signalling the end of the output string for the terminal being serviced becomes unnecessary and the transfer of the data byte from the new segment may be begun.

Referring to routine 20C, the first step 2023 is directed to the actual transfer of the data byte from the current memory segment 1101 to the output buffer 829. During the following step 2025 a test is made to determine if the byte just transferred to the buffer 829 is an End of Text sentinel. This is determined by direct comparison. If it is, it indicates that the byte just transferred is the last byte in the text intended for the terminal being serviced. Accordingly, the routine 20C proceeds directly through the line 2026 to step 2031. During the latter step the entry in TX-TBL 825 is set to the address of the next string of text 821 in the segmented memory 805 intended for the terminal being serviced. If there is none, the TX-TBL entry for the terminal being serviced is set to zero to indicate that fact. Next, during step 2033 the memory segment from which the end of text sentinel has been transferred during step 2023 is deallocated, using the sub-routine 16A. After this has been done, the routine 20C returns through line 2014 to the entry point 20B of the routine 20A which leads again into step 2007. At this time, as part of the step 2007, the routine is stepped to the next line to be serviced and the entire procedure for servicing a line is repeated.

If during step 2025 the byte which was transferred during step 2023 from the current memory segment 1101 is not found to be an end of text sentinel so that it is not the last byte in the text awaiting transmission to the terminal being serviced, the step which follows 2025 is 2027 during which the byte is transferred to the output buffer 829. Concurrently the address in the TX-TBL location corresponding to the terminal being serviced is updated to point to the next word location in the memory segment from which the byte was just transferred (step 2029). After this has been done the routine 20C is completed and it returns through line 2014 to the entry point 20B of the routine 20A.

In summary, the routine 20A steps from line to line and at each line it pauses to transfer one byte from the string of text 821 in the segmented memory 805 which is awaiting transmission to the terminal whose line is being handled.

In servicing each of the lines, the routine 20A operates not only to transfer data bytes from the segmented memory 805 to the respective lines which it services but it also performs certain "bookkeeping" functions should they become necessary. Thus, if it finds a memory segment empty it deallocates it and makes it part of the list of available memory segments (steps 2013 through 2017). And, if it finds that a particular memory segment holds the end of a message for a particular terminal it causes a proper signal to be sent to the central computer 123 to inform it of that fact.

The sub-routine 20A continues until all of the lines have been processed as indicated by an affirmative answer in the question stated in the block representing step 2009. When this occurs the sub-routine returns to the Character Service routine 14C by which it was called and the next sub-routine in that routine may be then carried out.

(e) Transfer of characters from the receive buffer to the segmented memory: The process through which characters are transferred from the receive buffer 809 to the segmented memory 805 is fairly involved, as may be seen by referring to FIG. 12, block 24B. Generally, the process involves shifting bytes into the receive buffer 809 and ignoring them until a SYN character is received. This is a function of the sub-routine 21A. Once a SYN character is received, the sub-routine 21B looks for an SOH character. Once this is received, the block number of the incoming data block is stored by routine 21C and a determination is made as to whether the data block 93 is a text block or a control block. If it is a text block, all of its data bytes are shifted from the receive buffer into the segmented memory 805 by routine 22A. If it is a control block, its bytes are similarly shifted by routine 23A. Eventually an end of text character ETX is received. In response to this, the routine 22B performs several checks on the data block which was just read into the segmented memory 805 by the preceding sub-routines 21A, 21B, 21C, and 22A or 23A. If the data block is found to have been received correctly, the block number in R-ACK 837 is updated by one and the sub-routine 223 loops back to the sub-routine 21B looking for the acknowledge number of yet another data block. This process continues until there are no further bytes in the receive buffer 809.

Turning now to FIG. 24 for a detailed discussion of the routine 24B, the first and only step in this general routine is step 2407 which causes a byte to be taken from the receive buffer 809. The step 2407 is properly part of another sub-routine 24A and after the step 2407 has been completed, the sub-routine 24A returns to the routine which called upon it. Initially, however, when the step 2407 is initiated by the sub-routine 24B, it returns to the sub-routine 21A which is the first sub-routine involved in the process of transferring characters from the receive buffer 809 to the segmented memory 805.

The first step in the routine 21A is 2101 which calls upon the sub-routine 24A to get a byte from the receive buffer 809. Turning again to FIG. 24, the first step in the sub-routine 24A is 2405 in which a determination is made as to whether or not the receive buffer 809 is empty. If it is empty a return is made to the routine which called upon the sub-routine 24B so as to effectively end the whole process for transferring data from the receive buffer 809 to the segmented memory 805. This, of course, follows since the transferring process should end if there is nothing to transfer. If on the other hand it is found during step 2405 that the receive buffer is not empty, the next step 2407 in the sub-routine 24A is performed and another byte is taken from the receive buffer 809. Following this, the routine returns to the point in the original routine at which the sub-routine 24A was invoked, namely step 2101 in the routine 21A. During the following step 2103 the byte which was just taken from the receive buffer 809 is tested to determine whether or not it is a SYN character If it is not, the sub-routine 21A loops back to step 201 to get another data byte from the receive buffer 809 because at this point it is only interested in detecting a SYN character. This, it will be recalled from FIG. 10, is the first character in a message 91.

If it is found during step 2103 that the data byte is a SYN character, another byte is transferred by again resorting to sub-routine 24A during step 2105. This data byte is examined during the next step 2107 to determine what it is. If it is a SYN character, it falls in the category "other" listed in the "what is byte" table 2107 in FIG. 21. This being the case, the routine 21B loops back through line 2108 to step 2105 and another byte is obtained from the receive buffer 809 through the sub-routine 24A. Recalling from FIG. 10 that there are 4 SYN characters, it may be seen that this looping back process may be repeated. How many times will depend on how many SYN characters it takes to get the receiving equipment into synchronism. Until it is synchronized, the equipment will not process a SYN character. The first byte thus read from the receive buffer following the last SYN character should be an ACK character. If it is, control is transferred to step 2111 which calls upon sub-routine 25A to get the acknowledged block number which is part of the acknowledge block 103 (FIG. 10).

Referring to FIG. 25, the sub-routine 25A is directed to getting any pair of bytes such as ack# and ack#*. The first step in the sub-routine 25A for getting a byte pair is the step 2503 which in turn calls for yet another sub-routine 24A for obtaining the first byte of the pair to be obtained. In the manner just described with reference to sub-routine 24A the first byte of the byte pair, ack# is taken from the receive buffer 809. During the following step 2505 a parity check is carried out on that byte to verify that the byte was received correctly. If there is a parity error, the sub-routine 25A returns to the routine 21B in FIG. 21 and enters at step 2105 which causes the next byte to be read from the receive buffer 809.

If 2505 in the sub-routine 25 reveals no parity error in the ack# byte, the next byte ack#* of the acknowledge block 103 is obtained during the step 2507, which again invokes sub-routine 24A to obtain that byte from the receive buffer 809. Again, a parity check is done on the ack#* byte during step 2509 and again if this byte fails the parity test control returns to routine 21B in FIG. 21.

If the ack#* byte passes the parity test, then, during the following step 2511 a determination is made as to whether or not the bytes ack# and ack#* are ones-complements of one another as they should be. If they are not, control is again returned to sub-routine 21B in FIG. 21. If the two bytes pass the ones-complement test, the sub-routine 25A is terminated and control is returned to the routine which invoked the sub-routine 25A, i.e., to step 2111 in FIG. 21. It should be remembered during the following discussion that the sub-routine 25A is not limited to transferring the ack#, -ack#* byte pair from the receive buffer 809 but is equally adapted to transfer any data byte and its ones-complement, such as the block#-block#* and the term#-term#* byte pairs, from the receive buffer 809.

Having transferred the ack# byte from the receive buffer 809 and having verified that it was received correctly, it is next saved during step 2113 in the memory location X-ACK 839 to be used subsequently in the purging of the output string 1109 in the segmented memory 805.

With ack# stored away in X-ACK 839, the routine 21B next loops back through line 2108 to its initial step 2105 which causes the next byte to be read from the receive buffer 809, through sub-routine 24A. This byte should be an SOH character. If it is, control is transferred through line 2110 to sub-routine 21C. During the first step 2115 of sub-routine 21C the sub-routine 25A is invoked to get the block#, which should be the character immediately following the SOH character, from the receive buffer 809. In the course of performing the steps of the sub-routine 25A the block# and the block#* bytes are taken from the receive buffer 809. Each is checked for correct parity and they are also checked for being the ones-complements of one another. If they pass all of these tests, the sub-routine 25A returns control to the routine 21C which then performs the next step 2117 which is a test to determine whether or not the block# is one greater than the block number of the last data block which was successfully received and which was stored in R-ACK 837. If the block# fails this test it is an indication that the data block which is to follow has already been correctly received and should not again be entered. Or else, one or more blocks have been missed. Consequently control is returned to the sub-routine 21B. It would have been noted that, when a data byte is read from the receive buffer 809 during the routine 21B following the failure of the block# to pass its test control is returned to the beginning of that routine, causing the routine 21B to shift another byte from the receive buffer 809, and to repeat this until all of the bytes of the data block involved have been read out of the receive buffer 809. However, none of these data bytes are stored in the segmented memory so that in effect all of them are ignored.

Assuming that step 2117 showed that the block# just received is one greater than that stored in R-ACK 837 the next step 2119 in the routine 21C is carried out. This step invokes sub-routine 25A to obtain from the receive buffer 809, and to verify, the term# character which should be the next character read out of the receive buffer. If the term# has been correctly received it is saved in CR-LINE 823 during step 2121 for subsequent use in interrogating TX-TBL 825. After storing term#, sub-routine 24A is used during the next step 2123 to get the next byte from the buffer 809. It is tested during the following step 2125 for being the STX character which it should be. If it is not, the preceding step 2123 is repeated and another byte is obtained from the receive buffer 809. If the next byte is an STX character, the CR-SUM memory location 833 is set to zero in step 2127 in preparation for accumulating therein a running sum modulo 128 of the bytes received in the data block to be shifted into the segmented memory 805 from the receive buffer 809. A determination is then made in step 2129 as to the nature of the data block in the receive buffer 809. This is done by examining the 7th bit location in CR-LINE 823 which holds the term# of the data block. As explained previously in Section G.2., with reference to the distinction between data blocks and control blocks, if the incoming data block is a control block 93*b*, the 7th bit of its term# is set to 1. If it is a text block 93*a* the 7th bit of its term# is set to 0.

Let it be assumed first that the 7th bit of the term# in CR-LINE 823 is found to be zero, i.e., that the data block in the receive buffer 809 is a text block. This being the case, the bytes of the text in the text block will be transferred from the receive buffer 809 to the segmented memory 805 under the control of the routine 22A. Referring to FIG. 22, the routine 22A for obtaining bytes of the text in the receive buffer 809 begins with step 2203 which invokes sub-routine 24A to get the next byte from the receive buffer 809. After that byte has been read from the receive buffer 809, it is tested during step 2205 to determine whether it is a normal byte, an incorrectly received byte, or an ETX byte. If it is a normal byte, the routine continues to step 2207 in which the byte is added (modulo 128) to the check sum stored in CR-SUM 833.

A test is then performed during step 2209 to determine whether or not the byte is the first of the text in the data block. In the present case, the answer will be yes, and the next step 2211 will invoke sub-routine 15A to allocate a segment of memory to the incoming byte. After this, the routine 22A proceeds directly to step 2219 and stores the byte in the current memory segment 1101 which was just allocated during the step 2211. The routine then loops back through line 2220 and repeats the steps 2203 through 2209 for the next byte in the receive buffer 809 unless there is something wrong with it.

During step 2213 which follows step 2209 for the second text byte, a test is made to determine whether or not the current memory segment 1101 is full. In this case, it will not be full since there will be only a single byte in it. Therefore, the process continues directly to step 2119 and the byte is stored in the current segment. The sequence involving steps 2205, 2207, 2209, 2213 and 2219 is repeated until the memory segment 1101 which was allocated is filled, as indicated by the test 2213 resulting in a positive answer. When this occurs, the step 2213 leads into step 2215 which invokes sub-routine 15A to allocate another memory segment 1101 to the data bytes in the text. The previous segment is linked to the newly allocated memory segment 1101 during the following step 2217 by setting into it a linking byte representing the address of the newly allocated memory segment 1101. The process then loops back through line 2220 and repeats, continuing to fill and link successive memory segments 1101 until in step 2205 an ETX character is detected, representing the end of the text portion of the data block.

The detection of an ETX character causes a transfer from the routine 22A to the routine 22B. In the initial step 2221 of the routine 22B the ETX byte is added to the checksum stored in CR-SUM 833. Next, during step 2223 the sub-routine 24A is invoked to get the next byte in the data block 93 residing in the receive buffer 809, this data byte being the longitudinal checksum lcc character byte which follows the ETX character in the data block (see FIG. 10). The lcc byte is added to the checksum in CR-SUM 833 (step 2225) and a test is performed to determine whether or not the sum of the addition carried out in step 2225 is zero (modulo 128). If this is not the case, the longitudinal checksum character lcc is not the two-s-complement of the sum which was accumulated in CR-SUM 833 indicating an error must have occurred in the transmission of the data block. If this is the case, control is transferred from the sub-routine 22B to the sub-routine 22C which includes a single step 2203 which calls upon a sub-routine 17A to deallocate all of the segments in which the previously accumulated (and erroneous) text was stored.

Figure 17:
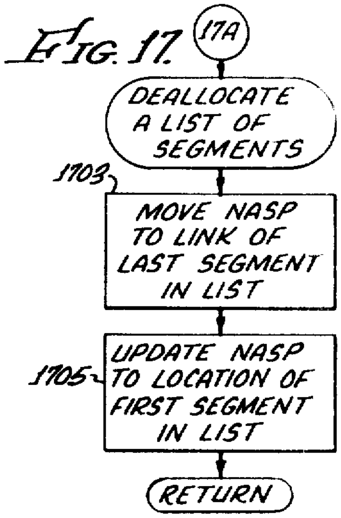

Referring to FIG. 17 for the routine for deallocating a list of segments, it includes steps 1703 and 1705. During the first step 1703 the last memory segment 1101 in the list of memory segments to be deallocated is linked to the first memory segment in the list of available memory segments by transferring the address of the first available memory segment then in NASP 811 to the link of the last memory segment to be deallocated. As a result of this step the linking byte stored in the last of the memory segments to be deallocated will point to the first of the list of available memory segments 1101. In the next step 705 of the deallocating routine, NASP 811 is updated to point to the first memory segment of the list of memory segments to be deallocated by storing in NASP 811 the address of that first memory segment. The effect of the last step, therefore, is to make the first memory segment of the list of memory segments to be deallocated the new first available memory segment. Stated differently, the entire string of memory segments which were to be deallocated has been tacked onto the beginning of the previous list of available memory segments. When the routine 17A is completed, it returns control to the sub-routine 22C which in turn returns control to the routine 21B in FIG. 21.

If during step 2227 the checksum test is satisfied, indicating that the entire data block was received correctly, the routine 22B continues and during its next step 2229 and End of Text sentinel is added to the text assembled in the segmented memory 805. This completes the assembling of the text block 93A in the segmented memory 805 and it is now time for step 2231, which determines whether or not the terminal 101 which is to receive the text which was just assembled is presently "outputting" i.e., whether there is presently a string of text stored in the segmented memory 805 intended for that terminal. This is determined by referring to the entry in TX-TBL 825 corresponding to the terminal involved and checking to see whether or not there is an address stored in it. If there is, the routine 22B proceeds to step 2233 during which the text in segmented memory which was just completed is linked to the end of the text which is currently in the segmented memory 805, and which is to go to the same terminal. This is done by setting the link of the first memory segment in the just completed string of segments to point to the last memory segment in the preceding string of segments intended for the same terminal.

To find the last memory segment in the preceeding string of text it is followed in the segmented memory 805 until a memory segment is reached which has a zero link. This is the last memory segment in the string and it is this segment to which the first memory segment of the new string of text is to be linked. Once the linking of the new string of text to the preceding string of text in the segment memory 805 is completed, the block number in R-ACK 837 is updated (increased by one) in the final step 2237 of routine 22B, so as to correctly indicate the serial number of the last correctly received data block.

If in step 2231 it is found that there is no other string of text in the segmented memory 805 intended for the terminal 101 which is being serviced, the routine proceeds to step 2235, during which the entry in TX-TBL 825 for that terminal is set to point at the initial memory segment of the newly stored string of text 821. Following this step, the updating step 2237 is performed. That step, once completed, leads back to the routine 21B in FIG. 21 which will attempt to transfer any other message which might be present in the receive buffer 809.

A third possibility in performing the step 2205 in routine 22A is that the byte which was read during step 2203 from the receive buffer 809 was in error. If this is the case, control is transferred directly from the step 2205 of routine 22A to the initial and only step of the error correction routine 22C during which the entire string of text of which the erroneous byte was a part is deleted from the segmented memory 805.

The entire set of operations shown in FIGS. 21, 22, and 23 which collectively make up the process of transferring characters from the receive buffer 809 to the segmented memory 805 and assembling them into strings of text intended for various terminals is continued until such time as it is found during the execution of the subroutine 24A, step 2405 that the receive buffer is empty. When this happens, a return is made to the Character Service Routine 14C. And at this time the next major character servicing subroutine 27B is begun.

Figure 27:
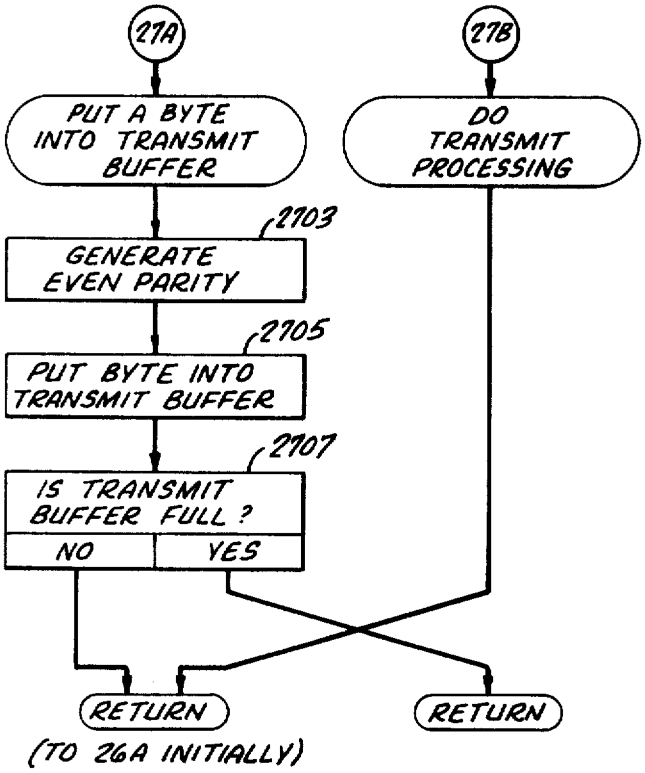
Figure 28:
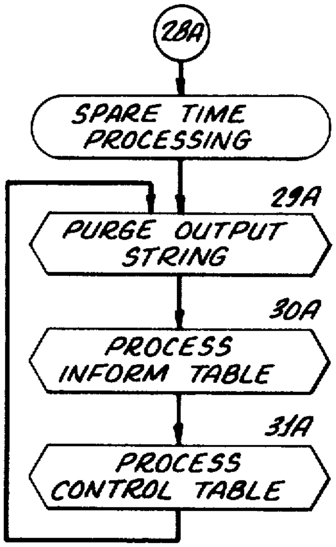

(f) Transferring of characters from the segmented memory to the transmit buffer: As shown in FIG 27, the routine with entry points 27A and 27B is a coordinating routine which couples the transmission routines 26A, 26B, 26C and 26D of FIG. 26 to the character service routine 14C. When the Character Service Routine 14C requests terminal output processing according to subroutine 27B, that sub-routine is entered at point 27B in FIG. 27 and is initially returned to the start of routine 26A in FIG. 26.

The first step 2603 in routine 26A calls for the sub-routine 27A shown in FIG. 27, whose purpose is to put a byte into the transmit buffer 807. This sub-routine, which is extremely often invoked by the sub-routines shown in FIG. 26, is a simple one involving three steps. During the first step 2703 even parity is generated for the byte which is to be transferred into the transmit buffer 807 using the character table. During the next step 2705 the byte with the correct parity is placed in the transmit buffer 807. Finally, during step 2707 the status of the transmit buffer 807 is determined. If it is found to be full the routine returns to the step which had invoked it, i.e., the Character Service Routine 14C. In effect, this terminates the high speed transmit processing sub-routine 27B.

If it is found during step 2707 that the transmit buffer 807 is not full, the sub-routine 27A is returned to the step which had invoked it, i.e., step 2603 in sub-routine 26A, FIG. 26. Step 2603 calls for the sending of four SYN characters in succession, so that the sub-routine 27A is invoked 4 times during the step 2603. After the four SYN characters have been put into the transmit buffer 807, an ACK character is transferred therein during step 2605, again using routine 27A.

Referring to FIG. 10 it will be recognized that thus far the first fiive bytes of a data message 91 have been assembled in the transmit buffer 807. This process of assembling a message 91 continues in step 2607 in which the ack# stored in R-ACK 837 is transferred to the next word location in the transmit buffer 807, by sub-routine 27A. The ack#* character is sent during the following step 2609 by another execution of the sub-routine 27A. At this point a test is performed at step 2611 to determine if the output string 1109 in the segmented memory 805 is empty. If it is, four ETB characters are transferred during the following step 2613 by executing the sub-routine 27A, operating on an ETB character, four times. Following this the sub-routine returns through line 2614 to the initial step 2603. The effect of this is to send a data block having only a series of four SYN characters 101, an acknowledge block 103, and a set of four ETB characters 105 so as to let the central computer 123 know that the block whose acknowledgement number is being transmitted was correctly received. In this way the lack of an output string 1109 in the peripheral computer 119 awaiting transmission to the central computer 123 does not prevent or delay the prompt transmission of an acknowledgement number to the central computer.

If step 2611 indicates that the output string 1109 is not empty, it is followed by step 2615, during which the block number in CX-BLN 817 is set to equal the number stored in F-ACK 835. The number in F-ACK 835 represents the last data block to have been erased from the output string 1109 in the segmented memory 805. Consequently, the number of the initial data block in the output string 1109 to be transmitted may be derived by increasing the number in F-ACK by one. This is done as the first step 2617 in the routine 26C which follows the last block 2615 of the routine 26A through the line 2616.

Assuming, as we have, that the output string 1109 is not empty, there are now stored in the transmit buffer 807, as a result of the steps performed during the routine 26A, four SYN characters 101 and the acknowledge block 103, neither of which were obtained from the output string 1109 in the memory segment 805. The first byte in that output string 1109 is the terminal address (term#) of the terminal 101 which orginated the message 91 forming the initial portion of the output string.

The term# is taken from the output string 1109 in the memory 805 during step 2619 and is saved in CX-LINE 815. The sub-routine 27A is then invoked 6 times during steps 2621 through 2631, successively to set into the transmit buffer 807 (a) and SOH character, (b) the block number of the data block to be transmitted, obtained from CX-BLN 817, (c) the ones-complement of the block number obtained from CX-BLN 817, (d) the address of the (term#) terminal from which the message to be sent originated, obtained from CX-LINE 815, (e) the ones complement of the terminal address (term#), and (f) an STX character to indicate the beginning of text. Once these six characters have been assembled successively in the transmit buffer 807, the number in CX-SUM 819 is initialized to zero (step 2633). The system is now ready to transfer, into the transmit buffer 807 by means of the routine 26D successive text bytes of the first data block in the output string 1109 held in the segmented memory 805.

The routine 26D begins with step 2635, which quieries the first memory segment 1101 in the output string 1109 to find out if there are any data bytes left in it. If there are, the routine proceeds to step 2639, in which the next byte in the current segment is read. During the following step 2640 a determination is made to find out if the byte just read is an End of Text sentinel. If it is not, the byte is added to the checksum in the CX-SUM location 819, after which the byte is stored in the transmit buffer 807 during the step 2643, which is a 27A sub-routine. Following this, the sub-routine 26D loops back to its initial step 2635 and the process is repeated to transfer another byte from the output string 1109 in the segmented memory 805 into the transmit buffer 807.

The process of successively transferring text bytes from the output string 1109 continues until the byte read is an End of Text sentinel. This is detected by the test performed as part of the step 2640 and results in the routine proceeding directly to step 2645 which is directed to invoking routine 27A to set an ETX character into the transmit buffer 807 after the last text character is stored therein.

Following the storage of the ETX character in the transmit buffer 807 it is added to the checksum in CX-SUM 819 and the longitudinal checksum character 1cc is calculated by using the two's complement of the number in CX-SUM after the ETX character has been added thereto. The longitudinal checksum character so calculated is set into the transmit buffer 807 during step 2649, which is another routine 27A. Next, during step 2651 a determination is made as to whether or not the end of the output string 1109 has been reached. This test is accomplished by testing the linking byte position 1103 (link) of the current memory segment 1101. The end of the output string 1109 has been reached if the link 1103 is zero. If the link is not zero it then points to at least one additional memory segment 1101 in the output string 1109. If this is the case, during the next step 2653 that link is followed to the next memory segment and operation returns to the beginning of routine 26C and to its first block 2617. The transfer of another block from the output string 1109 to the transmit buffer 807 then begins.

If the test of step 2651 at the end of routine 26B reveals that the end of the output string 1109 has been reached, control is returned to the beginning of routine 26B which is directed to inserting four ETB characters 105 in the transmit buffer 807 in the manner described previously with reference to the step 2613. This terminates the transfer of characters from the segmented memory 805 to the transmit buffer 807 so as to complete a message 91.

(g) Spare Time Operations: Spare time operations are generally indicated by the routine 28A in FIG. 28. It is a loop which executes three sub-routines 29A, 30A, and 31A in succession and which continues to cycle in spare time any time that the real time or persuedo real time operations are not performed. The first sub-routine to be invoked is 29A and its function is to purge the output string 1109 in accordance with acknowledgements received from the central computer 123. The second sub-routine 30A is directed to processing entries in the Inform Table 841 to generate control blocks in the output string 1109 from them. The third sub-routine 31A has as its function the processing of entries in the control table 843 and the carrying out of whatever functions are indicated by the microencoded bits in those entries.

(h) Purging the output string in spare time: The first step in the sub-routine 29A for purging the output string 1109 is to determine in step 2903 whether or not the output string is empty. If it is there is obviously nothing to purge and the sub-routine returns to the calling routine 28A for the performance of the following sub-routine 30A. Howevre, if the output string 1109 is found to be not empty, the step 2905 is performed in which a determination is made as to whether or not the numbers stored in F-ACK 835 (representing the block number of the last block to have been erased from the output string) is equal to the number in X-ACK 839 (representing the number of the last block to have been acknowledged by the central computer 123). If the two numbers are equal, it means that the last block to have been purged is the same as the last block for which an acknowledgment has been received, which is as it should be. In this case, the purge routine has nothing to do.

If the two numbers are not equal, then one or more blocks must be erased from the output string 1109. In this event, the sub-routine 29A proceeds to step 2907 in which we proceed to the beginning of the output string 1109. During the following step 2909 the output string 1109 is scanned for an End of Text sentinel. As part of this step the output string 1109 is followed from its initial memory segment 1101 through successive ones of its interlinked memory segments until the end of text sentinel is found in one of them. When it has been found, it means that one entire block in the output string 1109 has been scanned. At this point the next step 2911 is performed in which the block number in F-ACK 835 is updated by one to indicate that the first block of the output string 1109 has been marked for purging. Based on the assumption that the block so marked has been purged, a test is next made in step 2913 to determine whether the new block number in F-ACK 835 is equal to the block number in F-ACK 839. If the answer is yes, it means that purging of the block which has just been marked for purging will be sufficient to bring the two block numbers into agreement, all blocks up to the last one for which acknowledgement was received will have been purged from the output string 1109. If this is the case the sub-routine 29A continues to step 2915 in which it invokes sub-routine 17A to deallocate all of the segments which have been scanned and marked for purging. Once this has been completed the sub-routine 29A returns to the calling routine 28A for the next sub-routine to be performed.

If on the other hand it is found during the step 2913 that the new block number in F-ACK 835 is still not equal to the block number in X-ACK 839, the sub-routine loops back to its step 2909 and the output string 1109 is scanned further until another End of Text sentinel is reached, i.e., until another block has been scanned. When this step has been completed, the block number in F-ACK 835 is again updated by one, thus marking a total of 2 blocks for purging and another test is made to see if the block numbers in F-ACK 835 and X-ACK 839 agree. This process continues until agreement is found between the two block numbers, at which time the sub-routine exits from the step 2913 and calls upon the sub-routine 17A to deallocate whatever total number of segments were finally scanned, which may include any number of data blocks.

(i) Processing the inform table in spare time: Generally, the sub-routine 30A scans the inform table 841 looking for non-zero entries. If such an entry is found, a corresponding control block 93B is created in the segmented memory 805 and is linked onto the output string 1109 therein. Specifically, the sub-routine begins with step 3003 in which we proceed to the beginning of the inform table 841, that is, to the location corresponding to the first of the terminals 101. The steps 3005 through 3009 represent a look which scans through the inform table, stepping successively through its entries corresponding to respective terminals 101 looking for non-zero entries. The loop continues until all entries have been processed (step 3007) or until a non-zero entry is found (step 3009). In the latter event the loop is interrupted and the step 3011 is performed in which the sub-routine 15A is called upon to allocate a memory segment 1101 to receive the control block 93B to be set up for the non-zero entry just found. Following the allocation of a memory segment 1101, in step 3011 the terminal address of the terminal 101 in whose location in the Inform Table 841 the non-zero entry was found is stored in the first data byte location of the allocated memory segment, with the 7th bit of the terminal address (term#) byte being set to one designate that it is part of a control block 93B.

In step 3015 the microencoded control byte which was removed from the Inform Table 841 is stored in the next data word location in the memory segment 1101. At this point the entry in the Inform Table 841 for the terminal 101 in question is zeroed out. A delete character is then stored in the following byte location in the memory segment 1101 in step 3017 of the sub-routine 30A. Finally, in step 3019 an End of Text sentinel is stored in the memory segment 1101 thus completing the control block 93B (see Section G.2.).

The memory segment 1101 containing the just assembled control data block **93*b* is then linked in step 3021 to the output string 1109 by storing the address of the memory segment containing the control data block 93*b* in the linking byte location of the last memory segment 1101 in the output string 1109**.

(j) Processing the control table in spare time: The Control Table 843 contains one word location in the memory 201 corresponding to each of the terminals 101. When control blocks **93*b* arrive from the central computer 123 the High Speed Receive routine 24B extracts the micro-encoded control byte from each control block 93*b* and stores it in the control table entry corresponding to the terminal address of the control block. Subsequently, in spare time, the sub-routine 31A performs the functions specified by the microencoded bits held in the control table 843**.

Figures 29, 30, 31:
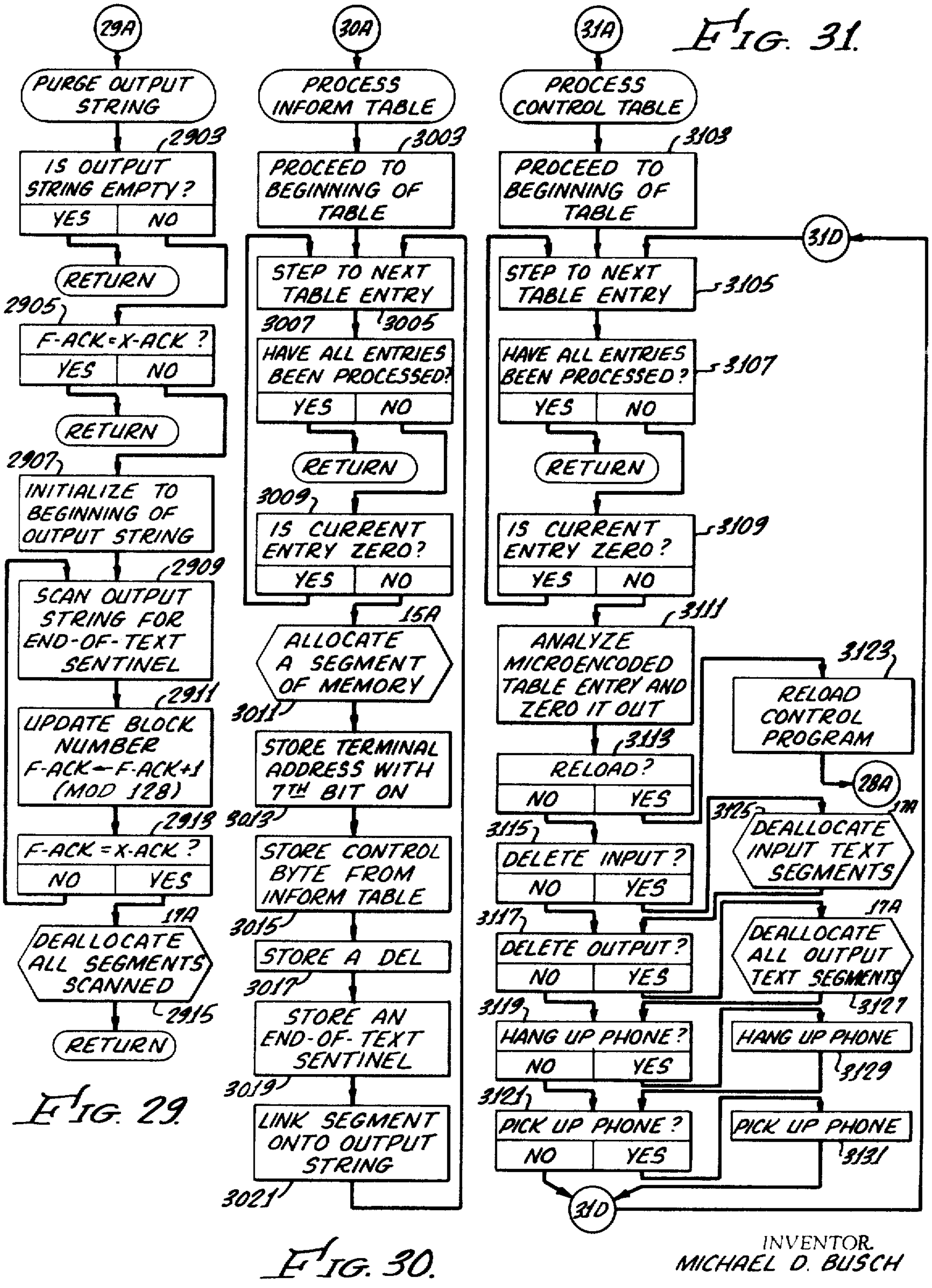

Referring to FIG. 31, the first step in the sub-routine 31A is to proceed to the beginning of the control table 843, i.e., the word location corresponding to the first one of the terminals 101. The next three steps 3105, 3107, and 3109 together represent a loop which scans through successive word locations in the control table 843 until either all entries have been processed (step 3107) or a non-zero entry is found in one of the word locations (step 3109). In the latter case the loop is interrupted and the last of its steps 3109 is followed by another step 311 in which the micro-encoded entry in the Control Table 843 found in step 3109 is analyzed and zeroed out. The details of this analysis and its results are shown by the blocks 3113 through 3131.

As part of the process of analyzing the micro-encoded entry in the Control Table 843 in step 3113 a test is made to determine whether the micro-encoded byte represents an instruction to reload the entire control program of the computer. If it does, the reloading is carried out in step 3123 after which control is returned to the routine 28A.

The steps 3113 and 3123 for reloading the control routines of the peripheral computer 119 in response to a control message from the central computer 123 are provided for unforseen emergencies only. The step 3123 is invoked only when the central computer 123 has determined that control routines in the peripheral computer 119 are in error. In this case it can, by sending an appropriate control block, cause the data concentrator to reload itself. In this event however, all of the text which is in th memory 201 of the data concentrator is lost. Consequently, this reloading procedure is done only when absolutely essential.

If, upon anlysis in step 3133, it is found that the micro-encoded control byte does not represent an instruction to reload, another test is performed to determine whether or not it represents an instruction to delete text which is held in the segmented memory 805 for delivery to the central computer 123. If this is found to be the case, step 3125 is performed next in which the sub-routine 17A is called upon to deallocate all of the memory segments 1101 in the segmented memory 805 which contain data from the terminal 101 corresponding to the entry in the control table 843 in which the micro-encoded control bit was found.

If the test in step 3115 yields a negative answer, the next test, indicated by step 3117, is carried out to determine if the control byte represents an instruction to delete text in the segmented memory 805 held there pending delivery to the terminal 101 for which the control byte is being held in the Control Table 843. If the answer is positive, the sub-routine proceeds to step 3127 in which the additional sub-routine 17A is used to deallocate all of the memory segments 1101 in the segmented memory 805 holding text for the terminal 101 in question. Deletion of an input text is normally requested by the central computer 123 immediately after a terminal 101 has been connected to the system, in order to erase any random noise characters which might have been received by the data line interface 121 in the course of the connecting process. Deletion of an output text intended for delivery to one of the terminals 101 is used when the central computer 123 wants the peripheral computer 119 to stop typing immediately on a given terminal 101.

Let it be assumed, for example, that the peripheral computer 119 is typing on a given terminal 101 and that it has several lines of output text 821 stored in the segmented memory 805 waiting to be typed out. Let it be assumed further that at this point the user at the particular terminal 101 types in a command requesting that the central computer 123 stop typing. Even if the central computer 123 stopped sending more output text to the data concentrator as a result of this command, the peripheral computer 119 would continue typing at least until it had exhausted the string of text 821 held in its segmented memory 805 for delivery to the terminal 101 involved.. Therefore, provision is made for the central computer 123 to send to the peripheral computer 119 a control message requesting that it delete producing further output, at which point the peripheral computer 119 immediately discontinues typing on the terminal 101 and deallocates all of the text then in the segmented memory 805 waiting to be typed out on the terminal.

Returning to the routine 31A for processing the control table 843, if it is found in step 3117 that the micro-encoded control byte being analyzed is not calling for a deletion of output text, another test is performed during step 3119 to determine if it is calling for the hanging up of the phone in the telephone channel 102 connecting the terminal 101 cooresponding to the control byte. If this is the case the phone connecting the terminal 101 is hung up.

Finally, if the control byte does not represent any of the foregoing four instructions, it is tested in step 3121 for the possibility that it is calling for picking up of the phone connected to the terminal 101 to which it corresponds. If the latter is the case, the phone is picked up in step 3121. If not, the sub-routine 31A is terminated and it loops back through the entry point 31D to step 3105 in which the process is stepped to the next entry in the Control Table 843 and is repeated with reference to it.

It should be noted that more than one bit of the micro-encoded control byte may have been set to "1," so that the control byte may represent more than one instruction. For this reason each of the tests 3117, 3119, and 3121 is performed even through the preceeding test yielded a positive result. So, for example, if the answer to step 3115 is YES, all input segments are deallocated in step 3125 and then the next test, step 3117, is carried out to determine if the control byte also carried a "delete output" instruction.

A detailed list of instructions for programming the computers 119 and 123 to carry out the operations shown in and described with reference to FIGS. 12 through 30 appears in Appendix V of the application.

(7) Summary of operations

The operations of the system of FIG. 8 may be divided into those which are performed by elements of the peripheral computer 119 in combination with the multiplex system 117 and the telephone channels 102 controlled to act as a Data Concentrator and those performed by elements of both computers 119 and 123 controlled to act as a high speed error correcting data transmission system.

The Data Concentrator takes several streams of data bytes representing messages sent intermittently and asynchronously from several terminals 101 and assembles them all into a tightly packed string of data in the segmented memory 805 containing successive messages 91 each identified with its originating terminal.

As part of the above function data is taken a bit at a time from successive ones of the terminal 101, assembled into data bytes in the input shift buffer 801, and successively fed through the input buffer 803 byte by byte into the segmented memory 805. This memory is organized successively to allocate memory segments 1101 from a string of available memory segments. In coming data bytes are stored in separate groups of memory segments, each group interlinked into a sub-string 1107 containing a complete message from a respective one of the terminals 101. As each sub-string 1107 is completed, it is linked onto an output string 1109 of memory segments in the segmented memory 805 from which data is transmitted synchronously to the central computer 123 as part of the high speed transmission routine of the system.

Data received by the Data Concentrator from the central computer 123 is stored as separate strings of text 121 in the segmented memory 805. Each string contains a separate message and each message is identified with the terminal 101 to which it is to be sent. Bytes from the respective strings of text 121 are transferred into locations in the output buffer 829 individually allocated to respective ones of the terminals 101. The terminals are serviced periodically in rapid succession, a bit being transmitted to each respective terminal 101 from the output shift buffer 831 each time the terminal is serviced. In this way, the respective strings of text 821 in the segmented memory 805 are concurrently fed through the output buffer 829 and the output shift buffer 831 and are concurrently transmitted on a time-shared basis a bit at a time to the respective terminals 101. For a more detailed description of the portions of the system involved in the foregoing operations sections G.4.a–G.4.c. should be reviewed. For their detailed operation Section G.6.a.–G.6.d. should be studied.

The structural features of FIG. 8 related to the high speed transmission of data with error correction are described in detail in sections G.4.e., and G.4.g.–G.4.i. and the operations involved are discussed in detail in sections G.6.e. and G.6.f. These operations will now be reviewed with reference to the transmission of data blocks from the peripheral computer 119 to the central computer 123.

The output string 1109 in the segmented memory 805 of the transmitting computer 119 is intermittently purged of data blocks for which acknowledgement has been received, and the block number of the last data block to have been purged is stored in F-ACK 835 (routine 29A). CX-BLN 817 is used to store the number which is to be assigned as the block number of the next data block to be transmitted from the output string 1109 during the next transmission routine. After each data block is sent from the transmitting computer 119, the number in CX-BLN 817 is stepped by one so that each block number taken from CX-BLN is one greater than the last. Prior to each transmission routine the number in CX-BLN 817 is set to a number which is one higher than that in F-ACK 835. This number is assigned to the first data block to be transmitted so that its number will be one greater than the number of the last data block to have been purged (routines 26A and 26C).

In the receiving computer, the block number of the last successfully received data block is stored in R-ACK 835*a*, and each subsequent block received is checked to verify that its block number is one greater than the number stored in R-ACK 835*a*. If it is, the entire data block is read into the segmented memory 805*a* of the receiving computer 123 and when all of the data block has been read, it is checked to see if it was correctly received. If it was, R-ACK 837*a* is updated by increasing the block number therein by one. The next time that there is a transmission from the receiving computer 123 to the transmitting computer 119 the newly stored block number in R-ACK 837*a* is sent (step 2607).

Let it be assumed that, prior to the beginning of a given transmission routine, block 56 was the last data block for which an acknowledgement was received by the transmitting computer 119. Assume further that there are presently four data blocks in the output string 1109 to be transmitted. They will then be assigned block numbers 57–60. Assuming that all four blocks are correctly received at the receiving computer 123, its R-ACK 837 is stepped from 56 to 60. During the next transmission the number 60 is sent back to, and is stored in, X-ACK 839 of the transmitting computer 119 (steps 2607 and 2111). During the next purge routine (29A) the output string 1109 in the segmented memory 805 of the transmitting computer 119 is purged until a number in F-ACK 835 is the same as that in X-ACK 839, i.e., 60.

Let it be assumed further that during the time which elapsed between the transmission of the data blocks 57–60 and their subsequent purging, two additional data blocks have been added to the output string 1109. During the next transmission, the first block in the string to be transmitted will be the first of the two new data blocks added to the output string 1109. Its block number will be one greater than the block number stored in F-ACK 835, i.e., 61 and that of the following data block will be 62.

Throughout the specification the term "greater than" has been used to express the relationship of a number in one of the word locations CX–BLN, CR–BLN, F–ACK, R–ACK, X–ACK to some other number. It is used for example in the sense that, after the number in X–ACK 839 has been stepped, it is one "greater than" it was before. Or, in the sense that each number taken from CX–BLN 817 to be used as a data block number by a transmitting computer is "one greater" than the previous one. However, those of the word locations which are periodically stepped, such as CX–BLN, have a maximum count state of 127. Their next count state after that is 0. Therefore, as used herein, "greater than" means further along in the circular progression 0, 1, 2 . . . 127, 0, and, 0 is "greater than" 127.

Two separate checks are performed at the receiving computer 123 on each data block that it receives. The first is a parity check and it is performed individually on each data byte. It will be recalled that each data byte is sent from the transmitting computer 119 with correct parity.

The second check performed at the receiving computer 123 is a collective check on all of the data bytes of the data block. This check is performed by determining whether or not the sum (modulo 128) of all of the text bytes in the data block equals the longitudinal checksum character lcc of the data block. The lcc character is generated in the transmitting computer 119 by storing in its CX–SUM 819 a running sum (modulo 128) of all the next bytes set into the transmit buffer 807 for a given data block. After the last text byte the LCC character for that block is computed by taking the two's complement of the number in CX–SUM and this number is set as the last character of the data block into the transmit buffer 807. Since the lcc number is the two's complement of the sum (modulo 128) of all of the preceding text bytes in the data block, it follows that the sum of all of the data bytes (modulo 128) when added to the lcc character should result in a total sum of zero. If the data block is transmitted to the receiving computer 123 without error this relationship will remain true. This may be confirmed by keeping a running sum (modulo 128) of all of the next bytes in a data block which has been received at the receiving computer in its CR–SUM 833*a*. At the end of receiving a data block, when the lcc character of the data block is read it is added to the sum which has been accumulated in CR–SUM 833 and if the result is zero it will be an indication that the block was received correctly.

(H) CONCLUSION

From the foregoing it is apparent that the disclosed apparatus and method represent a significant contribution to the art of digital data communication. Many remote terminals are enabled by use of the invention to share the time of a single central computer located many miles away. As a data concentrator, the system permits efficient use of the long distance lines through which the central computer is reached. And this tightly packed information is sent more securely by virtue of the error correcting ability of the system.

APPENDIX I

Logical And (AND Y)

Op. Code: 0
Operation: The AND operation is performed between the content of memory location Y and the content of the AC. The result is left in the AC, the original content of the AC is lost.

Two's Complement Add (TAD Y)

Op. Code: 1
Operation: The content of memory location Y is added to the content of the AC in two's complement arithmetic. The result of this addition is held in the AC, the original content of the AC is lost. If there is a carry from AC0, the link is complemented. This feature is useful in multiple precision arithmetic.

Increment and Skip if Zero (ISZ Y)

Op. Code: 2
Operation: The content of memory location Y is incremented by one in two's complement arithmetic. If the resultant content of Y equals zero, the content of the PC is incremented by one and the next instruction is skipped. If the resultant content of Y does not equal zero, the program proceeds to the next instruction. The incremented content of Y is restored to memory. The content of the AC is not affected by this instruction.

Deposit And Clear AC (DCA Y)

Op. Code: 3
Operation: The content of the AC is deposited in core memory at address Y and the AC is cleared. The previous content of memory location Y is lost.

Jump to Sub-Routine (JMS Y)

Op. Code: 4
Operation: The content of the PC is deposited in core memory location Y and the next instruction is taken from core memory location $Y+1$. The content of the AC is not affected by this instruction.

Jump To Y (JMP Y)

Op Code: 5
Operation: Address Y is set into the PC so that the next instruction is taken from core memory address Y. The original content of the PC is lost. The content of the AC is not affected by this instruction.

APPENDIX II

Interrupt Turn On (ION)

Op. Code: 6001
Operation: This command enables the computer to respond to a program interrupt request. If the interrupt is disabled when this instruction is given, the computer executes the next instruction, then ables the interrupt. The additional instruction allows exit from the interrupt sub-routine before allowing another interrupt to occur. This instruction has no effect upon the condition of the interrupt circuits if it is given when the interrupt is enabled.

Interrupt Turn Off (IOF)

Op. Code: 6002
Operation: This command disables the program interrupt synchronization element to prevent interruption of the current program.

Teletype Increment (TTINCR)

Op. Code: 6401
Operation: The content of the line select register (LSR) in the Serial Line Multiplexer is incremented by one to address the next sequentially numbered line unit.

Teletype In (TTI)

OP. Code: 6402
Operation: Three core memory locations are required by the TTI instruction. The first location contains the TTI instruction, and the two succeeding locations contain a line status word (LSW) and a character assembly word (CAW), respectively. Bit 0 of the LSW records the active/inactive status of the selected Teletype line, and bits 9 through 11 of the LSW serve as a real time clock to determine the bit assembly time for the CAW. Both of these words should be cleared prior to the first use of the TTI instruction in a subroutine. The TTI instruction checks the status of the selected line and the number in the real time clock. If the line is active and the clock indicates the center of a bit has passed, one bit of the Teletype line is shifted into the CAW.

The TTI instruction is executed in two or three computer cycles. In the first cycle, a fetch cycle, the computer reads the instruction from core memory and establishes the next sequential core memory location as the address to be read during the next cycle. By placing a 1 in bit 11, this instruction can be microencoded to increment the content of the LSR of the Serial Line Multiplexer during the first cycle.

The second cycle is a Status state in which the LSW is read, the active/inactive status of the line is checked, the timing of the current bit is checked, and (based on these conditions) the inactive status of the line is recorded in MB0 and the program advances to the next instruction, the real time clock count is incremented in the LSW and the program advances to the next instruction, or the real time clock count is incremented and the third cycle is initiated.

The active/inactive status of the Teletype line is checked by sampling the condition of bit 0 of the LSW. If it is a zero, MB0(0) (indicating that the line is inactive, i.e. not transmitting a character) the LSW is shifted one position to the right in the MB, and the complement of the Teletype line is set into MB0. Therefore, if the line is now active, a 1 is set into MB0 and will be read during the Status cycle of the next TTI instruction. The program count is then incremented by one to skip over the CAW, the LSW is restored to core memory, the MB is cleared, and the Fetch state is entered to fetch the next instruction. If the MB0(1) at the beginning of the Status cycle, the LSW is incremented by one to advance the real time clock and the LSW number is sampled. If $LSW=3$ it is too early to sample the active line so the program count is incremented to skip over the CAW, the LSW is restored to core memory, the MB is cleared, and the program advances to the Fetch state for the next instruction. If $LSW=4$ after incrementation, the LSW is rewritten in memory and the line is written into the CAW during the next cycle.

The third cycle is a Character state in which the CAW is read into the MB from core memory, the character is shifted right one position with the line bit being shifted into MB0, then the CAW is rewritten in memory. The program then advances to the Fetch state for the next instruction.

Teletype Out (TTO)

Op. Code: 6404
Operation: This instruction must be preceded by a command sequence (such as CLA and TAD) that loads the AC with the character to be (or being) transferred to the external Teletype equipment. The TTO instruction clears the L, shifts the content of the AC and the L one position to the right, then transfers the bit contained in AC11 to the selected Teletype line.

Clear Line Select Register (TTCL)

Op. Code: 6411
Operation: The line select register is cleared, so line 0 is addressed.

Load Line Select Register (TTSL)

Op. Code: 6412
Operation: The line select register is set by an OR transfer from the content of bits 5 through 11 of the accumulator, then the accumulator is cleared.

Read Line Select Register (TTRL)

Op. Code: 6414
Operation: The content of the line select register is loaded into bits 5 through 11 of the accumulator by an OR transfer.

Skip on Clock Flag (TTSKP)

Op. Code: 6421
Operation: The content of clock 1 flag of the Serial Line Multiplexer is sampled, and if it contains a 1 (indicating that a clock pulse has occurred and the flag has been enabled to request a program interrupt) the content of the program counter is incremented by 1 to skip the next sequential instruction. If the skip occurs clock 1 caused a program interrupt if the interrupt system was enabled when the clock pulse occurred.

Turn On Clock (TTXON)

Op. Code: 6422
Operation: The clock in the Serial Line Multiplexer is enabled and the clock flag cleared. When the clock is enabled the next clock pulse sets the clock flag and requests a program interrupt.

Skip on Transmit Flag (STF)

Op. Code: 6611
Operation: Causes the program to skip the next instruction if the Transmit Flag is in the 0 state. When the Transmit Flag is in the 1 state, the transmit buffer register is ready to accept another character.

Clear Transmit Flag (CTF)

Op Code: 6602
Operation: Resets the Transmit Flag. If Transmit Active Flag is not set, CTF also causes the program to skip the next instruction.

Transmit a Character (TAC)

Op. Code: 6601
Operation: Causes the contents of the accumulator to be transferred into the transmit buffer register (TCB).

Skip on Receive Flag (SRF)

Op. Code: 6651
Operation: Causes the program to skip the next instruction if the Receive Flag is not set. (The Receive Flag is set when the first incoming sync character is detected, and stays set until the Receive End Flag is set.)

Read Receiver Buffer (RRB)

Op. Code: 6612
Operation: Transfers the contents of the Receive Buffer (RCB) to the accumulator. RRB also resets the Receive Flag.

Skip on Receive End Flag (SEF)

Op. Code: 6621
Operation: Causes the program to skip the next instruction if the Receive End Flag is not set. (The Receive End Flag flip-flop is set when the receive logic has stopped receiving serial data from the communications equipment due to termination of the timing pulses.)

Clear End Flag (CEF)

Op. Code: 6622
Operation: Resets the Receive End Flag.

Set Ring Enable (SRE)

Op. Code: 6624
Operation: Set the Ring Enable flip-flop which permits the Ring Flag to request a program interrupt.

Clear Ring Enable (CRE)

Op. Code: 6644
Operation: Resets the Ring Enable flip-flop.

Skip on Ring Indicator (SRI)

Op. Code: 6631
Operation: Causes the program to skip the next instruction if the Ring Flag is not set. The Ring Flag is set when a RING input is received from the data set.

Clear Ring Flag (CRF)

Op. Code: 6632
Operation: Resets the Ring Flag.

Set Terminal Ready (STR)

Op. Code: 6634
Operation: Sets the Terminal Ready flip-flop.

Clear Terminal Ready (CTR)

Op. Code: 6642
Operation: Resets the Terminal Ready flip-flop.

Skip on Data Set Ready (SSR)

Op. Code: 6641
Operation: Causes the program to skip the next instruction if the communications equipment is in the "ready" state.

Clear Receiver Active (CRA)

Op. Code: 6652
Operation: Resets the Receive Active flip-flop, taking the receive logic out of the "active" state. No more incoming characters are transferred to the receive buffer register until another sync character is detected.

Turn Off Clock (TTXOFF)

Op. Code: 6424
Operation: The clock is disabled and the clock flag is cleared. When the clock is disabled the clock flag cannot be set by the clock, and cannot request a program interrupt or be skipped upon. The clock is unaffected and continues to run, but all operations caused by clock pulses are disabled. (When the system handles multiple-band frequencies additional clocks and instructions are provided. Instructions similar to TTSKP, TTXON, and TTXOF use select code 43 for clock 2 and use select code 44 for clock 3.)

APPENDIX III

No Operation (NOP)

Op. Code: 7000
Operation: This command causes a 1-cycle delay in the program and then the next sequential instruction is initiated. This command is used to add execution time to a program, such as to synchronize sub-routine or loop timing with peripheral equipment timing.

Increment Accumulator (IAC)

Op. Code: 7001
Operation: The content of the AC is incremented by one in two's complement arithmetic.

Rotate Accumulator Left (RAL)

Op. Code: 7004
Operation: The content of the AC is rotated one binary position to the left with the content of the link. The content of bits AC1–11 are shifted to the next greater significant bit, the content of AC0 is shifted into the L, and the content of the L is shifted into AC11.

Rotate Two Left (RTL)

Op. Code: 7006
Operation: The content of the AC is rotated two binary positions to the left with the content of the link. This instruction is logically equal to two successive RAL operations.

Rotate Accumulator Right (RAR)

Op. Code: 7010
Operation: The content of the AC is rotated one binary position to the right with the content of the link. The content of bits AC0–10 are shifted to the next less significant bit, the content of AC11 is shifted into the L, and the content of the L is shifted into AC0.

Rotate Two Right (RTR)

Op. Code: 7012
Operation: The content of the AC is rotated two binary positions to the right with the content of the link. This instruction is logically equal to two successive RAR operations.

Complement Link (CML)

Op. Code: 7020
Operation: The content of the L is complemented.

Complement Accumulator (CMA)

Op. Code: 7040
Operation: The content of the AC is set to the one's complement of the current content of the AC. The content of each bit of the AC is complemented individually.

Complement and Increment Accumulator (CIA)

Op. Code: 7041
Operation: The content of the AC is converted from a binary value to its equivalent two's complement number. This conversion is accomplished by combining the CMA and IAC commands, thus the content of the AC is complemented during event time 1 and is incremented by one during event time 2.

Clear Link (CLL)

Op. Code: 7100
Operation: The content of the L is cleared to contain a 0.

Set Link (STL)

Op. Code: 7120
Operation: The L is set to contain a binary 1. This instruction is logically equal to combining the CLL and CML commands.

Clear Accumulator (CLA)

Op. Code: 7200
Operation: The content of each bit of the AC is cleared to contain a binary 0.

Set Accumulator (STA)

Op. Code: 7240
Operation: Each bit of the AC is set to contain a binary 1. This operation is logically equal to combining the CLA and CMA commands.

APPENDIX IV

Halt (HLT)

Op. Code: 7402
Operation: The program stops at the conclusion of the current machine cycle. This command can be combined with others in the OPR 2 group that are executed during either event time 1 or 2, and so are performed before the program stops.

Skip, Unconditional (SKP)

Op. Code: 7410
Operation: The content of the PC is incremented by one so that the next sequential instruction is skipped.

Skip on Non-Zero Link (SNL)

Op. Code: 7420
Operation: The content of the L is sampled, and if it contains a 1 the content of the PC is incremented by one so that the next sequential instruction is skipped. If the L contains a 0, no operation occurs and the next sequential instruction is initiated.

Skip on Zero Link (SZL)

Op. Code: 7430
Operation: The content of the L is sampled, and if it contains a 0 the content of the PC is incremented by one so that the next sequential instruction is skipped. If the L contains a 1, no operation occurs and the next sequential instruction is initiated.

Skip on Zero Accumulator (SZA)

Op. Code: 7440
Operation: The content of each bit of the AC is sampled, and if each bit contains a 0 the content of the PC is incremented by one so that the next sequential instruction is skipped. If any bit of the AC contains a 1, no operation occurs and the next sequential instruction is initiated.

Skip on Non-Zero Accumulator (SNA)

Op. Code: 7450
Operation: The content of each bit of the AC is sampled, and if any bit contains a 1 the content of the PC is incremented by one so that the next sequential instruction is skipped. If all bits of the AC contain a 0, no operation occurs and the next sequential instruction is initiated.

Skip on Minus Accumulator (SMA)

Op. Code: 7500
Operation: The content of the most significant bit of the AC is sampled, and if it contains a 1, indicating the AC contains a negative two's complement number, the content of the PC is incremented by one so that the next sequential instruction is skipped. If the AC contains a positive number no operation occurs and program control advances to the next sequential instruction.

Skip on Positive Accumulator (SPA)

Op. Code: 7510
Operation: The content of the most significant bit of the AC is sampled, and if it contains a 0, indicating a positive (or zero) two's complement number, the content of the PC is incremented by one so that the next sequential instruction is skipped. If the AC contains a negative number, no operation occurs and program control advances to the next sequential instruction.

Clear Accumulator (CLA)

Op. Code: 7600
Operation: Each bit of the AC is cleared to contain a binary 0.

APPENDIX V

There follows a list of instructions which may be entered into the memory 201 of the peripheral computer 119 to implement the data communication techniques of the present invention.

Column A of the appendix is a list of memory 201 locations. Column B is a list of the machine language instructions and constants stored in the corresponding memory locations of column A. Each instruction in Column B has a symbolic code which is listed in Column C. Column D contains descriptive comments of each instruction.

The *Digital 8–3–S Assembly Program* referenced in this specification may be used to facilitate the assembly of the machine language instructions as listed herein.

| A | B | C | D |
|---|---|---|---|
| | ØØØØ | *Ø | |
| ØØØØ | 544Ø | JMP I STARTØ | |
| ØØØØ | 5437 | JMP I INTERØ | |
| ØØØ2 | 544Ø | JMP I STARTØ | |
| | | | / |
| | | | / |
| | | | /EQUIVALENCES |
| | ØØ3Ø | LINES=3Ø | /NUMBER OF LINES (TWENTY FOUR) |
| | ØØØ3 | LINES8=3 | /NUMBER OF LINES PER MINOR LOOP |
| | 64Ø1 | TTINCR=64Ø1 | |
| | 64Ø2 | TTI=64Ø2 | |
| | 64Ø4 | TTO=64Ø4 | |
| | 6411 | TTCL=6411 | |
| | 6412 | TTSL=6412 | |
| | 6414 | TTRL=6414 | |
| | 6431 | TT8SKP=6431 | |
| | 6434 | TT8ON=6434 | |
| | 6432 | TT8OF=6432 | |
| | 63Ø1 | TAC=63Ø1 | |
| | 63Ø2 | CTP=63Ø2 | |
| | 63Ø4 | CIM=63Ø4 | |
| | 6311 | STF=6311 | |
| R | 6312 | RRB=6312 | |
| | 6314 | SIM=6314 | |
| | 6321 | SEF=6321 | |
| | 6322 | CEF=6322 | |
| | 6324 | SRE=6324 | |
| | 6331 | SRI=6331 | |
| | 6332 | CRF=6332 | |
| | 6334 | STR=6334 | |
| | 6341 | SSR=6341 | |
| | 6342 | CTR=6342 | |
| | 6344 | CRE=6344 | |
| | 6351 | SRF=6351 | |
| | 6352 | CRA=6352 | |
| | 67Ø1 | ADFSRF=67Ø1 | |
| | 67Ø2 | ADFRRS=67Ø2 | |
| | 67Ø4 | ADFEDF=67Ø4 | |
| | 6711 | ADFSCF=6711 | |
| | 6712 | ADFRCS=6712 | |
| | 6714 | ADFDDF=6714 | |
| | 6721 | ADFCTG=6721 | |
| | 6722 | ADFSTR=6722 | |
| | 6724 | ADFCTR=6724 | |
| | 6731 | ADFITG=6731 | |
| | 6732 | ADFSRS=6732 | |
| | 6734 | ADFCRS=6734 | |
| | 6741 | ADFCCF=6741 | |
| | 6742 | ADFCRF=6742 | |
| | 5ØØØ | POTORG=5ØØØ | |
| | 756Ø | POTEND=756Ø | |
| | ØØ15 | *15 | /AUTO-INDEX WORDS |
| ØØ15 | Ø441 | T8AX1, T8IN+1 | |
| ØØ16 | Ø277 | T8AX2, T8IBF−1 | |
| ØØ17 | ØØØØ | T8AX3, Ø | |
| | ØØ2Ø | *2Ø | /COMMON PAGE |
| ØØ2Ø | 2ØØØ | CBRISØ, CBRIS1 | /SVC 637 RCV FLAG INTERRUPT |
| ØØ21 | 2Ø24 | CBXISØ, CBXIS1 | /SVC 637 XMIT FLAG INTERRUPT |
| ØØ22 | 2Ø15 | CBEISØ, CBEIS1 | /SVC 637 END FLAG INTERRUPT |
| ØØ23 | 14ØØ | T8DISØ, T8DIS1 | /SVC 68Ø CLOCK INTERRUPT |
| ØØ24 | 22ØØ | ADFRIØ, ADFRI1 | /SVC ADF RING FLAG INTERRUPT |
| ØØ25 | 2225 | ADFCIØ, ADFCI1 | /SVC ADF CARIRER FLAG INTERRUPT |
| ØØ26 | 26ØØ | TXISØ, TXIS1 | /TELETYPE OUTPUT CHAR SVC |
| ØØ27 | 24ØØ | TRISØ, TRIS1 | /TELETYPE INPUT CHAR SVC |
| ØØ3Ø | 3ØØØ | CRISØ, CRIS1 | /637 RCV CHAR SVC |
| ØØ31 | 36ØØ | CXISØ, CXIS1 | /637 XMIT CHAR SVC |
| ØØ32 | 3624 | CXPARØ, CXPAR1 | /PARITY GENERATOR |
| ØØ33 | 41Ø5 | GETSEØ, GETSE1 | /ALLOCATE POT SEGMENT |
| ØØ34 | 4117 | RELSEØ, RELSE1 | /DEALLOCATE POT SEGMENT |
| ØØ35 | 4126 | RELSTØ, RELST1 | /DEALLOCATE POT STRING |
| ØØ36 | 4457 | HWLOAØ, HWLOA1 | /HARDWARE LOAD |
| ØØ37 | 4135 | INTERØ, INTER1 | /INTERRUPT PROCESSING |
| ØØ4Ø | 4462 | STARTØ, START1 | /START INITIALIZE AFTER LOAD |
| ØØ41 | 416Ø | STIMEØ, STIME1 | /SPARE TIME LOOP |
| ØØ42 | 3Ø33 | CRGTPØ, CRGTP1 | /GET PAIR OF CHARS |
| ØØ43 | 3Ø55 | CRCTRØ, CRCTR1 | /PROCESS CONTROL BLOCK |
| ØØ44 | 34ØØ | CRSTOØ, CRSTO1 | /PUT CHAR IN POT STRING |
| ØØ45 | 3434 | CRASGØ, CRASG1 | /ASSIGN STRING TO OUTPUT |
| ØØ46 | 3467 | CREXPØ, CREXP1 | /EXPUNGE POT STRING |
| ØØ47 | 46ØØ | PCTRLØ, PCTRL1 | /PROCESS CONTROL TABLE ENTRIES |
| ØØ5Ø | 4ØØØ | CXTEXØ, CXTEX1 | /PROCESS TEXT BLOCKS |
| ØØ51 | 44ØØ | PINFRØ, PINFR1 | /PROCESS INFORM TABLE ENTRIES |
| ØØ52 | 42ØØ | PRACKØ, PRACK1 | /PROCESS D–3Ø ACK'S |
| ØØ53 | 32ØØ | CRGTØ, CRPUT1 | /637 RCV CO-ROUTINE LINKAGE |
| ØØ54 | 5455 | JMP I, +1 | |
| ØØ55 | 3ØØ1 | CRGET1 | |
| ØØ56 | 3637 | CXPUTØ, CXGET1 | /637 XMIT CO-ROUTINE LINKAGE |
| ØØ57 | 546Ø | JMP I, +1 | |
| ØØ6Ø | 36Ø5 | CXPUT1 | |
| ØØ61 | ØØØ4 | O4, 4 | |
| ØØ62 | ØØØ7 | O7, 7 | |
| ØØ63 | ØØ17 | O17, 17 | |
| ØØ64 | ØØ2Ø | O2Ø, 2Ø | |
| ØØ65 | ØØ77 | O77, 77 | |
| ØØ66 | Ø1ØØ | O1ØØ, 1ØØ | |
| ØØ67 | Ø177 | O177, 177 | |
| ØØ7Ø | Ø2ØØ | O2ØØ, 2ØØ | |
| ØØ71 | Ø377 | O377, 377 | |
| ØØ72 | 4ØØØ | O4ØØØ, 4ØØØ | |
| ØØ73 | 776Ø | O776Ø, 776Ø | |
| ØØ74 | 7761 | O7761, 7761 | |
| ØØ75 | 7774 | O7774, 7774 | |
| ØØ76 | 7777 | O7777, 7777 | |
| ØØ77 | ØØØØ | SEG1, Ø | /PARAMETER FOR POT SUBROUTINES |
| Ø1ØØ | ØØØØ | SEG2, Ø | /PARAMETER FOR POT SUBROUTINES |

```
        A     B     C                        D
------- Ø1Ø1  ØØØØ  NASP,Ø                   /NEXT AVAILABLE SEGMENT POINTER
------- Ø1Ø2  ØØØØ  RACK,Ø                   /LAST BLOCK ACK'D BY PDP-8
------- Ø1Ø3  ØØØØ  TACK,Ø                   /LAST ACK SENT BY PDP-8
------- Ø1Ø4  ØØØØ  XACK,Ø                   /LAST BLOCK ACK'D BY D-3Ø
------- Ø1Ø5  ØØØØ  FACK,Ø                   /LAST D-3Ø ACK PROCESSED BY PDP-8
------- Ø1Ø6  ØØØØ  BOUTS,Ø                  /BEGINNING OF OUTPUT STRING
------- Ø1Ø7  Ø1Ø6  EOUTS, BOUTS             /END OF OUTPUT STRING
------- Ø11Ø  ØØØØ  FOUTS,Ø                  /OUTPUT STRING FLAG
------- Ø111  ØØØ1  MSGOUT,Ø1                /OUT OF OUTPUT MESSAGE
------- Ø112  ØØØ2  MSGRNG,Ø2                /RINGING MESSAGE
------- Ø.113 ØØØ4  MSGCON, Ø4               /CONNECTED MESSAGE
------- Ø114  ØØ1Ø  MSGDIS, 1Ø               /DISCONNECTED MESSAGE
------- Ø115  ØØ2Ø  MSGPOT, 2Ø               /POT OVERFLOW MESSAGE
------- Ø116  ØØØ1  CRLPIC, Ø1               /PICK UP THE PHONE CONTROL
------- Ø117  ØØØ2  CRLHAN, 2                /HANG UP THE PHONE CONTROL
------- Ø12Ø  ØØØ4  CRLDEL, Ø4               /DELETE PUTPUT CONTROL
------- Ø121  ØØ1Ø  CRLDIN, 1Ø               /DELETE INPUT CONTROL
------- Ø122  ØØ4Ø  CRLHWL, 4Ø               /HARDWARE LOAD CONTROL
------- Ø123  1ØØØ  TABLE, TABLE1            /CHARACTER CONVERSION TABLE
------- Ø124  Ø737  CRLTBL, CRLTB1-1         /CONTROL TABLE
------- Ø125  Ø7Ø7  INFLTBL, INFTB1-1        /INFORM TABLE
------- Ø126  Ø577  TXTBL, TXTBL1-1          /TELETYPE OUTPUT TABLE
------- Ø127  Ø626  TRTBL, TRTBL1-2          /TELETYPE INPUT TABLE
------- Ø13Ø  ØØØØ  T8INFL, Ø                /INPUT READY FLAG
------- Ø131  Ø277  T8BFK, T81BF-1           /TO RESET INPUT BUFFER POINTER
------- Ø132  775Ø  T8NL, --LINES            /--NUMBER OF LINES
------- Ø133  Ø36Ø  T8K7, T8ØBF              /K FOR OBF1
------- Ø134  1421  T8K8, T8COM              /COMMON ROUTINE LINKAGE
------- Ø135  16ØØ  T8SOUT, T8OUTS           /SKIP IF OUTPUT FREE: LINKAGE
------- Ø136  161Ø  T8SOCH. T8OCHS           /OUTPUT CHARACTER: LINKAGE
------- Ø137  1622  T8SIN, T8INS             /SKIP IF INPUT READY: LINKAGE
------- Ø14Ø  Ø36Ø  T8OUTK, T8OBF            /POINTER TO OBF1
------- Ø141  Ø41Ø  T8OTK2, T8OBF2           /POINTER TO OBF2
------- Ø142  Ø41Ø  T8K36, T8OBF2            /K FOR OBF2
------- Ø143  777Ø  T8CNT1, -1Ø              /MAJOR LOOP COUNTER
------- Ø144  ØØØØ  T8CNT2, Ø                /MINOR LOOP COUNTER
------- Ø145  775Ø  T8CNT3,--LINES           /IBF EXHAUST COUNTER
------- Ø146  ØØØØ  TTCHAR, Ø                /CHARACTER IN-OUT INTERFACE
------- Ø147  ØØØØ  T8SA, Ø                  /SAVE AC
------- Ø15Ø  ØØØØ  T8SVLK, Ø                /SAVE LK
------- Ø151  ØØØØ  T8SVØ, Ø                 /SAVE RETURN ADX
------- Ø152  ØØØØ  T8SVLN, Ø                /SAVE LINE REGISTER
------- Ø153  7775  CRSYNT, -3               /TEST FOR SYN
------- Ø154  ØØØØ  CRCTRL, Ø                /CONTROL BLOCK FLAG
------- Ø155  7777  CRPART, -1               /TEST FOR BAD PARITY
------- Ø156  ØØØØ  CRTEMP, Ø                /WORKING
------- Ø157  ØØØØ  CRSUM, Ø                 /LONGITUDINAL SUM REGISTER
------- Ø16Ø  ØØØØ  CRLINE, Ø                /CHANNEL NUMBER
------- Ø161  ØØØØ  CXOTP, Ø                 /OUTPUT CURRENT ADX
------- Ø162  ØØØØ  CXBLN, Ø                 /BLOCK NUMBER
------- Ø163  ØØØØ  CXLINE, Ø                /CHANNEL NUMBER
------- Ø164  ØØØØ  CXSUM, Ø                 /LP REGISTER
------- Ø165  ØØØØ  CXTEMP, Ø                /WORKING
------- Ø166  ØØØ6  CXACKK, ØØ6              /ACK
------- Ø167  Ø377  CXDELK, 377              /DEL
------- Ø17Ø  ØØ27  CXETBK, Ø27              /ETB
------- Ø171  ØØØ3  CXETXK, ØØ3              /ETX
------- Ø172  Ø2Ø2  CXSTXK, 2Ø2              /STX
------- Ø173  Ø2Ø1  CXSOHK, 2Ø1              /SOH
------- Ø174  Ø226  CXSYNK, 226              /SYN
------- Ø175  ØØØØ  CXREX, Ø                 /RETRANSMISSION COUNTER
-------       Ø2ØØ  *2ØØ                     /BUFFER AREAS
                                             /
------- Ø2ØØ  7777  CHIBF, 7777              /637 INPUT BUFFER
------- Ø2Ø1  ØØØØ  Ø
------- Ø2Ø2  ØØØØ  Ø
------- Ø2Ø3  ØØØØ  Ø
------- Ø2Ø4  ØØØØ  Ø
------- Ø2Ø5  ØØØØ  Ø
------- Ø2Ø6  ØØØØ  Ø
------- Ø2Ø7  ØØØØ  Ø
------- Ø21Ø  ØØØØ  Ø
------- Ø211  ØØØØ  Ø
------- Ø212  ØØØØ  Ø
------- Ø213  ØØØØ  Ø
------- Ø214  ØØØØ  Ø
------- Ø215  ØØØØ  Ø
------- Ø216  ØØØØ  Ø
------- Ø217  ØØØØ  Ø
------- Ø22Ø  ØØØØ  Ø
------- Ø221  ØØØØ  Ø
------- Ø222  ØØØØ  Ø
------- Ø223  ØØØØ  Ø
------- Ø224  ØØØØ  Ø
------- Ø225  ØØØØ  Ø
------- Ø226  ØØØØ  Ø
------- Ø227  ØØØØ  Ø
------- Ø23Ø  ØØØØ  Ø
------- Ø231  ØØØØ  Ø
------- Ø232  ØØØØ  Ø
------- Ø233  ØØØØ  Ø
------- Ø234  ØØØØ  Ø
------- Ø235  ØØØØ  Ø
------- Ø236  ØØØØ  Ø
------- Ø237  ØØØØ  Ø
------- Ø24Ø  ØØØØ  CHOBF,Ø                  /637 OUTPUT BUFFER
------- Ø241  ØØØØ  Ø
------- Ø242  ØØØØ  Ø
------- Ø243  ØØØØ  Ø
------- Ø244  ØØØØ  Ø
------- Ø245  ØØØØ  Ø
------- Ø246  ØØØØ  Ø
------- Ø247  ØØØØ  Ø
------- Ø25Ø  ØØØØ  Ø
------- Ø251  ØØØØ  Ø
------- Ø252  ØØØØ  Ø
------- Ø253  ØØØØ  Ø
------- Ø254  ØØØØ  Ø
------- Ø255  ØØØØ  Ø
------- Ø256  ØØØØ  Ø
```

| | A | B | C | D |
|---|---|---|---|---|
| ------- | Ø257 | ØØØØ | Ø | |
| ------- | Ø26Ø | ØØØØ | Ø | |
| ------- | Ø261 | ØØØØ | Ø | |
| ------- | Ø262 | ØØØØ | Ø | |
| ------- | Ø263 | ØØØØ | Ø | |
| ------- | Ø264 | ØØØØ | Ø | |
| ------- | Ø265 | ØØØØ | Ø | |
| ------- | Ø266 | ØØØØ | Ø | |
| ------- | Ø267 | ØØØØ | Ø | |
| ------- | Ø27Ø | ØØØØ | Ø | |
| ------- | Ø271 | ØØØØ | Ø | |
| ------- | Ø272 | ØØØØ | Ø | |
| ------- | Ø273 | ØØØØ | Ø | |
| ------- | Ø274 | ØØØØ | Ø | |
| ------- | Ø275 | ØØØØ | Ø | |
| ------- | Ø276 | ØØØØ | Ø | |
| ------- | Ø277 | ØØØØ | Ø | |
| ------- | Ø3ØØ | ØØØØ | T8IBF, Ø | /TELETYPE INPUT BUFFER |
| ------- | Ø3Ø1 | ØØØØ | Ø | |
| ------- | Ø3Ø2 | ØØØØ | Ø | |
| ------- | Ø3Ø3 | ØØØØ | Ø | |
| ------- | Ø3Ø4 | ØØØØ | Ø | |
| ------- | Ø3Ø5 | ØØØØ | Ø | |
| ------- | Ø3Ø6 | ØØØØ | Ø | |
| ------- | Ø3Ø7 | ØØØØ | Ø | |
| ------- | Ø31Ø | ØØØØ | Ø | |
| ------- | Ø311 | ØØØØ | Ø | |
| ------- | Ø312 | ØØØØ | Ø | |
| ------- | Ø313 | ØØØØ | Ø | |
| ------- | Ø314 | ØØØØ | Ø | |
| ------- | Ø315 | ØØØØ | Ø | |
| ------- | Ø316 | ØØØØ | Ø | |
| ------- | Ø317 | ØØØØ | Ø | |
| ------- | Ø32Ø | ØØØØ | Ø | |
| ------- | Ø321 | ØØØØ | Ø | |
| ------- | Ø322 | ØØØØ | Ø | |
| ------- | Ø323 | ØØØØ | Ø | |
| ------- | Ø324 | ØØØØ | Ø | |
| ------- | Ø325 | ØØØØ | Ø | |
| ------- | Ø326 | ØØØØ | Ø | |
| ------- | Ø327 | ØØØØ | Ø | |
| ------- | Ø33Ø | ØØØØ | Ø | |
| ------- | Ø331 | ØØØØ | Ø | |
| ------- | Ø332 | ØØØØ | Ø | |
| ------- | Ø333 | ØØØØ | Ø | |
| ------- | Ø334 | ØØØØ | Ø | |
| ------- | Ø335 | ØØØØ | Ø | |
| ------- | Ø336 | ØØØØ | Ø | |
| ------- | Ø337 | ØØØØ | Ø | |
| ------- | Ø34Ø | ØØØØ | Ø | |
| ------- | Ø341 | ØØØØ | Ø | |
| ------- | Ø342 | ØØØØ | Ø | |
| ------- | Ø343 | ØØØØ | Ø | |
| ------- | Ø344 | ØØØØ | Ø | |
| ------- | Ø345 | ØØØØ | Ø | |
| ------- | Ø346 | ØØØØ | Ø | |
| ------- | Ø347 | ØØØØ | Ø | |
| ------- | Ø35Ø | ØØØØ | Ø | |
| ------- | Ø351 | ØØØØ | Ø | |
| ------- | Ø352 | ØØØØ | Ø | |
| ------- | Ø353 | ØØØØ | Ø | |
| ------- | Ø354 | ØØØØ | Ø | |
| ------- | Ø355 | ØØØØ | Ø | |
| ------- | Ø356 | ØØØØ | Ø | |
| ------- | Ø357 | ØØØØ | Ø | |
| ------- | Ø36Ø | ØØØØ | T8ØBF, Ø | /TELETYPE FIRST-LEVEL OUTPUT BUFFER |
| ------- | Ø361 | ØØØØ | Ø | |
| ------- | Ø362 | ØØØØ | Ø | |
| ------- | Ø363 | ØØØØ | Ø | |
| ------- | Ø364 | ØØØØ | Ø | |
| ------- | Ø365 | ØØØØ | Ø | |
| ------- | Ø366 | ØØØØ | Ø | |
| ------- | Ø367 | ØØØØ | Ø | |
| ------- | Ø37Ø | ØØØØ | Ø | |
| ------- | Ø371 | ØØØØ | Ø | |
| ------- | Ø372 | ØØØØ | Ø | |
| ------- | Ø373 | ØØØØ | Ø | |
| ------- | Ø374 | ØØØØ | Ø | |
| ------- | Ø375 | ØØØØ | Ø | |
| ------- | Ø376 | ØØØØ | Ø | |
| ------- | Ø377 | ØØØØ | Ø | |
| ------- | Ø4ØØ | ØØØØ | Ø | |
| ------- | Ø4Ø1 | ØØØØ | Ø | |
| ------- | Ø4Ø2 | ØØØØ | Ø | |
| ------- | Ø4Ø3 | ØØØØ | Ø | |
| ------- | Ø4Ø4 | ØØØØ | Ø | |
| ------- | Ø4Ø5 | ØØØØ | Ø | |
| ------- | Ø4Ø6 | ØØØØ | Ø | |
| ------- | Ø4Ø7 | ØØØØ | Ø | |
| ------- | Ø41Ø | ØØØØ | T8ØBF2, Ø | /TELETYPE SECOND-LEVEL OUTPUT BUFFER |
| ------- | Ø411 | ØØØØ | Ø | |
| ------- | Ø412 | ØØØØ | Ø | |
| ------- | Ø413 | ØØØØ | Ø | |
| ------- | Ø414 | ØØØØ | Ø | |
| ------- | Ø415 | ØØØØ | Ø | |
| ------- | Ø416 | ØØØØ | Ø | |
| ------- | Ø417 | ØØØØ | Ø | |
| ------- | Ø42Ø | ØØØØ | Ø | |
| ------- | Ø421 | ØØØØ | Ø | |
| ------- | Ø422 | ØØØØ | Ø | |
| ------- | Ø423 | ØØØØ | Ø | |
| ------- | Ø424 | ØØØØ | Ø | |
| ------- | Ø425 | ØØØØ | Ø | |
| ------- | Ø426 | ØØØØ | Ø | |
| ------- | Ø427 | ØØØØ | Ø | |
| ------- | Ø43Ø | ØØØØ | Ø | |
| ------- | Ø431 | ØØØØ | Ø | |
| ------- | Ø432 | ØØØØ | Ø | |
| ------- | Ø433 | ØØØØ | Ø | |

```
        A     B     C                                   D
------- Ø434  ØØØØ  Ø
------- Ø435  ØØØØ  Ø
------- Ø436  ØØØØ  Ø
------- Ø437  ØØØØ  Ø
------------  64Ø3  T8IN, A=TTINCR TTI              /TELETYPE "TTI STRING"
------------  ØØØØ   B=Ø
------------  2ØØØ   C=2ØØØ
------- Ø44Ø  64Ø3   A
------- Ø441  ØØØØ  B
------- Ø442  2ØØØ  C
------- Ø443  64Ø3   A
------- Ø444  ØØØØ  B
------- Ø445  2ØØØ  C
------- Ø446  64Ø3   A
------- Ø447  ØØØØ  B
------- Ø45Ø  2ØØØ  C
------- Ø451  64Ø3   A
------- Ø452  ØØØØ  B
------- Ø453  2ØØØ  C
------- Ø454  64Ø3   A
------- Ø455  ØØØØ  B
------- Ø456  2ØØØ  C
------- Ø457  64Ø3   A
------- Ø46Ø  ØØØØ  B
------- Ø461  2ØØØ  C
------- Ø462  64Ø3   A
------- Ø463  ØØØØ  B
------- Ø464  2ØØØ  C
------- Ø465  64Ø3   A
------- Ø466  ØØØØ  B
------- Ø467  2ØØØ  C
------- Ø47Ø  64Ø3   A
------- Ø471  ØØØØ  B
------- Ø472  2ØØØ  C
------- Ø473  64Ø3   A
------- Ø474  ØØØØ  B
------- Ø475  2ØØØ  C
------- Ø476  64Ø3   A
------- Ø477  ØØØØ  B
------- Ø5ØØ  2ØØØ  C
------- Ø5Ø1  64Ø3   A
------- Ø5Ø2  ØØØØ  B
------- Ø5Ø3  2ØØØ  C
------- Ø5Ø4  64Ø3   A
------- Ø5Ø5  ØØØØ  B
------- Ø5Ø6  2ØØØ  C
------- Ø5Ø7  64Ø3   A
------- Ø51Ø  ØØØØ  B
------- Ø511  2ØØØ  C
------- Ø512  64Ø3   A
------- Ø513  ØØØØ  B
------- Ø514  2ØØØ  C
------- Ø515  64Ø3   A
------- Ø516  ØØØØ  B
------- Ø517  2ØØØ  C
------- Ø52Ø  64Ø3   A
------- Ø521  ØØØØ  B
------- Ø522  2ØØØ  C
------- Ø523  64Ø3   A
------- Ø524  ØØØØ  B
------- Ø515  2ØØØ  C
------- Ø562  64Ø3   A
------- Ø527  ØØØØ  B
------- Ø53Ø  2ØØØ  C
------- Ø531  64Ø3   A
------- Ø532  ØØØØ  B
------- Ø533  2ØØØ  C
------- Ø534  64Ø3   A
------- Ø535  ØØØØ  B
------- Ø536  2ØØØ  C
------- Ø537  64Ø3   A
------- Ø54Ø  ØØØØ  B
------- Ø541  2ØØØ  C
------- Ø542  64Ø3   A
------- Ø543  ØØØØ  B
------- Ø544  2ØØØ  C
------- Ø545  64Ø3   A
------- Ø546  ØØØØ  B
------- Ø547  2ØØØ  C
------- Ø55Ø  5534  JMP  I  T8K8
------------  Ø6ØØ  *6ØØ                            /CHANNEL TABLE ALLOCATIONS
------------------------------------------------------ /
------- Ø6ØØ  ØØØØ  TXTBL1, Ø------------------------- /TTY OUTPUT TABLE
------- Ø6Ø1  ØØØØ  Ø
------- Ø6Ø2  ØØØØ  Ø
------- Ø6Ø3  ØØØØ  Ø
------- Ø6Ø4  ØØØØ  Ø
------- Ø6Ø5  ØØØØ  Ø
------- Ø6Ø6  ØØØØ  Ø
------- Ø6Ø7  ØØØØ  Ø
------- Ø61Ø  ØØØØ   Ø
------- Ø611  ØØØØ  Ø
------- Ø612  ØØØØ  Ø
------- Ø613  ØØØØ  Ø
------- Ø614  ØØØØ  Ø
------- Ø615  ØØØØ  Ø
------- Ø616  ØØØØ  Ø
------- Ø617  ØØØØ  Ø
------- Ø62Ø  ØØØØ   Ø
------- Ø621  ØØØØ  Ø
------- Ø622  ØØØØ  Ø
------- Ø623  ØØØØ  Ø
------- Ø624  ØØØØ  Ø
------- Ø625  ØØØØ  Ø
------- Ø626  ØØØØ  Ø
------- Ø627  ØØØØ  Ø
------- Ø63Ø  ØØØØ  TRTBL1, Ø                       /TTY INPUT TABLE
------- Ø631  ØØØØ  Ø
------- Ø632  ØØØØ  Ø
```

```
          A     B    C                                                  D
------- Ø633  ØØØØ  Ø
------- Ø634  ØØØØ  Ø
------- Ø635  ØØØØ  Ø
------- Ø636  ØØØØ  Ø
------- Ø637  ØØØØ  Ø
------- Ø64Ø  ØØØØ    Ø
------- Ø641  ØØØØ  Ø
------- Ø642  ØØØØ  Ø
------- Ø643  ØØØØ  Ø
------- Ø644  ØØØØ  Ø
------- Ø645  ØØØØ  Ø
------- Ø646  ØØØØ  Ø
------- Ø647  ØØØØ  Ø
------- Ø65Ø  ØØØØ    Ø
------- Ø651  ØØØØ  Ø
------- Ø652  ØØØØ  Ø
------- Ø653  ØØØØ  Ø
------- Ø654  ØØØØ  Ø
------- Ø655  ØØØØ  Ø
------- Ø656  ØØØØ  Ø
------- Ø657  ØØØØ  Ø
------- Ø66Ø  ØØØØ    Ø
------- Ø661  ØØØØ  Ø
------- Ø662  ØØØØ  Ø
------- Ø663  ØØØØ  Ø
------- Ø664  ØØØØ  Ø
------- Ø665  ØØØØ  Ø
------- Ø666  ØØØØ  Ø
------- Ø667  ØØØØ  Ø
------- Ø67Ø  ØØØØ  Ø
------- Ø671  ØØØØ  Ø
------- Ø672  ØØØØ  Ø
------- Ø673  ØØØØ  Ø
------- Ø674  ØØØØ  Ø
------- Ø675  ØØØØ  Ø
------- Ø676  ØØØØ  Ø
------- Ø677  ØØØØ  Ø
------- Ø7ØØ  ØØØØ    Ø
------- Ø7Ø1  ØØØØ  Ø
------- Ø7Ø2  ØØØØ  Ø
------- Ø7Ø3  ØØØØ  Ø
------- Ø7Ø4  ØØØØ  Ø
------- Ø7Ø5  ØØØØ  Ø
------- Ø7Ø6  ØØØØ  Ø
------- Ø7Ø7  ØØØØ  Ø
------- Ø71Ø  ØØØØ  INFTB1, Ø                                      /CTRL MESSAGES TO DN-3Ø
------- Ø711  ØØØØ  Ø
------- Ø712  ØØØØ  Ø
------- Ø713  ØØØØ  Ø
------- Ø714  ØØØØ  Ø
------- Ø715  ØØØØ  Ø
------- Ø716  ØØØØ  Ø
------- Ø717  ØØØØ  Ø
------- Ø72Ø  ØØØØ    Ø
------- Ø721  ØØØØ  Ø
------- Ø722  ØØØØ  Ø
------- Ø723  ØØØØ  Ø
------- Ø724  ØØØØ  Ø
------- Ø725  ØØØØ  Ø
------- Ø726  ØØØØ  Ø
------- Ø727  ØØØØ  Ø
------- Ø73Ø  ØØØØ    Ø
------- Ø731  ØØØØ  Ø
------- Ø732  ØØØØ  Ø
------- Ø733  ØØØØ  Ø
------- Ø734  ØØØØ  Ø
------- Ø735  ØØØØ  Ø
------- Ø736  ØØØØ  Ø
------- Ø737  ØØØØ  Ø
------- Ø74Ø  ØØØØ  ØCRLTB1, Ø                                     /CTRL MESSAGES FROM DN-3Ø
------- Ø741  ØØØØ  Ø
------- Ø742  ØØØØ  Ø
------- Ø743  ØØØØ  Ø
------- Ø744  ØØØØ  Ø
------- Ø745  ØØØØ  Ø
------- Ø746  ØØØØ  Ø
------- Ø747  ØØØØ  Ø
------- Ø75Ø  ØØØØ    Ø
------- Ø751  ØØØØ  Ø
------- Ø752  ØØØØ  Ø
------- Ø753  ØØØØ  Ø
------- Ø754  ØØØØ  Ø
------- Ø755  ØØØØ  Ø
------- Ø756  ØØØØ  Ø
------- Ø757  ØØØØ  Ø
------- Ø76Ø  ØØØØ    Ø
------- Ø761  ØØØØ  Ø
------- Ø762  ØØØØ  Ø
------- Ø763  ØØØØ  Ø
------- Ø764  ØØØØ  Ø
------- Ø765  ØØØØ  Ø
------- Ø766  ØØØØ  Ø
------- Ø767  ØØØØ  Ø
-------------------------------------------------------------- /
------------  1ØØØ *1ØØØ                                         /INPUT-OUTPUT CHARACTER TABLE
-------------------------------------------------------------- /FORMAT:
-------------------------------------------------------------- /  BITS Ø-2 INPUT TYPE (ZERO IF NON SPL)
-------------------------------------------------------------- /  BIT 3 PARITY (1 IF ODD, Ø IF EVEN)
-------------------------------------------------------------- /  BITS 4-11 OUTPUT TYPE
-------------------------------------------------------------- /
------------  1ØØØ  IGNORE=1ØØØ
------------  Ø4ØØ  ODD=4ØØ
------------  ØØØØ  EVEN=Ø
------------  ØØØ1  BAD=1
------- 1ØØØ  2ØØ2  TABLE1, EVEN 2ØØØ 2                          /NUL
------- 1ØØ1  14Ø1  ODD IGNORE BAD                               /SOH
------- 1ØØ2  14Ø1  ODD IGNORE BAD                               /STX
------- 1ØØ3  1ØØ7  EVEN IGNORE 7                                /ETX
------- 1ØØ4  Ø4Ø1  ODD BAD                                      /EOT
```

| A | B | C | D |
|---|---|---|---|
| 1ØØ5 | ØØØØ | EVEN | /ENQ |
| 1ØØ6 | 1ØØ4 | EVEN IGNORE 4 | /ACK |
| 1ØØ7 | Ø4Ø1 | ODD BAD | /BELL |
| 1Ø1Ø | Ø4Ø1 | ODD BAD | /BS |
| 1Ø11 | ØØØØ | EVEN | /HT |
| 1Ø12 | ØØØØ | EVEN | /LF |
| 1Ø13 | Ø4Ø1 | ODD BAD | /VT |
| 1Ø14 | ØØØØ | EVEN | /FF |
| 1Ø15 | 44Ø1 | ODD 4ØØØ BAD | /CR |
| 1Ø16 | Ø4Ø1 | ODD BAD | /SO |
| 1Ø17 | ØØØØ | EVEN | /SI |
| 1Ø2Ø | Ø4Ø1 | ODD BAD | /DLE |
| 1Ø21 | ØØØØ | EVEN | /DC1 |
| 1Ø22 | ØØØØ | EVEN | /DC2 |
| 1Ø23 | Ø4Ø1 | ODD BAD | /DC3 |
| 1Ø24 | ØØØØ | EVEN | /DC4 |
| 1Ø25 | Ø4Ø1 | ODD BAD | /NAK |
| 1Ø26 | 14Ø1 | ODD IGNORE BAD | /SYN |
| 1Ø27 | 1Ø1Ø | EVEN IGNORE 1Ø | /ETB |
| 1Ø3Ø | 3ØØØ | EVEN 3ØØØ | /CAN |
| 1Ø31 | Ø4Ø1 | ODD BAD | /EOM |
| 1Ø32 | Ø4Ø1 | ODD BAD | /SUB |
| 1Ø33 | ØØØØ | EVEN | /ESC |
| 1Ø34 | Ø4Ø1 | ODD BAD | /FS |
| 1Ø35 | ØØØØ | EVEN | /GS |
| 1Ø36 | ØØØØ | EVEN | /RS |
| 1Ø37 | Ø4Ø1 | ODD BAD | /US |
| 1Ø4Ø | Ø4Ø1 | ODD BAD | /SPACE |
| 1Ø41 | ØØØØ | EVEN | /EXCLAMATION POINT |
| 1Ø42 | ØØØØ | EVEN | /QUOTE |
| 1Ø43 | Ø4Ø1 | ODD BAD | /NUMBER SIGN |
| 1Ø44 | ØØØØ | EVEN | /DOLLAR SIGN |
| 1Ø45 | Ø4Ø1 | ODD BAD | /PERCENT |
| 1Ø46 | Ø4Ø1 | ODD BAD | /AMPERSAND |
| 1Ø47 | ØØØØ | EVEN | /APOSTROPHE |
| 1Ø5Ø | ØØØØ | EVEN | /OPEN PARENTHESIS |
| 1Ø51 | Ø4Ø1 | ODD BAD | /CLOSE PARENTHESIS |
| 1Ø52 | Ø4Ø1 | ODD BAD | /ASTERISK |
| 1Ø53 | ØØØØ | EVEN | /PLUS |
| 1Ø54 | Ø4Ø1 | ODD BAD | /COMMA |
| 1Ø55 | ØØØØ | EVEN | /MINUS |
| 1Ø56 | ØØØØ | EVEN | /PERIOD |
| 1Ø57 | Ø4Ø1 | ODD BAD | /SLASH |
| 1Ø6Ø | ØØØØ | EVEN | /Ø |
| 1Ø61 | Ø4Ø1 | ODD BAD | /1 |
| 1Ø62 | Ø4Ø1 | ODD BAD | /2 |
| 1Ø63 | ØØØØ | EVEN | /3 |
| 1Ø64 | Ø4Ø1 | ODD BAD | /4 |
| 1Ø65 | ØØØØ | EVEN | /5 |
| 1Ø66 | ØØØØ | EVEN | /6 |
| 1Ø67 | Ø4Ø1 | ODD BAD | /7 |
| 1Ø7Ø | Ø4Ø1 | ODD BAD | /8 |
| 1Ø71 | ØØØØ | EVEN | /9 |
| 1Ø72 | ØØØØ | EVEN | /COLON |
| 1Ø73 | Ø4Ø1 | ODD BAD | /SEMICOLON |
| 1Ø74 | ØØØØ | EVEN | /LESS |
| 1Ø75 | Ø4Ø1 | ODD BAD | /EQUAL |
| 1Ø76 | Ø4Ø1 | ODD BAD | /GREATER |
| 1Ø77 | ØØØØ | EVEN | /QUESTION MARK |
| 11ØØ | Ø4Ø1 | ODD BAD | /ACCENT GRAVE OR AT SIGN |
| 11Ø1 | ØØØØ | EVEN | /A |
| 11Ø2 | ØØØØ | EVEN | /B |
| 11Ø3 | Ø4Ø1 | ODD BAD | /C |
| 11Ø4 | ØØØØ | EVEN | /D |
| 11Ø5 | Ø4Ø1 | ODD BAD | /E |
| 11Ø6 | Ø4Ø1 | ODD BAD | /F |
| 11Ø7 | ØØØØ | EVEN | /G |
| 111Ø | ØØØØ | EVEN | /H |
| 1111 | Ø4Ø1 | ODD BAD | /I |
| 1112 | Ø4Ø1 | ODD BAD | /J |
| 1113 | ØØØØ | EVEN | /K |
| 1114 | Ø4Ø1 | ODD BAD | /L |
| 1115 | ØØØØ | EVEN | /M |
| 1116 | ØØØØ | EVEN | /N |
| 1117 | Ø4Ø1 | ODD BAD | /O |
| 112Ø | ØØØØ | EVEN | /P |
| 1121 | Ø4Ø1 | ODD BAD | /Q |
| 1122 | Ø4Ø1 | ODD BAD | /R |
| 1123 | ØØØØ | EVEN | /S |
| 1124 | Ø4Ø1 | ODD BAD | /T |
| 1125 | ØØØØ | EVEN | /U |
| 1126 | ØØØØ | EVEN | /V |
| 1127 | Ø4Ø1 | ODD BAD | /W |
| 113Ø | Ø4Ø1 | ODD BAD | /X |
| 1131 | ØØØØ | EVEN | /Y |
| 1132 | ØØØØ | EVEN | /Z |
| 1133 | Ø4Ø1 | ODD BAD | /OPEN BRACKET |
| 1134 | ØØØØ | EVEN | /TILDE |
| 1135 | Ø4Ø1 | ODD BAD | /CLOSE BRACKET |
| 1136 | Ø4Ø1 | ODD BAD | /CIRCUMFLEX |
| 1137 | ØØØØ | EVEN | /UNDERLINE OR BACKARROW |
| 114Ø | ØØØØ | EVEN | /AT SIGN (NOT 33/35'S) |
| 1141 | Ø4Ø1 | ODD BAD | /A, LOWER CASE |
| 1142 | Ø4Ø1 | ODD BAD | /B |
| 1143 | ØØØØ | EVEN | /C |
| 1144 | Ø4Ø1 | ODD BAD | /D |
| 1145 | ØØØØ | EVEN | /E |
| 1146 | ØØØØ | EVEN | /F |
| 1147 | Ø4Ø1 | ODD BAD | /G |
| 115Ø | Ø4Ø1 | ODD BAD | /H |
| 1151 | ØØØØ | EVEN | /I |
| 1152 | ØØØØ | EVEN | /J |
| 1153 | Ø4Ø1 | ODD BAD | /K |
| 1154 | ØØØØ | EVEN | /L |
| 1155 | Ø4Ø1 | ODD BAD | /M |
| 1156 | Ø4Ø1 | ODD BAD | /N |
| 1157 | ØØØØ | EVEN | /O |
| 116Ø | Ø4Ø1 | ODD BAD | /P |
| 1161 | ØØØØ | EVEN | /Q |

| A | B | C | D |
|---|---|---|---|
| 1162 | ØØØØ | EVEN | /R |
| 1163 | Ø4Ø1 | ODD BAD | /S |
| 1164 | ØØØØ | EVEN | /T |
| 1165 | Ø4Ø1 | ODD BAD | /U |
| 1166 | Ø4Ø1 | ODD BAD | /V |
| 1167 | ØØØØ | EVEN | /W |
| 117Ø | ØØØØ | EVEN | /X |
| 1171 | Ø4Ø1 | ODD BAD | /Y |
| 1172 | Ø4Ø1 | ODD BAD | /Z |
| 1173 | ØØØØ | EVEN | /OPEN BRACE |
| 1174 | Ø4Ø1 | ODD BAD | /OVERLINE |
| 1175 | ØØØØ | EVEN | /CLOSE BRACE |
| 1176 | ØØØØ | EVEN | /VERTICAL LINE |
| 1177 | 14Ø1 | ODD IGNORE BAD | /DEL |
| | | | / |
| 12ØØ | 2ØØ1 | EVEN 2ØØØ BAD | /NUL |
| 12Ø1 | 14Ø5 | ODD IGNORE 5 | /SOH |
| 12Ø2 | 14Ø6 | ODD IGNORE 6 | /STX |
| 12Ø3 | 1ØØ1 | EVEN IGNORE BAD | /ETX |
| 12Ø4 | Ø4ØØ | ODD | /EOT |
| 12Ø5 | ØØØ1 | EVEN BAD | /ENQ |
| 12Ø6 | 1ØØ1 | EVEN IGNORE BAD | /ACK |
| 12Ø7 | Ø4ØØ | ODD | /BELL |
| 121Ø | Ø4ØØ | ODD | /BS |
| 1211 | ØØØ1 | EVEN BAD | /HT |
| 1212 | ØØØ1 | EVEN BAD | /LF |
| 1213 | Ø4ØØ | ODD | /VT |
| 1214 | ØØØ1 | EVEN BAD | /FF |
| 1215 | 44ØØ | ODD 4ØØØ | /CR |
| 1216 | Ø4ØØ | ODD | /SO |
| 1217 | ØØØ1 | EVEN BAD | /SI |
| 122Ø | Ø4ØØ | ODD | /DLE |
| 1221 | ØØØ1 | EVEN BAD | /DC1 |
| 1222 | ØØØ1 | EVEN BAD | /DC2 |
| 1223 | Ø4ØØ | ODD | /DC3 |
| 1224 | ØØØ1 | EVEN BAD | /DC4 |
| 1225 | Ø4ØØ | ODD | /NAK |
| 1226 | 14Ø3 | ODD IGNORE 3 | /SYN |
| 1227 | 1ØØ1 | EVEN IGNORE BAD | /ETB |
| 123Ø | 3ØØ1 | EVEN 3ØØØ BAD | /CAN |
| 1231 | Ø4ØØ | ODD | /EOM |
| 1232 | Ø4ØØ | ODD | /SUB |
| 1233 | ØØØ1 | EVEN BAD | /ESC |
| 1234 | Ø4ØØ | ODD | /FS |
| 1235 | ØØØ1 | EVEN BAD | /GS |
| 1236 | ØØØ1 | EVEN BAD | /RS |
| 1237 | Ø4ØØ | ODD | /US |
| 124Ø | Ø4ØØ | ODD | /SPACE |
| 1241 | ØØØ1 | EVEN BAD | /EXCLAMATION POINT |
| 1242 | ØØØ1 | EVEN BAD | /QUOTE |
| 1243 | Ø4ØØ | ODD | /NUMBER SIGN |
| 1244 | ØØØ1 | EVEN BAD | /DOLLAR SIGN |
| 1245 | Ø4ØØ | ODD | /PERCENT |
| 1246 | Ø4ØØ | ODD | /AMPERSAND |
| 1247 | ØØØ1 | EVEN BAD | /APOSTROPHE |
| 125Ø | ØØØ1 | EVEN BAD | /OPEN PARENTHESIS |
| 1251 | Ø4ØØ | ODD | /CLOSE PARENTHESIS |
| 1252 | Ø4ØØ | ODD | /ASTERISK |
| 1253 | ØØØ1 | EVEN BAD | /PLUS |
| 1254 | Ø4ØØ | ODD | /COMMA |
| 1255 | ØØØ1 | EVEN BAD | /MINUS |
| 1256 | ØØØ1 | EVEN BAD | /PERIOD |
| 1257 | Ø4ØØ | ODD | /SLASH |
| 126Ø | ØØØ1 | EVEN BAD | /Ø |
| 1261 | Ø4ØØ | ODD | /1 |
| 1262 | Ø4ØØ | ODD | /2 |
| 1263 | ØØØ1 | EVEN BAD | /3 |
| 1264 | Ø4ØØ | ODD | /4 |
| 1265 | ØØØ1 | EVEN BAD | /5 |
| 1266 | ØØØ1 | EVEN BAD | /6 |
| 1267 | Ø4ØØ | ODD | /7 |
| 127Ø | Ø4ØØ | ODD | /8 |
| 1271 | ØØØ1 | EVEN BAD | /9 |
| 1272 | ØØØ1 | EVEN BAD | /COLON |
| 1273 | Ø4ØØ | ODD | /SEMICOLON |
| 1274 | ØØØ1 | EVEN BAD | /LESS |
| 1275 | Ø4ØØ | ODD | /EQUAL |
| 1276 | Ø4ØØ | ODD | /GREATER |
| 1277 | ØØØ1 | EVEN BAD | /QUESTION MARK |
| 13ØØ | Ø4ØØ | ODD | /ACCENT GRAVE OR AT SIGN |
| 13Ø1 | ØØØ1 | EVEN BAD | /A |
| 13Ø2 | ØØØ1 | EVEN BAD | /B |
| 13Ø3 | Ø4ØØ | ODD | /C |
| 13Ø4 | ØØØ1 | EVEN BAD | /D |
| 13Ø5 | Ø4ØØ | ODD | /E |
| 13Ø6 | Ø4ØØ | ODD | /F |
| 13Ø7 | ØØØ1 | EVEN BAD | /G |
| 131Ø | ØØØ1 | EVEN BAD | /H |
| 1311 | Ø4ØØ | ODD | /I |
| 1312 | Ø4ØØ | ODD | /J |
| 1313 | ØØØ1 | EVEN BAD | /K |
| 1314 | Ø4ØØ | ODD | /L |
| 1315 | ØØØ1 | EVEN BAD | /M |
| 1316 | ØØØ1 | EVEN BAD | /N |
| 1317 | Ø4ØØ | ODD | /O |
| 132Ø | ØØØ1 | EVEN BAD | /P |
| 1321 | Ø4ØØ | ODD | /Q |
| 1322 | Ø4ØØ | ODD | /R |
| 1323 | ØØØ1 | EVEN BAD | /S |
| 1324 | Ø4ØØ | ODD | /T |
| 1325 | ØØØ1 | EVEN BAD | /U |
| 1326 | ØØØ1 | EVEN BAD | /V |
| 1327 | Ø4ØØ | ODD | /W |
| 133Ø | Ø4ØØ | ODD | /X |
| 1331 | ØØØ1 | EVEN BAD | /Y |
| 1332 | ØØØ1 | EVEN BAD | /Z |
| 1333 | Ø4ØØ | ODD | /OPEN BRACKET |
| 1334 | ØØØ1 | EVEN BAD | /TILDE |
| 1335 | Ø4ØØ | ODD | /CLOSE BRACKET |

```
        A     B    C                               D
------- 1336  Ø4ØØ ODD                             /CIRCUMFLEX
------- 1337  ØØØ1 EVEN BAD                        /UNDERLINE OR BACKARROW
------- 134Ø  ØØØ1 EVEN BAD                        /AT SIGN (NOT 33/35'S)
------- 1341  Ø4ØØ ODD                             /A, LOWER CASE
------- 1342  Ø4ØØ ODD                             /B
------- 1343  ØØØ1 EVEN BAD                        /C
------- 1344  Ø4ØØ ODD                             /D
------- 1345  ØØØ1 EVEN BAD                        /E
------- 1346  ØØØ1 EVEN BAD                        /F
------- 1347  Ø4ØØ ODD                             /G
------- 135Ø  Ø4ØØ ODD                             /H
------- 1351  ØØØ1 EVEN BAD                        /I
------- 1352  ØØØ1 EVEN BAD                        /J
------- 1353  Ø4ØØ ODD                             /K
------- 1354  ØØØ1 EVEN BAD                        /L
------- 1355  Ø4ØØ ODD                             /M
------- 1356  Ø4ØØ ODD                             /N
------- 1357  ØØØ1 EVEN BAD                        /O
------- 136Ø  Ø4ØØ ODD                             /P
------- 1361  ØØØ1 EVEN BAD                        /Q
------- 1362  ØØØ1 EVEN BAD                        /R
------- 1363  Ø4ØØ ODD                             /S
------- 1364  ØØØ1 EVEN BAD                        /T
------- 1365  Ø4ØØ ODD                             /U
------- 1366  Ø4ØØ ODD                             /V
------- 1367  ØØØ1 EVEN BAD                        /W
------- 137Ø  ØØØ1 EVEN BAD                        /X
------- 1371  Ø4ØØ ODD                             /Y
------- 1372  Ø4ØØ ODD                             /Z
------- 1373  ØØØ1 EVEN BAD                        /OPEN BRACE
------- 1374  Ø4ØØ ODD                             /OVERLINE
------- 1375  ØØØ1 EVEN BAD                        /CLOSE BRACE
------- 1376  ØØØ1 EVEN BAD                        /VERTICAL LINE
------- 1377  14ØØ ODD IGNORE                      /DEL
-------------------------------------------------- /8-BIT CHARACTER ASSEMBLY SUBRTNS
-------------------------------------------------- /TYPE 68Ø TTY LINE MULTIPLEXER
-------------------------------------------------- /THESE SUBRINS ARE MODIFICATIONS
-------------------------------------------------- /OF THE DIGITAL-8-35-S-B PACKAGE
-------------------------------------------------- /
------------  14ØØ *14ØØ
------------  5423 T8DIS=JMP I T8DISØ
------------------ T8DIS1,                         /MULTIPLE LEVEL INTERRUPT ROUTINE
------- 14ØØ  2337 ISZ  T8LC                       /STEP+TEST INTERRUPT LVL CTR
------- 14Ø1  5216 JMP  T8DIS3                     /2ND LVL INTERRUPT, OOPS . . .
------- 14Ø2  3147 DCA  T8SA                       /SAVE ACCUMULATOR
------- 14Ø3  7Ø1Ø RAR
------- 14Ø4  315Ø DCA  T8SVLK                     /SAVE LINK
------- 14Ø5  1ØØØ TAD  Ø
------- 14Ø6  3151 DCA  T8SVØ                      /SAVE RETURN ADDRESS
------- 14Ø7  6414 TTRL
------- 141Ø  3152 DCA  T8SVLN                     /SAVE 68Ø LINE REGISTER
------- 1411  6434 TT8ON                           /CLEAR CLOCK INTERRUPT
------------------ T8DIS2,                         /REENTRY FOR 2ND LVL INTERRUPT
------- 1412  6ØØ1 ION                             /ENABLE INTERRUPTS
------- 1413  1351 TAD  T8K9                       /SET LINE REGISTER TO 1ST LINE
------- 1414  6413 TTCL  TTSL                      /SET LINE REGISTER AND CLEAR AC
------- 1415  5742 JMP  I  T8K1                    /GO TO TTI LIST
------------------ T8DIS3,                         /HERE FOR 2ND LEVEL INTERRUPT
------- 1416  6434 TT8ON                           /CLEAR CLCOK INTERRUPT
------- 1417  6ØØ1 ION                             /ENABLE INTERRUPTS
------- 142Ø  54ØØ JMP  I  Ø                       /EXIT INTERRUPT ROUTINE
-------------------------------------------------- /
------------------ T8COM,                          /TTI STRING RETURNS HERE
------- 1421  1343 TAD  T8MNC                      /INITIALIZE MINOR LOOP COUNTER
------- 1422  3144 DCA  T8CNT2
------- 1423  1344 TAD  T8LN                       /SET LINE REGISTER TO WHERE WE LEFT
------- 1424  6413 TTCL  TTSL
------------------ T8COMØ,                         /MINOR LOOP STARTS HERE
------- 1425  154Ø TAD  I  T8OUTK                  /GET OUTPUT CHARACTER
------- 1426  745Ø SNA                             /IS CHAR COMPLETELY XMITTED?
------- 1427  5362 JMP  T8COMB                     /YES, GO GET NEXT CHAR FROM OBF2
------- 143Ø  64Ø5 TTINCR  TTO                     /NO, INCR LINE REG AND OUTPUT A BIT
------- 1431  354Ø DCA  I  T8OUTK                  /AND SAVE REMAINDER OF CHARACTER
------------------ T8COM1,                         /INPUT PORTION ON MINOR LOOP
------- 1432  1415 TAD  I  T8AX1                   /GET CHAR ASSEMBLY WORD
------- 1433  711Ø CLL  RAR                        /LOOK AT RIGHTMOST BIT POSITION
------- 1434  743Ø SZL
------- 1435  53Ø4 JMP  T 8COM6                    /IF "1", INPUT CHAR IS COMPLETE
------- 1436  72ØØ CLA                             /IF "Ø", NOTHING TO BE DONE
------------------ T8COM3,                         /STEP POINTERS, TEST MINOR LOOP TERM
------- 1437  214Ø ISZ  T8OUTK                     /STEP OBF1 POINTER
------- 144Ø  2141 ISZ  T8ATK2                     /STEP OBF2 POINTER
------- 1441  2Ø15 ISZ  T8AX1                      /STEP CHAR ASS'Y WORD BY THREE
------- 1442  2Ø15 ISZ  T8AX1
------- 1443  2144 ISZ  T8CNT2                     /CHECKED 1/8 OF THE LINES?
------- 1444  5225 JMP  T8COMØ                     /NOPE, CONTINUE MINOR LOOP
------- 1445  6414 TTRL                            /SAVE LINE NUMBER
------- 1446  3344 DCA  T8LN
------- 1447  2143 ISZ  T8CNT1                     /ALL LINES BEEN CHECKED (MAJOR LOOP)?
------- 145Ø  5263 JMP  T8COM5                     /NO, MAJOR LOOP NOT DONE YET
------- 1451  1345 TAD  T8K2                       /YES, RESET MAJOR LOOP COUNTER FOR
------- 1452  3143 DCA  T8CNT1                     /  EIGHT MINOR LOOPS
------- 1453  1346 TAD  T8K3                       /RESET CHAR ASS'Y WORD POINTER
------- 1454  3Ø15 DCA  T8AX1
------- 1455  1351 TAD  T8K9                       /RESET LINE NUMBER
------- 1456  3344 DCA  T8LN
------- 1457  1133 TAD  T8K7                       /RESET OBF1 POINTER
------- 146Ø  314Ø DCA  T8OUTK
------- 1461  1142 TAD  T8K36                      /RESET OBF2 POINTER
------- 1462  3141 DCA  T8OTK2
------------------ T8COM5,                         /INTERRUPT ROUNTINE EXIT
------- 1463  6ØØ2 IOF                             /INTERRUPT PROTECT
------- 1464  724Ø STA                             /DECREMENT INTERRUPT LEVEL COUNTER
------- 1465  1337 TAD  T8LC
------- 1466  3337 DCA  T8LC
------- 1467  1337 TAD  T8LC                       /TEST IF ANY 2ND LVL INTERRUPTS
------- 147Ø  77ØØ SMA  CLA
------- 1471  5212 JMP  T8DIS2                     /YES, GO SERVICE AGAIN
------- 1472  274Ø ISZ  I  CCOUN1                  /TIME FOR CHAR SERVICE?
```

```
   A     B   C                                D
------- 1473 741Ø SKP                         /NO, EXIT INTERRUPT
------- 1474 5741 JMP I TCHIS1                /YES, GO DO CHAR SERVICE
------- 1475 1152 TAD T8SVLN                  /RESTORE 68Ø LINE REGISTER
------- 1476 6413 TTCL TTSL
------- 1477 115Ø TAD T8SVLK                  /RESTORE LINK
------- 15ØØ 71Ø4 CLL RAL
------- 15Ø1 1147 TAD T8SA                    /RESTORE ACCUMULATOR
------- 15Ø2 6ØØ1 ION                         /ENABLE INTERRUPTS
------- 15Ø3 5551 JMP I T8SVØ                 /EXIT INTERRUPT
----------------- T8COM6:                     /SERVICE COMPLETED INPUT CHAR
------- 15Ø4 7112 CLL RTR                     /STRIP START CODE
------- 15Ø5 3416 DCA I T8AX2                 /PUT CHAR IN IBF
------- 15Ø6 6414 TTRL                        /GET ASSOCIATED LINE NUMBER
------- 15Ø7 3416 DCA I T8AX2                 /PUT LINE NUMBER IN IBF
------- 151Ø 1Ø15 TAD T8AX1                   /LET T8AX1=T8AX1-2
------- 1511 1347 TAD T8K5
------- 1512 3Ø15 DCA T8AX1
------- 1513 3415 DCA I T8AX1                 /RESET STATUS/COUNTER WORD
------- 1514 135Ø TAD T8K6                    /RESET CHAR ASS'Y WORD
------- 1515 3415 DCA I TAXI
------- 1516 213Ø ISZ T8INFL                  /SET INPUT READY FLAG
------- 1517 2145 ISZ T8CNT3                  /TEST FOR IBF EXHAUST.
------- 152Ø 5237 JMP T8COM3                  /NO, CONTINUE MINOR LOOP
------- 1521 1131 TAD T8BFK                   /YES, RESET IBF POINTER
------- 1522 3Ø16 DCA T8AX2
------- 1523 1132 TAD T8NL                    /RESET LENGTH COUNTER
------- 1524 3145 DCA T8CNT3
------- 1525 5237 JMP T8COM3                  /NOW, CONTINUE MINOR LOOP
----------------- T8COM8,                     /SERVICE EXHAUSTED OUTPUT CHAR
------- 1526 1541 TAD I T8OTK2                /GET CHAR FROM OBF2
------- 1527 744Ø SZA                         /SOMETHING THERE TO SEND?
------- 153Ø 5333 JMP .+3                     /YES, WATCHA WAITING FOR . . .
------- 1531 64Ø1 TTINCR                      /NO, STEP LINE REG TO KEEP IN PHASE
------- 1532 5232 JMP T8COM1                  /RETURN TO MINOR LOOP
------- 1533 64Ø5 TTINCR TTO                  /INCR LINE REG AND OUTPUT A BIT
------- 1534 354Ø DCA I 8OUTK                 /SAVE REMAINDER OF CHAR
------- 1535 3541 DCA I T8OTK2                /ZERO CHAR IN OBF2
------- 1536 5232 JMP T8COM1                  /RETURN TO MINOR LOOP
--------------------------------------------- /
--------------------------------------------- /CONSTANTS
------- 1537 7777 T8LC, -1                    /INTERRUPT LEVEL COUNTER
------- 154Ø 17Ø5 CCOUN1, CCOUNT              /LINKAGE
------- 1541 1647 TCHIS1, TCHIS               /LINKAGE
------- 1542 Ø44Ø T8K1, T8IN                  /START OF TTI STRING
------- 1543 7775 T8MNC, -LINES8              /MINOR LOOP COUNTER
------- 1544 ØØØØ T8LN, Ø                     /LINE NUMBER
------- 1545 777Ø T8K2, -1Ø                   /RESET FOR MAJOR LOOP COUNTER
------- 1546 Ø441 T8K3, T8IN+1                /RESET FOR INPUT LINE POINTER
------- 1547 7776 T8K5, -2                    /CONST
------- 155Ø 2ØØØ T8K6, 2ØØØ                  /RESET FOR CHAR ASS'Y WORD
------- 1551 7777 T8K9, -1                    /STARTING LINE MINUS ONE
--------------------------------------------- /
--------------------------------------------- /CHARACTER ASSEMBLY SUBROUTINES
--------------------------------------------- /PSEUDO-OPERATIONS
------------ 16ØØ *16ØØ
--------------------------------------------- /SKIP IF OUTPUT FREE
--------------------------------------------- /LINE NUMBER IN AC ON ENTRY
------------ 4535 T8SOF=JMS I T8SOUT
------- 16ØØ ØØØØ T8OUTS, Ø
------- 16Ø1 1Ø76 TAD O7777
------- 16Ø2 1142 TAD T8K36                   /CONSTRUCT OBF2 ADX
------- 16Ø3 3217 DCA T8WA                    /TO WORK AREA
------- 16Ø4 1617 TAD I T8WA                  /GET CHAR IN OBF2
------- 16Ø5 765Ø SNA CLA                     /IS OBF2 AVAILABLE?
------- 16Ø6 22ØØ ISZ T8OUTS                  /IF SO, SKIP
------- 16Ø7 56ØØ JMP I T8OUTS                /RETURN TO CALLER
--------------------------------------------- /
--------------------------------------------- /OUTPUT A CHARACTER
--------------------------------------------- /CHARACTER IN TTCHAR
--------------------------------------------- /MUST FOLLOW CORRESPRNDING "T8SOF"
------------ 4536 T8OCH=JMS I T8SOCH
------- 161Ø ØØØØ T8OCHS, Ø                   /ASSUME T8WA IS SET UP
------- 1611 1146 TAD TTCHAR                  /GET CHARACTER
------- 1612 Ø22Ø AND T8K11                   /TRIM TO 8 BITS
------- 1613 1221 TAD T8K12                   /ADD STOP BITS
------- 1614 71Ø4 CLL RAL                     /ADD START BIT
------- 1615 3617 DCA I T8WA                  /PUT IN OBF2
------- 1616 561Ø JMP I T8OCHS                /RETURN TO CALLER
------- 1617 ØØØØ T8WA, Ø                     /TEMP STORE
------- 162Ø Ø377 T8K11, 377                  /8-BIT MASK
------- 1621 14ØØ T8K12, 14ØØ                 /STOP BITS K
--------------------------------------------- /
--------------------------------------------- /SKIP IF INPUT READY
--------------------------------------------- /RETURN WITH CHAR IN "TTCHAR"
--------------------------------------------- /RETURN WITH LINE NUMBER IN AC
------------ 4537 T8SIR=JMSI T8SIN
------- 1622 ØØØØ T8INS, Ø
------- 1623 6ØØ2 IOF                         /INTERRUPT PROTECT
------- 1624 724Ø STA
------- 1625 113Ø TAD T8INFL                  /TEST INPUT READY FLAG
------- 1626 751Ø SPA                         /IS ANY INPUT READY?
------- 1627 5244 JMP T8INON                  /NO, RETURN W/O SKIP
------- 163Ø 313Ø DCA T8INFL                  /YES, DECREMENT FLAG
------- 1631 2246 ISZ T8CNT4                  /CHECK BUFFER WRAP-AROUND
------- 1632 5237 JMP .+5                     /NO, DON'T BOTHER
------- 1633 1132 TAD T8NL                    /RESET WRAP-AROUND COUNTER
------- 1634 3246 DCA T8CNT4
------- 1635 1131 TAD T8BFK                   /RESET IBF POINTER
------- 1636 3Ø17 DCA T8AX3
------- 1637 1417 TAD I T8AX3                 /GET CHARACTER
------- 164Ø 3146 DCA TTCHAR                  /HAND OVER TO CALLER
------- 1641 1417 TAD I T8AX3                 /GET LINE NUMBER
------- 1642 7ØØ1 IAC
------- 1643 2222 ISZ T8INS                   /SKIP
------- 1644 6ØØ1 T8INON, ION                 /END INTERRUPT PROTECT
------- 1645 5622 JMP I T8INS                 /RETURN
------- 1646 7777 T8CNT4, -1                  /IBF WRAP-AROUND COUNTER
----------------- TCHIS,                      /DO CHARACTER SERVICE
------- 1647 1152 TAD T8SVLN                  /RESAVE LINE REG, AC, LK, RETURN
```

```
      A    B    C                                     D
------- 1650 3301 DCA  TCSVLN
------- 1651 1150 TAD  T8SVLK
------- 1652 3302 DCA  TCSVLK
------- 1653 1147 TAD  T8SA
------- 1654 3303 DCA  TCSA
------- 1655 1151 TAD  T8SVØ
------- 1656 3304 DCA  TCSVØ
------- 1657 6001 ION                              /ENABLE INTERRUPTS
------- 1660 4430 CRIS                             /DO 637 INPUT SERVICE
------- 1661 4431 CXIS                             /DO 637 OUTPUT SERVICE
------- 1662 4427 TRIS                             /DO 680 INPUT SERVICE
------- 1663 4426 TXIS                             /DO 680 OUTPUT SERVICE
------- 1664 6002 IOF                              /INTERRUPT PROTECT
------- 1665 1305 TAD  CCOUNT                      /RESET CCOUNT
------- 1666 1306 TAD  CCSET
------- 1667 7500 SMA
------- 1670 7240 STA
------- 1671 3305 DCA  CCOUNT
------- 1672 1301 TAD  TCSVLN                      /RESTORE LINE REG, LK, AC
------- 1673 6413 TTCL  TTSL
------- 1674 1302 TAD  TCSVLK
------- 1675 7104 CLL RAL
------- 1676 1303 TAD  TCSA
------- 1677 6001 ION                              /ENABLE INTERRUPTS
------- 1700 5704 JMP  I  TCSVØ                    /EXIT INTERRUPT
------- 1701 0000 TCSVLN, Ø                        /SAVE LINE REG
------- 1702 0000 TCSVLK, Ø                        /SAVE LINK
------- 1703 0000 TCSA, Ø                          /SAVE ACCUMULATOR
------- 1704 0000 TCSVØ, Ø                         /SAVE RETURN
------- 1705 7660 CCOUNT, -120
------- 1706 7660 CCSET, -120
---------------------------------------------------- /
------------ 2000 *2000
---------------------------------------------------- /SERVICE 637 INTERRUPTS
---------------------------------------------------- /
------------ 5420 CBRIS=JMP I CBRISØ
---------------- CBRIS1,                           /SERVICE 637 RECEIVE FLAG INTERRUPT
------- 2000 4257 JMS  CBSAVE                      /SAVE REGISTERS
------- 2001 6312 RRB                              /READ 637 RECEIVE BUFFER INTO AC
------- 2002 3672 DCA  I  CBRBP                    /PUT CHAR IN CORE BUFFER
---------------- CBRST,
------- 2003 2272 ISZ  CBRBP                       /STEP CORE BUFFER POINTER
------- 2004 2274 ISZ CBRCNT                       /END OF BUFFER?
------- 2005 5212 JMP CBREX                        /NO
------- 2006 1273 TAD  CBRBK                       /YES, WRAP AROUND
------- 2007 3272 DCA CBRBP
------- 2010 1275 TAD CBRCNK
------- 2011 3274 DCA CBRCNT
---------------- CBREX,
------- 2012 7240 STA                              /SET TERMINATOR IN BUFFER
------- 2013 3672 DCA  I  CBRBP
------- 2014 5264 JMP  CBREST                      /RESTORE REGISTERS AND EXIT
---------------------------------------------------- /
------------ 5422 CBEIS=JMP  I  CBEISØ
---------------- CBEIS1,                           /SERVICE 637 END FLAG INTERRUPT
------- 2015 4257 JMS  CBSAVE                      /SAVE REGISTERS
------- 2016 6322 CEF                              /CLEAR END FLAG
------- 2017 1276 TAD  CBRETB                      /REACT JUST LIKE AN "ETB"
------- 2020 7041 CIA
------- 2021 3672 DCA  CBRBP
------- 2022 6352 CRA
------- 2023 5203 JMP  CBRST
---------------------------------------------------- /
------------ 5421 CBXIS=JMP  I  CBXISØ
---------------- CBXIS1,                           /SERVICE 637 TRANSMIT FLAG INTERRUPT
------- 2024 4257 JMS  CBSAVE                      /SAVE REGISTERS
------- 2025 1701 TAD  I  CBXBP                    /GET CHARACTER FROM CORE BUFFER
------- 2026 7450 SNA                              /ANYTHING TO XMIT?
------- 2027 5244 JMP  CBXEM                       /NO, BUFFER EMPTY
------- 2030 6303 TAC  CTF                         /YES, XMIT CHAR AND CLR FLAG
------- 2031 5252 JMP  CBXNA                       /637 XMIT NOT ACTIVE, TROUBLE . ; ;
------- 2032 7200 CLA                              /ZERO OUT CHAR IN BUFFER
------- 2033 3701 DCA  I  CBXBP
------- 2034 2301 ISZ  CBXBP                       /STEP CORE BUFFER POINTER
------- 2035 2303 ISZ  CBXCNT                      /END OF BUFFER?
------- 2036 5264 JMP  CBREST                      /NO, RESTORE REGISTERS AND EXIT
------- 2037 1302 TAD  CBXBK                       /YES, WRAP AROUND
------- 2040 3301 DCA  CBXBP
------- 2041 1304 TAD  CBXCNK
------- 2042 3303 DCA  CBXCNT
------- 2043 5264 JMP  CBREST                      /RESTORE REGISTERS AND EXIT
---------------- CBXEM,                            /CORE BUFFER EMPTY
------- 2044 7200 CLA
------- 2045 1300 TAD  CBXIDL                      /SEND AN IDLE CHARACTER
------- 2046 6314 SIM                              /SET IDLE MODE JUST IN CASE
------- 2047 6303 TAC  CTF                         /XMIT CHAR AND CLEAR FLAG
------- 2050 5252 JMP  CBXNA                       /637 XMIT NOT ACTIVE, TROUBLE . . ;
------- 2051 5264 JMP  CBREST                      /RESTORE REGISTERS AND EXIT
---------------- CBXNA,                            /TRANSMIT NOT ACTIVE, TROUBLE
------- 2052 7200 CLA
------- 2053 1277 TAD  CBXSYN                      /FORCE A SYN CHAR
------- 2054 6303 TAC  CTF                         /  FOR LACK OF A BETTER THING TO DO
------- 2055 5264 JMP  CBREST                      /RESTORE REGISTERS AND EXIT
------- 2056 5264 JMP  CBREST                      /DITTO
---------------------------------------------------- /
------- 2057 0000 CBSAVE, Ø                        /SAVE REGISTERS
------- 2060 3305 DCA CBSVAC                       /SAVE AC
------- 2061 7010 RAR
------- 2062 3306 DCA  CBSVLK                      /SAVE LK
------- 2063 5657 JMP  I  CBSAVE                   /RETURN
---------------------------------------------------- /
---------------- CBREST,                           /RESTORE REGISTERS AND EXIT
------- 2064 7200 CLA
------- 2065 1306 TAD  CBSVLK                      /RESTORE LINK
------- 2066 7104 CLL  RAL
------- 2067 1305 TAD  CBSVAC                      /RESTORE AC
------- 2070 6001 ION                              /ENABLE INTERRUPTS
```

| A | B | C | D |
|---|---|---|---|
| 2Ø71 | 54ØØ | JMP I Ø | /EXIT INTERRUPT |
| | | | / |
| 2Ø72 | Ø2ØØ | CBRBP, CHIBF | /RECEIVE CORE BUFFER POINTER |
| 2Ø73 | Ø2ØØ | CBRBK, CHIBF | /RECEIVE CORE BUFFER ORIGIN |
| 2Ø74 | 774Ø | CBRCNT, −4Ø | /RECEIVE COUNTER |
| 2Ø75 | 774Ø | CBRCNK, −4Ø | /RECEIVE COUNTER RESET |
| 2Ø76 | 7751 | CBRETB, −Ø27 | /ETB TEST |
| 2Ø77 | Ø226 | CBXSYN, Ø226 | /SYN CHARACTER |
| 21ØØ | Ø377 | CBXIDL, Ø377 | /DEL CHARACTER |
| 21Ø1 | Ø24Ø | CBXBP, CHOBF | /XMIT CORE BUFFER POINTER |
| 21Ø2 | Ø24Ø | CBXBK, CHOBF | /XMIT CORE BUFFER ORIGIN |
| 21Ø3 | 774Ø | CBXCNT, −4Ø | /XMIT COUNTER |
| 21Ø4 | 774Ø | CBXCNK, −4Ø | /XMIT COUNTER RESET |
| 21Ø5 | ØØØØ | CBSVAC, Ø | /SAVE ACCUMULATOR |
| 21Ø6 | ØØØØ | CBSVLK, Ø | /SAVE LINK |
| | | | / |
| | 22ØØ | *22ØØ | |
| | | | /ADDITIONAL DATAPHONE FEATURES |
| | | | /INTERRUPT SERVICE |
| | | | / |
| | | | /SERVICES RING FLAG AND CARRIER FLAG |
| | | | /INTERRUPTS FROM THE ADF, SINCE THERE |
| | | | /IS NO WAY OF SAVING THE GROUP REGISTER |
| | | | /OF THE ADF, ALL SPARE-TIME REFERENCES |
| | | | /TO THE ADF MUST HAVE INTERRUPT PROTECTION. |
| | 5424 | ADFRIS-JMP I ADFRIØ | |
| | | ADFRI1, | /SERVICE ADF RING FLGA INTERRUPT |
| 22ØØ | 6742 | ADFCRF | /CLEAR RING FLAG |
| 22Ø1 | 4271 | JMS ADFSV | /SAVE REGISTERS,INITIALIZE |
| 22Ø2 | 1327 | TAD ADFRTB | /INITIALIZE |
| 22Ø3 | 3341 | DCA ADFPTR | |
| | | ADFRI2, | |
| 22Ø4 | 67Ø2 | ADFRRS | /READ RING STATUS |
| 22Ø5 | 3342 | DCA ADFSTS | /SAVE |
| 22Ø6 | 1342 | TAD ADFSTS | |
| 22Ø7 | 744Ø | SZA | /ANY NEW RINGS THIS GROUP? |
| 221Ø | 5216 | JMP ADFRI3 | /YES, GO SERVICE |
| 2211 | 6731 | ADFITG | |
| 2212 | 2341 | ISZ ADFPTR | |
| 2213 | 2343 | ISZ ADFGCT | /ALL GROUPS TRIED? |
| 2214 | 52Ø4 | JMP ADFRI2 | /NO, TRY NEXT ONE |
| 2215 | 53Ø4 | JMP ADFOUT+2 | /YES, RESTORE AND EXIT (SHOULDN'T HAPPEN) |
| | | ADFRI3, | |
| 2216 | 4311 | JMS ADFDEC | /DECODE CHANNEL NUMBER |
| 2217 | 1112 | TAD MSGRNG | /SET UP "RINGING" ORM MESSAGE |
| 222Ø | 7Ø4Ø | CMA | |
| 2221 | Ø745 | AND I ADFADX | |
| 2222 | 1112 | TAD MSGRNG | |
| 2223 | 3745 | DCA I ADFADX | |
| 2224 | 53Ø2 | JMP ADFOUT | /RESTORE AND EXIT |
| | | | / |
| | 5425 | ADFCIS=JMP I ADFCIØ | |
| | | ADFCI1, | /SERVICE ADF CARRIER FLAG INTERRUPT |
| 2225 | 6741 | ADFCCF | /CLEAR CARRIER FLAG |
| 2226 | 4271 | JMS ADFSV | /SAVE REGISTERS, INITIALIZE |
| 2227 | 1334 | TAD ADFCTB | /INITIALIZE |
| 223Ø | 3341 | DCA ADFPTR | |
| | | ADFCI2, | |
| 2231 | 6712 | ADFRCS | /READ CARRIER STATUS |
| 2232 | 3342 | DCA ADFSTS | /SAVE |
| 2233 | 1741 | TAD I ADFPTR | /CALC (NOT CARR BEFORE)+(CARR NOW) |
| 2234 | 7Ø4Ø | CMA | |
| 2235 | Ø342 | AND ADFSTS | |
| 2236 | 744Ø | SZA | /ANY NEW CARRIER ON'S IN THIS GROUP? |
| 2237 | 5253 | JMP ADFCI3 | /YES, GO SERVICE |
| 224Ø | 1342 | TAD ADFSTS | /CALC (CARR BEFORE)+(NOT CARR NOW) |
| 2241 | 7Ø4Ø | CMA | |
| 2242 | Ø741 | AND I ADFPTR | |
| 2243 | 744Ø | SZA | /ANY NEW CARRIER OFF'S IN THIS GROUP? |
| 2244 | 5262 | JMP ADFCI4 | /YES, GO SERVICE |
| 2245 | 6731 | ADFITG | |
| 2246 | 2341 | ISZ ADFPTR | |
| 2247 | 2343 | ISZ ADFGCT | /ALL GROUPS TRIED? |
| 225Ø | 5231 | JMP ADFCI2 | /NO, TRY NEXT ONE |
| 2251 | 53Ø4 | JMP ADFOUT+2 | /YES, RESTORE AND EXIT (SHOULDN'T HAPPEN) |
| 2252 | 53Ø2 | JMP ADFOUT | /YES, RESTORE AND EXIT (SHOULDN'T HAPPEN) |
| | | ADFCI3, | |
| 2253 | 4311 | JMS ADFDEC | /DECODE CHANNEL NUMBER |
| 2254 | 1113 | TAD MSGCON | /SET UP "CONNECTED" INFORM MESSAGE |
| 2255 | 7Ø4Ø | CMA | |
| 2256 | Ø745 | AND I ADFADX | |
| 2257 | 1113 | TAD MSGCON | |
| 226Ø | 3745 | DCA I ADFADX | |
| 2261 | 53Ø2 | JMP ADFOUT | /RESTORE AND EXIT |
| | | ADFCI4, | |
| 2262 | 4311 | JMS ADFDEC | /DECODE CHANNEL NUMBER |
| 2263 | 1114 | TAD MSGDIS | /SET UP "DISCONNECTED" INFORM MESSAGE |
| 2264 | 7Ø4Ø | CMA | |
| 2265 | Ø745 | AND I ADFADX | |
| 2266 | 1114 | TAD MSGDIS | |
| 2267 | 3745 | DCA I ADFADX | |
| 227Ø | 53Ø2 | JMP ADFOUT | /RESTORE AND EXIT |
| | | | / |
| 2271 | ØØØØ | ADFSV, Ø | /SAVE REGISTERS, INITIALIZE |
| 2272 | 3346 | DCA ADFSAC | /SAVE AC |
| 2273 | 7Ø1Ø | RAR | |
| 2274 | 3347 | DCA ADFSLK | /SAVE LK |
| 2275 | 1Ø75 | TAD Ø7774 | /INITIALIZE |
| 2276 | 3343 | DCA ADFGCT | |
| 2277 | 3344 | DCA ADFCCT | |
| 23ØØ | 6721 | ADFCTG | |
| 23Ø1 | 5671 | JMP I ADFSV | /RETURN |
| | | | / |
| | | ADFOUT, | /RESTORE AND EXIT |
| 23Ø2 | 1342 | TAD AFDSTS | /UPDATE STATUS TABLE |
| 23Ø3 | 3741 | DCA I ADFPTR | |
| 23Ø4 | 1347 | TAD ADFSLK | RESTORE LK |
| 23Ø5 | 71Ø4 | CLL RAL | |

| A | B | C | D |
|---|---|---|---|
| 2306 | 1346 | TAD ADFSAC | /RESTORE AC |
| 2307 | 6001 | ION | /ENABLE INTERRUPTS |
| 2310 | 5400 | JMP I Ø | /EXIT INTERRUPT |
| | | | / |
| 2311 | ØØØØ | ADFDEC, Ø | /DECODE CHANNEL NUMBER |
| 2312 | 2344 | ISZ ADFCCT | /STEP COUNTER |
| 2313 | 7010 | RAR | /SHIFT ONE BIT |
| 2314 | 7420 | SNL | /IS THE BIT NORMALIZED? |
| 2315 | 5312 | JMP ADFDEC+1 | /NO, CONTINUE |
| 2316 | 7200 | CLA | |
| 2317 | 1343 | TAD ADFGCT | /YES, CONSTRUCT CHANNEL NUMBER |
| 2320 | 1061 | TAD O4 | /USING FORMULA: |
| 2321 | 7106 | CLL RTL | /CHAN=8*GROUP+BITPOS+1 |
| 2322 | 7004 | RAL | |
| 2323 | 1344 | TAD ADFCCT | |
| 2324 | 1125 | TAD INFTBL | /CONSTRUCT ADX IN INFORM TABLE |
| 2325 | 3345 | DCA ADFADX | |
| 2326 | 5711 | JMP I ADFDEC | /RETURN |
| | | | / |
| 2327 | 2330 | ADFRTB.,+1 | /RING STATUS TABLE |
| 2332 | ØØØØ | Ø | |
| 2331 | ØØØØ | Ø | |
| 2332 | ØØØØ | Ø | |
| 2333 | ØØØØ | Ø | |
| 2334 | 2335 | ADFCTB.,+1 | CARRIER STATUS TABLE |
| 2335 | ØØØØ | Ø | |
| 2336 | ØØØØ | Ø | |
| 2337 | ØØØØ | Ø | |
| 2340 | ØØØØ | Ø | |
| 2341 | ØØØØ | ADFPTR, Ø | /POINTER TO STATUS TABLE |
| 2342 | ØØØØ | ADFSTS, Ø | /SAVE STATUS |
| 2343 | ØØØØ | ADFGCT, Ø | /GROUP COUNTER |
| 2344 | ØØØØ | ADFCCT, Ø | /CHANNEL COUNTER |
| 2345 | ØØØØ | ADFADX, Ø | /INFORM TABLE POINTER |
| 2346 | ØØØØ | ADFSAC, Ø | /SAVE AC |
| 2347 | ØØØØ | ADFSLK, Ø | /SAVE LK |
| | | | / |
| | 24ØØ | *24ØØ | |
| | | | /TELETYPE INPUT CHARACTER SERVICE |
| | | | / |
| | | | /ACCUMULATES INPUT STRINGS IN POT |
| | | | /AND FORWARDS THEM TO CONCENTRATOR OUTPUT |
| | | | /UPON RECEIPT OF CR, CAN, NUL, |
| | | | / |
| | 4427 | TRIS=JMS I TRISØ | |
| 24ØØ | ØØØØ | TRIS1, Ø | /GET INPUT CHARACTER |
| 24Ø1 | 4537 | T8SIR | /NO INPUT AVAILABLE, RETURN |
| 24Ø2 | 56ØØ | JMP I TRIS1 | /SAVE CHANNEL NUMBER |
| 24Ø3 | 3327 | DCA TRCHN | /ARITHMETIC TO SET UP POINTERS |
| 24Ø4 | 1327 | TAD TRCHN | / TO INPUT CHANNEL TABLE |
| 24Ø5 | 71Ø4 | CLL RAL | |
| 24Ø6 | 1127 | TAD TRTBL | |
| 24Ø7 | 333Ø | DCA TRORG | /POINTER TO STRING ORG ADX |
| 241Ø | 133Ø | TAD TRORG | |
| 2411 | 7ØØ1 | IAC | /POINTER TO CURRENT ADX |
| 2412 | 3333 | DCA TRINP | /MOVE CURRENT ADX TO |
| 2413 | 1731 | TAD I TRINP | / WORKING (AUTO-INDEX) |
| 2414 | 3Ø14 | DCA TRAX1 | /GET INPUT CHARACTER |
| 2415 | 1146 | TAD TTCHAR | /TRIM TO 7 BITS |
| 2416 | ØØ67 | AND O177 | |
| 2417 | 3146 | DCA TTCHAR | /CONSTRUCT CHAR TABLE ADX |
| 242Ø | 1146 | TAD TTCHAR | |
| 2421 | 1123 | TAD TABLE | |
| 2422 | 3332 | DCA TRTEMP | /GET CHARACTER TABLE ENTRY |
| 2423 | 1732 | TAD I TRTEMP | /SHIFT INPUT TYPE TO LOW ORDER |
| 2424 | 7ØØ6 | RTL | / AND PARITY TO LINK |
| 2425 | 7ØØ6 | RTL | /STRIP OFF OUTPUT TYPE INFO |
| 2426 | ØØ62 | AND O7 | /CONSTRUCT BRANCH TABLE ENTRY |
| 2427 | 1236 | TAD TRBR+1 | |
| 243Ø | 3235 | DCA TRBR | /GET TRIMMED CHARACTER AGAIN |
| 2431 | 1146 | TAD TTCHAR | |
| 2432 | 743Ø | SZL | /GENERATE EVEN PARITY |
| 2433 | 1Ø7Ø | TAD O2ØØ | /SAVE CORRECTED CHARACTER |
| 2434 | 3146 | DCA TTCHAR | /CONSTRUCTED BRANCH TABLE ENTRY |
| 2435 | 5237 | TRBR, JMP ,+2 | /CONSTANT |
| 2436 | 5237 | JMP ,+1 | /TYPE Ø, NORMAL CHARACTER |
| 2437 | 5244 | JMP TRNOR | /TYPE 1, IGNORE |
| 244Ø | 525Ø | JMP TRIGN | /TYPE 2, NUL (BREAK) |
| 2441 | 5251 | JMP TRNUL | /TYPE 3, CAN (CONTROL X) |
| 2442 | 5251 | JMP TRCAN | /TYPE 4, CARRIAGE RETURN |
| 2443 | 5251 | JMP TRRET | / |
| | | TRNOR, | /PROCESS NON-SPECIAL CHAR |
| 2444 | 4272 | JMS TRPUT | /PUT CHAR IN INPUT STRING |
| 2445 | 1Ø14 | TAD TRAX1 | /RESTORE CURRENT ADDRESS FROM |
| 2446 | 3731 | DCA I TRINP | / UPDATED WORKING STORAGE |
| 2447 | 52Ø1 | JMP TRIS1+1 | /LOOP FOR ANOTHER INPUT CHARACTER |
| | | | / |
| | | TRIGN, | /PROCESS NON-INPUTTABLE CHAR |
| 245Ø | 52Ø1 | JMP TRIS1+1 | /EASY, ISN'T IT? |
| | | TRNUL, | /PROCESS NUL (BREAK) |
| | | TRCAN, | /PROCESS CAN (CONTROL X) |
| | | TRRET, | /PROCESS CARRIAGE RETURN |
| 2451 | 1Ø14 | TAD TRAX1 | /TEST FOR VACUOUS LINES |
| 2452 | 765Ø | SNA CLA | |
| 2453 | 525Ø | JMP TRIGN | |
| 2454 | 4272 | JMS TRPUT | /PUT CHARACTER IN INPUT STRING |
| 2455 | 724Ø | STA | /PREPARE TO CREATE END SENTINEL |
| 2456 | 3146 | DCA TTCHAR | |
| 2457 | 4272 | JMS TRPUT | /PUT SENTINEL IN INPUT STRING |
| 246Ø | 6ØØ2 | IOF | /INTERRUPT PROTECT |
| 2461 | 173Ø | TAD I TRORG | /GET BEGINNING OF INPUT STRING |
| 2462 | 35Ø7 | DCA I EOUTS | /LINK ONTO END OF CONC, OUTPUT |
| 2463 | 1Ø14 | TAD TRAX1 | /GET CURRENT ADX |
| 2464 | ØØ73 | AND O776Ø | /GENERATE CURRENT SEGMENT ADX |
| 2465 | 31Ø7 | DCA EOUTS | /UPDATE END CONC, OUTPUT POINTER |
| 2466 | 35Ø7 | DCA I EOUTS | /SET TERMINAL LINK TO ZERO |
| 2467 | 6ØØ1 | ION | /INTERRUPT ENABLE |

```
A     B     C                          D
2470  3731  DCA I TRINP                /DISCONNECT STRING FROM TTY
2471  52Ø1  JMP TRIS1+1                /LOOP FOR ANOTHER INPUT CHAR
---------------------------------------/
2472  ØØØØ  TRPUT, Ø                   /SUBR TO PUT CHAR IN INPUT STRING
2473  1Ø14  TAD TRAX1                  /GET CURRENT ADX FROM WORKING
2474  744Ø  SZA                        /ARE WE STARTING A NEW STRING?
2475  53Ø7  JMP TRPOL                  /NO
2476  6ØØ2  IOF                        /INTERRUPT PROTECT
2477  4433  GETSEG                     /GET A SEGMENT FROM POT
25ØØ  6ØØ1  ION                        /INTERRUPT ENABLE
25Ø1  3Ø14  DCA TRAX1                  /SET CURRENT ADX TO SEGMENT ADX
25Ø2  1Ø14  TAD TRAX1
25Ø3  373Ø  DCA I TRORG                /REMEMBER START OF STRING
25Ø4  1327  TAD TRCHN                  /GET CHANNEL NUMBER
25Ø5  3414  DCA I TRAX1                /USE AS 1ST BYTE OF STRING
25Ø6  5324  JMP TRPCH                  /GO PUT AWAY CHARACTER
------------TRPOL,
25Ø7  7ØØ1  IAC                        /IS CURRENT SEGMENT FULL?
251Ø  ØØ63  AND O17                    / I,E, TRAX=15 MOD 16?
2511  764Ø  SZA CLA
2512  5324  JMP TRPCH                  /NOT FULL, GO PUT AWAY CHAR
2513  1Ø14  TAD TRAX1                  /GET CURRENT ADX
2514  ØØ73  AND O776Ø                  /GENERATE SEG ADX
2515  3332  DCA TRTEMP
2516  6ØØ2  IOF                        /INTERRUPT PROTECT
2517  4433  GETSEG                     /GET A SEGMENT FROM POT
252Ø  6ØØ1  ION                        /INTERRUPT ENABLE
2521  3Ø14  DCA TRAX1                  /UPDATE CURRENT ADX
2522  1Ø14  TAD TRAX1                  /LINK NEW SEG TO STRING
2523  3732  DCA I TRTEMP
------------TRPCH,
2524  1146  TAD TTCHAR                 /GET CHARACTER
2525  3414  DCA I TRAX1                /PUT AWAY IN STRING
2526  5672  JMP I TRPUT                /RETURN
2527  ØØØØ  TRCHN, Ø                   /CHANNEL NUMBER
253Ø  ØØØØ  TRORG, Ø                   /POINTS TO STRING ORG ADX
2531  ØØØØ  TRINP, Ø                   /POINTS TO CURRENT ADX
2532  ØØØØ  TRTEMP, Ø                  /TEMPORARY STORAGE
      ØØ14  TRAX1=14                   /WORKING ADX, AUTO INDEX
---------------------------------------/
      26ØØ  *26ØØ
---------------------------------------/TRANSMITS OUTPUT STRINGS FROM POT
---------------------------------------/AND RELEASES SEGMENTS AS THEY ARE EMPTIED
---------------------------------------/
      4426  TXIS=JMS I TXISØ
26ØØ  ØØØØ  TXIS1, Ø
26Ø1  724Ø  STA                        /INITIALIZE TERMINATING COUNTER
26Ø2  1312  TAD TXNLS
26Ø3  7Ø41  CIA
26Ø4  3313  DCA TXCNT
26Ø5  1126  TAD TXTBL                  /INITIALIZE TO FIRST LINE NUMBER
26Ø6  3Ø13  DCA TXAX1                  /WILL USE AUTO-INDEX THRU TABLE
26Ø7  1413  TAD I TXAX1                /GET CURRENT OUTPUT ADX
261Ø  744Ø  SZA                        /ANYTHING TO OUTPUT?
2611  5215  JMP TXCHS                  /YES, GO SEE WHAT WE CAN DO
------------TXNX,
2612  2313  ISZ TXCNT                  /ALL LINES SERVICED?
2613  52Ø7  JMP TXNX-3                 /NO, CONTINUE LOOPING
2614  56ØØ  JMP I TXIS1                /YES, RETURN
---------------------------------------/
------------TXCHS,
2615  3Ø14  DCA TXAX2                  /CURRENT ADX TO AUTO-INDEX WORKING
2616  1312  TAD TXNLS                  /CALC LINE NUMBER
2617  1313  TAD TXCNT
262Ø  3314  DCA TXCHN                  /SAVE LINE NUMBER
2621  1314  TAD TXCHN
2622  4535  T8SOF                      /TEST IF THIS LINE FREE
2623  5212  JMP TXNX                   /NO, CAN'T SERVICE THIS LINE
2624  1Ø13  TAD TXAX1                  /MOVE TABLE POINTER TO A
2625  3315  DCA TXOTP                  / NON AUTO-INDEX WORD
2626  1Ø14  TAD TXAX2                  /END OF BLOCK YET?
2627  ØØ63  AND O17
263Ø  764Ø  SZA CLA
2631  5251  JMP TXWRT                  /NO
2632  1Ø14  TAD TXAX2                  /YES, LAST BLOCK?
2633  3316  DCA TXTEMP
2634  1716  TAD I TXTEMP
2635  764Ø  SZA CLA
2636  5251  JMP TXWRT                  /NO
2637  1314  TAD TXCHN                  /YES, SET UP INFORM MESSAGE
264Ø  1125  TAD INFTBL                 / FOR OUT-OF-OUTPUT
2641  3316  DCA TXTEMP
2642  1111  TAD MSGOUT
2643  7Ø4Ø  CMA
2644  6ØØ2  IOF
2645  Ø716  AND I TXTEMP
2646  1111  TAD MSGOUT
2647  3716  DCA I TXTEMP
265Ø  6ØØ1  ION
------------TXWRT,
2651  1Ø14  TAD TXAX2                  /GET CURRENT ADDRESS
2652  7ØØ1  IAC                        /IS CURRENT SEGMENT EMPTY
2653  ØØ63  AND O17                    / E,I, IS ADX=15 MOD 16?
2654  764Ø  SZA CLA
2655  5267  JMP TXGCH                  /NO, SO GO GET CHARACTER
2656  1Ø14  TAD TXAX2                  /YES, GET CURRENT ADDRESS
2657  ØØ73  AND O776Ø                  /GENERATE SEGMENT ADDRESS
266Ø  3316  DCA TXTEMP                 /SAVE IT
2661  1716  TAD I TXTEMP               /GET SEGMENT LINK
2662  3Ø14  DCA TXAX2                  /UPDATE CURRENT ADDRESS
2663  1316  TAD TXTEMP                 /GET SEGMENT ADX
2664  6ØØ2  IOF                        /INTERRUPT PROTECT
2665  4434  RELSEG                     /RELEASE EMPTY SEGMENT TO POT
2666  6ØØ1  ION                        /INTERRUPT ENABLE
---------------------------------------/
------------TXGCH,
2667  1414  TAD I TXAX2                /GET CHARACTER TO BE OUTPUT
267Ø  751Ø  SPA                        /IS IT AN OUTPUT TERMINATOR?
```

| A | B | C | D |
|---|---|---|---|
| 2671 | 5277 | JMP TXETX | /YES, TERMINATE THIS OUTPUT STRING |
| 2672 | 3146 | DCA TTCHAR | /NO, SAVE CHARACTER |
| 2673 | 1Ø14 | TAD TXAX2 | /UPDATE CURRENT ADX IN TABLE |
| 2674 | 3715 | DCA I TXOTP | |
| 2675 | 4536 | T8OCH | /OUTPUT THE CHARACTER |
| 2676 | 5212 | JMP TXNX | /LOOP FOR NEXT LINE |
| | | | / |
| | | TXETX, | /TERMINATOR WAS SEEN |
| 2677 | 72ØØ | CLA | |
| 27ØØ | 1Ø14 | TAD TXAX2 | /GET CURRENT ADX |
| 27Ø1 | ØØ73 | AND O776Ø | /GENERATE SEG ADX |
| 27Ø2 | 3316 | DCA TXTEMP | |
| 27Ø3 | 1716 | TAD I TXTEMP | /GET LINK TO NEXT STRING |
| 27Ø4 | 3715 | DCA I TXOTP | / WHICH MAY BE ZERO IF NONE |
| 27Ø5 | 1316 | TAD TXTEMP | /GET SEGMENT ADX |
| 27Ø6 | 6ØØ2 | IOF | /INTERRUPT PROTECT |
| 27Ø7 | 4434 | RELSEG | /RELEASE SEGMENT TO POT |
| 271Ø | 6ØØ1 | ION | /INTERRUPT ENABLE |
| 2711 | 5212 | JMP TXNX | /LOOP FOR NEXT LINE |
| | | | / |
| 2712 | ØØ31 | TXNLS, LINES+1 | /NUMBER OF LINES+1 |
| 2713 | ØØØØ | TXCNT, Ø | TERMINATION COUNTER |
| 2714 | ØØØØ | TXCHN, Ø | /OUTPUT LINE NUMBER |
| 2715 | ØØØØ | TXOTP, Ø | /TABLE POINTER |
| 2716 | ØØØØ | TXTEMP,Ø | /WORKING STORAGE |
| | ØØ13 | TXAX1=13 | /AUTO-INDEX |
| | ØØ14 | TXAX2=14 | /AUTO-INDEX |
| | | | / |
| | 3ØØØ | *3ØØØ | /HIGH-SPEED RECEIVE SERVICE |
| | | | / |
| | | | /ASSEMBLES HIGH-SPEED INPUT INTO POT STRINGS |
| | | | /AND FORWARDS THEM FOR TELETYPE OUTPUT |
| | | | /ALSO SERVICES CONTROL MESSAGES FROM THE D-3Ø |
| | | | /AND DOES ALL THE APPROPRIATE ERROR CHECKING |
| | | | / |
| | 443Ø | CRIS=JMS I CRISØ | |
| | 5453 | CRPUT=JMP I CRGETØ | /CO-ROUTINE CALL |
| | 4Ø53 | CRGET=JMS CRGETØ | /CO-ROUTINE CALL |
| 3ØØØ | ØØØØ | CRIS1, Ø | /HIGH-SPEED RECEIVE SERVICE |
| | | CRGET1, | |
| 3ØØ1 | 72ØØ | CLA | |
| 3ØØ2 | 1626 | TAD I CRBP | /GET NEXT CHAR FROM CORE BUFFER |
| 3ØØ3 | 75ØØ | SMA | /BUFFER EMPTY? |
| 3ØØ4 | 52Ø7 | JMP ,+3 | /NO |
| 3ØØ5 | 72ØØ | CLA | /YES, CLEAR AND RETURN |
| 3ØØ6 | 56ØØ | JMP I CRIS1 | |
| 3ØØ7 | ØØ71 | AND O377 | /TRIM TO 8 BITS |
| 3Ø1Ø | 3146 | DCA TTCHAR | /SAVE CHARACTER |
| 3Ø11 | 2226 | ISZ CRBP | /STEP CORE BUFFER POINTER |
| 3Ø12 | 223Ø | ISZ CRCNT | /END OF BUFFER? |
| 3Ø13 | 522Ø | JMP ,+5 | /NO |
| 3Ø14 | 1227 | TAD CRBK | /YES, WRAP AROUND |
| 3Ø15 | 3226 | DCA CRBP | |
| 3Ø16 | 1231 | TAD CRCNK | |
| 3Ø17 | 323Ø | DCA CRCNT | |
| 3Ø2Ø | 1146 | TAD TTCHAR | |
| 3Ø21 | 1123 | TAD TABLE | /CALC ADDRESS IN CHAR TABLE |
| 3Ø22 | 3232 | DCA CRGWA | |
| 2Ø23 | 1632 | TAD I CRGWA | /GET TABLE ENTRY |
| 3Ø24 | ØØ71 | AND O377 | /STRIP TTY INFO |
| 3Ø25 | 5453 | CRPUT | /GO PROCESS THE CHARACTER |
| 3Ø26 | Ø2ØØ | CRBP, CHIBF | /CORE BUFFER POINTER |
| 3Ø27 | Ø2ØØ | CRBK, CHIBF | /CORE BUFFER POINTER RESET |
| 3Ø3Ø | 774Ø | CRCNT ,-4Ø | /EXHAUST COUNTER |
| 3Ø31 | 774Ø | CRCNK, -4Ø | /EXHAUST COUNTER RESET |
| 3Ø32 | ØØØØ | CRGWA, Ø | /WORK AREA |
| | | | / |
| | 4442 | CRGTPR=JMS I CRGTPØ | |
| 3Ø33 | ØØØØ | CRGTP1, Ø | /GET PAIR CHARS, CHECK VALID |
| 3Ø34 | 4Ø53 | CRGET | /GET FIRST CHARACTER |
| 3Ø35 | 1155 | TAD CRPART | /MUST HAVE GOOD PARITY |
| 3Ø36 | 765Ø | SNA CLA | |
| 3Ø37 | 5633 | JMP I CRGTP1 | /BAD PARITY, EXIT 1 |
| 3Ø4Ø | 1146 | TAD TTCHAR | /GOOD PARITY, SAVE CHAR |
| 3Ø41 | 3156 | DCA CRTEMP | |
| 3Ø42 | 4Ø53 | CRGET | /GET SECOND CHARACTER |
| 3Ø43 | 1155 | TAD CRPART | /MUST HAVE GOOD PARITY |
| 3Ø44 | 765Ø | SNA CLA | |
| 3Ø45 | 5633 | JMP I CRGTPI | /BAD PARITY, EXIT 1 |
| 3Ø46 | 1146 | TAD TTCHAR | /GOOD PARITY, TEST FOR CPL |
| 3Ø47 | 1156 | TAD CRTEMP | |
| 3Ø5Ø | 7ØØ1 | IAC | |
| 3Ø51 | ØØ67 | AND O177 | |
| 3Ø52 | 765Ø | SNA CLA | |
| 3Ø53 | 2233 | ISZ CRGTP1 | /VALID, EXIT 2 ELSE EXIT 1 |
| 3Ø54 | 5633 | JMP I CRGTP1 | /RETURN |
| | | | / |
| | | | / |
| | 5443 | CRCTRB=JMP I CRCTRØ | |
| | | CRCTR1 | /PROCESS CONTROL BLOCK |
| 3Ø55 | 4Ø53 | CRGET | /GET CHARACTER (CONTROL CHARACTER) |
| 3Ø56 | 1155 | TAD CRPART | /MUST HAVE GOOD PARITY |
| 3Ø57 | 765Ø | SNA CLA | |
| 3Ø6Ø | 5735 | JMP I CRCTXA | /BAD PARITY, PUNT |
| 3Ø61 | 1146 | TAD TTCHAR | /GOOD PARITY, SAVE CHARACTER |
| 3Ø62 | 3156 | DCA CRTEMP | |
| 3Ø63 | 1156 | TAD CRTEMP | |
| 3Ø64 | 3157 | DCA CRSUM | |
| | | CRCTRC, | /SKIP TO ETX |
| 3Ø55 | 4Ø53 | CRGT | /GET CHARACTER (CONTROL CHARACTER) |
| 3Ø66 | 1271 | TAD ,+3 | |
| 3Ø67 | 327Ø | DCA ,+1 | |
| 3Ø7Ø | 5272 | JMP ,+2 | |
| 3Ø71 | 5272 | JMP ,+1 | |
| 3Ø72 | 53Ø3 | JMP CRCTRN | /NORMAL |
| 3Ø73 | 5735 | JMP CRCTXA | /PARITY ERROR, PUNT |
| 3Ø74 | 53Ø3 | JMP CRCTRN | /NUL |
| 3Ø75 | 53Ø3 | JMP CRCTRN | /SYN |

```
A     B     C                        D
3076  5736  JMP  CRCTXB              /ACK, PUNT
3077  5737  JMP  I  CRCTXC           /SOH, PUNT
3100  5735  JMP  I  CRCTXA           /STX, PUNT
3101  5307  JMP  CRCTRE              /ETX
3102  5740  JMP  CRCTXD              /ETB, PUNT
            CRCTRN,
3103  1146  TAD  TTCHAR              /IGNORE CHARACTER
3104  1157  TAD  CRSUM               /EXCEPT ADD TO CHECKSUM
3105  3157  DCA  CRSUM
3106  5265  JMP  CRCTRC              /GET NEXT CHARACTER
            CRCTRE,                  /END OF CONTROL BLOCK
3107  1146  TAD  TTCHAR              /UPDATE CHECKSUM
3110  1157  TAD  CRSUM
3111  3157  DCA  CRSUM
3112  4053  CRGET                    /GET CHARACTER (LP)
3113  1155  TAD  CRPART              /MUST HAVE GOOD PARITY
3114  7650  SNA  CLA
3115  5735  JMP  I  CRCTXA           /BAD PARITY, PUNT
3116  1157  TAD  CRSUM               /GOOD PARITY, CHECK LONGITUDINAL
3117  1146  TAD  TTCHAR
3120  0067  AND  0177                /SHOULD ADD TO ZERO MOD 128
3121  7640  SZA  CLA
3122  5735  JMP  I  CRCTXA           /BAD LONGITUDINAL, PUNT
3123  1124  TAD  CRLTBL              /GOOD, CONTROL MESSAGE
3124  1160  TAD  CRLINE              /PREPARE TO MAKE CTRL TABLE ENTRY
3125  3146  DCA  TTCHAR
3126  1156  TAD  CRTEMP              /GET CTRL CHAR
3127  7040  CMA                      /"OR" INTO CTRL TABLE
3130  0546  AND  I  TTCHAR
3131  1156  TAD  CRTEMP
3132  0067  AND  0177
3133  3546  DCA  TTCHAR
3134  5741  JMP  I  CRCTXE           /GO UPDATE RCV ACK AND EXIT
------------------------------------ /
3135  3204  CRCTXA, CRNXBL

3136  3225  CRTXB, CRACK
3137  3233  CRTXC, CRSOH
3140  3222  CRTXD, CRETB
3141  3344  CRCTXE, CRUPRA
      3200  *3200
------------------------------------ /
            CRPUT1,                  /INITIAL ENTRY FOR RCV ANALYSIS
3200  4053  CRGET                    /GET CHARACTER
3201  1153  TAD CRSYNT               /LOOK FOR SYN ONLY
3202  7640  SZA CLA
3203  5200  JMP  ,-3
            CRNXBL,                  /GO TO NEXT BLOCK ORG
3204  4053  CRGET                    /GET CHARATCER
3205  1201  TAD  ,+3                 /LOOK ONLY FOR SOH, ACK, ETB
3206  3207  DCA  ,+1
3207  5211  JMP  ,+2
3210  5211  JMP  ,+1
3211  5204  JMP  CRNXBL
2312  5204  JMP  CRNXLB
3213  5204  JMP  CRNXBL
3214  5204  JMP  CRNXBL
3215  5225  JMP  CRACK               /ACK, ENTER ACKNOWLEDGE SEQUENCE
3216  5233  JMP  CRSOH               /SOH, ENTER TEXT BLOCK SEQUENCE
3217  5204  JMP  CRNXBL
3220  5223  JMP  CRIGN               /ETX, IGNORE LP
3221  5222  JMP  CRETB               /ETB, TERMINATE ANALYSIS
------------------------------------ /
            CRETB,
3222  5200  JMP  CRPUT1
------------------------------------ /
            CRIGN,                   /IGNORE LP
3223  4053  CRGET
3224  5204  JMP CRNXBL
------------------------------------ /
------------------------------------ /
            CRACK,                   /ACKNOWLDEGE SEQUENCE
3225  4442  CRGTPR                   /GET AND CHECK ACK NUMBER
3226  5204  JMP CRNXBL               /IF INVALID, PUNT
3227  1156  TAD CRTEMP               /IF VALID, UPDATE XMISSN ACK NUMBER
3230  0067  AND  0177                /TRIM TO 7 BITS
3231  3104  DCA  XACK
3232  5204  JMP  CRNXBL              /TERMINATE ACK SEQUENCE
------------------------------------ /
            CRSOH,                   /TEXT BLOCK SEQUENCE
3233  4442  CRGTPR                   /GET AND CHECK BLOCK NUMBER
3234  5204  JMP  CRNXBL              /IF INVALID, PUNT
3235  1102  TAD  RACK                /IF VALID, TEST IF THIS IS THE

3236  7040  CMA                      /  BLOCK WE'RE LOOKING FOR
3237  1156  TAD  CR  TEMP
3240  0067  AND  0117
3241  7640  SZA  CLA
3242  5204  JMP  CRNXBL              /WRONG BLOCK, PUNT
3242  4442  CRTGPR                   /GET AND CHECK LINE NUMBER
3244  5024  JMP  CRNXBL              /IF VALID, PUNT
3245  1156  TAD  CR  TEMP            /IF VALID, SAVE LINE NUMBER
3246  0065  AND  077
3247  3160  CDA  CRLINE
3250  1156  TAD  CRTEMP              /SAVE CONTROL/TEXT BIT
3251  0066  AND  0100
3252  3154  DCA  CRCTRL
            CRNXTX,                  /LOOK FOR STX
3253  4053  CRGET
3254  1257  TAD  ,+3
3255  3256  DCA  ,+1
3256  5260  JMP  ,+2
3257  5260  JMP  ,+1
3260  5253  JMP  CRNXTX
3261  5253  JMP  CRNXTX
3262  5253  JMP  CRNXTX
3263  5253  JMP  CRNXTX
3264  5225  JMP  CRACK
3265  5233  JMP  CRSOH
```

```
 A      B     C                           D
------ 3266  5271  JMP  CRSTX
------ 3267  5223  JMP  CRIGN
------ 3270  5222  JMP  CRETB
----------------   CRSTX,                 /START OF TEXT
------ 3271  3157  DCA  CRSUM             /ZERO CHECKSUM
------ 3272  1355  TAD  CRCON             /SET SAFETY COUNTER
------ 3273  3356  DCA  CRCT
------ 3274  1154  TAD  CRCTRL            /CONTROL BLOCK?
------ 3275  7640  SZA  CLA               /NO, TEXT BLOCK
------ 3276  5443  CRCTRB                 /YES PROCESS
----------------   CRTXCH,                /GET TEXT CHAR
------ 3277  4053  CRGET
------ 3300  3156  DCA  CRTEMP
------ 3301  1156  TAD  CRTEMP
------ 3302  1305  TAD  ,+3
------ 3303  3304  DCA  ,+1
------ 3304  5306  JMP  ,+2
------ 3305  5306  JMP  ,+1
------ 3306  5317  JMP  CRTXOK            /NORMAL CHARACTER
------ 3307  5352  JMP  CRTXNG            /PARITY ERROR
------ 3310  5277  JMP  CRTXCH            /NUL, IGNORE
------ 3311  5317  JMP  CRTXOK            /SYN, NORMAL(?)
------ 3312  5352  JMP  CRTXNG            /ACK
------ 3313  5352  JMP  CRTXNG            /SOH
------ 3314  5352  JMP  CRTXNG            /STX
------ 3315  5327  JMP  CRETX             /ETX, END TEXT
------ 3316  5352  JMP  CRTXNG            /ETB
----------------   CRTXOK,                /NORMAL TEXT CHARACTER
------ 3317  1157  TAD  CRSUM             /UPDATE LP REGISTER
------ 3320  1146  TAD  TTCHAR
------ 3321  3157  DCA  CRSUM
------ 3322  2356  ISZ  CRCT              /BUMP SAFETY COUNTER
------ 3323  7410  SKP
------ 3324  5352  JMP  CRTXNG            /IF OVERFLOW, ABORT MESSAGE
------ 3325  4444  CRSTOR                 /PUT CHAR IN POT STRING
------ 3326  5277  JMP  CRTXCH            /GET NEXT CHAR
----------------   CRETX,                 /END OF TEXT
------ 3327  1157  TAD  CRSUM             /UPDATE LP REGISTER
------ 3330  1146  TAD  TTCHAR
------ 3331  3157  DCA  CRSUM
------ 3332  4053  CRGET                  /GET CHARACTER (LP)
------ 3333  1155  TAD  CRPART            /MUST HAVE GOOD PARITY
------ 3334  7650  SNA  CLA
------ 3335  5351  JMP  CRTXNP            /BAD PARITY, PUNT
------ 3336  1157  TAD  CRSUM             /GOOD PARITY, CHECK LONGITUDINAL
------ 3337  1146  TAD  TTCHAR
------ 3340  0067  AND  O177              /SHOULD ADD TO ZERO MOD 128
------ 3341  7640  SZA  CLA
------ 3342  5351  JMP  CRTXNP            /BAD LONGITUDINAL, PUNT
------ 3343  4445  CRASGN,                /GOOD LP, ASSIGN BLOCK TO OUTPUT
----------------   CRUPRA,
------ 3344  1102  TAD  RACK              /UPDATE RECEIVE ACK NUMBER
------ 3345  7001  IAC
------ 3346  0067  AND  O177
------ 3347  3102  DCA  RACK
------ 3350  5204  JMP  CRNXBL            /GO GET NEXT BLOCK
----------------   CRTXNP,                /DELETE BLOCK
------ 3351  3156  DCA  CRTEMP
----------------   CRTXNG,
------ 3352  4446  CREXPU                 /EXPUNGE BLOCK IN POT
------ 3353  1156  TAD  CRTEMP            /GET CHAR TYPE
------ 3354  5205  JMP  CRNXBL+1          /GO GET NEXT BLOCK
------ 3355  7600  CRCON, 7600
------ 3356  0000  CRCT, Ø
------------ 3400  *3400
------------ 4444  CRSTOR=JMS  I  CRSTOØ
------ 3400  0000  CRSTO1, Ø              /PUT CHARACTER IN POT STRING
------ 3401  1305  TAD  CRINP             /GET CURRENT ADX
------ 3402  7440  SZA                    /ARE WE STARTING A NEW STRING?
------ 3403  5213  JMP  CRPOL             /NO
------ 3404  6002  IOF                    /INTERRUPT PROTECT
------ 3405  4433  GETSEG                 /GET A SEGMENT FROM THE POT
------ 3406  6001  ION                    /INTERRUPT ENABLE
------ 3407  3304  DCA  CRORG             /SAVE ORIGIN OF STRING
------ 3410  1304  TAD  CRORG             /SET CURRENT ADX TO FIRST BYTE
------ 3411  3305  DCA  CRINP
------ 3412  5230  JMP  CRPCH             /GO PUT CHARACTER IN STRING
----------------   CRPOL,
------ 3413  7001  IAC                    /IS CURRENT SEGMENT FULL?
------ 3414  0063  AND  Ø17
------ 3415  7640  SZA  CLA
------ 3416  5230  JMP  CRPCH             /NOT FULL, GO PUT CHAR
------ 3417  1305  TAD  CRINP             /FULL, GET CURRENT ADX
------ 3420  0073  AND  Ø7760             /GET CURRENT SEGMENT ADX
------ 3421  3306  DCA  CRSTOT            /SAVE IN TEMP
------ 3422  6002  IOF                    /INTERRUPT PROTECT
------ 3423  4433  GETSEG                 /GET A SEGMENT FROM THE POT
------ 3424  6001  ION                    /INTERRUPT ENABLE
------ 3425  3305  DCA  CRINP             /UPDATE CURRENT ADDRESS
------ 3426  1305  TAD  CRINP             /LINK NEW SEGMENT ONTO STRING
------ 3427  3706  DCA  I  CRSTOT
----------------   CRPCH,
------ 3430  2305  ISZ  CRINP             /STEP CURRENT ADDRESS
------ 3431  1146  TAD  TTCHAR            /GET CHARACTER
------ 3432  3705  DCA  I  CRINP          /PUT AWAY IN STRING
------ 3433  5600  JMP  I  CRSTO1         /RETURN TO CALLER
------------------------------------------/
------------ 4445  CRASGN=JMS  I  CRASGØ
------ 3434  0000  CRASG1, Ø              /ASSIGN POT STRING TO OUTPUT
------ 3435  7240  STA                    /SET UP TERMINATOR
------ 3436  3146  DCA  TTCHAR
------ 3437  4444  CRSTOR
------ 3440  1305  TAD  CRINP             /GET CURRENT ADDRESS
------ 3441  0073  AND  O7760             /GET ADX OF LAST SEGMENT
------ 3442  3306  DCA  CRSTOT
------ 3443  3706  DCA  I  CRSTOT         /ZERO LINK FOR SENTINEL
------ 3444  1126  TAD  TXTBL             /CALC ADX OF CHANNEL TABLE ENTRY
------ 3445  1160  TAD  CRLINE
```

```
A     B     C                        D
3446  33Ø6  DCA  CRSTOT
3447  17Ø6  TAD  I  CRSTOT           /GET CURRENT TTY OUTPUT ADX
345Ø  744Ø  SZA                      /IS ANYTHING OUTPUTTING PRESENTLY?
3451  5256  JMP  CRSAGL              /YES, MUST LINK ONTO END OF IT
3452  13Ø4  TAD  CRORG               /NO, START OUTPUTTING THIS STRING
3453  37Ø6  DCA  I  CRSTOT
3454  33Ø5  DCA  CRINP               /REINITIALIZE
3455  5634  JMP  I  CRASG1           /RETURN TO CALLER
            CRASGL,                  /THIS LINE HAS OUTPUT ALREADY
3456  ØØ73  AND  O776Ø               /GET CURRENT SEGMENT ADX
3457  3146  DCA  TTCHAR              /AS GOOD TEMP STORAGE AS ANY
346Ø  1546  TAD  I  TTCHAR           /GET LINK OF SEGMENT
3461  744Ø  SZA                      /IS THIS THE LAST SEGMENT?
3462  5257  JMP  CRASGL+1            /NO, KEEP LOOKING
3463  13Ø4  TAD  CRORG               /YES, LINK NEW STUFF TO IT
3464  3546  DCA  I  TTCHAR
3465  33Ø5  DCA  CRINP               /REINITIALIZE
3466  5634  JMP  I  CRASG1           /RETURN TO CALLER
-------------------------------------/
      4446  CREXPU=JMS  I  CREXPØ
3467  ØØØØ  CREXP1,Ø                 /EXPUNGE STRING FROM POT
347Ø  13Ø4  TAD  CRORG               /SET STARTING SEGMENT ADX
3471  3Ø77  DCA  SEG1
3472  13Ø5  TAD  CRINP               /SET ENDING SEGMENT ADX
3473  ØØ73  AND  O776Ø
3474  745Ø  SNA                      /ANYTHING TO EXPUNGE?
3475  5667  JMP  I  CREXP1           /NO, RETURN DOING NOTHING
3476  31ØØ  DCA  SEG2
3477  6ØØ2  IOF                      /INTERRUPT PROTECT
35ØØ  4435  RELSTR                   /RELEASE STRING TO AVAIL POT
35Ø1  6ØØ1  ION                      /INTERRUPT ENABLE
35Ø2  33Ø5  DCA  CRINP               /INITIALIZE
35Ø3  5667  JMP  I  CREXP1           /RETURN TO CALLER
-------------------------------------/
35Ø4  ØØØØ  CRORG,Ø                  /POINTS TO FIRST BLOCK OF STRING
35Ø5  ØØØØ  CRINP,Ø                  /POINTS TO CURRENT BLOCK OF STRING
35Ø6  ØØØØ  CRSTOT,Ø                 /TEMPORARY STORAGE
      36ØØ  *36ØØ
-------------------------------------/HIGH-SPEED TRANSMIT SERVICE
-------------------------------------/
-------------------------------------/OUTPUTS THE OUTPUT STRING TO THE 637
-------------------------------------/
      4431  CXIS=JMS  I  CXISØ
      4Ø56  CXPUT=JMS  CXPUTØ
      5456  CXGET=JMP  I  CXPUTØ
36ØØ  ØØØØ  CXIS1,Ø                  /HIGH-SPEED TRANSMIT SERVICE
36Ø1  162Ø  TAD  I  CXBP             /BUFFER FULL?
36Ø2  764Ø  SZA  CLA
36Ø3  56ØØ  JMP  I  CXIS1            /YES, RETURN
36Ø4  5456  CXGET                    /NO, GET NEXT CHARACTER
            CXPUT1,                  /CHARACTER IN AC
36Ø5  ØØ71  AND  O377                /STRIP TO 8 BITS
36Ø6  1Ø72  TAD  O4ØØØ               /ADD SIGN BIT
36Ø7  362Ø  DCA  I  CXBP             /PUT IN BUFFER
361Ø  222Ø  ISZ  CXBP                /STEP BUFFER POINTER
3611  2222  ISZ  CXCNT               /END OF BUFFER?
3612  52Ø1  JMP  CXIS1+1             /NO, CONTINUE FILLING BUFFER
3613  1221  TAD  CXBK                /YES, WRAP AROUND
3614  322Ø  DCA  CXBP
3615  1223  TAD  CXCNK
3616  3222  DCA  CXCNT
3617  52Ø1  JMP  CXIS1+1             /CONTINUE FILLING BUFFER
362Ø  Ø24Ø  CXBP, CHOBF              /BUFFER POINTER
3621  Ø24Ø  CXBK, CHOBF              /BUFFER POINTER RESET
3622  774Ø  CXCNT, -4Ø               /EXHAUST COUNTER
3623  774Ø  CXCNK, -4Ø               /EXHAUST COUNTER RESET
-------------------------------------/
      4432  CXPAR=JMS  I  CXPARØ
3624  ØØØØ  CXPAR1,Ø                 /GENERATE PARITY ON CHAR IN AC
3625  ØØ67  AND  O177                /TRIM TO 7 BITS
3626  3146  DCA  TTCHAR
3627  1146  TAD  TTCHAR
363Ø  1123  TAD  TABLE               /GENERATE CHAR TABLE ADX
3631  3165  DCA  CXTEMP
3632  1565  TAD  I  CXTEMP           /GET TABLE ENTRY
3633  7Ø1Ø  RAR
3634  ØØ7Ø  AND  O2ØØ                /EXTRACT PARITY BIT
3635  1146  TAD  TTCHAR              /ADD 7 DATA BITS
3636  5624  JMP  I  CXPAR1           /RETURN WITH CHAR IN AC
-------------------------------------/
            CXGET1,                  /BEGINNING OF OUTPUT ANALYSIS
3637  1Ø75  TAD  O7774               /SEND FOUR "SYN" CHARS
364Ø  3165  DCA  CXTEMP
3641  1174  TAD  CXSYNK
3642  4Ø56  CXPUT
3643  2165  ISZ  CXTEMP
3644  5241  JMP  .-3
3645  11Ø2  TAD  RACK                /GET LAST ACK'D BLOCK NUMBER
3646  31Ø3  DCA  TACK
3647  1166  TAD  CXACKK              /SEND AN "ACK"
365Ø  4Ø56  CXPUT
3651  11Ø3  TAD  TACK                /SEND ACK NUMBER
3652  4432  CXPAR                    /WITH EVEN PARITY
3653  4Ø56  CXPUT
3654  11Ø3  TAD  TACK                /SEND CPL ACK NO,
3655  7Ø4Ø  CMA
3656  4432  CXPAR                    /WITH EVEN PARITY
3657  4Ø56  CXPUT
366Ø  445Ø  CXTEXT                   /SEND ANY AND ALL TEST BLOCKS
3661  1Ø75  TAD  O7774               /SEND FOUR "ETB"/"DEL" PAIRS
3662  3165  DCA  CXTEMP
3663  117Ø  TAD  CXETBK
3664  4Ø56  CXPUT
3665  1167  TAD  CXDELK
3666  4Ø56  CXPUT
3667  2165  ISZ  CXTEMP
367Ø  5263  JMP  .-5
```

```
A      B     C                              D
3671  5237  JMP  CXGETI                     /DONE, RETURN FOR NEXT MESSAGE
                                            /
      4ØØØ  *4ØØØ
                                            /SEND OUTPUT STRING TO D-3Ø
                                            /
      455Ø  CXTEXT=JMS  I  CXTEXØ
4ØØØ  ØØØØ  CXTEX1,Ø                        /SEND OUTPUT STRING
4ØØ1  311Ø  DCA  FOUTS                      /ZERO OUTPUT STRING FLAG FOR S-T
4ØØ2  11Ø6  TAD  BOUTS                      /IS OUTPUT STRING VACUOUS?
4ØØ3  745Ø  SNA
4ØØ4  56ØØ  JMP  I  CXTEX1                  /YES, RETURN IMMEDIATELY
4ØØ5  3161  DCA  CXOTP                      /NO, INITIALIZE CURRENT ADX
4ØØ6  2175  ISZ  CREXX                      /STEP RETRANSMISSION COUNTER
4ØØ7  72ØØ  CLA
4Ø1Ø  11Ø5  TAD  FACK                       /GET FIRST BLOCK NUMBER IN OUTS
4Ø11  3162  DCA  CXBLN                      /INITIALIZE CURRENT BLOCK NUMBER
            CXNXBL,                         /START OUTPUT BLOCK
4Ø12  2162  ISZ  CXBLN                      /STEP BLOCK NUMBER
4Ø13  2161  ISZ  CXOTP                      /GET FIRST CHARACTER OF BLOCK
4Ø14  1561  TAD  I  CXOTP                   / WHICH IS THE LINE NUMBER
4Ø15  3163  DCA  CXLINE                     / COMPLETE WITH CONTROL BIT
4Ø16  1173  TAD  CXSOHK                     / SEND "SOH"
4Ø17  4Ø56  CXPUT
4Ø2Ø  1162  TAD  CXBLN                      /SEND BLOCK NUMBER
4Ø21  4432  CXPAR                           /WITH EVE PARITY
4Ø22  4Ø56  CXPUT
4Ø23  1162  TAD  CXBLN                      /SEND CPL  BLOCK NUMBER
4Ø24  7Ø4Ø  CMA
4Ø25  4432  CXPAR                           /WITH EVEN PARITY
4Ø26  4Ø56  CXPUT
4Ø27  1163  TAD  CXLINE                     /SEND LINE NUMBER
4Ø3Ø  4432  CXPAR                           /WITH EVEN PARITY
4Ø31  4Ø56  CXPUT
4Ø32  1163  TAD  CXLINE                     /SEND CPL LINE NUMBER
4Ø33  7Ø4Ø  CMA
4Ø34  4432  CXPAR                           /WITH EVEN PARITY
4Ø35  4Ø56  CXPUT
4Ø36  1172  TAD  CXSTXK                     /SEND "STX"
4Ø37  4Ø56  CXPUT
4Ø4Ø  3164  DCA  CXSUM                      /INITIALIZE LONGITUDINAL REGISTER
            CXNXCH,                         /CHARACTER LOOP
4Ø41  1161  TAD  CXOPT                      /IS CURRENT SEGMENT EXHAUSTED?
4Ø42  7ØØ1  IAC                             / I.E., IS ADX=15 MOD 16?
4Ø43  ØØ63  AND  O17
4Ø44  764Ø  SZA  CLA
4Ø45  5253  JMP  CXGTCH                     /NO, CONTINUE
4Ø46  1161  TAD  CXOPT                      /YES, GET CURRENT ADX
4Ø47  ØØ73  AND  Ø776Ø                      /GENERATE CURRENT SEG ADX
4Ø5Ø  3161  DCA  CXOTP
4Ø51  1561  TAD  I  CXOTP                   /LINK TO NEXT SEGMENT
4Ø52  3161  DCA  CXOTP                      /UPDATE CURRENT ADX
            CXGTCH,
4Ø53  2161  ISZ  CXOPT                      /STEP CURRENT ADX
4Ø54  1561  TAD  I  CXOTP                   /GET CHARACTER
4Ø55  751Ø  SPA                             /END-OF-BLOCK SENTINEL?
4Ø56  5265  JMP  CXETX                      /YES
4Ø57  1164  TAD  CXSUM                      /NO, UPDATE LONGITUDINAL REGISTER
4Ø6Ø  3164  DCA  CXSUM
4Ø61  1561  TAD  I  CXOTP                   /SEND CHARACTER
4Ø62  4432  CXPAR                           /GENERATE PARITY JUST IN CASE
4Ø63  4Ø56  CXPUT
4Ø64  5241  JMP  CXNXCH                     /GO GET NEXT CHARACTER
            CXETX,                          /END OF BLOCK
4Ø65  72ØØ  CLA
4Ø66  1171  TAD  CXETXK                     /SEND "ETX"
4Ø67  4Ø56  CXPUT
4Ø7Ø  1164  TAD  CXSUM                      /GET SUM OF ALL CHARACTERS
4Ø71  1171  TAD  CXETXK                     /INCLUDING "ETX"
4Ø72  7Ø41  CIA                             /GENERATE LP CHARACTER AND SEND IT
4Ø73  4432  CXPAR                           /MUST HAVE EVEN PARITY
4Ø74  4Ø56  CXPUT
4Ø75  1161  TAD  CXOTP                      /GET CURRENT ADX
4Ø76  ØØ73  AND  O776Ø                      /GENERATE CURRENT SEG ADX
4Ø77  3161  DCA  CXOTP
41ØØ  1561  TAD  I  CXOTP                   /GET LINK TO NEXT SEGMENT
41Ø1  745Ø  SNA                             /ANY MORE BLOCKS IN OUTPUT STRING?
41Ø2  56ØØ  JMP  I  CXTEX1                  /NO, RETURN
41Ø3  3161  DCA  CXOTP                      /YES, UPDATE CURRENT ADX
41Ø4  5212  JMP  CXNXBL                     /GO OUTPUT NEXT BLOCK
                                            /
                                            /MEMORY POT ALLOCATION SUBROUTINES
                                            /MUST CALL THESE RTNS WITH IOF
                                            /
      4433  GETSEG=JMS  I  GETSEØ           /ALLOCATE A SEGMENT
41Ø5  ØØØØ  GETSE1,Ø
41Ø6  72ØØ  CLA                             /GET NEXT AVAIL SEG ADX
41Ø7  11Ø1  TAD  NASP                       /SAME IT IN TEMP
411Ø  3Ø77  DCA  SEG1                       /UPDATE NASP
4111  15Ø1  TAD  I  NASP                    /HAVE WE EXHAUSTED THE POT
4112  745Ø  SNA                             /YES. PANIC INSTANTLY * * *
4113  4436  HWLOAD
4114  31Ø1  DCA  NASP                       /RETURN WITH SEG ADX IN AC
4115  1Ø77  TAD  SEG1
4116  57Ø5  JMP  I  GETSE1
                                            /
      4434  RELSEG=JMS  I  RELSEØ           /DEALLOCATE A SEGMENT
4117  ØØØØ  RELSE1,Ø                        /SEG ADX IN AC ON ENTRY
412Ø  3Ø77  DCA  SEG1                       /LINK SEGMENT ONTO AVAILABLE
4121  11Ø1  TAD  NASP
4122  3477  DCA  I  SEG1                    /UPDATE NASP
4123  1Ø77  TAD  SEG1
4124  31Ø1  DCA  NASP                       /RETURN
4125  5717  JMP  I  RELSE1
                                            /
      4435  RELSTR=JMS  I  RELSTØ           /RELEASE A STRING OF SEGS
4126  ØØØØ  RELST1,Ø                        /START ADX IN SEG1, END IN SEG2
4127  72ØØ  CLA
```

```
        A     B    C                               D
------ 413Ø  11Ø1 TAD  NASP                     /LINK STRING ONTO AVAILABLE
------ 4131  35ØØ DCA  I  SEG2
------ 4132  1Ø77 TAD  SEG1                     /UPDATE NASP
------ 4133  31Ø1 DCA  NASP
------ 4134  5726 JMP  I  RELST1                /RETURN
------------------------------------------------ /REAL-TIME AND SPARE-TIME DRIVERS
------------------------------------------------ /
------------------ INTER1,                      /INTERRUPT ENTERS HERE
------ 4135  6431 TT8SKP                        /68Ø CLOCK FLAG?
------ 4136  741Ø SKP
------ 4137  5423 TSDIS                         /YES, SERVICE
------ 414Ø  6351 SRF                           /637 RECEIVE FLAG?
------ 4141  542Ø CBRIS                         /YES, SERVICE
------ 4142  6311 STF                           /637 XMIT FLAG?
------ 4143  5421 CBXIS                         /YES, SERVICE
------ 4144  6321 SEF                           /637 END FLAG?
------ 4145  5422 CBEIS                         /YES, SERVICE
------ 4146  67Ø1 ADFSRF                        /ADF RING FLAG?
------ 4147  741Ø SKP
------ 415Ø  5424 ADFRIS                        /YES, SERVICE
------ 4151  6711 ADFSCF                        /ADF CARRIER FLAG?
------ 4152  741Ø SKP
------ 4153  5425 ADFCIS                        /YES, SERVICE
------ 4154  6Ø32 KCC                           /IF TELETYPE, CLEAR AND IGNORE
------ 4155  6Ø42 TCF
------ 4156  6ØØ1 ION                           /IF NOBODY SPECIAL, EXIT
------ 4157  54ØØ JMP  I  Ø
------------------------------------------------ /
------------------ STIME1,                      /SPARE TIME DRIVER
------ 416Ø  4452 PRACK                         /PROCESS ACK'S
------ 4161  4451 PINFR                         /PROCESS INFORM TABLE ENTRIES
------ 4162  4447 PCTRL                         /PROCESS CONTROL TABLE ENTRIES
------ 4163  6334 STR                           /SET 637 TERMINAL READY
------ 4164  6344 CRE                           /CLEAR 637 RING ENABLE
------ 4165  67Ø4 ADFEDF                        /ENABLE ADF DATAPHONE FEATURES
------ 4166  76Ø4 LAS                           /VISUAL INSPECTION OF MEMORY (VIM)
------ 4167  3375 DCA  VIMX
------ 417Ø  1775 TAD  I  VIMX
------ 4171  2376 ISZ  VIMC                     /DELAY FOR VISIBILITY
------ 4172  5371 JMP  , -1
------ 4173  72ØØ CLA
------ 4174  536Ø JMP  STIME1
------ 4175  ØØØØ VIMX,Ø
------ 4176  ØØØØ VIMC,Ø
------------------------------------------------
------------ 42ØØ *42ØØ
------------------------------------------------ /PROCESS "ACK" FROM D-3Ø
------------------------------------------------ /THIS ROUTINE CLEANS UP THOSE BLOCKS IN
------------------------------------------------ /THE OUTPUT STRING WHICH HAVE BEEN ACK'D
------------------------------------------------ /BY THE D-3Ø, AND RELEASES THE UNNEEDED
------------------------------------------------ /SEGMENTS TO AVAILABLE POT,
------------------------------------------------ /
------------ 4452 PRACK=JMS  I  PRACKØ
------ 42ØØ  ØØØØ PRACK1,Ø                      /PROCESS ACK'S FROM D-3Ø
------ 42Ø1  1313 TAD  PRFLAG                   /PHASE 1 OR PHASE 2 SVC?
------ 42Ø2  764Ø SZA  CLA
------ 42Ø3  5276 JMP  PRACK2                   /PHASE 2, GO DO IT
------ 42Ø4  11Ø6 TAD  BOUTS                    /IS OUTPUT STRING VACUOUS?
------ 42Ø5  765Ø SNA  CLA
------ 42Ø6  5273 JMP  PRVAC                    /YES, SPECIAL CASE
------ 42Ø7  11Ø5 TAD  FACK                     /NO, DOES OUTS NEED CLEANING UP?
------ 421Ø  7Ø41 CIA
------ 4211  11Ø4 TAD  XACK
------ 4212  ØØ67 AND  O177
------ 4213  765Ø SNA  CLA
------ 4214  56ØØ JMP  I  PRACK1                /NO, EXIT
------ 4215  11Ø5 TAD  FACK                     /YES, INITIALIZE CLEAN-UP
------ 4216  3316 DCA  PRBLN
------ 4217  11Ø6 TAD  BOUTS
------ 422Ø  3314 DCA  PRORG
------ 4221  11Ø6 TAD  BOUTS
------ 4222  3315 DCA  PRADX
------------------ PRLOOK,                      /LOOK FOR SENTINEL
------ 4223  1Ø74 TAD  O7761                    /INITIALIZE COUNTER
------ 4224  3313 DCA  PRFLAG
------ 4225  1315 TAD  PRADX                    /INITIALIZE AUTO-INDEX
------ 4226  3Ø1Ø DCA  PRAX1
------ 4227  141Ø TAD  I  PRAX1                 /GET CHARACTER
------ 423Ø  771Ø SPA  CLA                      /TEST FOR SENTINEL
------ 4231  5244 JMP  PRFND                    /YES, FOUND IT
------ 4232  2313 ISZ  PRFLAG                   /END OF SEGMENT?
------ 4233  5227 JMP  ,-4                      /NO, KEEP GOING
------------------ PRNXS,
------ 4234  1715 TAD  I  PRADX                 /YES, GET NEXT SEG ADX
------ 4235  745Ø SNA                           /END OF STRING?
------ 4236  5241 JMP  ,+3                      /YES, OUT OF PHASE, TRY RECOVERY
------ 4237  3315 DCA  PRADX
------ 424Ø  5223 JMP  PRLOOK                   /KEEP LOOKING
------ 4241  11Ø4 TAD  XACK                     /TRY TO GET BACK IN PHASE
------ 4242  31Ø5 DCA  FACK
------ 4243  5253 JMP  PRSET
------------------ PRFND,                       /FOUND SENTINEL
------ 4244  2316 ISZ  PRBLN                    /STEP BLOCK NUMBER
------ 4245  1316 TAD  PRBLN                    /CLEAN-UP COMPLETE?
------ 4246  7Ø41 CIA
------ 4247  11Ø4 TAD  XACK
------ 425Ø  ØØ67 AND  O177
------ 4251  764Ø SZA  CLA
------ 4252  5234 JMP  PRNXS                    /NO, PICK OFF ANOTHER BLOCK
------------------ PRSET,
------ 4253  6ØØ2 IOF                           /YES, INTERRUPT PROTECT
------ 4254  1715 TAD  I  PRADX                 /SET NEW OUTS ORIGIN
------ 4255  31Ø6 DCA  BOUTS
------ 4256  11Ø6 TAD  BOUTS                    /EMPTY OUTS?
------ 4257  764Ø SZA  CLA
------ 426Ø  5263 JMP  ,+3                      /NO
------ 4261  1317 TAD  EOUTSK                   /YES, SET UP EMPTY CONDX
------ 4262  31Ø7 DCA  EOUTS
```

```
  A     B    C                                  D
------- 4263 1316 TAD  PRBLN                    /UPDATE BLOCK NUMBERING
------- 4264 3105 DCA  FACK
------- 4265 7240 STA                           /SET FLAG FOR R-T
------- 4266 3110 DCA  FOUTS
------- 4267 6001 ION                           /INTERRUPT ENABLE
------- 4270 7240 STA                           /SET PHASE 2 NEXT
------- 4271 3313 DCA  PRFLAG
------- 4272 5600 JMP  I  PRACK1                /EXIT
----------------- PRVAC,                        /VACUOUS OUTPUT STRING
------- 4273 1104 TAD  XACK                     /FORCE AGREEMENT JUST IN CASE
------- 4274 3105 DCA  FACK                     /CAN'T HURT(?)
------- 4275 5600 JMP  I  PRACK1                /EXIT
----------------------------------------------- /
----------------- PRACK2,                       /PHASE 2
------- 4276 1110 TAD  FOUTS                    /HAS R-T SEEN UPDATE?
------- 4277 7640 SZA  CLA
------- 4300 5600 JMP  I  PRACK1                /NO, KEEP WAITING
------- 4301 6002 IOF                           /YES, INTERRUPT PROTECT
------- 4302 1314 TAD  PRORG                    /SET UP PARAMETERS
------- 4303 3077 DCA  SEG1
------- 4304 1315 TAD  PRADX
------- 4305 3100 DCA  SEG2
------- 4306 4435 RELSTR                        /RELEASE TO AVAIL POT
------- 4307 6001 ION                           /INTERRUPT ENABLE
------- 4310 3313 DCA  PRFLAG                   /RESET TO PHASE 1
------- 4311 3175 DCA  CXREX                    /ZERO RETRANSMISSION COUNTER
------- 4312 5600 JMP  I  PRACK1                /EXIT
----------------------------------------------- /
------- 4313 0000 PRFLAG,0                      /PHASE FLAG
------- 4314 0000 PRORG,0                       /ORG OF POT TO BE FREED
------- 4315 0000 PRADX,0                       /END OF POT TO BE FREED
------- 4316 0000 PRBLN,0                       /WORKING BLOCK NUMBER
------------ 0010 PRAX1=10                      /AUTO-INDEX WORD
------- 4317 0106 EOUTSK,BOUTS                  /EMPTY OUTS CONSTANT
------------ 4400 *4400
----------------------------------------------- /PROCESS INFORM TABLE ENTRIES
----------------------------------------------- /
----------------------------------------------- /IN RESPONSE TO INFORM TABLE ENTRIES,
----------------------------------------------- /THIS ROUTINE GENERATES CONTROL BLOCKS
----------------------------------------------- /IN THE OUTPUT STRING FOR TRANSMISSION
----------------------------------------------- /TO THE D-30,
----------------------------------------------- /
------------ 4451 PINFR-JMS  I  PINFR0
------- 4400 0000 PINFR1,0                      /PROCESS INFORM TABLE ENTRIES
------- 4401 1125 TAD  INFTBL                   /INITIALIZE
------- 4402 3251 DCA  PINPTR
------- 4403 1252 TAD  PINNL
------- 4404 3253 DCA  PINCT
----------------- PINFR2,
------- 4405 2251 ISZ  PINPTR                   /STEP TO NEXT ENTRY
------- 4406 2253 ISZ  PINCT                    /ALL CHANNELS DONE?
------- 4407 7610 SKP  CLA                      /NO
------- 4410 5600 JMP  I  PINFR1                /YES, EXIT
------- 4411 6002 IOF                           /NO, INTERRUPT PROTECT
------- 4412 1651 TAV  I  PINPTR                /GET INFORM TABLE ENTRY
------- 4413 7440 SZA                           /ZERO?
------- 4414 5217 JMP  PINFR3                   /NO, PROCESS
------- 4415 6001 ION                           /YES, IGNORE AND ENABLE INTERRUPTS
------- 4416 5205 JMP  PINFR2
----------------- PINFR3,                       /FOUND NON-ZERO INFORM ENTRY
------- 4417 3254 DCA  PINENT                   /SAVE ENTRY
------- 4420 3651 DCA  I  PINPTR                /ZERO OUT TABLE
------- 4421 4433 GETSEG                        /GET A POT SEGMENT (STILL IOF)
------- 4422 6001 ION                           /INTERRUPT ENABLE
------- 4423 3255 DCA  PINSEG                   /SAVE ADX
------- 4424 1255 TAD  PINSEG                   /ALSO PUT IN AUTO-INDEX WORKING
------- 4425 3012 DCA  PINAX1
------- 4426 1252 TAD  PINNL                    /CALC CHANNEL NUMBER
------- 4427 7041 CIA
------- 4430 1253 TAD  PINCT
------- 4431 1066 TAD  O100                     /SET "CONTROL BLOCK" BIT
------- 4432 3412 DCA  I  PINAX1                /PUT IN SEGMENT
------- 4433 1254 TAD  PINENT                   /GET CONTROL BITS
------- 4434 3412 DCA  I  PINAX1                /PUT IN SEGMENT
------- 4435 1256 TAD  PINDEL                   /GET "DEL" CHARACTER
------- 4436 3412 DCA  I  PINAX1                /PUT IN SEGMENT
------- 4437 7240 STA                           /GET SENTINEL
------- 4440 3412 DCA  I  PINAX1                /PUT IN SEGMENT
------- 4441 6002 IOF                           /INTERRUPT PROTECT
------- 4442 1255 TAD  PINSEG                   /LINK THIS BLOCK ONTO OUTPUT STRING
------- 4443 3507 DCA  I  EOUTS
------- 4444 1255 TAD  PINSEG
------- 4445 3107 DCA  EOUTS
------- 4446 3507 DCA  I  EOUTS
------- 4447 6001 ION                           /INTERRUPT ENABLE
------- 4450 5205 JMP  PINFR2                   /GO TRY NEXT CHANNEL
----------------------------------------------- /
------- 4451 0000 PINPTR,0                      /POINTER TO INFORM TABLE
------- 4452 7747 PINNL,-LINES-1                /COUNTER RESET
------- 4453 0000 PINCT,0                       /COUNTER
------- 4454 0000 PINENT,0                      /SAVE ENTRY
------- 4455 0000 PINSEG,0                      /SEGMENT ADX
------- 4456 0377 PINDEL,377                    /"DEL" CHAR
------------ 0012 PINAX1=12                     /AUTO-INDEX WORKING
----------------------------------------------- /
----------------------------------------------- /HARDWARE LOAD ROUTINE
----------------------------------------------- /
----------------------------------------------- /THIS ROUTINE INITIALIZES EVERYTHING
----------------------------------------------- /
----------------------------------------------- /IF AND WHEN THE AUTO-RESTART OPTION
----------------------------------------------- /IS PROVIDED IN THE PDP-8, THIS ROUTINE
----------------------------------------------- /SHOULD RELOAD THE PROGRAM, AMOUNG OTHER
----------------------------------------------- /THINGS,
----------------------------------------------- /
------------ 4436 HWLOAD=JMS  I  HWLOA0
------- 4457 0000 HWLOA1,0                      /HARDWARE LOAD ROUTINE
------- 4460 6002 IOF                           /INTERRUPT DISABLE
```

```
A     B     C                              D
4461  74Ø2  HLT
            START1,                        /BINARY LOADER TO RETURN HERE
4462  72ØØ  CLA                            /INITIALIZE
4463  1316  TAD  HWLORG
4464  ØØ73  AND  O776Ø
4465  332Ø  DCA  HWLADX
4466  1317  TAD  HWLLEN
4467  ØØ73  AND  O776Ø
447Ø  7112  CLL  RTR
4471  7Ø12  RTR
4472  7Ø41  CIA
4473  3321  DCA  HWLCNT
            HWLPIN,                        /INITIALIZE POT
447Ø  132Ø  TAD  HWLADX                    /GET SEGMENT ADX
4475  1Ø64  TAD  O2Ø                       /CALC NEXT SEG ADX
4476  372Ø  DCA  I  HWLADX                 /CREATE LINKAGE
4477  172Ø  TAD  I  HWLADX                 /UPDATE POINTER
45ØØ  332Ø  DCS  HWLADX
45Ø1  2321  ISZ  HWLCNT                    /DONE?
45Ø2  5274  JMP  HWLPIN                    /NO, CONTINUE
45Ø3  372Ø  DCA  I  HWLADX                 /YES, PANIC FLAG IN LAST SEG
45Ø4  1316  TAD  HWLORG                    /INITIALIZE NASP
45Ø5  31Ø1  DCA  NASP
45Ø6  6434  TT8ON                          /ENABLE 68Ø
45Ø7  67Ø4  ADFEDF                         /ENABLE ADF
451Ø  1174  TAD  CXSYNK                    /ENABLE 637 CLOCKS (XMIT)
4511  63Ø3  TAC  CTF
4512  5311  JMP  ,-1
4513  72ØØ  CLA
4514  6ØØ1  ION                            /INTERRUPT ENABLE
4515  5441  JMP  I  STIMEØ                 /ENTER SPARE TIME
---------------------------------------------------------------
4516  5ØØØ  HWLORG, POTORG                 /BEGINNING OF POT
4517  256Ø  HWLLEN, POTEND-POTORG          /POT LENGTH
452Ø  ØØØØ  HWLADX, Ø                      /WORKING
4521  ØØØØ  HWLCNT, Ø                      /WORKING
---------------------------------------------------------------
            PCTADI,                        /BIT TABLE FOR ADF
4522  ØØØ1  1
4523  ØØØ2  2
4524  ØØØ4  4
4525  ØØ1Ø  1Ø
4526  ØØ2Ø  2Ø
4527  ØØ4Ø  4Ø
453Ø  Ø1ØØ  1ØØ
4531  Ø2ØØ  2ØØ
                                           /
      46ØØ  *46ØØ
                                           /PROCESS CONTROL TABLE ENTRIES
                                           /
                                           /IN RESPONSE TO CONTROL TABLE ENTRIES,
                                           /THIS ROUTINE PERFORMS THE REQUESTED
                                           /CONTROL FUNCTION,
      4447  PCTRL=JMS I PCTRLØ
46ØØ  ØØØØ  PCTRL1, Ø                      /PROCESS CONTROL TABLE ENTRIES
46Ø1  1124  TAD  CRL  TBL                  /INITIALIZE
46Ø2  3371  DCA  PCTPTR
46Ø3  1372  TAD  PCTNL
46Ø4  3373  DCA  PCTCT
            PCTRL2,
46Ø5  2371  ISZ  PCTPTR                    /STEP TO NEXT ENTRY
46Ø6  2373  ISZ  PCTCT                     /ALL CHANNELS DONE?
46Ø7  761Ø  SKP  CLA                       /NO
461Ø  56ØØ  JMP  I  PCTRL1                 /YES, EXIT
4611  6ØØ2  IOF                            /NO, INTERRUPT PROTECT
4612  1771  TAD  I  PCTPTR                 /GET CONTROL TABLE ENTRY
4613  744Ø  SZA                            /ZERO?
4614  5217  JMP  PCTRL3                     /NO, PROCESS
4615  6ØØ1  ION                            /YES, IGNORE AND ENABLE INTERRUPTS
4616  52Ø5  JMP  PCTRL2
            PCTRL3,                        /FOUND NON-ZERO CONTROL ENTRY
4617  3374  DCA  PCTENT                     /SAVE ENTRY
462Ø  3771  DCA  I  PCTPTR                 /ZERO OUT TABLE
4621  6ØØ1  ION                            /INTERRUPT ENABLE
4622  1372  TAD  PCTNL                     /CALC CHANNEL NUMBER
4623  7Ø41  CIA
4624  1373  TAD  PCTCT
4625  3377  DCA  PCTCH
4626  1374  TAD  PCTENT                     /HARDWARE LOAD COMMAND?
4627  Ø122  AND  CRLHWL
463Ø  764Ø  SZA  CLA
4631  4436  HWLOAD                         /YES DO IT
4632  1374  TAD  PCTENT                     /INPUT DELETE COMMAND
4633  Ø121  AND  CRLDIN
4634  764Ø  SZA  CLA
4635  4274  JMS  PCTDIN                     /YES DO IT
4636  1374  TAD  PCTENT                     /OUTPUT DELETE COMMAND?
4637  Ø12Ø  AND  CLRDEL
464Ø  764Ø  SZA  CLA
4641  4253  JMS  PCTDEL                     /YES DO IT
4642  1374  TAD PCTENT                      /HANG UP THE PHONE COMMAND?
4643  Ø117  AND  CRLHAN
4644  764Ø  SZA  CLA
4645  4326  JMS  PCTHAN                     /YES DO IT
4646  1374  TAD  PCTENT                     /PICK UP THE PHONE COMMAND?
4647  Ø116  AND  CRLPIC
465Ø  764Ø  SZA  CLA
4651  4333  JMS  PCTPIC                     /YES DO IT
4652  52Ø5  J7P  PCTRL2                     /NOW GO TRY NEXT CHANNEL
                                           /
4653  ØØØØ  PCTDEL, Ø                      /DELETE OUTPUT
4654  1377  TAD  PCTCH                      /CALC ADX IN TABLE
4655  1126  TAD  TXTBL
4656  3376  DCA  PCTADX
4657  6ØØ2  IOF                            /INTERRUPT PROTECT
466Ø  1776  TAD  I  PCTADX                 /GET ADX OF CURRENT OUTPUT
4661  745Ø  SNA                            /CURRENTLY ANY OUTPUT?
4662  5324  JMP  PCTDEX                     /NO, NOTHING TO DO
```

```
      A     B    C                              D
------- 4663 ØØ73 AND  Ø776Ø                    /GET SEGMENT ADX
------- 4664 3375 DCA  PCTSEG                   /SAVE IT
------- 4665 3776 DCA  I  TCTADX                /TERMINATE OUTPUT
------- 4666 6ØØ1 ION                           /INTERRUPT ENABLE
------- 4667 1375 TAD  PCTSEG                   /INITIALIZ END SEARCH
------- 467Ø 3376 DCA  PCTADX
------- 4671 1776 TAD  I  PCTADX                /LAST SEG OF OUTPUT?
------- 4672 744Ø SZA
------- 4673 527Ø J7P  ,-3                      /NO, KEEP LOOKING
----------------------------------------------- /
------- 4674 ØØØØ PCTDIN, Ø                     /DELETE INPUT
------- 4675 1377 TAD  PCTCH                    /CALC ADX IN TABLE
------- 4676 71Ø4 CLL  RAL
------- 4677 1127 TAD  TRTBL
------- 47ØØ 3376 DCA  PCTADX
------- 47Ø1 6ØØ2 IOF
------- 47Ø2 1776 TAD  I  PCTADX                /SET UP PARAMETERS TO DELETE POT
------- 47Ø3 3Ø77 DCA  SEG1
------- 47Ø4 2376 ISZ  PCTADX
------- 47Ø5 1776 TAD  I  PCTADX
------- 47Ø6 ØØ73 AND  Ø776Ø
------- 47Ø7 31ØØ DCA  SEG2
------- 471Ø 3776 DCA  I  PCTADX
------- 4711 11ØØ TAD  SEG2                     /TEST IF VACUOUS STRING
------- 4712 764Ø SZA  CLA
------- 4713 4435 RELSTR                        /IF NOT, RELEASE POT STRING
------- 4714 6ØØ1 ION
------- 4715 5674 JMP  I  PCTDIN                /RETURN
------- 4716 6ØØ2 IOF                           /INTERRUPT PROTECT
------- 4717 1376 TAD  PCTADX                   /RELEASE POT
------- 472Ø 31ØØ DCA  SEG2
------- 4721 1375 TAD  PCTSEG
------- 4722 3Ø77 DCA  SEG1
------- 4723 4435 RELSTR
----------------- PCTDEX,
------- 4724 6ØØ1 ION                           /INTERRUPT ENABLE
------- 4725 5653 JMP  I  PCTDEL                /RETURN
----------------------------------------------- /
------- 4726 ØØØØ PCTHAN, Ø                     /HANG UP THE PHONE
------- 4727 4341 JMS  PCTADF                   /SET UP GROUP AND AC
------- 473Ø 6724 ADFCTR                        /CLEAR TERMINAL READY
------- 4731 6ØØ1 ION                           /INTERRUPT ENABLE
------- 4732 5726 JMP  I  PCTHAN                /RETURN
----------------------------------------------- /
------- 4733 ØØØØ PCTPIC, Ø                     /PICK UP THE PHONE
------- 4734 4341 JMS  PCTADF                   /SET UP GROUP AND AC
------- 4735 6722 ADFSTR                        /SET TERMINAL READY
------- 4736 6732 ADFSRS                        /SET REQUEST TO SEND
------- 4737 6ØØ1 ION                           /INTERRUPT ENABLE
------- 474Ø 5733 JMP  I  PCTPIC                /RETURN
----------------------------------------------- /
------- 4741 ØØØØ PCTADF, Ø                     /SET UP GROUP AND AC FOR ADF
------- 4742 724Ø STA
------- 4743 1377 TAD  PCTCH
------- 4744 711Ø CLL  RAR
------- 4745 711Ø CLL  RAR
------- 4746 711Ø CLL  RAR
------- 4747 7Ø41 CIA
------- 475Ø 1362 TAD  PCTADG+1                 /CONSTRUCT JUMP
------- 4751 3361 DCA  PCTADG
------- 4752 724Ø STA
------- 4753 1377 TAD  PCTCH
------- 4754 ØØ62 AND  O7
------- 4755 137Ø TAD  PCTADT
------- 4756 3376 DCA  PCTADX                   /ADX OF PROPER AC BIT
------- 4757 6ØØ2 IOF                           /INTERRUPT PROTECT
------- 476Ø 6721 ADFCTG                        /CLEAR THE GROUP
----------------- PCTADG,
------- 4761 5361 JMP  .                        /CONSTRUCTED JUMP
------- 4762 5366 JMP  .+4                      /CONSTANT
------- 4763 6731 ADFITG
------- 4764 6731 ADFITG
------- 4765 6731 ADFITG
------- 4766 1776 TAD  I  PCTADX                /SET AC BIT
------- 4767 5741 JMP  I  PCTADF                /RETURN
------- 477Ø 4522 PCTADT,PCTAD1                 /POINTER TO INFORM TABLE
------- 4771 ØØØØ PCTPTR,Ø                      /COUNTER RESET
------- 4772 7747 PCTNL,-LINES-1                /COUNTER
------- 4773 ØØØØ PCTCT,Ø                       /SAVE ENTRY
------- 4774 ØØØØ PCTETN,Ø                      /SEGMENT ADX
------- 4775 ØØØØ PCTSEG,Ø                      /WORKING ADX
------- 4776 ØØØØ PCTADX,Ø                      /CHANNEL NUMBER
------- 4777 ØØØØ PCTCH,Ø
----------------------------------------------- /
-----------------$
THERE IS 1 ERROR
```

SYMBOL TABLE / SYMBOL TABLE.—Continued

| | | | | | | | |
|---|---|---|---|---|---|---|---|
| A | 64Ø3 | ADFCTG | 6721 | ADFRI2 | 22Ø4 | BAD | ØØØ1 |
| ADFADX | 2345 | ADFCTR | 6724 | ADFRI3 | 2216 | BOUTS | Ø1Ø6 |
| ADFCCF | 6741 | ADFDDF | 6714 | ADFRRS | 67Ø2 | C | 2ØØØ |
| ADFCCT | 2344 | ADFDEC | 2311 | ADFRTB | 2327 | CBEIS | 5422 |
| ADFCIS | 5425 | ADFEDF | 67Ø4 | ADFSAC | 2346 | CBEISØ | ØØ22 |
| ADFCIØ | ØØ25 | ADFGCT | 2343 | ADFSCF | 6711 | CBEIS1 | 2Ø15 |
| ADFCI1 | 2225 | ADFITG | 6731 | ADFSLK | 2347 | CBRBK | 2Ø73 |
| ADFCI2 | 2231 | ADFOUT | 23Ø2 | ADFSRF | 67Ø1 | CBRBP | 2Ø72 |
| ADFCI3 | 2253 | ADFPTR | 2341 | ADFSRS | 6732 | CBRCNK | 2Ø75 |
| ADFCI4 | 2262 | ADFRCS | 6712 | ADFSTR | 6722 | CBRCNT | 2Ø74 |
| ADFCRF | 6742 | ADFRIS | 5424 | ADFSTS | 2342 | CBREST | 2Ø64 |
| ADFCRS | 6734 | ADFRIØ | ØØ24 | ADFSV | 2271 | CBRETB | 2Ø76 |
| ADFCTB | 2334 | ADFRI1 | 22ØØ | B | ØØØØ | CBREX | 2Ø12 |

SYMBOL TABLE.—Continued

| | | | |
|---|---|---|---|
| CBRIS | 542Ø | CRLPIC | Ø116 |
| CBRISØ | ØØ2Ø | CRLTBL | Ø124 |
| CBRIS1 | 2ØØØ | CRLTB1 | Ø74Ø |
| CBRST | 2ØØ3 | CRNXBL | 32Ø4 |
| CBSAVE | 2Ø57 | CRNXTX | 3253 |
| CBSVAC | 21Ø5 | CRORG | 35Ø4 |
| CBSVLK | 21Ø6 | CRPART | Ø155 |
| CBXBK | 21Ø2 | CRPCH | 343Ø |
| CBXBP | 21Ø1 | CRPOL | 3413 |
| CBXCNK | 21Ø4 | CRPUT | 5453 |
| CBXCNT | 21Ø3 | CRPUT1 | 32ØØ |
| CBXEM | 2Ø44 | CRSOH | 3233 |
| CBXIDL | 21ØØ | CRSTOR | 4444 |
| CBXIS | 5421 | CRSTOT | 35Ø6 |
| CBXISØ | ØØ21 | CRSTOØ | ØØ44 |
| CBXIS1 | 2Ø24 | CRSTO1 | 34ØØ |
| CBXNA | 2Ø52 | CRSTX | 3271 |
| CBXSYN | 2Ø77 | CRSUM | Ø157 |
| CCOUNT | 17Ø5 | CRSYNT | Ø153 |
| CCOUN1 | 154Ø | CRTEMP | Ø156 |
| CCSET | 17Ø6 | CRTXCH | 3277 |
| CEF | 6322 | CRTXNG | 3352 |
| CHIBF | Ø2ØØ | CRTXNP | 3351 |
| CHOBF | Ø24Ø | CRTXOK | 3317 |
| CIM | 63Ø4 | CRUPRA | 3344 |
| CRA | 6352 | CTF | 63Ø2 |
| CRACK | 3225 | CTR | 6342 |
| CRASGL | 3456 | CXACKK | Ø166 |
| CRASGN | 4445 | CXBK | 3621 |
| CRASGØ | ØØ45 | CXBLN | Ø162 |
| CRASG1 | 3434 | CXBP | 362Ø |
| CRBK | 3Ø27 | CXCNK | 3623 |
| CRBP | 3Ø26 | CXCNT | 3622 |
| CRCNK | 3Ø31 | CXDELK | Ø167 |
| CRCNT | 3Ø3Ø | CXETBK | Ø17Ø |
| CRCON | 3355 | CXETX | 4Ø65 |
| CRCT | 3356 | CXETXK | Ø171 |
| CRCTRB | 5443 | CXGET | 5456 |
| CRCTRC | 3Ø65 | CXGET1 | 3637 |
| CRCTRE | 31Ø7 | CXGTCH | 4Ø53 |
| CRCTRL | Ø154 | CXIS | 4431 |
| CRCTRN | 31Ø3 | CXISØ | ØØ31 |
| CRCTRØ | ØØ43 | CXIS1 | 36ØØ |
| CRCTR1 | 3Ø55 | CXLINE | Ø163 |
| CRCTXA | 3135 | CXNXBL | 4Ø12 |
| CRCTXB | 3136 | CXNXCH | 4Ø41 |
| CRCTXC | 3137 | CXOTP | Ø161 |
| CRCTXD | 314Ø | CXPAR | 4432 |
| CRCTXE | 3141 | CXPARØ | ØØ32 |
| CRE | 6344 | CXPAR1 | 3624 |
| CRETB | 3222 | CXPUT | 4Ø56 |
| CRETX | 3327 | CXPUTØ | ØØ56 |
| CREXPU | 4446 | CXPUT1 | 36Ø5 |
| CREXPØ | ØØ46 | CXREX | Ø175 |
| CREXP1 | 3467 | CXSOHK | Ø173 |
| CRF | 6332 | CXSTXK | Ø172 |
| CRGET | 4Ø53 | CXSUM | Ø164 |
| CRGETØ | ØØ53 | CXSYNK | Ø174 |
| CRGET1 | 3ØØ1 | CXTEMP | Ø165 |
| CRGTPR | 4442 | CXTEXT | 445Ø |
| CRGTPØ | ØØ42 | CXTEXØ | ØØ5Ø |
| CRGTP1 | 3Ø33 | CXTEX1 | 4ØØØ |
| CRGWA | 3Ø32 | EOUTS | Ø1Ø7 |
| CRIGN | 3223 | EOUTSK | 4317 |
| CRINP | 35Ø5 | EVEN | ØØØØ |
| CRIS | 443Ø | FACK | Ø1Ø5 |
| CRISØ | ØØ3Ø | FOUTS | Ø11Ø |
| CRIS1 | 3ØØØ | GETSEG | 4433 |
| CRLDEL | Ø12Ø | GETSEØ | ØØ33 |
| CRLDIN | Ø121 | GETSE1 | 41Ø5 |
| CRLHAN | Ø117 | HWLADX | 452Ø |
| CRLHWL | Ø122 | HWLCNT | 4521 |
| CRLINE | Ø16Ø | HWLLEN | 4517 |

SYMBOL TABLE.—Continued

| | | | |
|---|---|---|---|
| HWLOAD | 4436 | PRAX1 | ØØ1Ø |
| HWLOAØ | ØØ36 | PRBLN | 4316 |
| HWLOA1 | 4457 | PRFLAG | 4313 |
| HWLORG | 4516 | PRFND | 4244 |
| HWLPIN | 4474 | PRLOOK | 4223 |
| IGNORE | 1ØØØ | PRNXS | 4234 |
| INFTBL | Ø125 | PRORG | 4314 |
| INFTB1 | Ø71Ø | PRSET | 4253 |
| INTERØ | ØØ37 | PRVAC | 4273 |
| INTER1 | 4135 | RACK | Ø1Ø2 |
| LINES | ØØ3Ø | RELSEG | 4434 |
| LINES8 | ØØØ3 | RELSEØ | ØØ34 |
| MSGCON | Ø113 | RELSE1 | 4117 |
| MSGDIS | Ø114 | RELSTR | 4435 |
| MSGOUT | Ø111 | RELSTØ | ØØ35 |
| MSGPOT | Ø115 | RELST1 | 4126 |
| MSGRNG | Ø112 | RRB | 6312 |
| NASP | Ø1Ø1 | SEF | 6321 |
| ODD | Ø4ØØ | SEG1 | ØØ77 |
| O1ØØ | ØØ66 | SEG2 | Ø1ØØ |
| O17 | ØØ63 | SIM | 6314 |
| O177 | ØØ67 | SRE | 6324 |
| O2Ø | ØØ64 | SRF | 6351 |
| O2ØØ | ØØ7Ø | SRI | 6331 |
| O377 | ØØ71 | SSR | 6341 |
| O4 | ØØ61 | STARTØ | ØØ4Ø |
| O4ØØØ | ØØ72 | START1 | 4462 |
| O7 | ØØ62 | STF | 6311 |
| O77 | ØØ65 | STIMEØ | ØØ41 |
| O776Ø | ØØ73 | STIME1 | 416Ø |
| O7761 | ØØ74 | STR | 6334 |
| O7774 | ØØ75 | TABLE | Ø123 |
| O7777 | ØØ76 | TABLE1 | 1ØØØ |
| PCTADF | 4741 | TAC | 63Ø1 |
| PCTADG | 4761 | TACK | Ø1Ø3 |
| PCTADT | 477Ø | TCHIS | 1647 |
| PCTADX | 4776 | TCHIS1 | 1541 |
| PCTAD1 | 4522 | TCSA | 17Ø3 |
| PCTCH | 4777 | TCSVLK | 17Ø2 |
| PCTCT | 4773 | TCSVLN | 17Ø1 |
| PCTDEL | 4653 | TCSVØ | 17Ø4 |
| PCTDEX | 4724 | TRAX1 | ØØ14 |
| PCTDIN | 4674 | TRBR | 2435 |
| PCTENT | 4774 | TRCAN | 2451 |
| PCTHAN | 4726 | TRCHN | 2527 |
| PCTNL | 4772 | TRIGN | 245Ø |
| PCTPIC | 4733 | TRINP | 2531 |
| PCTPTR | 4771 | TRIS | 4427 |
| PCTRL | 4447 | TRISØ | ØØ27 |
| PCTRLØ | ØØ47 | TRIS1 | 24ØØ |
| PCTRL1 | 46ØØ | TRNOR | 2444 |
| PCTRL2 | 46Ø5 | TRNUL | 2451 |
| PCTRL3 | 4617 | TRORG | 253Ø |
| PCTSEG | 4775 | TRPCH | 2524 |
| PINAX1 | ØØ12 | TRPOL | 25Ø7 |
| PINCT | 4453 | TRPUT | 2472 |
| PINDEL | 4456 | TRRET | 2451 |
| PINENT | 4454 | TRTBL | Ø127 |
| PINFR | 4451 | TRTBL1 | Ø63Ø |
| PINFRØ | ØØ51 | TRTEMP | 2532 |
| PINFR1 | 44ØØ | TTCHAR | Ø146 |
| PINFR2 | 44Ø5 | TTCL | 6411 |
| PINFR3 | 4417 | TTI | 64Ø2 |
| PINNL | 4452 | TTINCR | 64Ø1 |
| PINPTR | 4451 | TTO | 64Ø4 |
| PINSEG | 4455 | TTRL | 6414 |
| POTEND | 756Ø | TTSL | 6412 |
| POTORG | 5ØØØ | TT8OF | 6432 |
| PRACK | 4452 | TT8ON | 6434 |
| PRACKØ | ØØ52 | TT8SKP | 6431 |
| PRACK1 | 42ØØ | TXAX1 | ØØ13 |
| PRACK2 | 4276 | TXAX2 | ØØ14 |
| PRADX | 4315 | TXCHN | 2714 |

SYMBOL TABLE.—Continued

| | | | |
|---|---|---|---|
| TXCHS | 2615 | XACK | Ø1Ø4 |
| TXCNT | 2713 | B | ØØØØ |
| TXETX | 2677 | EVEN | ØØØØ |
| TXGCH | 2667 | BAD | ØØØ1 |
| TXIS | 4426 | LINES8 | ØØØ3 |
| TXISØ | ØØ26 | PRAX1 | ØØ1Ø |
| TXIS1 | 26ØØ | PINAX1 | ØØ12 |
| TXNLS | 2712 | TXAX1 | ØØ13 |
| TXNX | 2612 | TXAX2 | ØØ14 |
| TXOTP | 2715 | TRAX1 | ØØ14 |
| TXBL | Ø126 | T8AX1 | ØØ15 |
| TXTBL1 | Ø6ØØ | T8AX2 | ØØ16 |
| TXTEMP | 2716 | T8AX3 | ØØ17 |
| TXWRT | 2651 | CBRISØ | ØØ2Ø |
| T8AX1 | ØØ15 | CBXISØ | ØØ21 |
| T8AX2 | ØØ16 | CBEISØ | ØØ22 |
| T8AX3 | ØØ17 | T8DISØ | ØØ23 |
| T8BFK | Ø131 | ADFRIØ | ØØ24 |
| T8CNT1 | Ø143 | ADFCIØ | ØØ25 |
| T8CNT2 | Ø144 | TXISØ | ØØ26 |
| T8CNT3 | Ø145 | TRISØ | ØØ27 |
| T8CNT4 | 1646 | CRISØ | ØØ3Ø |
| T8COM | 1421 | LINES | ØØ3Ø |
| T8COMØ | 1425 | CXISØ | ØØ31 |
| T8COM1 | 1432 | CXPARØ | ØØ32 |
| T8COM3 | 1437 | GETSEØ | ØØ33 |
| T8COM5 | 1463 | RELSEØ | ØØ34 |
| T8COM6 | 15Ø4 | RELSTØ | ØØ35 |
| T8COM8 | 1526 | HWLOAØ | ØØ36 |
| T8DIS | 5423 | INTERØ | ØØ37 |
| T8DISØ | ØØ23 | STARTØ | ØØ4Ø |
| T8DIS1 | 14ØØ | STIMEØ | ØØ41 |
| T8DIS2 | 1412 | CRGTPØ | ØØ42 |
| T8DIS3 | 1416 | CRCTRØ | ØØ43 |
| T8IBF | Ø3ØØ | CRSTOØ | ØØ44 |
| T8IN | Ø44Ø | CRASGØ | ØØ45 |
| T8INFL | Ø13Ø | CREXPØ | ØØ46 |
| T8INON | 1644 | PCTRLØ | ØØ47 |
| T8INS | 1622 | CXTEXØ | ØØ5Ø |
| T8K1 | 1542 | PINFRØ | ØØ51 |
| T8K11 | 162Ø | PRACKØ | ØØ52 |
| T8K12 | 1621 | CRGETØ | ØØ53 |
| T8K2 | 1545 | CXPUTØ | ØØ56 |
| T8K3 | 1546 | O4 | ØØ61 |
| T8K36 | Ø142 | O7 | ØØ62 |
| T8K5 | 1547 | O17 | ØØ63 |
| T8K6 | 155Ø | O2Ø | ØØ64 |
| T8K7 | Ø133 | O77 | ØØ65 |
| T8K8 | Ø134 | O1ØØ | ØØ66 |
| T8K9 | 1551 | O177 | ØØ67 |
| T8LC | 1537 | O2ØØ | ØØ7Ø |
| T8LN | 1544 | O377 | ØØ71 |
| T8MNC | 1543 | O4ØØØ | ØØ72 |
| T8NL | Ø132 | O776Ø | ØØ73 |
| T8OBF | Ø36Ø | O7761 | ØØ74 |
| T8OBF2 | Ø41Ø | O7774 | ØØ75 |
| T8OCH | 4536 | O7777 | ØØ76 |
| T8OCHS | 161Ø | SEG1 | ØØ77 |
| T8OTK2 | Ø141 | SEG2 | Ø1ØØ |
| T8OUTK | Ø14Ø | NASP | Ø1Ø1 |
| T8OUTS | 16ØØ | RACK | Ø1Ø2 |
| T8SA | Ø147 | TACK | Ø1Ø3 |
| T8SIN | Ø137 | XACK | Ø1Ø4 |
| T8SIR | 4537 | FACK | Ø1Ø5 |
| T8SOCH | Ø136 | BOUTS | Ø1Ø6 |
| T8SOF | 4535 | EOUTS | Ø1Ø7 |
| T8SOUT | Ø135 | FOUTS | Ø11Ø |
| T8SVLK | Ø15Ø | MSGOUT | Ø111 |
| T8SVLN | Ø152 | MSGRNG | Ø112 |
| T8SVØ | Ø151 | MSGCON | Ø113 |
| T8WA | 1617 | MSGDIS | Ø114 |
| VIMC | 4176 | MSGPOT | Ø115 |
| VIMX | 4176 | CRLPIC | Ø116 |

SYMBOL TABLE.—Continued

| | | | |
|---|---|---|---|
| CRLHAN | Ø117 | T8K1 | 1542 |
| CRLDEL | Ø12Ø | T8MNC | 1543 |
| CRLDIN | Ø121 | T8LN | 1544 |
| CRLHWL | Ø122 | T8K2 | 1545 |
| TABLE | Ø123 | T8K3 | 1546 |
| CRLTBL | Ø124 | T8K5 | 1545 |
| INFTBL | Ø125 | T8K6 | 155Ø |
| TXTBL | Ø126 | T8K9 | 1551 |
| TRTBL | Ø127 | T8OUTS | 16ØØ |
| T8INFL | Ø13Ø | T8OCHS | 161Ø |
| T8BFK | Ø131 | T8WA | 1617 |
| T8NL | Ø132 | T8K11 | 162Ø |
| T8K7 | Ø133 | T8K12 | 1621 |
| T8K8 | Ø134 | T8INS | 1622 |
| T8SOUT | Ø135 | T8INON | 1644 |
| T8SOCH | Ø136 | T8CNT4 | 1646 |
| T8SIN | Ø137 | TCHIS | 1647 |
| T8OUTK | Ø14Ø | TCSVLN | 17Ø1 |
| T8OTK2 | Ø141 | TCSVLK | 17Ø2 |
| T8K36 | Ø142 | TCSA | 17Ø3 |
| T8CNT1 | Ø143 | TCSVØ | 17Ø4 |
| T8CNT2 | Ø144 | CCOUNT | 17Ø5 |
| T8CNT3 | Ø145 | CCSET | 17Ø6 |
| TTCHAR | Ø146 | C | 2ØØØ |
| T8SA | Ø147 | CBRIS1 | 2ØØØ |
| T8SVLK | Ø15Ø | CBRST | 2ØØ3 |
| T8SVØ | Ø151 | CBREX | 2Ø12 |
| T8SVLN | Ø152 | CBEIS1 | 2Ø15 |
| CRSYNT | Ø153 | CBXIS1 | 2Ø24 |
| CRCTRL | Ø154 | CBXEM | 2Ø44 |
| CRPART | Ø155 | CBXNA | 2Ø52 |
| CRTEMP | Ø156 | CBSAVE | 2Ø57 |
| CRSUM | Ø157 | CBREST | 2Ø64 |
| CRLINE | Ø16Ø | CBRBP | 2Ø72 |
| CXOTP | Ø161 | CBRBK | 2Ø73 |
| CXBLN | Ø162 | CBRCNT | 2Ø74 |
| CXLINE | Ø163 | CBRCNK | 2Ø75 |
| CXSUM | Ø164 | CBRETB | 2Ø76 |
| CXTEMP | Ø165 | CBXSYN | 2Ø77 |
| CXACKK | Ø166 | CBXIDL | 21ØØ |
| CXDELK | Ø167 | CBXBP | 21Ø1 |
| CXETBK | Ø17Ø | CBXBK | 21Ø2 |
| CXETXK | Ø171 | CBXCNT | 21Ø3 |
| CXSTXK | Ø172 | CBXCNK | 21Ø4 |
| CXSOHK | Ø173 | CBSVAC | 21Ø5 |
| CXSYNK | Ø174 | CBSVLK | 21Ø6 |
| CXREX | Ø175 | ADFRI1 | 22ØØ |
| CHIBF | Ø2ØØ | ADFRI2 | 22Ø4 |
| CHOBF | Ø24Ø | ADFRI3 | 2216 |
| T8IBF | Ø3ØØ | ADFCI1 | 2225 |
| T8OBF | Ø36Ø | ADFCI2 | 2231 |
| ODD | Ø4ØØ | ADFCI3 | 2253 |
| T8OBF2 | Ø41Ø | ADFCI4 | 2262 |
| T8IN | Ø44Ø | ADFSV | 2271 |
| TXTBL1 | Ø6ØØ | ADFOUT | 23Ø2 |
| TRTBL1 | Ø63Ø | ADFDEC | 2311 |
| INFTB1 | Ø71Ø | ADFRTB | 2327 |
| CRLTB1 | Ø74Ø | ADFCTB | 2334 |
| IGNORE | 1ØØØ | ADFPTR | 2341 |
| TABLE1 | 1ØØØ | ADFSTS | 2342 |
| T8DIS1 | 14ØØ | ADFGCT | 2343 |
| T8DIS2 | 1412 | ADFCCT | 2344 |
| T8DIS3 | 1416 | ADFADX | 2345 |
| T8COM | 1421 | ADFSAC | 2346 |
| T8COMØ | 1425 | ADFSLK | 2347 |
| T8COM1 | 1432 | TRIS1 | 24ØØ |
| T8COM3 | 1437 | TRBR | 2435 |
| T8COM5 | 1463 | TRNOR | 2444 |
| T8COM6 | 15Ø4 | TRIGN | 245Ø |
| T8COM8 | 1526 | TRCAN | 2451 |
| T8LC | 1537 | TRNUL | 2451 |
| CCOUN1 | 154Ø | TRRET | 2451 |
| TCHIS1 | 1541 | TRPUT | 2472 |

SYMBOL TABLE—Continued

| | | | |
|---|---|---|---|
| TRPOL | 2507 | CXETX | 4065 |
| TRPCH | 2524 | GETSE1 | 4105 |
| TRCHN | 2527 | RELSE1 | 4117 |
| TRORG | 2530 | RELST1 | 4126 |
| TRINP | 2531 | INTER1 | 4135 |
| TRTEMP | 2532 | STIME1 | 4160 |
| TXIS1 | 2600 | VIMX | 4175 |
| TXNX | 2612 | VIMC | 4176 |
| TXCHS | 2615 | PRACK1 | 4200 |
| TXWRT | 2651 | PRLOOK | 4223 |
| TXGCH | 2667 | PRNXS | 4234 |
| TXETX | 2677 | PRFND | 4244 |
| TXNLS | 2712 | PRSET | 4253 |
| TXCNT | 2713 | PRVAC | 4273 |
| TXCHN | 2714 | PRACK2 | 4276 |
| TXOTP | 2715 | PRFLAG | 4313 |
| TXTEMP | 2716 | PRORG | 4314 |
| CRIS1 | 3000 | PRADX | 4315 |
| CRGET1 | 3001 | PRBLN | 4316 |
| CRBP | 3026 | EOUTSK | 4317 |
| CRBK | 3027 | PINFR1 | 4400 |
| CRCNT | 3030 | PINFR2 | 4405 |
| CRCNK | 3031 | PINFR3 | 4417 |
| CRGWA | 3032 | TXIS | 4426 |
| CRGTP1 | 3033 | TRIS | 4427 |
| CRCTR1 | 3055 | CRIS | 4430 |
| CRCTRC | 3065 | CXIS | 4431 |
| CRCTRN | 3103 | CXPAR | 4432 |
| CRCTRE | 3107 | GETSEG | 4433 |
| CRCTXA | 3135 | RELSEG | 4434 |
| CRCTXB | 3136 | RELSTR | 4435 |
| CRCTXC | 3137 | HWLOAD | 4436 |
| CRCTXD | 3140 | CRGTPR | 4442 |
| CRCTXE | 3141 | CRSTOR | 4444 |
| CRPUT1 | 3200 | CRASGN | 4445 |
| CRNXBL | 3204 | CREXPU | 4446 |
| CRETB | 3222 | PCTRL | 4447 |
| CRIGN | 3223 | CXTEXT | 4450 |
| CRACK | 3225 | PINFR | 4451 |
| CRSOH | 3233 | PINPTR | 4451 |
| CRNXTX | 3253 | PRACK | 4452 |
| CRSTX | 3271 | PINNL | 4452 |
| CRTXCH | 3277 | PINCT | 4453 |
| CRTXOK | 3317 | PINENT | 4454 |
| CRETX | 3327 | PINSEG | 4455 |
| CRUPRA | 3344 | PINDEL | 4456 |
| CRTXNP | 3351 | HWLOA1 | 4457 |
| CRTXNG | 3352 | START1 | 4462 |
| CRCON | 3355 | HWLPIN | 4474 |
| CRCT | 3356 | HWLORG | 4516 |
| CRSTO1 | 3400 | HWLLEN | 4517 |
| CRPOL | 3413 | HWLADX | 4520 |
| CRPCH | 3430 | HWLCNT | 4521 |
| CRASG1 | 3434 | PCTAD1 | 4522 |
| CRASGL | 3456 | T8SOF | 4535 |
| CREXP1 | 3467 | T8OCH | 4536 |
| CRORG | 3504 | T8SIR | 4537 |
| CRINP | 3505 | PCTRL1 | 4600 |
| CRSTOT | 3506 | PCTRL2 | 4605 |
| CXIS1 | 3600 | PCTRL3 | 4617 |
| CXPUT1 | 3605 | PCTDEL | 4653 |
| CXBP | 3620 | PCTDIN | 4674 |
| CXBK | 3621 | PCTDEX | 4724 |
| CXCNT | 3622 | PCTHAN | 4726 |
| CXCNK | 3623 | PCTPIC | 4733 |
| CXPAR1 | 3624 | PCTADF | 4741 |
| CXGET1 | 3637 | PCTADG | 4761 |
| CXTEX1 | 4000 | PCTADT | 4770 |
| CXNXBL | 4012 | PCTPTR | 4771 |
| CXNXCH | 4041 | PCTNL | 4772 |
| CXGTCH | 4053 | PCTCT | 4773 |
| CRGET | 4053 | PCTENT | 4774 |
| CXPUT | 4056 | PCTSEG | 4775 |

SYMBOL TABLE.—Continued

| | | | |
|---|---|---|---|
| PCTADX | 4776 | SRF | 6351 |
| PCTCH | 4777 | CRA | 6352 |
| POTORG | 5000 | TTINCR | 6401 |
| CBRIS | 5420 | TTI | 6402 |
| CBXIS | 5421 | A | 6403 |
| CBEIS | 5422 | TTO | 6404 |
| T8DIS | 5423 | TTCL | 6411 |
| ADFRIS | 5424 | TTSL | 6412 |
| ADFCIS | 5425 | TTRL | 6414 |
| CRCTRB | 5443 | TT8SKP | 6431 |
| CRPUT | 5453 | TT8OF | 6432 |
| CXGET | 5456 | TT8ON | 6434 |
| TAC | 6301 | ADFSRF | 6701 |
| CTF | 6302 | ADFRRS | 6702 |
| CIM | 6304 | ADFEDF | 6704 |
| STF | 6311 | ADFSCF | 6711 |
| RRB | 6312 | ADFRCS | 6712 |
| SIM | 6314 | ADFDDF | 6714 |
| SEF | 6321 | ADFCTG | 6721 |
| CEF | 6322 | ADFSTR | 6722 |
| SRE | 6324 | ADFCTR | 6724 |
| SRI | 6331 | ADFITG | 6731 |
| CRF | 6332 | ADFSRS | 6732 |
| STR | 6334 | ADFCRS | 6734 |
| SSR | 6341 | ADFCCF | 6741 |
| CTR | 6342 | ADFCRF | 6742 |
| CRE | 6344 | POTEND | 7560 |

What is claimed is:

1. A message concentrator for assembling into a single string of data, multi-byte digital messages received from a plurality of remote terminals comprising in combination (a) buffer means connected to receive bytes of said messages from all of said terminals for concurrently assembling and temporarily storing a plurality of message bytes;

(b) a memory comprising a plurality of individually addressable memory segments, each capable of storing a fixed number of message bytes;

(c) means for transferring message bytes from said buffer to said memory and for concurrently assembling successive message bytes originating from respective terminals in respective sub-strings of serially linked memory segments; and (d) means for successively linking serially to one another sub-strings holding complete messages so as to form in said memory an output string of several messages originating from various ones of said terminals.

2. A message concentrator for assemblying into a single string of data for rapid synchronous transmission a plurality of digital messages of the type comprising a plurality of bytes and ending with a terminating character, and received asynchronously from a plurality of remote terminals, comprising in combination (a) buffer means connected to receive digital messages from all of said terminals for assembling and temporarily storing a plurality of bytes comprising said messages, each byte being accompanied in said buffer means by a terminal address byte identifying its terminal of origin;

(b) a memory having a plurality of individually addressable memory segments, each capable of storing N message bytes and a linking word representing the address of another one of said memory segments;

(c) means for allocating a plurality of sub-strings of memory segments, each sub-string to receive from said buffer means all the bytes of a message originating from a respective one of said terminals;

(d) means for sequentially transferring said bytes from said buffer to the memory segments allocated to receive them;

(e) means for storing a linking word in all memory segments except the last in each of said sub-strings, the linking word of each memory segments in a given sub-string representing the address of the next memory segment in that sub-string; and (f) means for storing a linking word in that last segment of all said sub-strings except that last, each said linking word representing the address of the first segment of the following sub-string, said linked sub-strings together holding a plurality of messages in a single data string ready for synchronous transmission.

3. In a message concentrator for assembling into a single string of data digital multi-byte messages originating from several remote terminals, the combination comprising (a) a memory having a plurality of individually addressable memory segments, each having a storage capacity for N bytes and a linking word representing the address of another one of said segments;

(b) means for initially storing in each except the last of a plurality of memory segments which are available to receive bytes a linking word representing the address of the next one of said available memory segments;

(c) a next available segment pointer including means for storing the address of the first one of said available memory segments;

(d) means for updating said available segment pointer by storing therein the address of the next available memory segment when said first one of said available memory segments becomes unavailable;

(e) means for sequentially presenting bytes from a given terminal for storage in said memory;

(f) means for storing said bytes as they are presented for storage in successive memory segments in the sequence in which the addresses of said memory segments appear in said next available segment pointer; and (g) means for storing in each memory segment which has become filled with bytes from said terminal, and hence unavailable, the address of the next memory segment in which bytes from said terminal have been stored, thereby linking the memory segments holding bytes originating from said terminal.

4. In a data processor, the combination comprising (a) a memory having a plurality of individually addressable memory segments, each segment having a capacity to store an equal plurality of data bytes and a linking word representing the address of another one of said segments;

(b) means for initially storing in each except the last of a plurality of empty memory segments which are available to receive data bytes, a linking word representing the address of the next one of said available memory segments;

(c) a next available segment pointer including means for storing the address of the first one of said available memory segments;

(d) means for updating said next available segment pointer by storing therein the addresses of successive ones of said available memory segments as preceding ones of them become filled and hence unavailable;

(e) means for sequentially storing data bytes of a single digital message in successive ones of said available memory segments in the sequence in which their addresses appear in said next available segment pointer;

(f) means for storing in each but the last of said successive memory segments the address of the next of said successive memory segments so that memory segments holding data bytes of a given message form a continuous string of memory segments;

(g) means for sequentially reading out of said string of segments, beginning with the first, the data bytes of said message stored therein;

(h) means for storing in each said memory segment after its contents have been read out a linking word representing the address of the memory segment whose address is then in said next available segment pointer; and (i) means for updating said next available segment pointer by storing therein the address of the memory segment in which a linking word has just been stored, thereby making it the next available memory segment.

5. In a data concentrator, the combination comprising (a) a memory having a plurality of similar multi-word memory segments;

(b) means for initially storing in the first word of each except the last of a plurality of empty memory segments which are available to receive bytes the address of the first word of the next one of said available memory segments;

(c) a next available segment pointer including means for storing the address of the first word of the first one of said available memory segments;

(d) means for updating said next available segment pointer by storing therein the addresses of the first words of successive ones of said available memory segments as preceding ones of them become filled with data bytes and hence unavailable;

(e) means for sequentially storing a finite number of data bytes representing a message received from a particular data source in the second through the last words of successive ones of said available memory segments in the sequence in which the addresses of their first words appear in said next available segment pointer;

(f) means for replacing the address initially stored in the first word of each memory segment which has become filled with bytes from said source with the address of the first word of the next memory segment in which bytes from said source have been stored, thereby linking into a single string the memory segments holding bytes originating from said source;

(g) means for sequentially transferring out of said string of segments beginning with the first, the data bytes of said message stored therein;

(h) means for storing in the first word of each said memory segment in said string as it becomes emptied of its data bytes the address which is then in the next available segment pointer; and (i) means for updating said next available segment pointer by storing therein the address of the first word of the memory segment which has just received the address previously in said next available segment pointer, thereby making the last memory segment to have been emptied the first available memory segment to receive further data bytes from said sequential storing means.

6. A method of assembling in the memory of a digital computer multi-byte digital messages received asynchronously from a plurality of remote terminals into a single string of data comprising the steps of (a) concurrently assembling successive message bytes originating from respective terminals in respective sub-strings of serially linked memory segments in said memory, and (b) successively linking serially to one another in said memory sub-strings holding complete messages so as to form an output string of several messages originating from various ones of said terminals.

7. A method of assembling in the memory of a digital computer multi-byte digital messages received asynchronously from a plurality of remote terminals into a single string of data comprising the steps of (a) assembling and temporarily storing each of said bytes comprising said messages with a terminal address byte identifying its terminal of origin;

(b) sequentially transferring said temporarily stored bytes to memory segments of said memory;

(c) storing in each memory segment holding bytes from a given terminal a linking word representing the address of another one of said memory segments holding bytes from the same terminal to form a substring of memory segments; and (d) storing a linking word in each of said substrings except the last representing the address of the following sub-string for successively linking serially to one another sub-strings holding complete messages so as to form an output string of several messages originating from various ones of said terminals.

8. A method of allocating words of a digital computer's memory to incoming data bytes of a message comprising the steps of (a) organizing said memory into a plurality of multiword memory segments;

(b) arranging said memory segments into a string of available memory segments;

(c) allocating successive ones of said string of available memory segments to store successive groups of said data bytes;

(d) successively reading said data bytes out of said memory segments; and (e) automatically returning each memory segment after its data bytes have been read out, to the head of said string of available memory segments so as to make it the next memory segment to be allocated.

9. A method of allocating words of a digital memory to incoming data bytes of a message comprising the steps of (a) organizing said memory into a plurality of multiword memory segments;

(b) initially storing in each except the last of a plurality of memory segments available to receive data bytes the address of the next one of said available memory segments;

(c) storing in said memory the address of the first one of said available memory segments;

(d) replacing the stored address of said first memory segment with the addresses of successive ones of the available memory segments as preceding ones of them become unavailable;

(e) sequentially storing data bytes of a message in successive ones of said available memory segments in the sequence in which their addresses are stored in said memory;

(f) storing in each but the last of said successive memory segments in which data bytes have been stored the address of the next of said successive memory segments so that memory segments holding data bytes of the message form a continuous string of memory segments;

(g) sequentially reading out of said string of segments the data bytes of said message stored therein;

(h) storing in each said memory segment, after its data bytes have been read out, the address of the memory segment whose address is currently stored as the next available memory segment; and (i) storing in said memory the address of the memory segment in which the address of the previously next available memory segment has just been stored.

References Cited

UNITED STATES PATENTS

| | | | |
|---|---|---|---|
| 3,444,525 | 5/1969 | Barlow et al. | 340—172.5 |
| 3,411,139 | 11/1968 | Lynch et al. | 340—172.5 |
| 3,408,628 | 10/1968 | Brass et al. | 340—172.5 |
| 3,406,380 | 10/1968 | Bradley et al. | 340—172.5 |
| 3,401,380 | 9/1968 | Bell et al. | 340—172.5 |
| 3,377,579 | 4/1968 | Wissick et al. | 340—172.5 |
| 3,363,234 | 1/1968 | Erickson et al. | 340—172.5 |
| 3,346,851 | 10/1967 | Thornton et al. | 340—172.5 |
| 3,345,618 | 10/1967 | Threadgold | 340—172.5 |
| 3,337,853 | 8/1967 | Harrand | 340—172.5 |
| 3,251,040 | 5/1966 | Burkholder et al. | 340—172.5 |

GARETH D. SHAW, Primary Examiner